(12) United States Patent
Rukavina et al.

(10) Patent No.: US 9,822,211 B2
(45) Date of Patent: *Nov. 21, 2017

(54) POLYURETHANES, ARTICLES AND COATINGS PREPARED THEREFROM AND METHODS OF MAKING THE SAME

(71) Applicant: PPG Industries Ohio, Inc., Cleveland, OH (US)

(72) Inventors: Thomas G. Rukavina, New Kensington, PA (US); Caroline S. Harris, Pittsburgh, PA (US); Robert M. Hunia, Kittanning, PA (US); Veronica L. Frain, Brackenridge, PA (US); Yan Wang, Seven Fields, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/465,436

(22) Filed: Aug. 21, 2014

(65) Prior Publication Data

US 2014/0364026 A1 Dec. 11, 2014

Related U.S. Application Data

(60) Division of application No. 13/690,579, filed on Nov. 30, 2012, now Pat. No. 8,835,592, which is a (Continued)

(51) Int. Cl.
*B32B 17/10* (2006.01)
*B32B 27/40* (2006.01)
(Continued)

(52) U.S. Cl.
CPC ...... *C08G 18/6644* (2013.01); *B32B 17/1077* (2013.01); *B32B 27/40* (2013.01); *C08G 18/00* (2013.01); *C08G 18/08* (2013.01); *C08G 18/10* (2013.01); *C08G 18/12* (2013.01); *C08G 18/28* (2013.01); *C08G 18/30* (2013.01); *C08G 18/305* (2013.01); *C08G 18/3203* (2013.01); *C08G 18/3206* (2013.01); *C08G 18/3212* (2013.01); *C08G 18/3215* (2013.01); *C08G 18/3284* (2013.01); *C08G 18/341* (2013.01); *C08G 18/381* (2013.01); *C08G 18/3868* (2013.01); *C08G 18/3872* (2013.01); *C08G 18/4018* (2013.01); *C08G 18/4277* (2013.01); *C08G 18/44* (2013.01); *C08G 18/6607* (2013.01);
(Continued)

(58) Field of Classification Search
CPC .. C08G 18/341; C08G 18/4277; C08G 18/00; C08G 18/30; C08G 18/28; C08G 18/08; C08G 18/10; C08G 18/12; C08G 18/305; C08G 18/3206; C08G 18/3212; C08G 18/3215; C08G 18/3284; C08G 18/381; C08G 18/3868; C08G 18/3872; C08G 18/4018; C08G 18/44; C08G 18/6607; C08G 18/6644; C08G 18/671; C08G 18/724; C08G 18/758; C08G 18/765; C08G 18/7657; C08G 18/792; C08G 18/70; C08G 18/831; C08G 18/3203; C08G 18/72; C09D 175/04; Y10T 156/10; Y10T 442/20; Y10T 428/31601; Y10T 428/31598; Y10T 442/2623; Y10T 428/31507; Y10T 442/2197; Y10T 428/31591; Y10T 428/249921; Y10T 428/31551; Y10T 442/2721; Y10T 442/183; Y10T 428/31605; B32B 17/1077; B32B 27/40; B32B 2605/18
See application file for complete search history.

(56) References Cited

U.S. PATENT DOCUMENTS 2,370,567 A  2/1945  Muskat et al.
2,403,113 A  7/1946  Muskat et al.
(Continued)

FOREIGN PATENT DOCUMENTS

DE  3201224 A1  7/1983
DE  19721600 A1  11/1998
(Continued)

OTHER PUBLICATIONS

Efstathiou, K., Synthesis and characterization of a Polyurethane Prepolymer for the development of a novel Acrylate-based polymer foam, Budapest University of Technology and Economics (BME), Oct. 13, 2011, pp. 1-57.
(Continued)

*Primary Examiner* — Patrick Niland
(74) *Attorney, Agent, or Firm* — Julie W. Meder

(57) ABSTRACT

The present invention provides polyurethanes including a reaction product of components including: (a) an isocyanate functional urethane prepolymer comprising a reaction product of components including: (i) about 1 equivalent of at least one polyisocyanate; and (ii) about 0.1 to about 0.5 equivalents of at least one diol having 2 to 18 carbon atoms; and (b) about 0.05 to about 0.9 equivalents of at least one branched polyol having 4 to 18 carbon atoms and at least 3 hydroxyl groups; and (c) up to about 0.9 equivalents of at least one polyol different from branched polyol (b) and having 2 to 18 carbon atoms, wherein the reaction product components are essentially free of polyester polyol and polyether polyol; compositions, coatings and articles made therefrom and methods of making the same.

28 Claims, 35 Drawing Sheets

Related U.S. Application Data continuation of application No. 12/410,047, filed on Mar. 24, 2009, now abandoned, which is a continuation-in-part of application No. 11/639,059, filed on Dec. 14, 2006, now abandoned, which is a continuation-in-part of application No. 10/932,641, filed on Sep. 1, 2004, now Pat. No. 8,178,615, and a continuation-in-part of application No. 11/303,670, filed on Dec. 16, 2005, now abandoned, and a continuation-in-part of application No. 11/303,422, filed on Dec. 16, 2005, now abandoned, and a continuation-in-part of application No. 11/303,892, filed on Dec. 16, 2005, now abandoned, and a continuation-in-part of application No. 11/303,671, filed on Dec. 16, 2005, now abandoned.

(51) Int. Cl.
| | | |
|---|---|---|
| *C08G 18/00* | (2006.01) | |
| *C08G 18/08* | (2006.01) | |
| *C08G 18/10* | (2006.01) | |
| *C08G 18/12* | (2006.01) | |
| *C08G 18/28* | (2006.01) | |
| *C08G 18/30* | (2006.01) | |
| *C08G 18/32* | (2006.01) | |
| *C08G 18/34* | (2006.01) | |
| *C08G 18/38* | (2006.01) | |
| *C08G 18/40* | (2006.01) | |
| *C08G 18/42* | (2006.01) | |
| *C08G 18/44* | (2006.01) | |
| *C08G 18/66* | (2006.01) | |
| *C08G 18/67* | (2006.01) | |
| *C08G 18/70* | (2006.01) | |
| *C08G 18/72* | (2006.01) | |
| *C08G 18/75* | (2006.01) | |
| *C08G 18/76* | (2006.01) | |
| *C08G 18/79* | (2006.01) | |
| *C08G 18/83* | (2006.01) | |
| *C09D 175/04* | (2006.01) | |
| *C08G 18/73* | (2006.01) | |

(52) U.S. Cl.
CPC ......... *C08G 18/671* (2013.01); *C08G 18/70* (2013.01); *C08G 18/72* (2013.01); *C08G 18/724* (2013.01); *C08G 18/73* (2013.01); *C08G 18/758* (2013.01); *C08G 18/765* (2013.01); *C08G 18/7657* (2013.01); *C08G 18/792* (2013.01); *C08G 18/831* (2013.01); *C09D 175/04* (2013.01); *B32B 2307/412* (2013.01); *B32B 2605/18* (2013.01); *Y10T 156/10* (2015.01); *Y10T 428/249921* (2015.04); *Y10T 428/31507* (2015.04); *Y10T 428/31551* (2015.04); *Y10T 428/31591* (2015.04); *Y10T 428/31598* (2015.04); *Y10T 428/31601* (2015.04); *Y10T 428/31605* (2015.04); *Y10T 442/183* (2015.04); *Y10T 442/20* (2015.04); *Y10T 442/2197* (2015.04); *Y10T 442/2623* (2015.04); *Y10T 442/2721* (2015.04)

(56) References Cited

U.S. PATENT DOCUMENTS

| | | |
|---|---|---|
| 2,562,172 A | 7/1951 | Campos |
| 2,644,007 A | 6/1953 | Irwin |
| 2,680,127 A | 6/1954 | Slocombe et al. |
| 2,908,703 A | 10/1959 | Latourette et al. |
| 2,965,650 A | 12/1960 | Howard, Jr. |
| 2,965,651 A | 12/1960 | Kosmin |
| 3,134,742 A | 5/1964 | Wismer et al. |
| 3,169,945 A | 2/1965 | Hostettler et al. |
| 3,361,706 A | 1/1968 | Meriwether et al. |
| 3,433,856 A | 3/1969 | Friedman |
| 3,562,172 A | 2/1971 | Ono et al. |
| 3,567,605 A | 3/1971 | Becker |
| 3,578,602 A | 5/1971 | Ono et al. |
| 3,664,909 A | 5/1972 | Ackley |
| 3,674,746 A | 7/1972 | Lohse et al. |
| 3,678,011 A | 7/1972 | Hino et al. |
| 3,713,962 A | 1/1973 | Ackley |
| 3,755,262 A | 8/1973 | Slagel |
| 3,764,457 A | 10/1973 | Chang et al. |
| 3,766,148 A | 10/1973 | Taub |
| 3,786,034 A | 1/1974 | Blair et al. |
| 3,850,723 A | 11/1974 | Ackley |
| 3,866,242 A | 2/1975 | Slagel |
| 3,891,594 A | 6/1975 | Taylor |
| 3,919,173 A | 11/1975 | Coyner et al. |
| 3,936,426 A | 2/1976 | Campbell |
| 3,971,892 A | 7/1976 | Schlichte |
| 4,058,492 A | 11/1977 | von Bonin et al. |
| 4,085,092 A | 4/1978 | Chang et al. |
| 4,095,637 A | 6/1978 | Krishnan |
| 4,101,529 A | 7/1978 | Ammons |
| 4,103,070 A | 7/1978 | Ammons |
| 4,153,777 A | 5/1979 | Slagel |
| 4,160,853 A | 7/1979 | Ammons |
| 4,166,043 A | 8/1979 | Uhlmann et al. |
| 4,178,410 A | 12/1979 | Tomita |
| 4,208,507 A | 6/1980 | Stutz et al. |
| 4,215,010 A | 7/1980 | Hovey et al. |
| 4,269,945 A | 5/1981 | Vanderhider et al. |
| 4,342,668 A | 8/1982 | Hovey et al. |
| 4,365,051 A | 12/1982 | Chung et al. |
| 4,367,170 A | 1/1983 | Uhlmann et al. |
| 4,410,597 A | 10/1983 | Nishino et al. |
| 4,410,667 A | 10/1983 | Porter, Jr. et al. |
| 4,430,471 A | 2/1984 | Toothill et al. |
| 4,434,284 A | 2/1984 | Rukavina et al. |
| 4,487,904 A | 12/1984 | Fukuda et al. |
| 4,507,459 A | 3/1985 | Schmidt et al. |
| 4,556,605 A | 12/1985 | Mogami et al. |
| 4,581,433 A | 4/1986 | Potter et al. |
| 4,596,835 A | 6/1986 | Werner et al. |
| 4,632,877 A | 12/1986 | Watanabe et al. |
| 4,637,698 A | 1/1987 | Kwak et al. |
| 4,652,494 A | 3/1987 | Bravet et al. |
| 4,657,796 A | 4/1987 | Musil et al. |
| 4,659,747 A | 4/1987 | Alberino et al. |
| 4,670,346 A | 6/1987 | Smith |
| 4,680,204 A | 7/1987 | Das et al. |
| 4,710,560 A | 12/1987 | Vu |
| 4,719,296 A | 1/1988 | Irie et al. |
| 4,720,356 A | 1/1988 | Chu |
| 4,731,264 A | 3/1988 | Lin et al. |
| 4,756,973 A | 7/1988 | Sakagami et al. |
| 4,764,430 A | 8/1988 | Blackburn et al. |
| 4,798,745 A | 1/1989 | Martz et al. |
| 4,798,746 A | 1/1989 | Claar et al. |
| 4,798,849 A | 1/1989 | Thomas et al. |
| 4,808,690 A | 2/1989 | Slagel |
| 4,810,812 A | 3/1989 | Matsuda et al. |
| 4,816,584 A | 3/1989 | Kwak et al. |
| 4,818,096 A | 4/1989 | Heller et al. |
| 4,826,977 A | 5/1989 | Heller et al. |
| 4,839,455 A | 6/1989 | Fong |
| 4,847,140 A | 7/1989 | Jaskowski |
| 4,856,857 A | 8/1989 | Takeuchi et al. |
| 4,857,576 A | 8/1989 | Kochi et al. |
| 4,866,103 A | 9/1989 | Cassidy et al. |
| 4,873,027 A | 10/1989 | Umemoto et al. |
| 4,880,667 A | 11/1989 | Welch |
| 4,889,413 A | 12/1989 | Ormsby et al. |
| 4,892,920 A | 1/1990 | Quay et al. |
| 4,904,525 A | 2/1990 | Taniguchi et al. |
| 4,931,219 A | 6/1990 | Kwiatkowski et al. |

(56) References Cited

U.S. PATENT DOCUMENTS

| | | |
|---|---|---|
| 4,931,220 A | 6/1990 | Haynes et al. |
| 4,935,486 A | 6/1990 | Wellner |
| 4,948,661 A | 8/1990 | Smith et al. |
| 4,997,901 A | 3/1991 | Yamada et al. |
| 5,001,208 A | 3/1991 | Ross et al. |
| 5,011,737 A | 4/1991 | Smith et al. |
| 5,039,566 A | 8/1991 | Skubic et al. |
| 5,066,818 A | 11/1991 | Gemert et al. |
| 5,066,878 A | 11/1991 | Sekine et al. |
| 5,070,173 A | 12/1991 | Yokota et al. |
| 5,071,608 A | 12/1991 | Smith et al. |
| 5,071,951 A | 12/1991 | Ulrich et al. |
| 5,098,624 A | 3/1992 | Smith et al. |
| 5,104,692 A | 4/1992 | Belmares |
| 5,128,433 A | 7/1992 | LeCompte et al. |
| 5,134,191 A | 7/1992 | Takarada et al. |
| 5,147,897 A | 9/1992 | Morimoto et al. |
| 5,151,390 A | 9/1992 | Aoki et al. |
| 5,158,922 A | 10/1992 | Hinney et al. |
| 5,159,045 A | 10/1992 | Haseyama et al. |
| 5,166,345 A | 11/1992 | Akashi et al. |
| 5,191,055 A | 3/1993 | Kanemura et al. |
| 5,196,485 A | 3/1993 | McMonigal et al. |
| 5,221,788 A | 6/1993 | Goto et al. |
| 5,225,472 A | 7/1993 | Cameron et al. |
| 5,231,156 A | 7/1993 | Lin |
| 5,236,958 A | 8/1993 | Miyashita |
| 5,236,978 A | 8/1993 | Selvig et al. |
| 5,238,931 A | 8/1993 | Yoshikawa et al. |
| 5,239,012 A | 8/1993 | McEntire et al. |
| 5,252,742 A | 10/1993 | Miyashita |
| 5,256,452 A | 10/1993 | McMonigal et al. |
| 5,274,132 A | 12/1993 | VanGemert |
| 5,310,577 A | 5/1994 | Mase et al. |
| 5,323,191 A | 6/1994 | Firtion et al. |
| 5,334,673 A | 8/1994 | Wu |
| 5,352,758 A | 10/1994 | Kanemura et al. |
| 5,359,035 A | 10/1994 | Habermann |
| 5,359,085 A | 10/1994 | Iwamoto et al. |
| 5,368,806 A | 11/1994 | Harasin et al. |
| 5,373,033 A | 12/1994 | Toh et al. |
| 5,384,077 A | 1/1995 | Knowles |
| 5,384,379 A | 1/1995 | Bader et al. |
| 5,391,327 A | 2/1995 | Ligas et al. |
| 5,405,958 A | 4/1995 | VanGemert |
| 5,429,774 A | 7/1995 | Kumar |
| 5,462,806 A | 10/1995 | Konishi et al. |
| 5,466,398 A | 11/1995 | Van Gemert et al. |
| 5,470,813 A | 11/1995 | Le-Khac |
| 5,470,910 A | 11/1995 | Spanhel et al. |
| 5,482,908 A | 1/1996 | Le-Khac |
| 5,488,119 A | 1/1996 | Fischer-Reimann et al. |
| 5,496,641 A | 3/1996 | Mase et al. |
| 5,498,686 A | 3/1996 | Effer et al. |
| 5,510,444 A | 4/1996 | Halpaap et al. |
| 5,545,707 A | 8/1996 | Heidingsfeld et al. |
| 5,552,091 A | 9/1996 | Kumar |
| 5,554,673 A | 9/1996 | Shah |
| 5,563,233 A | 10/1996 | Reich et al. |
| 5,602,198 A | 2/1997 | Das et al. |
| 5,618,586 A | 4/1997 | Swarup et al. |
| 5,621,017 A | 4/1997 | Kobayakawa et al. |
| 5,631,339 A | 5/1997 | Faler et al. |
| 5,645,767 A | 7/1997 | Van Gemert |
| 5,646,230 A | 7/1997 | Pantone et al. |
| 5,658,501 A | 8/1997 | Kumar et al. |
| 5,663,244 A | 9/1997 | Barancyk et al. |
| 5,679,756 A | 10/1997 | Zhu et al. |
| 5,684,083 A | 11/1997 | Temple et al. |
| 5,691,440 A | 11/1997 | Katz et al. |
| 5,693,738 A | 12/1997 | Okazaki et al. |
| 5,698,141 A | 12/1997 | Kumar |
| 5,739,243 A | 4/1998 | Herold et al. |
| 5,753,146 A | 5/1998 | Van Gemert et al. |
| 5,770,115 A | 6/1998 | Misura |
| 5,776,376 A | 7/1998 | Nagoh et al. |
| 5,786,070 A | 7/1998 | Higuchi et al. |
| 5,807,607 A | 9/1998 | Smith et al. |
| 5,807,975 A | 9/1998 | Amagai et al. |
| 5,811,503 A | 9/1998 | Herold et al. |
| 5,811,506 A | 9/1998 | Slagel |
| 5,814,410 A | 9/1998 | Singer et al. |
| 5,821,287 A | 10/1998 | Hu et al. |
| 5,830,578 A | 11/1998 | Ono et al. |
| 5,834,554 A | 11/1998 | Duan et al. |
| 5,834,580 A | 11/1998 | Chen et al. |
| 5,853,809 A | 12/1998 | Campbell et al. |
| 5,910,522 A | 6/1999 | Schmidt et al. |
| 5,917,006 A | 6/1999 | Smith et al. |
| 5,922,469 A | 7/1999 | Wunsch et al. |
| 5,932,681 A | 8/1999 | Herold et al. |
| 5,942,158 A | 8/1999 | Okoroafor et al. |
| 5,945,504 A | 8/1999 | Amagi et al. |
| 5,961,889 A | 10/1999 | Jiang et al. |
| 5,962,608 A | 10/1999 | Ryang et al. |
| 5,962,617 A | 10/1999 | Slagel |
| 5,962,619 A | 10/1999 | Seneker et al. |
| 5,976,422 A | 11/1999 | Okoroafor et al. |
| 5,976,701 A | 11/1999 | Barancyk et al. |
| 6,025,026 A | 2/2000 | Smith et al. |
| 6,042,737 A | 3/2000 | Basil et al. |
| 6,060,001 A | 5/2000 | Welch et al. |
| 6,100,362 A | 8/2000 | Okazaki et al. |
| 6,113,814 A | 9/2000 | Gemert et al. |
| 6,127,505 A | 10/2000 | Slagel |
| 6,130,307 A | 10/2000 | Amagai et al. |
| 6,150,430 A | 11/2000 | Walters et al. |
| 6,153,126 A | 11/2000 | Kumar |
| 6,166,129 A | 12/2000 | Rosthauser et al. |
| 6,174,984 B1 | 1/2001 | Peter |
| 6,175,450 B1 | 1/2001 | Andreani et al. |
| 6,180,226 B1 | 1/2001 | McArdle et al. |
| 6,187,444 B1 | 2/2001 | Bowles, III et al. |
| 6,224,979 B1 | 5/2001 | Ryang et al. |
| 6,258,917 B1 | 7/2001 | Slagel |
| 6,268,055 B1 | 7/2001 | Walters et al. |
| 6,296,785 B1 | 10/2001 | Nelson et al. |
| 6,342,571 B1 | 1/2002 | Smith et al. |
| 6,348,604 B1 | 2/2002 | Nelson et al. |
| 6,353,039 B1 | 3/2002 | Rheinberger et al. |
| 6,353,102 B1 | 3/2002 | Kumar |
| 6,432,526 B1 | 8/2002 | Arney et al. |
| 6,432,544 B1 | 8/2002 | Stewart et al. |
| 6,433,043 B1 | 8/2002 | Misura et al. |
| 6,436,525 B1 | 8/2002 | Welch et al. |
| 6,441,119 B1 | 8/2002 | Kosaka |
| 6,472,495 B1 | 10/2002 | Yoshimura et al. |
| 6,506,488 B1 | 1/2003 | Stewart et al. |
| 6,509,418 B1 | 1/2003 | Zook et al. |
| 6,531,076 B2 | 3/2003 | Crano et al. |
| 6,555,028 B2 | 4/2003 | Walters et al. |
| 6,562,932 B1 | 5/2003 | Markusch et al. |
| 6,575,721 B1 | 6/2003 | Daly et al. |
| 6,602,603 B2 | 8/2003 | Welch et al. |
| 6,631,021 B2 | 10/2003 | Smith et al. |
| 6,632,914 B2 | 10/2003 | Bruchmann et al. |
| 6,733,887 B2 | 5/2004 | Okoroafor et al. |
| 6,818,306 B2 | 11/2004 | Miller et al. |
| 6,863,982 B2 | 3/2005 | Nakajima et al. |
| 6,939,939 B2 | 9/2005 | Slagel et al. |
| 6,951,666 B2 | 10/2005 | Kodas et al. |
| 6,955,778 B2 | 10/2005 | Huntemann |
| 7,009,032 B2 | 3/2006 | Bojkova et al. |
| 7,022,303 B2 | 4/2006 | Riman et al. |
| 7,049,367 B2 | 5/2006 | Mazanek et al. |
| 7,144,969 B2 | 12/2006 | McDonald |
| 7,169,375 B2 | 1/2007 | Chisholm |
| 7,199,207 B2 | 4/2007 | Gruenewaelder et al. |
| 7,303,700 B2 | 12/2007 | Miller et al. |
| 7,589,141 B2 | 9/2009 | Zalich et al. |
| 7,632,563 B2 | 12/2009 | Hellring et al. |
| 8,017,720 B2 | 9/2011 | Bojkova et al. |
| 8,178,615 B2 | 5/2012 | Lu et al. |
| 8,207,286 B2 | 6/2012 | Rukavina et al. |

(56) References Cited

U.S. PATENT DOCUMENTS

| | | | |
|---|---|---|---|
| 8,349,986 B2 | 1/2013 | Rukavina et al. | |
| 8,604,153 B2 | 12/2013 | Rukavina et al. | |
| 8,835,592 B2 | 9/2014 | Rukavina et al. | |
| 8,865,853 B2 | 10/2014 | Rukaivina | |
| 9,296,920 B2* | 3/2016 | Rukavina | B32B 17/1077 |
| 2001/0047043 A1 | 11/2001 | Okoroafor et al. | |
| 2003/0044620 A1 | 3/2003 | Okoroafor et al. | |
| 2003/0096935 A1 | 5/2003 | Nagpal et al. | |
| 2003/0105265 A1 | 6/2003 | McDonald | |
| 2003/0144452 A1 | 7/2003 | Jallouli et al. | |
| 2003/0149217 A1 | 8/2003 | Bojkova et al. | |
| 2003/0207976 A1 | 11/2003 | Yadav et al. | |
| 2003/0211369 A1 | 11/2003 | Riman et al. | |
| 2004/0138401 A1 | 7/2004 | Bojkova et al. | |
| 2004/0151928 A1 | 8/2004 | Kaneshiro et al. | |
| 2004/0192835 A1 | 9/2004 | Steidl et al. | |
| 2005/0027092 A1 | 2/2005 | Steidl et al. | |
| 2006/0008596 A1 | 1/2006 | Pokorny et al. | |
| 2006/0047058 A1 | 3/2006 | Lu et al. | |
| 2006/0079650 A1 | 4/2006 | Stevenson et al. | |
| 2006/0128859 A1 | 6/2006 | Muller | |
| 2007/0142602 A1 | 6/2007 | Rukavina | |
| 2007/0142603 A1 | 6/2007 | Rukavina | |
| 2007/0142604 A1 | 6/2007 | Bojkova et al. | |
| 2007/0142606 A1 | 6/2007 | Bojkova et al. | |
| 2007/0173601 A1 | 7/2007 | Rukavina et al. | |
| 2007/0225468 A1 | 9/2007 | Rukavina et al. | |
| 2007/0238848 A1 | 10/2007 | Bojkova et al. | |
| 2008/0097067 A1 | 4/2008 | Xie | |
| 2009/0048419 A1 | 2/2009 | Fahlen et al. | |
| 2009/0258974 A1 | 10/2009 | Slagel et al. | |
| 2009/0280709 A1 | 11/2009 | Rukavina et al. | |
| 2010/0124649 A1 | 5/2010 | Rukavina et al. | |
| 2010/0204428 A1 | 8/2010 | Barbieri | |
| 2010/0314067 A1 | 12/2010 | Yazaki et al. | |
| 2012/0321863 A1 | 12/2012 | O'Donnell et al. | |
| 2013/0095311 A1 | 4/2013 | Rukavina et al. | |
| 2013/0095714 A1 | 4/2013 | Rukavina | |
| 2014/0023866 A1 | 1/2014 | Rukavina et al. | |
| 2014/0066535 A1 | 3/2014 | Jacobs et al. | |
| 2014/0199524 A1 | 7/2014 | Rukavina | |
| 2014/0364026 A1 | 12/2014 | Rukavina et al. | |
| 2016/0039967 A1* | 2/2016 | Rukavina | C08G 18/72 |
| | | | 428/174 |
| 2017/0145351 A1* | 5/2017 | Haetzelt | C11D 3/34 |

FOREIGN PATENT DOCUMENTS

| | | |
|---|---|---|
| EP | 0116735 A1 | 8/1984 |
| EP | 0146136 A2 | 6/1985 |
| EP | 0294056 A2 | 12/1988 |
| EP | 0329387 A2 | 8/1989 |
| EP | 0454066 A2 | 10/1991 |
| EP | 0578220 A2 | 1/1994 |
| EP | 0780413 A1 | 6/1997 |
| EP | 0802208 A1 | 10/1997 |
| EP | 0839643 A1 | 5/1998 |
| EP | 0927730 A1 | 7/1999 |
| EP | 0936233 A2 | 8/1999 |
| EP | 1095956 A2 | 5/2001 |
| EP | 1099721 A1 | 5/2001 |
| EP | 1134242 A2 | 9/2001 |
| EP | 1197505 A1 | 4/2002 |
| EP | 1384736 A1 | 1/2004 |
| EP | 2248944 A1 | 11/2010 |
| EP | 2385075 A1 | 11/2011 |
| FR | 2251426 A1 | 7/1975 |
| FR | 2751763 A1 | 1/1998 |
| GB | 1011514 | 12/1965 |
| GB | 1115789 | 5/1968 |
| GB | 1419985 | 1/1976 |
| GB | 1501801 | 2/1978 |
| JP | 53141397 | 12/1978 |
| JP | 62195383 A | 8/1987 |
| JP | 62226134 A | 10/1987 |
| JP | 63178193 A | 7/1988 |
| JP | 6439330 A | 2/1989 |
| JP | 2269113 A | 11/1990 |
| JP | 32864 A | 1/1991 |
| JP | 335236 A | 2/1991 |
| JP | 3269507 A | 12/1991 |
| JP | 528753 B2 | 4/1993 |
| JP | 9151230 A | 6/1997 |
| JP | 9227648 A | 9/1997 |
| JP | 1060071 A | 3/1998 |
| JP | 10166497 A | 6/1998 |
| JP | 11152321 A | 6/1999 |
| JP | 2000256435 A | 9/2000 |
| JP | 2004231931 A | 8/2004 |
| JP | 2007169411 A | 7/2007 |
| JP | 2007277507 A | 10/2007 |
| JP | 2010159367 A | 7/2010 |
| JP | 201112155 A | 1/2011 |
| JP | 2011236335 A | 11/2011 |
| JP | 2012221682 A | 11/2012 |
| JP | 20137006 A | 1/2013 |
| JP | 201429432 A | 2/2014 |
| RU | 2224710 C1 | 2/2004 |
| WO | 9307179 A2 | 4/1993 |
| WO | 9611926 A1 | 4/1996 |
| WO | 9618926 A1 | 6/1996 |
| WO | 9619741 A1 | 6/1996 |
| WO | 9637573 A1 | 11/1996 |
| WO | 9700910 A1 | 1/1997 |
| WO | 9703373 A1 | 1/1997 |
| WO | 9705213 A1 | 2/1997 |
| WO | 9706944 A1 | 2/1997 |
| WO | 9721122 A1 | 6/1997 |
| WO | 9837115 A1 | 8/1998 |
| WO | 9929791 A1 | 6/1999 |
| WO | 0014137 A1 | 3/2000 |
| WO | 0017249 A1 | 3/2000 |
| WO | 0024449 A1 | 5/2000 |
| WO | 0136507 A1 | 5/2001 |
| WO | 0136508 A1 | 5/2001 |
| WO | 0166623 A1 | 9/2001 |
| WO | 0200026 A1 | 1/2002 |
| WO | 02102887 A1 | 12/2002 |
| WO | 03011925 A1 | 2/2003 |
| WO | 03042270 A1 | 5/2003 |
| WO | 03044070 A1 | 5/2003 |
| WO | 03050193 A1 | 6/2003 |
| WO | 2004060951 A1 | 7/2004 |
| WO | 2004060971 A2 | 7/2004 |
| WO | 2006130339 A1 | 12/2006 |
| WO | 2007015273 A1 | 2/2007 |
| WO | 2007043945 A1 | 4/2007 |
| WO | 2007070627 A2 | 6/2007 |
| WO | 2007108198 A1 | 9/2007 |
| WO | 2010110784 A1 | 9/2010 |
| WO | 2012130760 A1 | 10/2012 |

OTHER PUBLICATIONS

ANSI Code Z-26.1, Test No. 18—"American National Standard for Safety Glazing Materials for Glazing Motor Vehicles and Motor Vehicles and Motor Vehicle Equipment Operating on Land Highways—Safety Standard", American National Standards Institute, 1997, pp. 1-37.

ASTM D 542-00—"Standard Test Method for Index of Refraction of Transparent Organic Plastics", Annual Book of ASTM Standards, 2000, pp. 1-4.

ASTM-D 638-03—"Standard Test Method for Tensile Properties of Plastics", Annual Book of ASTM Standards, 2003, pp. 1-15.

ASTM-D-648-04—"Standard Test for Deflection Temperature of Plastics Under Flexural Load in the Edgewise Position", Annual Book of ASTM Standards, 2004, pp. 1-13.

ASTM D 792-00—"Standard Test Methods for Density and Specific Gravity (Relative Density) of Plastics by Displacement", Annual Book of ASTM Standards, 2000, pp. 1-6.

(56) References Cited

OTHER PUBLICATIONS

ASTM D 1044-99—"Standard Test Method for Resistance of Transparent Plastics to Surface Abrasion", Annual Book of ASTM Standards, 1999, pp. 1-5.
ASTM D-1499-59—"Tentative Recommended Practice for Operating Light and Water-Exposure Apparatus (Carbon Arc Type) for Exposure of Plastics", Annual Book of ASTM Standards, 1959, pp. 511-513.
ASTM D-1499-64, "Recommended Practice for Operating Light and Water Exposure Apparatus (Carbon-Arc Type) for Exposure of Plastics", pp. 509-511, 1966 Book of ASTM Standards.
ASTM D-1499-99, "Standard Practice for Filtered Open-Flame Carbon-Arc Exposure of Plastics", Annual Book of ASTM Standards 1999, pp. 1-4.
ASTM D 1925-70—"Standard Test Method for Yellowness Index of Plastics", Annual Book of ASTM Standards 1970 (Reapproved 1988), pp. 167-169.
ASTM-D 3763-02—"Standard Test Method for High Speed Puncture Properties of Plastics Using Load and Displacement Sensors", Annual Book of ASTM Standards, 2002, pp. 1-10.
ASTM-D 5420-04—"Standard Test Method for Impact Resistance of Flat, Rigid Plastic Specimen by Means of a Striker Impacted by a Falling Weight (Gardner Impact)", Annual Book of ASTM Standards, 2004, pp. 1-8.
ASTM E 228-95—"Standard Test Method for Linear Thermal Expansion of Solid Materials with a Vitreous Silica Dilatometer", pp. 129-135, ASTM International 1995.
ASTM E 903-82—"Standard Test Method for Solar Absorptance, Reflectance, and Transmittance of Materials Using Integrating Spheres", Annual Book of ASTM Standards, 1982, pp. 722-732.
ASTM F 735-94—"Standard Test Method for Abrasion Resistance of Transparent Plastics and Coatings Using the Oscillating Sand Method", Annual Book of ASTM Standards 1994 (Reapproved 2001) pp. 1-3.
ASTM G-25-70—"Standard Recommended Practice for Operating Enclosed Carbon-Arc Type Apparatus for Light Exposure of Non Metallic Materials", American Society for Testing and Materials, 1970, pp. 694-698.
ASTM G-53-96—"Standard Practice for Operating Light- and Water-Exposure Apparatus (Fluorescent UV-Condensation Type) for Exposure of Nonmetallic Materials", Annual Book of ASTM Standards, vol. 14.02, 1998, pp. 1271-1279.
CAPA 2077A Product Brochure of Solvay Chemicals; Oct. 23, 2006, retrieved from http://www.solvaychemicals.com/product/description/o,o,-_EN-76,00.html.
Ciba® Tinuvin® B75 Liquid Light Stabilizer System, Product Brochure of CIBA Specialty Chemicals; Dec. 1999.
Clauss, "Solid Lubricants and Self-Lubricating Solids" (1972); p. 1.
Crano, "Chromogenic Materials (Photochromic)", Kirk-Othmer Encyclopedia of Checmical Technology, Fourth Edition, 1993; pp. 321-332.
Desmodur® N3300, Product Brochure of Bayer Material Science; Nov. 11, 2005.
Desmodur® N3400 Product Brochure of Bayer Material Science; Nov. 3, 2005.
Desmodur® W, Product Brochure of Bayer Material Science; Oct. 27, 2005.
"Encyclopedia of Polymer Science and Technology", vol. 6 (1967); pp. 505-712.
Greene et al., "Protective Groups in Organic Synthesis" (1991), Wiley, New York.
"Hawley's Condensed Chemical Dictionary" (12th Ed., 1993), pp. 712, 761, 762, 784, 793 & 1113.
Islam, "A Quasi-Static Penetration Model for Ballistic Energy Absorption of Thick Section Composite", Presentation at University of Delaware Center for Composite Materials; Mar. 2, 2005.
ISO 14577-1:2002(E)—"Metallic Materials—Instrumented Indentation Test for Hardness and Materials Parameters—Part 1: Test Method", International Organization for Standardization First Edition, 2002, pp. 1-25.
Kaddami et al., "Different Solvent Free Synthetic Routes to Organic/Inorganic Hybrid Materials", Organic/Inorganic Materials II, Apr. 1999, p. 51-61, vol. 576.
Katz et al., "Handbook of Fillers and Plastics" (1987); pp. 9-10.
Loewenstein, "The Manufacturing Technology of Continuous Glass Fibres", 3d Ed. 1993); pp. 30-44, 47-60, 115-122 and 126-135.
Lu et al., "Nonlinear Optical Properties of Lead Sulfide Nanocrystals in Polymeric Coatings", Nanotechnology 13, 2002, p. 669-673.
Ludema, "Friction, Wear, Lubrication" (1996); p. 27.
Mark et al., "Inorganic Polymers", Prentice Hall Polymer Science and Engineering Series, (1992); p. 5.
Perry, "Applications for Cross-Linked Siloxane Particles" Chemtech. Feb. 1999; pp. 39-44.
Seneker et al., "Diisocyanato Dicyclohexylmethane: Structure/Property Relationships of its Geometrical Isomers in Polyurethane Elastomers", Colloid & Polymer Science vol. 270, No. 6 (Jun. 1992) (Abstract).
Silberberg, "Chemistry the Molecular Nature of Matter and Change" (1996); p. 586.
Surface Coatings, vol. I, Oil and Colour Chemists' Association Australia "Polyurethane Resins" (1993) pp. 105-117.
Technical Bulletin Pluriol® E400 Polyethylene Glycol, BASF Corp. (2005).
Technical Bulletin Pluronic® L62D Block Copolymer Surfactant, BASF Corp. (2004).
"Ullmann's Encyclopedia of Industrial Chemistry", 5th Edition, 1992, vol. A21, pp. 673-674.
Underwriter's Laboratory Test UL-94—"Standard for Test for Flammability of Plastic Materials for Parts in Devices and Appliances", Underwriter Laboratories, Inc., 1996, pp. 1-34.
U.S. Department of Defense MIL-PRF-25690B (Jan. 29, 1993), K-Factor Crack Propagation Resistance.
U.S. Appl. No. 60/332,829, filed Nov. 16, 2001, first named inventor Marvin Graham.
U.S. Appl. No. 60/435,537, filed Dec. 20, 2002, first named inventor Nina Bojkova.
Weast (Ed.), "Handbook of Chemistry of Physics", CRC Press (71.sup.st ED. 1990); p. 4-158.
Weast (Ed.), "Handbook of Chemistry and Physics", CRC Press (1975); p. F-22.
Wypych, "Handbook of Fillers", 2nd Ed. (1999); p. 15-202.
Young et al., "Polyesters from Lactone", Union Carbide F-40, p. 147.
Zimmerman et al., Desmodur W Chemistry and Applications.
U.S. Appl. No. 11/638,876, filed Dec. 14, 2006, Polyurethanes, Articles and Coatings Prepared Therefrom and Methods of Making the Same.
U.S. Appl. No. 11/638,712, filed Dec. 14, 2006, Poly(ureaurethane)s, Articles and Coatings Prepared Therefrom and Methods of Making the Same.
U.S. Appl. No. 11/638,713, filed Dec. 14, 2006, Polyurethanes Prepared from Polycaprolactone Polyols; Articles and Coatings Prepared Therefrom and Methods of Making the Same.
U.S. Appl. No. 11/638,736, filed Dec. 14, 2006, Poly(ureaurethane)s, Articles and Coatings Prepared Therefrom and Methods of Making the Same.
U.S. Appl. No. 11/638,855, filed Dec. 14, 2006, Impact Resistant Polyurethane and Poly(ureaurethane) Articles and Methods of Making the Same.
U.S. Appl. No. 11/638,925, filed Dec. 14, 2006, Polyurethanes Prepared from Polycarbonate Polyols, Articles and Coatings Prepared Therefrom and Methods of Making the Same.
U.S. Appl. No. 11/638,950, filed Dec. 14, 2006, Powder Coatings Prepared From Polyurethanes and Poly(ureaurethane)s, Coated Articles and Methods of Making the Same.
U.S. Appl. No. 11/638,976, filed Dec. 14, 2006, Polyurethanes Prepared from Polyester Polyols and/or Polycaprolactone Polyols, Articles and Coatings Prepared Therefrom and Methods of Making the Same.
U.S. Appl. No. 11/639,039, filed Dec. 14, 2006, Polyurethanes, Articles and Coatings Prepared Therefrom and Methods of Making the Same.

(56) References Cited

OTHER PUBLICATIONS

U.S. Appl. No. 11/639,040, filed Dec. 14, 2006, Poly(ureaurethane)s, Articles and Coatings Prepared Therefrom and Methods of Making the Same.
U.S. Appl. No. 11/639,057, filed Dec. 14, 2006, Reinforced Polyurethanes and Poly(ureaurethane)s, Methods of Making the Same and Articles Prepared Therefrom.
U.S. Appl. No. 11/639,058, filed Dec. 14, 2006, Polyurethanes Prepared from Polycarbonate Polyols, Articles and Coatings Prepared Therefrom and Methods of Making the Same.
U.S. Appl. No. 11/639,059, filed Dec. 14, 2006, Polyurethanes, Articles and Coatings Prepared Therefrom and Methods of Making the Same.
U.S. Appl. No. 11/639,093, filed Dec. 14, 2006, Poly(ureaurethane)s, Articles and Coatings Prepared Therefrom and Methods of Making the Same.
U.S. Appl. No. 11/639,094, filed Dec. 14, 2006, Poly(ureaurethane)s, Articles and Coatings Prepared Therefrom and Methods of Making the Same.
U.S. Appl. No. 11/639,095, filed Dec. 14, 2006, Polyurethanes, Articles and Coatings Prepared Therefrom and Methods of Making the Same.
U.S. Appl. No. 11/639,112, filed Dec. 14, 2006, Poly(ureaurethane)s, Articles and Coatings Prepared Therefrom and Methods of Making the Same.
U.S. Appl. No. 11/639,166, filed Dec. 14, 2006, Multilayer laminated articles including polyurethane and/or poly(ureaurethane) layers and methods of making the same.
U.S. Appl. No. 12/410,047, filed Mar. 24, 2009, Polyurethanes, Articles and Coatings Prepared Therefrom and Methods of Making the Same.
U.S. Appl. No. 12/410,102, filed Mar. 24, 2009, Polyurethanes, Articles and Coatings Prepared Therefrom and Methods of Making the Same.
U.S. Appl. No. 12/410,159, filed Mar. 24, 2009, Methods for Preparing Polyurethanes.
U.S. Appl. No. 13/455,609, filed Apr. 25, 2012, Process for Making Polymers Having Nanostructures Incorporated into the Matrix of the Polymer.
U.S. Appl. No. 13/690,579, filed Nov. 30, 2012, Polyurethanes, Articles and Coatings Prepared Therefrom and Methods of Making the Same.
U.S. Appl. No. 13/692,278, filed Dec. 3, 2012, Poly(ureaurethane)s, Articles and Coatings Prepared Therefrom and Methods of Making the Same.
U.S. Appl. No. 13/692,478, filed Dec. 3, 2012, Polyurethanes, Articles and Coatings Prepared Therefrom and Methods of Making the Same.
U.S. Appl. No. 13/712,110, filed Dec. 12, 2012, Polyurethanes, Articles and Coatings Prepared Therefrom and Methods of Making the Same.
U.S. Appl. No. 13/761,873, filed Feb. 7, 2013, Multilayer Laminated Articles Including Polyurethane and/or Poly(ureaurethane) Layers and Methods of Making the Same.
U.S. Appl. No. 14/212,192, filed Mar. 14, 2014, Polyurethanes, Articles and Coatings Prepared Therefrom and Methods of Making the Same.
U.S. Appl. No. 14/776,375, filed Sep. 14, 2015, Polyurethanes, Articles and Coatings Prepared Therefrom and Methods of Making the Same.
U.S. Appl. No. 14/776,419, filed Sep. 14, 2015, Polyurethanes, Articles and Coatings Prepared Therefrom and Methods of Making the Same.
U.S. Appl. No. 14/776,451, filed Dec. 15, 2015, Polyurethanes, Articles and Coatings Prepared Therefrom and Methods of Making the Same.
ASTM Designation: D 6380-03, "Standard Specification for Asphalt Roll Roofing (Organic Felt)", Annual Book of ASTM Standards, 2003, pp. 1-15.

* cited by examiner

Fresh Casting of PDO Formulation

Aged PDO Formulation

Electron Diffraction of Aged PDO

Entrance

Exit

POLYURETHANES, ARTICLES AND COATINGS PREPARED THEREFROM AND METHODS OF MAKING THE SAME

CROSS-REFERENCE TO RELATED APPLICATIONS

This application is a divisional of U.S. patent application Ser. No. 13/690,579, filed on Nov. 30, 2012, which is a continuation of U.S. patent application Ser. No. 12/410,047, filed Mar. 24, 2009, which is a continuation-in-part application of U.S. patent application Ser. No. 11/639,059, filed on Dec. 14, 2006, which is a continuation-in-part application of U.S. patent application Ser. No. 10/932,641, filed on Sep. 1, 2004, and application Ser. Nos. 11/303,670, 11/303,422, 11/303,892, and 11/303,671, each of which was filed on Dec. 16, 2005. Each of the above applications is incorporated by reference herein.

BACKGROUND OF THE INVENTION

I. Field of the Invention

The present invention relates to polyurethanes and poly(ureaurethanes) prepared from branched polyols, branched polyisocyanates and/or polyisocyanate trimers, articles and coatings prepared therefrom, and methods of making the same.

II. Technical Considerations

A number of organic polymeric materials, for example plastics such as polycarbonates and acrylics, have been developed as alternatives and replacements for glass in applications such as optical lenses, fiber optics, windows and automotive, nautical and aviation transparencies. For example, in aircraft glazings both polycarbonates, such as LEXAN®, and acrylics have enjoyed widespread acceptance. These polymeric materials can provide advantages relative to glass, including shatter or penetration resistance, lighter weight for a given application, flexibility, ease of molding and dyeability. Unfortunately, there are some serious disadvantages associated with both polycarbonates and acrylics. Polycarbonates scratch easily, and if directly exposed to sunlight and harsh environments soon become difficult to view through. Acrylics, although not as scratchable as polycarbonates, do not have the physical properties of the polycarbonates such as heat distortion temperature and impact resistance. Some "high impact" strength polycarbonates can have inconsistent impact strength that can degrade over time, poor crack propagation resistance (K-factor), poor optical quality, poor solvent resistance and poor weatherability. Even though polycarbonates can exhibit good impact strength when impacted at low speeds, at high impact speeds of greater than about 1100 ft/sec (335.3 m/sec), such as those exhibited in ballistics applications, a 9 mm bullet (125 grain) fired from about 20 feet (6.1 m) at a speed of about 1350 ft/sec (411 m/sec) can pass easily through a 1 inch (2.5 cm) thick polycarbonate plastic.

Also, polycarbonates are typically extruded, which can produce optical distortions in the extrudate in the direction of extrusion. For optical applications such as fighter plane canopies, polycarbonates typically must undergo an additional processing step to remove the distortions, which can increase cost. Also, some polycarbonates are birefringent which can also cause optical distortions. For example, the Abbe number of LEXAN is 34. Higher Abbe values indicate better visual acuity and less chromatic aberrations.

Thus, there is a need in the art to develop polymers useful for producing articles having good optical quality, high impact resistance, high impact strength, high K factor, good ballistics resistance, good solvent resistance and good weatherability. The ability to fabricate articles by casting or reaction injection molding rather than extrusion also is desirable.

SUMMARY OF THE INVENTION

Discussion of the various aspects and embodiments of polyurethanes and poly(ureaurethanes) of the present invention have been grouped below. While the various aspects of the invention have been grouped for discussion purposes, the groupings are not intended to limit the scope of the invention and aspects of one grouping may be relevant to the subject matter of other groupings.

Group A

In some non-limiting embodiments, the present invention provides polyurethanes comprising a reaction product of components comprising:
  (a) about 1 equivalent of at least one polyisocyanate;
  (b) about 0.05 to about 0.9 equivalents of at least one branched polyol having 4 to 12 carbon atoms and at least 3 hydroxyl groups; and
  (c) about 0.1 to about 0.95 equivalents of at least one diol having 2 to 18 carbon atoms,
wherein the reaction product components are essentially free of polyester polyol and polyether polyol and the reaction components are maintained at a temperature of at least about 100° C. for at least about 10 minutes.

In other non-limiting embodiments, the present invention provides polyurethanes comprising a reaction product of components consisting of:
  (a) about 1 equivalent of 4,4'-methylene-bis-(cyclohexyl isocyanate);
  (b) about 0.3 to about 0.5 equivalents of trimethylolpropane; and
  (c) about 0.3 to about 0.7 equivalents of 1,10-dodecanediol, butanediol or pentanediol, wherein the reaction components are maintained at a temperature of at least about 100° C. for at least about 10 minutes.

In some non-limiting embodiments, the present invention provides an article comprising a polyurethane comprising a reaction product of components comprising:
  (a) about 1 equivalent of at least one polyisocyanate;
  (b) about 0.1 to about 0.9 equivalents of at least one branched polyol having 4 to 18 carbon atoms and at least 3 hydroxyl groups; and
  (c) about 0.1 to about 0.9 equivalents of at least one diol having 2 to 12 carbon atoms,
wherein the reaction product components are essentially free of polyester polyol and polyether polyol, and the article has a Gardner Impact strength of at least about 200 in-lb (23 Joules) according to ASTM-D 5420-04.

In some non-limiting embodiments, the present invention provides methods of preparing polyurethane comprising the step of reacting in a one-potprocess components comprising:
  (a) about 1 equivalent of at least one polyisocyanate;
  (b) about 0.1 to about 0.9 equivalents of at least one branched polyol having 4 to 18 carbon atoms and at least 3 hydroxyl groups; and
  (c) about 0.1 to about 0.9 equivalents of at least one diol having 2 to 12 carbon atoms,
wherein the components are essentially free of polyester polyol and polyether polyol and the reaction components are maintained at a temperature of at least about 100° C. for at least about 10 minutes.

In other non-limiting embodiments, the present invention provides methods of preparing polyurethane comprising the steps of:
- (a) reacting at least one polyisocyanate and at least one branched polyol having 4 to 18 carbon atoms and at least 3 hydroxyl groups to form a polyurethane prepolymer; and
- (b) reacting the polyurethane prepolymer with at least one diol having 2 to 12 carbon atoms to form the polyurethane wherein the reaction components are maintained at a temperature of at least about 100° C. for at least about 10 minutes.

Group B

In some non-limiting embodiments, the present invention provides polyurethanes comprising a reaction product of components comprising:
- (a) an isocyanate functional urethane prepolymer comprising a reaction product of components comprising:
  - (i) about 1 equivalent of at least one polyisocyanate; and
  - (ii) about 0.1 to about 0.5 equivalents of at least one polyol having 2 to 18 carbon atoms; and
- (b) about 0.05 to about 1.0 equivalents of at least one branched polyol having 4 to 18 carbon atoms and at least 3 hydroxyl groups; and
- (c) up to about 0.9 equivalents of at least one polyol different from branched polyol (b) and having 2 to 18 carbon atoms, wherein the reaction product components are essentially free of polyester polyol and polyether polyol.

In some non-limiting embodiments, the present invention provides methods of preparing polyurethanes from reaction components comprising:
- (a) reacting about 1 equivalent of at least one polyisocyanate; and about 0.1 to about 0.5 equivalents of at least one polyol having 2 to 18 carbon atoms to form an isocyanate functional urethane prepolymer; and
- (b) reacting the isocyanate functional urethane prepolymer, about 0.05 to about 1.0 equivalents of at least one branched polyol having 4 to 18 carbon atoms and at least 3 hydroxyl groups; and up to about 0.9 equivalents of at least one polyol different from branched polyol (b) and having 2 to 18 carbon atoms, wherein the reaction product components are essentially free of polyester polyol and polyether polyol.

In some non-limiting embodiments, the present invention provides polyurethanes comprising a reaction product of components comprising:
- (a) an isocyanate functional urethane prepolymer comprising a reaction product of components comprising:
  - (i) about 1 equivalent of at least one polyisocyanate; and
  - (ii) about 0.3 to about 0.4 equivalents of butanediol or pentanediol; and
- (b) about 0.3 to about 0.7 equivalents of trimethylolpropane; and
- (c) up to about 0.4 equivalents of butanediol or pentanediol, wherein the reaction product components are essentially free of polyester polyol and polyether polyol.

In some non-limiting embodiments, the present invention provides polyurethanes comprising a reaction product of components comprising:
- (a) an isocyanate functional urethane prepolymer comprising a reaction product of components comprising:
  - (i) about 1 equivalent of at least one polyisocyanate; and
  - (ii) about 0.1 to about 0.5 equivalents of at least one diol having 2 to 18 carbon atoms; and
- (b) about 0.05 to about 0.9 equivalents of at least one branched polyol having 4 to 18 carbon atoms and at least 3 hydroxyl groups; and
- (c) up to about 0.45 equivalents of at least one diol having 2 to 18 carbon atoms, wherein the reaction product components are essentially free of polyester polyol and polyether polyol.

In some non-limiting embodiments, the present invention provides polyurethanes comprising a reaction product of components consisting of:
- (a) an isocyanate functional urethane prepolymer comprising a reaction product of components comprising:
  - (i) about 1 equivalent of at least one polyisocyanate; and
  - (ii) about 0.3 to about 0.4 equivalents of butanediol or pentanediol; and
- (b) about 0.3 to about 0.6 equivalents of trimethylolpropane; and
- (c) about 0.1 to about 0.4 equivalents of butanediol or pentanediol.

Group C

In some non-limiting embodiments, the present invention provides polyurethanes comprising a reaction product of components comprising:
- (a) at least one polyisocyanate selected from the group consisting of polyisocyanate trimers and branched polyisocyanates, the polyisocyanate having at least three isocyanate functional groups; and
- (b) at least one aliphatic polyol having 4 to 18 carbon atoms and at least two hydroxyl groups, wherein the reaction product components are essentially free of polyester polyol and polyether polyol.

In other non-limiting embodiments, the present invention provides polyurethanes comprising a reaction product of components consisting of:
- (a) about 1 equivalent of 4,4'-methylene-bis-(cyclohexyl isocyanate);
- (b) about 1.1 equivalents of butanediol; and
- (c) about 0.1 equivalents of isophorone diisocyanate trimer.

In some non-limiting embodiments, the present invention provides methods of preparing polyurethane comprising the step of reacting in a one-pot process components comprising:
- (a) at least one polyisocyanate trimer or branched polyisocyanate, the polyisocyanate having at least three isocyanate functional groups; and
- (b) at least one aliphatic polyol having 4 to 18 carbon atoms and at least two hydroxyl groups, wherein the reaction product components are essentially free of polyester polyol and polyether polyol.

Group D

In some non-limiting embodiments, the present invention provides polyurethanes comprising a reaction product of components comprising:
- (a) at least one polyisocyanate;
- (b) at least one branched polyol having 4 to 18 carbon atoms and at least 3 hydroxyl groups; and
- (c) at least one polyol having one or more bromine atoms, one or more phosphorus atoms or combinations thereof.

In other non-limiting embodiments, the present invention provides polyurethanes comprising a reaction product of components consisting of:

(a) about 1 equivalent of 4,4'-methylene-bis-(cyclohexyl isocyanate);
(b) about 0.3 to about 0.5 equivalents of trimethylolpropane;
(c) about 0.2 to about 0.5 equivalents of bis(4-(2-hydroxyethoxy)-3,5-dibromophenyl) sulfone;
(d) about 0.2 to about 0.5 equivalents of 1,4-cyclohexane dimethanol; and
(e) about 0.2 to about 0.5 equivalents of 3,6-dithia-1,2-octanediol.

In some non-limiting embodiments, the present invention provides polyurethanes comprising a reaction product of components comprising:
(a) at least one polyisocyanate selected from the group consisting of polyisocyanate trimers and branched polyisocyanates, the polyisocyanate having at least three isocyanate functional groups;
(b) at least one aliphatic polyol having 4 to 18 carbon atoms and at least 2 hydroxyl groups; and
(c) at least one polyol having one or more bromine atoms, one or more phosphorus atoms or combinations thereof.

In some non-limiting embodiments, the present invention provides methods of preparing polyurethane comprising the step of reacting in a one-potprocess components comprising:
(a) at least one polyisocyanate;
(b) at least one branched polyol having 4 to 18 carbon atoms and at least 3 hydroxyl groups; and
(c) at least one polyol having one or more bromine atoms, one or more phosphorus atoms or combinations thereof.

In other non-limiting embodiments, the present invention provides methods of preparing polyurethane comprising the steps of:
(a) reacting at least one polyisocyanate and at least one branched polyol having 4 to 18 carbon atoms and at least 3 hydroxyl groups to form a polyurethane prepolymer; and
(b) reacting the polyurethane prepolymer with at least one polyol having one or more bromine atoms, one or more phosphorus atoms or combinations thereof to form the polyurethane.

Group E

In some non-limiting embodiments, the present invention provides polyurethanes comprising a reaction product of components comprising:
(a) about 1 equivalent of at least one polyisocyanate;
(b) about 0.3 to about 1 equivalents of at least one branched polyol having 4 to 18 carbon atoms and at least 3 hydroxyl groups; and
(c) about 0.01 to about 0.3 equivalents of at least one polycarbonate diol,
wherein the reaction product components are essentially free of polyether polyol and amine curing agent and wherein the reaction components are maintained at a temperature of at least about 100° C. for at least about 10 minutes.

In other non-limiting embodiments, the present invention provides polyurethanes comprising a reaction product of components consisting of:
(a) about 1 equivalent of 4,4'-methylene-bis-(cyclohexyl isocyanate);
(b) about 0.3 equivalents of trimethylolpropane;
(c) about 0.5 to about 0.55 equivalents of butanediol or pentanediol; and
(d) about 0.15 to about 0.2 equivalents of polyhexylene carbonate diol wherein the reaction components are maintained at a temperature of at least about 100° C. for at least about 10 minutes.

In some non-limiting embodiments, the present invention provides methods of preparing polyurethane comprising the step of reacting in a one-potprocess components comprising:
(a) about 1 equivalent of at least one polyisocyanate;
(b) about 0.3 to about 1 equivalents of at least one branched polyol having 4 to 18 carbon atoms and at least 3 hydroxyl groups; and
(c) about 0.01 to about 0.3 equivalents of at least one polycarbonate diol,
wherein the reaction product components are essentially free of polyether polyol and amine curing agent and wherein the reaction components are maintained at a temperature of at least about 100° C. for at least about 10 minutes.

In other non-limiting embodiments, the present invention provides methods of preparing polyurethane comprising the steps of:
(a) reacting at least one polyisocyanate and at least one branched polyol having 4 to 18 carbon atoms and at least 3 hydroxyl groups to form a polyurethane prepolymer; and
(b) reacting the polyurethane prepolymer with at least one polycarbonate diol to form the polyurethane.

Group F

In some non-limiting embodiments, the present invention provides polyurethanes comprising a reaction product of components comprising:
(a) about 1 equivalent of at least one polyisocyanate;
(b) about 0.05 to about 1 equivalents of at least one branched polyol having 4 to 18 carbon atoms and at least 3 hydroxyl groups;
(c) about 0.01 to about 0.3 equivalents of at least one polycarbonate diol; and
(d) about 0.1 to about 0.9 equivalents of at least one polyol different from the branched polyol having 2 to 18 carbon atoms,
wherein the reaction product components are essentially free of polyether polyol and the reaction components are maintained at a temperature of at least about 100° C. for at least about 10 minutes.

In some non-limiting embodiments, the present invention provides methods comprising reacting in a one-potprocess reaction components comprising:
(a) about 1 equivalent of at least one polyisocyanate;
(b) about 0.05 to about 1 equivalents of at least one branched polyol having 4 to 18 carbon atoms and at least 3 hydroxyl groups;
(c) about 0.01 to about 0.3 equivalents of at least one polycarbonate diol; and
(d) about 0.1 to about 0.9 equivalents of at least one polyol different from the branched polyol having 2 to 18 carbon atoms,
wherein the reaction product components are essentially free of polyether polyol and the reaction components are maintained at a temperature of at least about 100° C. for at least about 10 minutes.

In some non-limiting embodiments, the present invention provides polyurethanes comprising a reaction product of components comprising:
(a) an isocyanate functional urethane prepolymer comprising a reaction product of components comprising:
(i) about 1 equivalent of at least one polyisocyanate; and
(ii) about 0.3 to about 0.4 equivalents of butanediol or cyclohexane dimethanol; and (b) about 0.1 to about 0.3 equivalents of trimethylolpropane;
(c) about 0.4 to about 0.5 equivalents of butanediol or cyclohexane dimethanol; and
(d) about 0.01 to about 0.3 equivalents of at least one polycarbonate diol, wherein the reaction product components are essentially free of polyether polyol.

In some non-limiting embodiments, the present invention provides methods for preparing polyurethanes from reaction components comprising:
(a) reacting about 1 equivalent of at least one polyisocyanate and about 0.3 to about 0.4 equivalents of butanediol or cyclohexane dimethanol to form an isocyanate functional urethane prepolymer; and
(b) reacting the isocyanate functional urethane prepolymer, about 0.1 to about 0.3 equivalents of trimethylolpropane, about 0.4 to about 0.5 equivalents of butanediol or cyclohexane dimethanol; and about 0.01 to about 0.3 equivalents of at least one polycarbonate diol, wherein the reaction product components are essentially free of polyether polyol.

In some non-limiting embodiments, the present invention provides polyurethanes comprising a reaction product of components comprising:
(a) about 1 equivalent of at least one polyisocyanate;
(b) about 0.3 to about 1 equivalents of at least one branched polyol having 4 to 18 carbon atoms and at least 3 hydroxyl groups;
(c) about 0.01 to about 0.3 equivalents of at least one polycarbonate diol; and
(d) about 0.1 to about 0.9 equivalents of at least one diol having 2 to 18 carbon atoms, wherein the reaction product components are essentially free of polyether polyol and wherein the reaction components are maintained at a temperature of at least about 100° C. for at least about 10 minutes.

In some non-limiting embodiments, the present invention provides methods of preparing polyurethane comprising the step of reacting in a one-potprocess components comprising:
(a) about 1 equivalent of at least one polyisocyanate;
(b) about 0.3 to about 1 equivalents of at least one branched polyol having 4 to 18 carbon atoms and at least 3 hydroxyl groups;
(c) about 0.01 to about 0.3 equivalents of at least one polycarbonate diol; and
(d) about 0.1 to about 0.9 equivalents of at least one diol having 2 to 18 carbon atoms, wherein the reaction product components are essentially free of polyether polyol and wherein the reaction components are maintained at a temperature of at least about 100° C. for at least about 10 minutes.

In other non-limiting embodiments, the present invention provides methods of preparing polyurethane comprising the steps of:
(a) reacting at least one polyisocyanate and at least one branched polyol having 4 to 18 carbon atoms and at least 3 hydroxyl groups to form a polyurethane prepolymer; and
(b) reacting the polyurethane prepolymer with at least one polycarbonate diol and at least one diol having 2 to 18 carbon atoms to form the polyurethane wherein the reaction product components are essentially free of polyether polyol.

Group G

In some non-limiting embodiments, the present invention provides polyurethanes comprising a reaction product of components comprising:
(a) about 1 equivalent of at least one polyisocyanate;
(b) about 0.3 to about 1 equivalents of at least one branched polyol having 4 to 18 carbon atoms and at least 3 hydroxyl groups;
(c) about 0.01 to about 0.3 equivalents of at least one polyol selected from the group consisting of polyester polyol, polycaprolactone polyol and mixtures thereof; and
(d) about 0.1 to about 0.7 equivalents of at least one aliphatic diol, wherein the reaction product components are essentially free of polyether polyol and amine curing agent and wherein the reaction components are maintained at a temperature of at least about 100° C. for at least about 10 minutes.

In other non-limiting embodiments, the present invention provides polyurethanes comprising a reaction product of components consisting of:
(a) about 1 equivalent of 4,4'-methylene-bis-(cyclohexyl isocyanate);
(b) about 0.3 equivalents of trimethylolpropane;
(c) about 0.5 equivalents of decanediol; and
(d) about 0.2 equivalents of polycaprolactone polyol, wherein the reaction components are maintained at a temperature of at least about 100° C. for at least about 10 minutes.

In some non-limiting embodiments, the present invention provides methods of preparing polyurethane comprising the step of reacting in a one-potprocess components comprising:
(a) about 1 equivalent of at least one polyisocyanate;
(b) about 0.3 to about 1 equivalents of at least one branched polyol having 4 to 18 carbon atoms and at least 3 hydroxyl groups; and
(c) about 0.01 to about 0.3 equivalents of at least one polyol selected from the group consisting of polyester polyol, polycaprolactone polyol and mixtures thereof; and
(d) about 0.1 to about 0.7 equivalents of at least one aliphatic diol, wherein the reaction product components are essentially free of polyether polyol and amine curing agent.

In other non-limiting embodiments, the present invention provides methods of preparing polyurethane comprising the steps of:
(a) reacting at least one polyisocyanate and at least one branched polyol having 4 to 18 carbon atoms and at least 3 hydroxyl groups to form a polyurethane prepolymer; and
(b) reacting the polyurethane prepolymer with at least one polyol selected from the group consisting of polyester polyol, polycaprolactone polyol and mixtures thereof and about 0.1 to about 0.7 equivalents of at least one aliphatic diol to form the polyurethane.

Group H

In some non-limiting embodiments, the present invention provides polyurethanes comprising a reaction product of components comprising:
(a) a prepolymer which is the reaction product of components comprising:
(1) at least one polyisocyanate;
(2) at least one polycaprolactone polyol; and
(3) at least one polyol selected from the group consisting of polyalkylene polyol, polyether polyol and mixtures thereof; and (b) at least one diol having 2 to 18 carbon atoms.

In other non-limiting embodiments, the present invention provides polyurethanes comprising a reaction product of components comprising:
- (a) a prepolymer which is the reaction product of components comprising:
  - (1) aliphatic or cycloaliphatic diisocyanate;
  - (2) polycaprolactone diol;
  - (3) polyethylene glycol; and
  - (4) polyoxyethylene and polyoxypropylene copolymer; and
- (b) at least one diol having 2 to 18 carbon atoms.

In some non-limiting embodiments, the present invention provides methods of preparing polyurethane comprising the steps of:
- (a) reacting components comprising:
  - 1) at least one polyisocyanate;
  - 2) at least one polycaprolactone polyol; and
  - 3) at least one polyol selected from the group consisting of polyalkylene polyol, polyether polyol and mixtures thereof,
  to form a polyurethane prepolymer; and
- (b) reacting the prepolymer with at least one diol having 2 to 18 carbon atoms to form the polyurethane.

Group I

In some non-limiting embodiments, the present invention provides poly(ureaurethane)s comprising a reaction product of components comprising:
- (a) at least one isocyanate functional urea prepolymer comprising a reaction product of:
  - (1) at least one polyisocyanate; and
  - (2) water; and
- (b) at least one branched polyol having 4 to 18 carbon atoms and at least 3 hydroxyl groups, wherein the reaction product components are essentially free of amine curing agent.

In some non-limiting embodiments, the present invention provides methods of preparing poly(ureaurethane) comprising the steps of:
- (a) reacting at least one polyisocyanate and water to form an isocyanate functional urea prepolymer; and
- (b) reacting reaction product components comprising the isocyanate functional urea prepolymer with at least one branched polyol having 4 to 18 carbon atoms and at least 3 hydroxyl groups, wherein the reaction product components are essentially free of amine curing agent.

Group J

In some non-limiting embodiments, the present invention provides poly(ureaurethane)s comprising a reaction product of components comprising:
- (a) at least one isocyanate functional urea prepolymer comprising a reaction product of:
  - (1) at least one polyisocyanate selected from the group consisting of polyisocyanate trimers and branched polyisocyanates, the polyisocyanate having at least three isocyanate functional groups; and
  - (2) water; and
- (b) at least one aliphatic polyol having 4 to 18 carbon atoms and at least 2 hydroxyl groups.

In some non-limiting embodiments, the present invention provides methods of preparing poly(ureaurethane)s comprising the steps of:
- (a) reacting at least one polyisocyanate selected from the group consisting of polyisocyanate trimers and branched polyisocyanates and water to form an isocyanate functional urea prepolymer; and
- (b) reacting reaction product components comprising the isocyanate functional urea prepolymer with at least one aliphatic polyol having 4 to 18 carbon atoms and at least 2 hydroxyl groups, wherein the reaction product components are essentially free of amine curing agent.

Group K

In some non-limiting embodiments, the present invention provides poly(ureaurethane)s comprising a reaction product of components comprising:
- (a) at least one isocyanate functional ureaurethane prepolymer comprising the reaction product of:
  - (1) at least one isocyanate functional urethane prepolymer comprising the reaction product of:
    - (i) a first amount of at least one polyisocyanate; and
    - (ii) a first amount of at least one branched polyol; and
  - (2) water,
  to form an isocyanate functional ureaurethane prepolymer; and
- (b) a second amount of at least one polyisocyanate and a second amount of at least one branched polyol.

In some non-limiting embodiments, the present invention provides methods of preparing poly(ureaurethane)s comprising the steps of:
- (a) reacting at least one polyisocyanate and at least one branched polyol having 4 to 18 carbon atoms and at least 3 hydroxyl groups to form an isocyanate functional urethane prepolymer;
- (b) reacting the isocyanate functional urethane prepolymer with water and polyisocyanate to form an isocyanate functional ureaurethane prepolymer; and
- (c) reacting reaction product components comprising the isocyanate functional ureaurethane prepolymer with at least one aliphatic polyol having 4 to 18 carbon atoms and at least 2 hydroxyl groups, wherein the reaction product components are essentially free of amine curing agent.

Group L

In some non-limiting embodiments, the present invention provides poly(ureaurethane)s comprising a reaction product of components comprising:
- (a) at least one isocyanate functional ureaurethane prepolymer comprising the reaction product of:
  - (1) at least one isocyanate functional urethane prepolymer comprising the reaction product of:
    - (i) a first amount of at least one polyisocyanate selected from the group consisting of polyisocyanate trimers and branched polyisocyanates, the polyisocyanate having at least three isocyanate functional groups; and
    - (ii) a first amount of at least one aliphatic polyol; and
  - (2) water,
  to form an isocyanate functional ureaurethane prepolymer; and
- (b) a second amount of at least one polyisocyanate and a second amount of at least one aliphatic polyol.

In some non-limiting embodiments, the present invention provides methods of preparing poly(ureaurethane)s comprising the steps of:
- (a) reacting at least one polyisocyanate selected from the group consisting of polyisocyanate trimers and branched polyisocyanates and at least one aliphatic polyol having 4 to 18 carbon atoms and at least 2 hydroxyl groups to form an isocyanate functional urethane prepolymer;

(b) reacting the isocyanate functional urethane prepolymer with water and polyisocyanate to form an isocyanate functional ureaurethane prepolymer; and
(c) reacting reaction product components comprising the isocyanate functional ureaurethane prepolymer with at least one aliphatic polyol having 4 to 18 carbon atoms and at least 2 hydroxyl groups, wherein the reaction product components are essentially free of amine curing agent.

Group M

In other non-limiting embodiments, the present invention provides poly(ureaurethane)s comprising a reaction product of components comprising:
(a) about 1 equivalent of at least one polyisocyanate;
(b) about 0.1 to about 0.9 equivalents of at least one branched polyol having 4 to 18 carbon atoms and at least 3 hydroxyl groups;
(c) about 0.1 to about 0.9 equivalents of at least one aliphatic diol having 2 to 18 carbon atoms; and
(d) at least one amine curing agent, wherein the reaction product components are essentially free of polyester polyol and polyether polyol.

In other non-limiting embodiments, the present invention provides methods of preparing poly(ureaurethane) comprising the step of reacting in a one-potprocess components comprising:
(a) at least one polyisocyanate;
(b) at least one branched polyol having 4 to 18 carbon atoms and at least 3 hydroxyl groups;
(c) at least one aliphatic diol having 2 to 18 carbon atoms; and
(d) amine curing agent, wherein the reaction product components are essentially free of polyester polyol and polyether polyol.

Group N

In some non-limiting embodiments, the present invention provides poly(ureaurethane)s comprising a reaction product of components comprising:
(a) at least one polyisocyanate selected from the group consisting of polyisocyanate trimers and branched polyisocyanates, the polyisocyanate having at least three isocyanate functional groups;
(b) about 0.1 to about 0.9 equivalents of at least one polyol having 4 to 18 carbon atoms and at least 2 hydroxyl groups; and
(c) at least one amine curing agent, wherein the reaction product components are essentially free of polyester polyol and polyether polyol.

In some non-limiting embodiments, the present invention provides methods of preparing poly(ureaurethane) comprising the step of reacting in a one-potprocess components comprising:
(a) at least one polyisocyanate selected from the group consisting of polyisocyanate trimers and branched polyisocyanates;
(b) at least one aliphatic polyol having 4 to 18 carbon atoms and at least 3 hydroxyl groups;
(c) at least one aliphatic diol having 2 to 18 carbon atoms; and
(d) amine curing agent, wherein the reaction product components are essentially free of polyester polyol and polyether polyol.

Group O

In some non-limiting embodiments, the present invention provides polyurethane materials comprising a first portion of crystalline particles having self-orientation and bonded together to fix their orientation along a first crystallographic direction and a second portion of crystalline particles having self-orientation and bonded together to fix their orientation along a second crystallographic direction, the first crystallographic direction being different from the second crystallographic direction, wherein said crystalline particles comprise at least about 30% of the total volume of the polyurethane material.

Group P

In some non-limiting embodiments, the present invention provides methods of preparing a polyurethane powder coating composition comprising the steps of: reacting at least one polyisocyanate with at least one aliphatic polyol to form a generally solid, hydroxy functional prepolymer; melting the hydroxy functional prepolymer; melting at least one generally solid polyisocyanate to form a melted polyisocyanate; mixing the hydroxy functional prepolymer and melted polyisocyanate to form a mixture; and solidifying the mixture to form a generally solid powder coating composition.

In other non-limiting embodiments, the present invention provides methods of preparing a polyurethane powder coating composition comprising the steps of: reacting at least one polyisocyanate with at least one aliphatic polyol to form a generally solid, hydroxy functional prepolymer; dissolving the hydroxy functional prepolymer in a first solvent to form a first solution; dissolving at least one generally solid polyisocyanate in a second solvent that is the same as or compatible with the first solvent to form a second solution; mixing the first and second solutions; and removing substantially all of the solvent to form a generally solid powder coating composition.

Group Q

In some non-limiting embodiments, the present invention provides polyurethane compositions comprising: at least one polyurethane comprising a reaction product of components comprising:
(a) (i) at least one polyisocyanate;
(ii) at least one branched polyol having 4 to 18 carbon atoms and at least 3 hydroxyl groups; and
(iii) at least one diol having 2 to 18 carbon atoms; and
(b) at least one reinforcement material selected from the group consisting of polymeric inorganic materials, nonpolymeric inorganic materials, polymeric organic materials, nonpolymeric organic materials, composites thereof, and combinations thereof.

In other non-limiting embodiments, the present invention provides polyurethane compositions comprising:
(a) at least one polyurethane comprising a reaction product of components comprising:
(i) at least one polyisocyanate;
(ii) at least one branched polyol having 4 to 18 carbon atoms and at least 3 hydroxyl groups; and
(iii) at least one polyol having one or more bromine atoms, one or more phosphorus atoms or combinations thereof; and
(b) at least one reinforcement material selected from the group consisting of polymeric inorganic materials, nonpolymeric inorganic materials, polymeric organic materials, nonpolymeric organic materials, composites thereof, and mixtures thereof.

In other non-limiting embodiments, the present invention provides polyurethane compositions comprising:
(a) a polyurethane comprising a reaction product of components comprising:
(i) a prepolymer which is the reaction product of components comprising:
(1) at least one polyisocyanate;
(2) at least one polycaprolactone polyol; and (3) at least one polyol selected from the group consisting of polyalkylene polyol, polyether polyol and mixtures thereof; and
(ii) at least one diol having 2 to 18 carbon atoms; and
(b) at least one reinforcement material selected from the group consisting of polymeric inorganic materials, nonpolymeric inorganic materials, polymeric organic materials, nonpolymeric organic materials, composites thereof, and mixtures thereof.

In other non-limiting embodiments, the present invention provides polyurethane compositions comprising:
(a) at least one polyurethane comprising a reaction product of components comprising:
(i) at least one polyisocyanate selected from the group consisting of polyisocyanate trimers or branched polyisocyanates, the polyisocyanate having at least three isocyanate functional groups; and
(ii) at least one aliphatic polyol having 4 to 18 carbon atoms and at least two hydroxyl groups; and
(b) at least one reinforcement material selected from the group consisting of polymeric inorganic materials, nonpolymeric inorganic materials, polymeric organic materials, nonpolymeric organic materials, composites thereof, and mixtures thereof.

In other non-limiting embodiments, the present invention provides poly(ureaurethane)s compositions comprising:
(a) at least one poly(ureaurethane) comprising a reaction product of components comprising:
(i) at least one isocyanate functional prepolymer comprising a reaction product of:
1. at least one polyisocyanate; and
2. water; and
(ii) at least one branched polyol having 4 to 18 carbon atoms and at least 3 hydroxyl groups,
wherein the reaction product components are essentially free of amine curing agent; and
(b) at least one reinforcement material selected from the group consisting of polymeric inorganic materials, nonpolymeric inorganic materials, polymeric organic materials, nonpolymeric organic materials, composites thereof, and mixtures thereof.

In other non-limiting embodiments, the present invention provides poly(ureaurethane)s compositions comprising:
(a) at least one poly(ureaurethane) comprising a reaction product of components comprising:
(i) at least one isocyanate functional urethane prepolymer comprising a reaction product of:
1. a first amount of at least one polyisocyanate; and
2. a first amount of at least one branched polyol; and
(ii) water,
to form an isocyanate functional ureaurethane prepolymer; and
(b) a second amount of at least one polyisocyanate and a second amount of at least one branched polyol; and
(c) at least one reinforcement material selected from the group consisting of polymeric inorganic materials, nonpolymeric inorganic materials, polymeric organic materials, nonpolymeric organic materials, composites thereof, and mixtures thereof.

In some non-limiting embodiments, the present invention provides methods for forming a reinforced polyurethane composition, comprising the steps of: mixing a precursor solution of the reaction product components of the above polyurethane or poly(ureaurethane) with a precursor for the nanostructures; forming the nanostructures from the precursor of the nanostructures in the polyurethane matrix; and polymerizing the precursor of the reaction product components to form the polyurethane.

Group R

In some non-limiting embodiments, the present invention provides a laminate comprising:
(a) at least one layer of at least one polyurethane comprising a reaction product of components comprising:
(i) at least one polyisocyanate;
(ii) at least one branched polyol having 4 to 18 carbon atoms and at least 3 hydroxyl groups; and
(iii) at least one diol having 2 to 18 carbon atoms; and
(b) at least one layer of a substrate selected from the group consisting of paper, glass, ceramic, wood, masonry, textile, metal or organic polymeric material and combinations thereof.

In other non-limiting embodiments, the present invention provides a laminate comprising:
(a) at least one layer of at least one polyurethane comprising a reaction product of components comprising:
(i) at least one polyisocyanate;
(ii) at least one branched polyol having 4 to 18 carbon atoms and at least 3 hydroxyl groups; and
(iii) at least one polyol having one or more bromine atoms, one or more phosphorus atoms or combinations thereof; and
(b) at least one layer of a substrate selected from the group consisting of paper, glass, ceramic, wood, masonry, textile, metal or organic polymeric material and combinations thereof.

In other non-limiting embodiments, the present invention provides a laminate comprising:
(a) at least one layer of at least one polyurethane comprising a reaction product of components comprising:
(i) a prepolymer which is the reaction product of components comprising:
(1) at least one polyisocyanate;
(2) at least one polycaprolactone polyol; and
(3) at least one polyol selected from the group consisting of polyalkylene polyol, polyether polyol and mixtures thereof; and
(ii) at least one diol having 2 to 18 carbon atoms; and
(b) at least one layer of a substrate selected from the group consisting of paper, glass, ceramic, wood, masonry, textile, metal or organic polymeric material and combinations thereof.

In other non-limiting embodiments, the present invention provides a laminate comprising:
(a) at least one layer of at least one polyurethane comprising a reaction product of components comprising:
(i) at least one polyisocyanate selected from the group consisting of polyisocyanate trimers or branched polyisocyanates, the polyisocyanate having at least three isocyanate functional groups; and
(ii) at least one aliphatic polyol having 4 to 18 carbon atoms and at least two hydroxyl groups; and
(b) at least one layer of a substrate selected from the group consisting of paper, glass, ceramic, wood, masonry, textile, metal or organic polymeric material and combinations thereof.

In other non-limiting embodiments, the present invention provides a laminate comprising:
(a) at least one layer of at least one poly(ureaurethane) comprising a reaction product of components comprising:

(i) at least one isocyanate functional prepolymer comprising a reaction product of:
1. at least one polyisocyanate; and
2. water; and
(ii) at least one branched polyol having 4 to 18 carbon atoms and at least 3 hydroxyl groups,
wherein the reaction product components are essentially free of amine curing agent; and
(b) at least one layer of a substrate selected from the group consisting of paper, glass, ceramic, wood, masonry, textile, metal or organic polymeric material and combinations thereof.

In other non-limiting embodiments, the present invention provides a laminate comprising:
(A) at least one layer of at least one poly(ureaurethane) comprising a reaction product of components comprising:
(a) at least one isocyanate functional ureaurethane prepolymer comprising a reaction product of components comprising
(1) at least one isocyanate functional urethane prepolymer comprising a reaction product of:
a. a first amount of at least one polyisocyanate; and
b. a first amount of at least one branched polyol; and
(2) water,
to form an isocyanate functional ureaurethane prepolymer; and
(b) a second amount of at least one polyisocyanate and a second amount of at least one branched polyol; and
(B) at least one layer of a substrate selected from the group consisting of paper, glass, ceramic, wood, masonry, textile, metal or organic polymeric material and combinations thereof.

Cured compositions, articles, laminates and methods of making and using the same comprising the above polyurethanes and poly(ureaurethane)s are also provided by the present invention.

BRIEF DESCRIPTION OF THE DRAWINGS

The foregoing summary, as well as the following detailed description, will be better understood when read in conjunction with the appended drawings. In the drawings.

DETAILED DESCRIPTION

Figure 1:
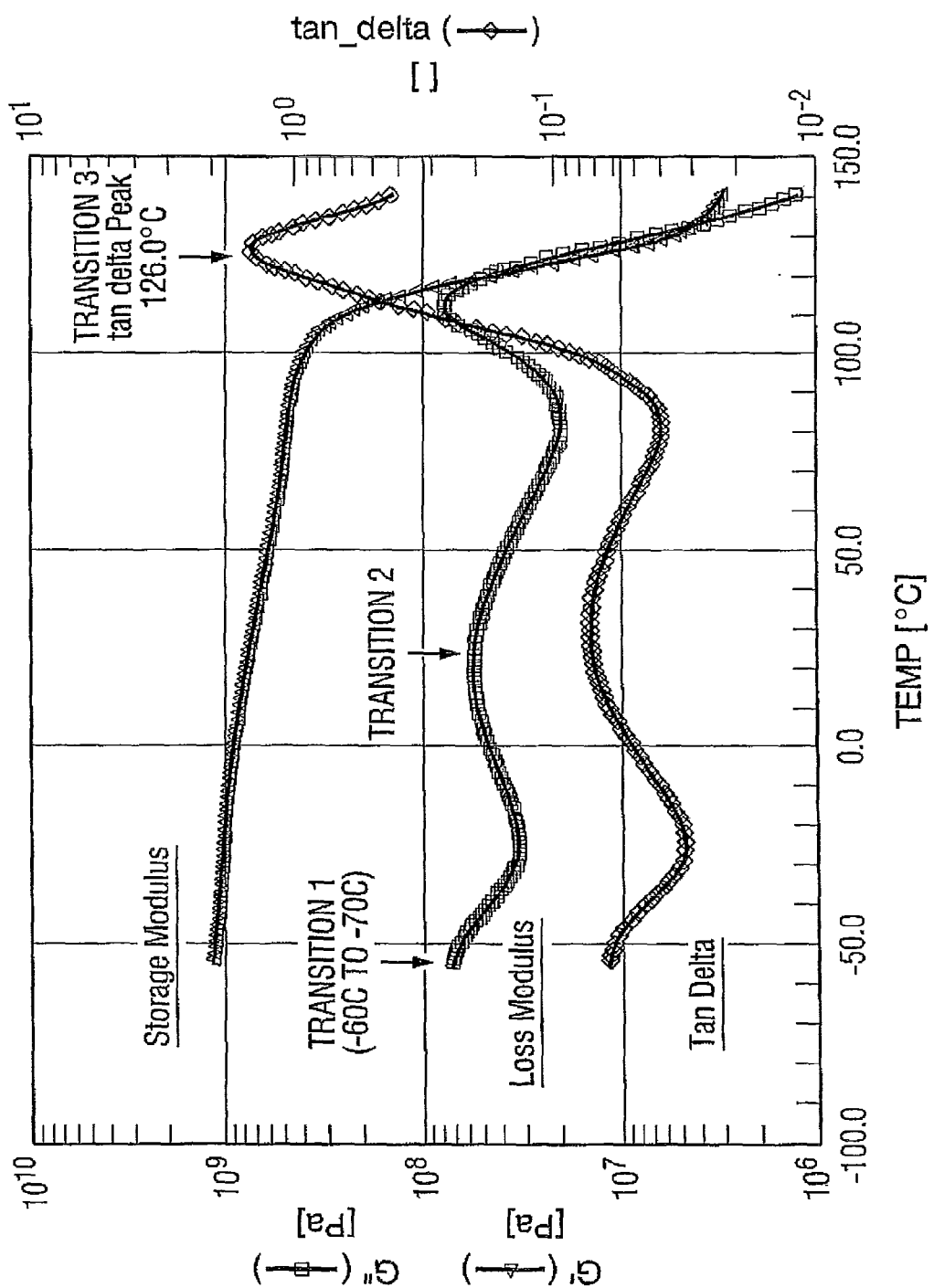
FIG. 1 is a graph of G' and G" as a function of temperature measured using Dynamic Mechanical Analysis (DMA) showing storage modulus, loss modulus and tan Delta for a casting of a polyurethane according to Example A, Formulation 1 of the present invention.

As used herein, spatial or directional terms, such as "inner", "left", "right", "up", "down", "horizontal", "vertical" and the like, relate to the invention as it is described herein. However, it is to be understood that the invention can assume various alternative orientations and, accordingly, such terms are not to be considered as limiting. For the purposes of this specification, unless otherwise indicated, all numbers expressing quantities of ingredients, reaction conditions, dimensions, physical characteristics, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

"Alkyl" means an aliphatic hydrocarbon group which may be straight or branched and comprising about 1 to about 20 carbon atoms in the chain. Non-limiting examples of suitable alkyl groups contain about 1 to about 18 carbon atoms in the chain, or about 1 to about 6 carbon atoms in the chain. Branched means that one or more lower alkyl groups such as methyl, ethyl or propyl, are attached to a linear alkyl chain. "Lower alkyl" or "short chain alkyl" means a group having about 1 to about 6 carbon atoms in the chain which may be straight or branched. "Alkyl" may be unsubstituted or optionally substituted by one or more substituents which may be the same or different, each substituent being independently selected from the group consisting of halo, alkyl, aryl, cycloalkyl, cyano, hydroxy, alkoxy, alkylthio, amino, —NH(alkyl), —NH(cycloalkyl), —N(alkyl)$_2$, carboxy and —C(O)O-alkyl. Non-limiting examples of suitable alkyl groups include methyl, ethyl, n-propyl, isopropyl and t-butyl.

"Alkylene" means a difunctional group obtained by removal of a hydrogen atom from an alkyl group that is defined above. Non-limiting examples of alkylene include methylene, ethylene and propylene.

"Aryl" means an aromatic monocyclic or multicyclic ring system comprising about 6 to about 14 carbon atoms, or about 6 to about 10 carbon atoms. The aryl group can be optionally substituted with one or more "ring system substituents" which may be the same or different, and are as defined herein. Non-limiting examples of suitable aryl groups include phenyl and naphthyl.

"Heteroaryl" means an aromatic monocyclic or multicyclic ring system comprising about 5 to about 14 ring atoms, or about 5 to about 10 ring atoms, in which one or more of the ring atoms is an element other than carbon, for example nitrogen, oxygen or sulfur, alone or in combination. In some non-limiting embodiments, the heteroaryls contain about 5 to about 6 ring atoms. The "heteroaryl" can be optionally substituted by one or more "ring system substituents" which may be the same or different, and are as defined herein. The prefix aza, oxa or thia before the heteroaryl root name means that at least one of a nitrogen, oxygen or sulfur atom respectively, is present as a ring atom. A nitrogen atom of a heteroaryl can be optionally oxidized to the corresponding N-oxide. Non-limiting examples of suitable heteroaryls include pyridyl, pyrazinyl, furanyl, thienyl, pyrimidinyl, pyridone (including N-substituted pyridones), isoxazolyl, isothiazolyl, oxazolyl, thiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl and the like.

"Aralkyl" or "arylalkyl" means an aryl-alkyl-group in which the aryl and alkyl are as previously described. In some non-limiting embodiments, the aralkyls comprise a lower alkyl group. Non-limiting examples of suitable aralkyl groups include benzyl, 2-phenethyl and naphthalenylmethyl. The bond to the parent moiety is through the alkyl.

"Alkylaryl" means an alkyl-aryl-group in which the alkyl and aryl are as previously described. In some non-limiting embodiments, the alkylaryls comprise a lower alkyl group. A non-limiting example of a suitable alkylaryl group is tolyl. The bond to the parent moiety is through the aryl.

"Cycloalkyl" means a non-aromatic mono- or multicyclic ring system comprising about 3 to about 10 carbon atoms, or about 5 to about 10 carbon atoms. In some non-limiting embodiments, the cycloalkyl ring contains about 5 to about 7 ring atoms. The cycloalkyl can be optionally substituted with one or more "ring system substituents" which may be the same or different, and are as defined above. Non-limiting examples of suitable monocyclic cycloalkyls include cyclopropyl, cyclopentyl, cyclohexyl, cycloheptyl and the like. Non-limiting examples of suitable multicyclic cycloalkyls include 1-decalinyl, norbornyl, adamantyl and the like.

"Halogen" or "halo" means fluorine, chlorine, bromine, or iodine. In some non-limiting embodiments, the halogen groups are fluorine, chlorine or bromine.

"Ring system substituent" means a substituent attached to an aromatic or non-aromatic ring system which, for example, replaces an available hydrogen on the ring system. Ring system substituents may be the same or different, each being independently selected from the group consisting of alkyl, alkenyl, alkynyl, aryl, heteroaryl, aralkyl, alkylaryl, heteroaralkyl, heteroarylalkenyl, heteroarylalkynyl, alkylheteroaryl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylthio, arylthio, heteroarylthio, aralkylthio, heteroaralkylthio, cycloalkyl, heterocyclyl, —C(=N—CN)—NH$_2$, —C(=NH)—NH$_2$, —C(=NH)—NH(alkyl), Y$_1$Y$_2$N—, Y$_1$Y$_2$N-alkyl-, Y$_1$Y$_2$NC(O)—, Y$_1$Y$_2$NSO$_2$— and —SO$_2$NY$_1$Y$_2$, wherein Y$_1$ and Y$_2$ can be the same or different and are independently selected from the group consisting of hydrogen, alkyl, aryl, cycloalkyl, and aralkyl. "Ring system substituent" may also mean a single moiety which simultaneously replaces two available hydrogens on two adjacent carbon atoms (one H on each carbon) on a ring system. Examples of such moieties are methylene dioxy, ethylenedioxy, —C(CH$_3$)$_2$— and the like which form moieties such as, for example:

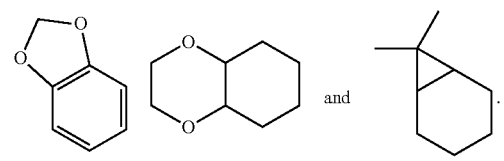

"Heterocyclyl" means a non-aromatic saturated monocyclic or multicyclic ring system comprising about 3 to about 10 ring atoms, or about 5 to about 10 ring atoms, in which one or more of the atoms in the ring system is an element other than carbon, for example nitrogen, oxygen or sulfur, alone or in combination. There are no adjacent oxygen and/or sulfur atoms present in the ring system. In some non-limiting embodiments, the heterocyclyl contains about 5 to about 6 ring atoms. The prefix aza, oxa or thia before the heterocyclyl root name means that at least a nitrogen, oxygen or sulfur atom respectively is present as a ring atom. Any —NH in a heterocyclyl ring may exist protected such as, for example, as an —N(Boc), —N(CBz), —N(Tos) group and the like; such protections are also considered part of this invention. The heterocyclyl can be optionally substituted by one or more "ring system substituents" which may be the same or different, and are as defined herein. The nitrogen or sulfur atom of the heterocyclyl can be optionally oxidized to the corresponding N-oxide, S-oxide or S,S-dioxide. Non-limiting examples of suitable monocyclic heterocyclyl rings include piperidyl, pyrrolidinyl, piperazinyl, morpholinyl, thiomorpholinyl, thiazolidinyl, 1,4-dioxanyl, tetrahydrofuranyl, tetrahydrothiophenyl, lactam, lactone, and the like.

It should be noted that in hetero-atom containing ring systems of this invention, there are no hydroxyl groups on carbon atoms adjacent to a N, O or S, as well as there are no N or S groups on carbon adjacent to another heteroatom. Thus, for example, in the ring:

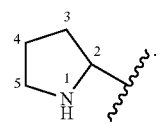

there is no —OH attached directly to carbons marked 2 and 5.

It should also be noted that tautomeric forms such as, for example, the moieties:

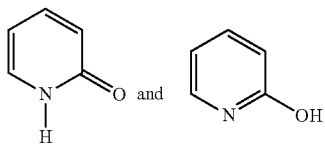 [SMILES: O=c1cccc[nH]1 ; Oc1ccccn1]

are considered equivalent in certain embodiments of this invention.

"Heteroaralkyl" means a heteroaryl-alkyl-group in which the heteroaryl and alkyl are as previously described. In some non-limiting embodiments, the heteroaralkyl contains a lower alkyl group. Non-limiting examples of suitable heteroaralkyl groups include pyridylmethyl, and quinolin-3-ylmethyl. The bond to the parent moiety is through the alkyl.

"Hydroxyalkyl" means a HO-alkyl-group in which alkyl is as previously defined. In some non-limiting embodiments, the hydroxyalkyl contains a lower alkyl group. Non-limiting examples of suitable hydroxyalkyl groups include hydroxymethyl and 2-hydroxyethyl.

"Alkoxy" means an alkyl-O— group in which the alkyl group is as previously described. Non-limiting examples of suitable alkoxy groups include methoxy, ethoxy, n-propoxy, isopropoxy and n-butoxy. The bond to the parent moiety is through the ether oxygen.

"Aryloxy" means an aryl-O— group in which the aryl group is as previously described. Non-limiting examples of suitable aryloxy groups include phenoxy and naphthoxy. The bond to the parent moiety is through the ether oxygen.

"Alkylthio" means an alkyl-S— group in which the alkyl group is as previously described. Non-limiting examples of suitable alkylthio groups include methylthio and ethylthio. The bond to the parent moiety is through the sulfur.

"Arylthio" means an aryl-S— group in which the aryl group is as previously described. Non-limiting examples of suitable arylthio groups include phenylthio and naphthylthio. The bond to the parent moiety is through the sulfur.

"Aralkylthio" means an aralkyl-S— group in which the aralkyl group is as previously described. A non-limiting example of a suitable aralkylthio group is benzylthio. The bond to the parent moiety is through the sulfur.

"Alkoxycarbonyl" means an alkyl-O—CO— group. Non-limiting examples of suitable alkoxycarbonyl groups include methoxycarbonyl and ethoxycarbonyl. The bond to the parent moiety is through the carbonyl.

"Aryloxycarbonyl" means an aryl-O—C(O)— group. Non-limiting examples of suitable aryloxycarbonyl groups include phenoxycarbonyl and naphthoxycarbonyl. The bond to the parent moiety is through the carbonyl.

"Aralkoxycarbonyl" means an aralkyl-O—C(O)— group. A non-limiting example of a suitable aralkoxycarbonyl group is benzyloxycarbonyl. The bond to the parent moiety is through the carbonyl.

"Alkylsulfonyl" means an alkyl-S($O_2$)— group. In some non-limiting embodiments, the alkylsulfonyl group includes a lower alkyl group. The bond to the parent moiety is through the sulfonyl.

"Arylsulfonyl" means an aryl-S($O_2$)— group. The bond to the parent moiety is through the sulfonyl.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

The term "optionally substituted" means optional substitution with the specified groups, radicals or moieties.

It should also be noted that any carbon as well as heteroatom with unsatisfied valences in the text, schemes, examples and Tables herein is assumed to have the sufficient number of hydrogen atom(s) to satisfy the valences.

When a functional group in a compound is termed "protected", this means that the group is in modified form to preclude undesired side reactions at the protected site when the compound is subjected to a reaction. Suitable protecting groups will be recognized by those with ordinary skill in the art as well as by reference to standard textbooks such as, for example, T. W. Greene et al., *Protective Groups in Organic Synthesis* (1991), Wiley, New York.

When any variable (e.g., aryl, heterocycle, $R^2$, etc.) occurs more than one time in any constituent, its definition on each occurrence is independent of its definition at every other occurrence.

As used herein, the term "composition" is intended to encompass a product comprising the specified ingredients in the specified amounts, as well as any product which results, directly or indirectly, from combination of the specified ingredients in the specified amounts.

As used herein, "formed from" or "prepared from" denotes open, e.g., "comprising," claim language. As such, it is intended that a composition "formed from" or "prepared from" a list of recited components be a composition comprising at least these recited components or the reaction product of at least these recited components, and can further comprise other, non-recited components, during the composition's formation or preparation. As used herein, the phrase "reaction product of" means chemical reaction product(s) of the recited components, and can include partial reaction products as well as fully reacted products.

As used herein, the term "polymer" is meant to encompass oligomers, and includes without limitation both homopolymers and copolymers. The term "prepolymer" means a compound, monomer or oligomer used to prepare a polymer, and includes without limitation both homopolymer and copolymer oligomers.

The phrase "thermoplastic polymer" means a polymer that undergoes liquid flow upon heating and can be soluble in solvents.

The phrase "thermoset polymer" means a polymer that solidifies or "sets" irreversibly upon curing or crosslinking. Once cured, a crosslinked thermoset polymer will not melt upon the application of heat and is generally insoluble in solvents.

As used herein, the term "cure" or "cured" as used in connection with a composition, e.g., "composition when cured" or a "cured composition", shall mean that any curable or crosslinkable components of the composition are at least partially cured or crosslinked. In some non-limiting embodiments of the present invention, the crosslink density of the crosslinkable components, i.e., the degree of crosslinking, ranges from about 5% to about 100% of complete crosslinking. In other non-limiting embodiments, the crosslink density ranges from about 35% to about 85% of full crosslinking. In other non-limiting embodiments, the crosslink density ranges from about 50% to about 85% of full crosslinking. One skilled in the art will understand that the presence and degree of crosslinking, i.e., the crosslink density, can be determined by a variety of methods, such as dynamic mechanical thermal analysis (DMA) using a TA Instruments DMA 2980 DMA analyzer over a temperature range of −65° F. (−18° C.) to 350° F. (177° C.) conducted under nitrogen according to ASTM D 4065-01. This method determines the glass transition temperature and crosslink density of free films of coatings or polymers. These physical properties of a cured material are related to the structure of the crosslinked network. In an embodiment of the present invention, the sufficiency of cure is evaluated relative to the solvent resistance of a cured film of the polymer. For example, solvent resistance can be measured by determining the number of double acetone rubs. For purposes of the present invention, a coating is deemed to be "cured" when the film can withstand a minimum of 100 double acetone rubs without substantial softening of the film and no removal of the film.

Curing of a polymerizable composition can be obtained by subjecting the composition to curing conditions, such as but not limited to thermal curing, irradiation, etc., leading to the reaction of reactive groups of the composition and resulting in polymerization and formation of a solid polymerizate. When a polymerizable composition is subjected to curing conditions, following polymerization and after reaction of most of the reactive groups occurs, the rate of reaction of the remaining unreacted reactive groups becomes progressively slower. In some non-limiting embodiments, the polymerizable composition can be subjected to curing conditions until it is at least partially cured. The term "at least partially cured" means subjecting the polymerizable composition to curing conditions, wherein reaction of at least a portion of the reactive groups of the composition occurs, to form a solid polymerizate. The at least partially cured polymerizate can be demolded and, for example, used to prepare articles such as windows, cut into test pieces or subjected to machining operations, such as optical lens processing. In some non-limiting embodiments, the polymerizable composition can be subjected to curing conditions such that a substantially complete cure is attained and wherein further exposure to curing conditions results in no significant further improvement in polymer properties, such as strength or hardness.

The term "polyurethane" is intended to include not only polyurethanes that are formed from the reaction of polyisocyanates and polyols but also poly(ureaurethane)(s) that are prepared from the reaction of polyisocyanates with polyols and water and/or polyamines.

The polyurethanes and poly(ureaurethane)s of the present invention can be useful in applications in which one or more of the following properties are desired: transparency, high optical quality, high Abbe number, low color, energy-absorption, stiffness, moisture stability, ultraviolet light stability, weathering resistance, low water absorption, hydrolytic stability and bullet or explosive resistance.

In some embodiments, cured articles prepared from the polyurethanes and poly(ureaurethane)s of the present invention are generally clear, can have a luminous transmittance of at least about 80 percent, less than about 2 percent haze and show no visual change after 1,000 hours of light and water exposure according to ASTM D-1499-64.

Polyurethanes and poly(ureaurethane)s of the present invention can be formed into articles having a variety of shapes and dimensions, such as flat sheets or curved shapes. Non-limiting examples of useful methods for forming articles include heat treatment, pressure casting, or pouring liquid polyurethane or poly(ureaurethane) into a mold and curing the product to form a molded article.

Generally, the polyurethanes and poly(ureaurethane)s of the present invention comprise a reaction product of components comprising at least one polyisocyanate and at least one aliphatic polyol having 4 to 18 carbon atoms and at least 2 or at least 3 hydroxyl groups, wherein at least one of the polyisocyanate(s) and/or the aliphatic polyol(s) is branched.

Figure 2:
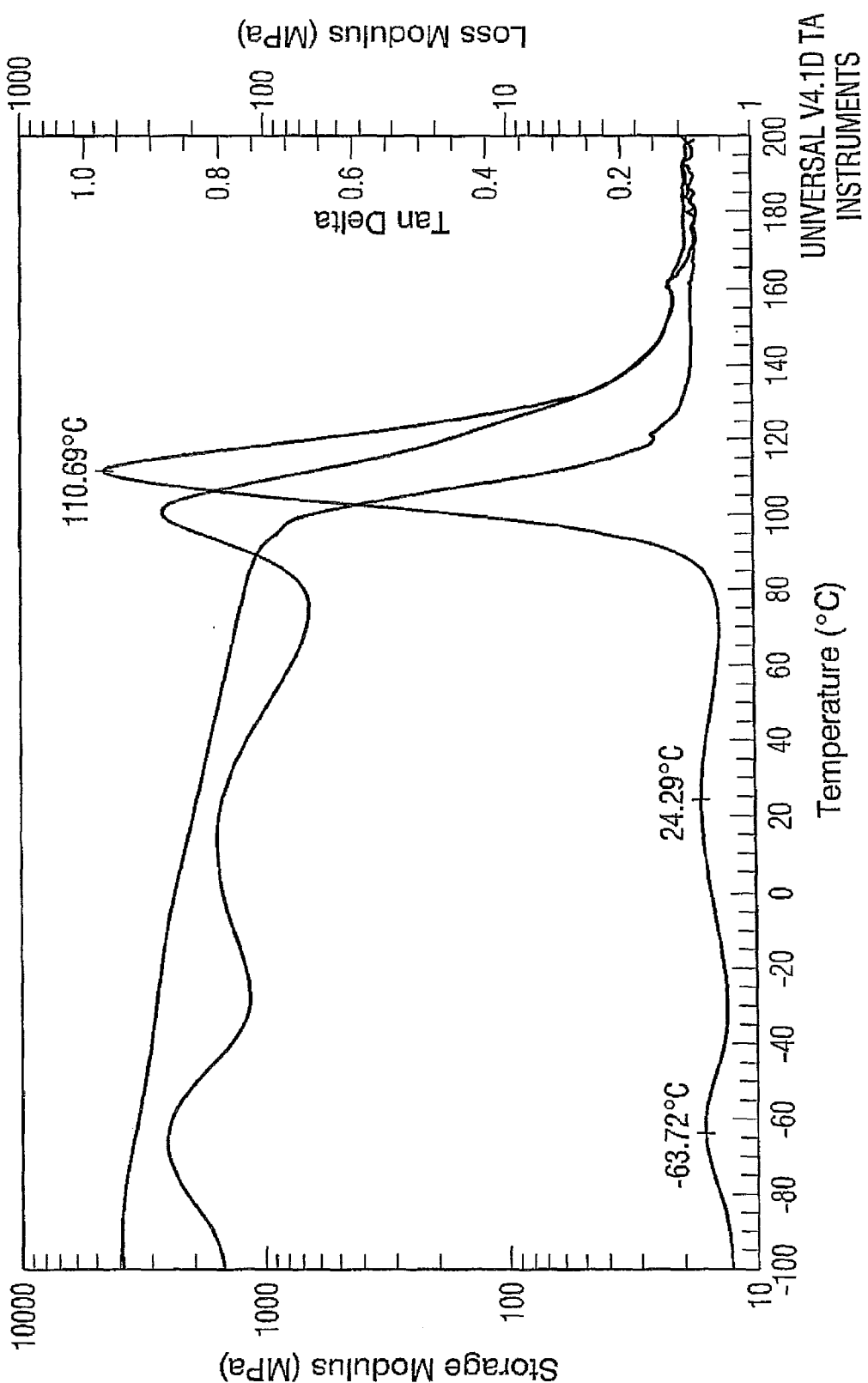
FIG. 2 is a graph of G' and G" as a function of temperature measured using Dynamic Mechanical Analysis (DMA) showing storage modulus, loss modulus and tan Delta for a casting of a polyurethane according to Example A, Formulation 2 of the present invention.
Figure 3:
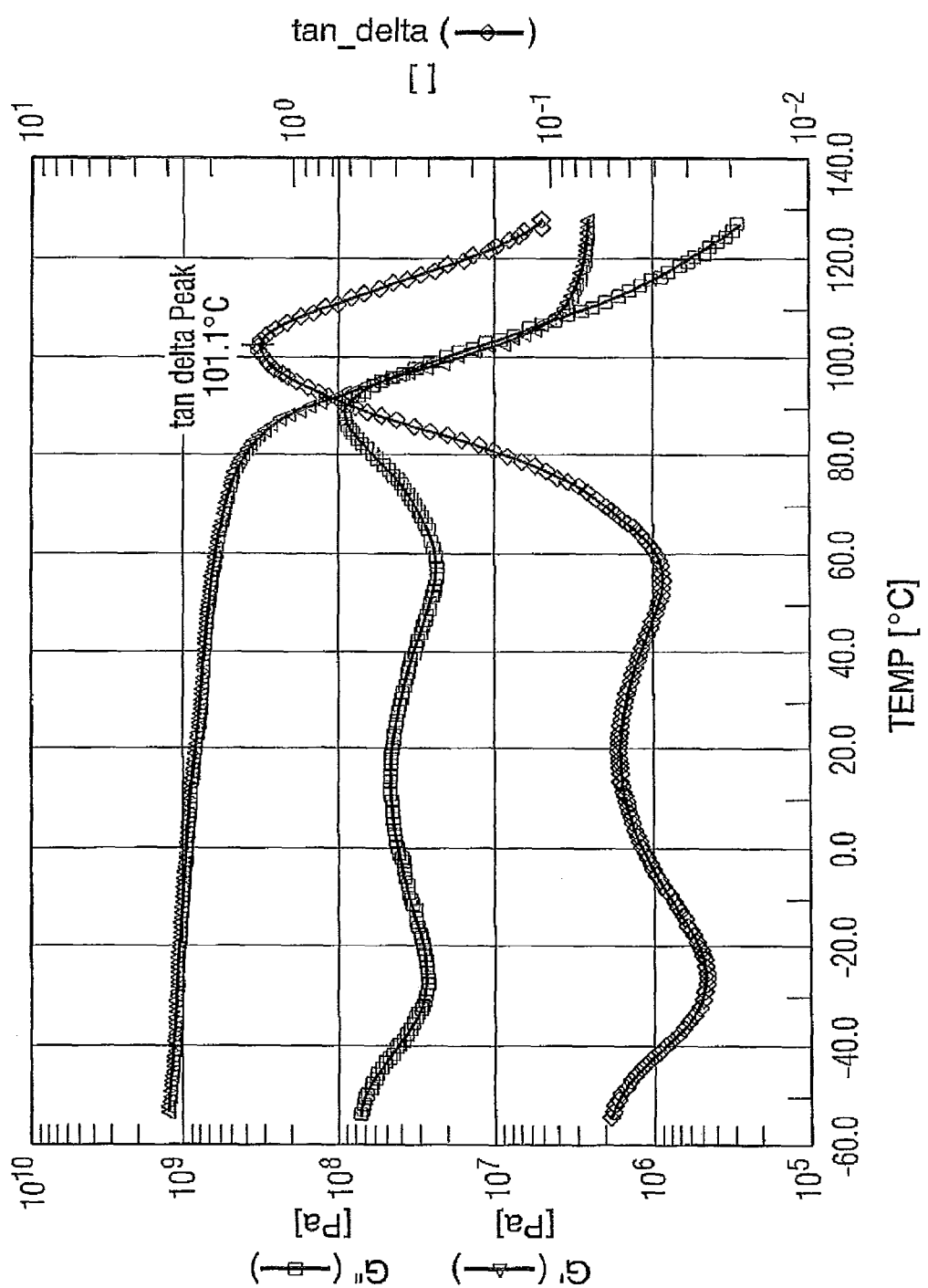
FIG. 3 is a graph of G' and G" as a function of temperature measured using Dynamic Mechanical Analysis (DMA) showing storage modulus, loss modulus and tan Delta for a casting of a polyurethane according to Example A, Formulation 40 of the present invention.

In the present invention, at least one of the isocyanate and/or at least one of the polyols is branched. As used herein, "branched" means a chain of atoms with one or more side chains attached to it. Branching occurs by the replacement of a substituent, e.g., a hydrogen atom, with a covalently bonded substituent or moiety, e.g., an alkyl group. While not intending to be bound by any theory, it is believed that branching of the polyisocyanate and/or polyol can increase the free volume within the polymer matrix, thereby providing room for the molecules to move. The molecules can orient and rotate into configurations and alignments having favorable energy states which can provide good impact properties and/or high modulus of elasticity for the cured polymer matrix. As shown in FIGS. 1, 2 and 3, Dynamic Mechanical Analysis (DMA) of polyurethane castings prepared according to Examples 1, 2 and 40, respectively, for loss modulus as a function of temperature show a low temperature transition at about −70° C. DMA analysis was conducted over a temperature range of −65° F. (−18° C.) to 350° F. (177° C.) under nitrogen according to ASTM D 4065-01. While not intending to be bound by any theory, it is believed that this low temperature transition is due to molecular torsional mobility at that temperature and is believed to contribute to the high impact strength of these polymers.

When a viscoelastic material is subjected to an oscillatory vibration, some energy is stored in the polymer, which is proportional to the elastic component of the modulus G', or storage modulus, and some of the energy is converted to heat through internal friction, or viscous dissipation of the energy, which is termed the loss modulus G". The maximum in the loss modulus is termed tan Delta, which is the maximum in internal friction, damping, or viscous energy dissipation.

High light transmittance, glassy polymers rarely exhibit high impact strength. Polycarbonate plastics such as LEXAN can exhibit a similar low temperature transition, but can have lower impact strength and lower Young's Modulus.

The physical properties of the polyurethanes and poly (ureaurethane)s of the present invention are derived from their molecular structure and are determined by the selection of building blocks, e.g., the selection of the reactants, the ratio of the hard crystalline and soft amorphous segments, and the supra-molecular structures caused by atomic interactions between chains.

Hard segments, i.e., the crystalline or semi-crystalline region of the urethane polymer, result from the reaction of the isocyanate and a chain extender, such as an aliphatic polyol having 4 to 18 carbon atoms or a low molecular weight polyol having a molecular weight of less than about 200 discussed herein. Generally, the soft segment, i.e., the amorphous, rubbery region of the urethane polymer, results from the reaction of the isocyanate and a polymer backbone component, for example a polyester polyol (such as a polycarbonate polyol) or a polyether polyol or short chain diols that have not formed crystalline regions.

The qualitative contribution of a particular organic polyol to either the hard or soft segment when mixed and reacted with other polyurethane-forming components can be readily determined by measuring the Fischer microhardness of the resulting cured polyurethane according to ISO 14577-1: 2002.

In some non-limiting embodiments, the hard segment content of the polyurethane ranges from about 10 to about 100 weight percent, or about 50 to about 100 weight percent, or about 70 to about 100 weight percent. The hard segment content is the percentage by weight of the hard segment linkages present in the polymer and can be calculated by determining the total number of equivalents, and from this the total weight of all reactants, and dividing the total weight of the hard segment linkages obtainable from these reactants by the total weight of the reactants themselves. The following example will further explain the calculation. In Example I, Formulation 1 which follows, a polyurethane article according to the invention was prepared by reacting 0.7 equivalents of 1,4-butanediol, 0.3 equivalents of trimethylolpropane and one equivalent of 4,4'-methylene-bis-(cyclohexyl isocyanate) (DESMODUR W). The equivalent weight of the 1,4-butanediol is 45 g/eq., the equivalent weight of the trimethylolpropane is 44.7 g/eq. (corrected for impurities) and the equivalent weight of the DESMODUR W is 131.2 g/eq. Therefore, the actual weight of ingredients used is 31.54 parts by weight of 1,4-butanediol, 13.2 parts by weight of trimethylolpropane and 131.2 parts by weight of DESMODUR W or a total reactant weight of 175. parts by weight. One equivalent of 1,4-butanediol will yield one equivalent of hard segment linkage, where the hard segment linkage is 1,4-butanediol/DESMODUR W dimer. The equivalent weight of a 1,4-butanediol/DESMODUR W dimer linkage is 176 g/eq. so that the total weight of the hard segment linkages determined by multiplying the equivalent weight of the hard segment dimer by the number of equivalents of 1,4-butanediol would be 123.2 g/eq. Thus, the total weight of the 1,4-butanediol/DESMODUR W dimer linkage, 123.2, divided by the total weight of the reactants, 175.7, multiplied by 100 to convert to percentages would give a percentage by weight of hard segment linkage of 70 percent by weight.

Both Plexiglas and stretched acrylic absorb quite a bit of water from the atmosphere. In accelerated tests such as QUV-B or soaking in water at room temperature, surprisingly, polyurethanes according to the present invention including short chain diols such as butanediol and pentanediol, absorbed essentially no water in water vapor transmission rate studies and after soaking in water for about 24 hours. While not intending to be bound by any theory, it is believed that even though these plastics are very polar, the hydrogen bonding in the hard segment domains is strong enough to block water vapor transmission and uptake of water. In comparison, stretched acrylic will absorb enough water to cause severe swelling of the plastic, to the point that it cracks in-plane, like layers of onion skin separating until it falls apart. The low water absorption can also mitigate any hydrolysis degradation of the urethane groups in the polymer.

Discussion of the various aspects and embodiments of polyurethanes and poly(ureaurethanes) of the present invention have been grouped generally in groups A-Q below. As stated above, these groupings are not intended to limit the scope of the invention and aspects of one grouping may be relevant to the subject matter of other groupings. Also, limitations as to amounts of reactants in one grouping are not necessarily intended to limit amounts of the same component in other groupings, although appropriate amounts may be the same for a different grouping unless otherwise indicated.

Group A

In some non-limiting embodiments, the present invention provides polyurethanes comprising a reaction product of components comprising:
(a) about 1 equivalent of at least one polyisocyanate;
(b) about 0.05 to about 0.9 equivalents of at least one branched polyol having 4 to 18 carbon atoms and at least 3 hydroxyl groups; and
(c) about 0.1 to about 0.95 equivalents of at least one diol having 2 to 18 carbon atoms,
wherein the reaction product components are essentially free of polyester polyol and polyether polyol and wherein the reaction components are maintained at a temperature of at least about 100° C. for at least about 10 minutes.

As used herein, the term "equivalent" means the mass in grams of a substance which will react with one mole ($6.022 \times 10^{23}$ electrons) of another substance. As used herein, "equivalent weight" is effectively equal to the amount of a substance in moles, divided by the valence or number of functional reactive groups of the substance.

As used herein, the term "isocyanate" includes compounds, monomers, oligomers and polymers comprising at least one or at least two —N=C=O functional groups and/or at least one or at least two —N=C=S (isothiocyanate) groups. Monofunctional isocyanates can be used as chain terminators or to provide terminal groups during polymerization. As used herein, "polyisocyanate" means an isocyanate comprising at least two —N=C=O functional groups and/or at least two —N=C=S (isothiocyanate) groups, such as diisocyanates or triisocyanates, as well as dimers and trimers or biurets of the isocyanates discussed herein. Suitable isocyanates are capable of forming a covalent bond with a reactive group such as hydroxyl, thiol or amine functional group. Isocyanates useful in the present invention can be branched or unbranched. As discussed above, use of branched isocyanates may be desirable to increase the free volume within the polymer matrix to provide space for the molecules to move.

Isocyanates useful in the present invention include "modified", "unmodified" and mixtures of "modified" and "unmodified" isocyanates. The isocyanates can have "free", "blocked" or partially blocked isocyanate groups. The term "modified" means that the aforementioned isocyanates are changed in a known manner to introduce biuret, urea, carbodiimide, urethane or isocyanurate groups or blocking groups. In some non-limiting embodiments, the "modified" isocyanate is obtained by cycloaddition processes to yield dimers and trimers of the isocyanate, i.e., polyisocyanates. Free isocyanate groups are extremely reactive. In order to control the reactivity of isocyanate group-containing components, the NCO groups may be blocked with certain selected organic compounds that render the isocyanate group inert to reactive hydrogen compounds at room temperature. When heated to elevated temperatures, e.g., ranging from about 90° C. to about 200° C., the blocked isocyanates release the blocking agent and react in the same way as the original unblocked or free isocyanate.

Generally, compounds used to block isocyanates are organic compounds that have active hydrogen atoms, e.g., volatile alcohols, epsilon-caprolactam or ketoxime compounds. Non-limiting examples of suitable blocking compounds include phenol, cresol, nonylphenol, epsilon-caprolactam and methyl ethyl ketoxime.

As used herein, the NCO in the NCO:OH ratio represents the free isocyanate of free isocyanate-containing materials, and of blocked or partially blocked isocyanate-containing materials after the release of the blocking agent. In some cases, it is not possible to remove all of the blocking agent. In those situations, more of the blocked isocyanate-containing material would be used to attain the desired level of free NCO.

The molecular weight of the isocyanate and isothiocyanate can vary widely. In alternate non-limiting embodiments, the number average molecular weight (Mn) of each can be at least about 100 grams/mole, or at least about 150 grams/mole, or less than about 15,000 grams/mole, or less than about 5,000 grams/mole. The number average molecular weight can be determined using known methods, such as by gel permeation chromatography (GPC) using polystyrene standards.

Non-limiting examples of suitable isocyanates include aliphatic, cycloaliphatic, aromatic and heterocyclic isocyanates, dimers and trimers thereof and mixtures thereof. Useful cycloaliphatic isocyanates include those in which one or more of the isocyanato groups are attached directly to the cycloaliphatic ring and cycloaliphatic isocyanates in which one or more of the isocyanato groups are not attached directly to the cycloaliphatic ring. Useful aromatic isocyanates include those in which one or more of the isocyanato groups are attached directly to the aromatic ring, and aromatic isocyanates in which one or more of the isocyanato groups are not attached directly to the aromatic ring. Useful heterocyclic isocyanates include those in which one or more of the isocyanato groups are attached directly to the heterocyclic ring and heterocyclic isocyanates in which one or more of the isocyanato groups are not attached directly to the heterocyclic ring.

Cycloaliphatic diisocyanates are desirable for use in the present invention because they are not adversely affected by ultraviolet light and can yield polyurethanes having high impact energy absorption levels, which make them desirable for glass replacements and bilayer safety glass applications. Also, polyurethanes prepared with cycloaliphatic diisocyanates are not adversely affected by conventional processing temperatures. When an aromatic polyisocyanate is used, generally, care should be taken to select a material that does not cause the polyurethane to color (e.g., yellow).

In some non-limiting embodiments, the aliphatic and cycloaliphatic diisocyanates can comprise about 6 to about 100 carbon atoms linked in a straight chain or cyclized and having two isocyanate reactive end groups.

Non-limiting examples of suitable aliphatic isocyanates include straight chain isocyanates such as ethylene diisocyanate, trimethylene diisocyanate, 1,6-hexamethylene diisocyanate (HDI), tetramethylene diisocyanate, hexamethylene diisocyanate, octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, bis(isocyanatoethyl)ether.

Other non-limiting examples of suitable aliphatic isocyanates include branched isocyanates such as trimethylhexane diisocyanate, trimethylhexamethylene diisocyanate (TMDI), 2,2'-dimethylpentane diisocyanate, 2,2,4-trimethylhexane diisocyanate, 2,4,4-trimethylhexamethylene diisocyanate, 1,8-diisocyanato-4-(isocyanatomethyl)octane, 2,5,7-trimethyl-1,8-diisocyanato-5-(isocyanatomethyl) octane, 2-isocyanatopropyl-2,6-diisocyanatohexanoate, lysinediisocyanate methyl ester and lysinetriisocyanate methyl ester.

Non-limiting examples of suitable cycloaliphatic isocyanates include dinuclear compounds bridged by an isopropylidene group or an alkylene group of 1 to 3 carbon atoms. Non-limiting examples of suitable cycloaliphatic isocyanates include 1,1'-methylene-bis-(4-isocyanatocyclohexane) or 4,4'-methylene-bis-(cyclohexyl isocyanate) (such as DESMODUR W commercially available from Bayer Corp. of Pittsburgh, Pa.), 4,4'-isopropylidene-bis-(cyclohexyl isocyanate), 1,4-cyclohexyl diisocyanate (CHDI), 4,4'-dicyclohexylmethane diisocyanate, 3-isocyanato methyl-3,5,5-trimethylcyclohexyl isocyanate (a branched isocyanate also known as isophorone diisocyanate or IPDI) which is commercially available from Arco Chemical Co. of Newtown Square, Pa. and meta-tetramethylxylylene diisocyanate (a branched isocyanate also known as 1,3-bis(1-isocyanato-1-methylethyl)-benzene which is commercially available from Cytec Industries Inc. of West Patterson, N.J. under the tradename TMXDI® (Meta) Aliphatic Isocyanate) and mixtures thereof.

Other useful dinuclear cycloaliphatic diisocyanates include those formed through an alkylene group of from 1 to 3 carbon atoms inclusive, and which can be substituted with nitro, chlorine, alkyl, alkoxy and other groups that are not reactive with hydroxyl groups (or active hydrogens) providing they are not positioned so as to render the isocyanate group unreactive. Also, hydrogenated aromatic diisocyanates such as hydrogenated toluene diisocyanate may be used. Dinuclear diisocyanates in which one of the rings is saturated and the other unsaturated, which are prepared by partially hydrogenating aromatic diisocyanates such as diphenyl methane diisocyanates, diphenyl isopropylidene diisocyanate and diphenylene diisocyanate, may also be used.

Mixtures of cycloaliphatic diisocyanates with aliphatic diisocyanates and/or aromatic diisocyanates may also be used. An example is 4,4'-methylene-bis-(cyclohexyl isocyanate) with commercial isomer mixtures of toluene diisocyanate or meta-phenylene diisocyanate.

Thioisocyanates corresponding to the above diisocyanates can be used, as well as mixed compounds containing both an isocyanate and a thioisocyanate group.

Non-limiting examples of suitable isocyanates can include but are not limited to DESMODUR W, DESMODUR N 3300 (hexamethylene diisocyanate trimer), DESMODUR N 3400 (60% hexamethylene diisocyanate dimer and 40% hexamethylene diisocyanate trimer), which are commercially available from Bayer Corp.

In some non-limiting embodiments, the isocyanate can include 1,1'-methylene-bis-(4-isocyanatocyclohexane) (also known as 4,4'-methylene-bis-(cyclohexyl isocyanate)) and isomeric mixtures thereof. As used herein, the term "isomeric mixtures" refers to a mixture of the cis-cis, trans-trans, and cis-trans isomers of the isocyanate. Non-limiting examples of isomeric mixtures suitable for use in the present invention can include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof. Three suitable isomers of 4,4'-methylenebis(cyclohexyl isocyanate) (also known as 1,1'-methylenebis(4-isocyanatocyclohexane) for use in the present invention are shown below.

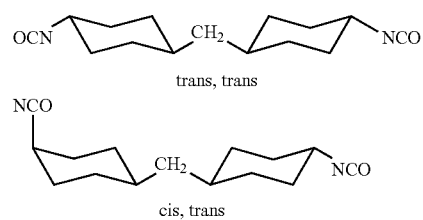

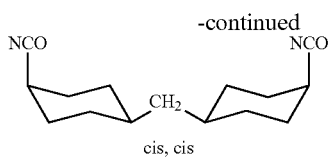

cis, cis

In some non-limiting embodiments, the PICM used in this invention can be prepared by phosgenating the 4,4'-methylenebis(cyclohexyl amine) (PACM) by procedures well-known in the art such as the procedures disclosed in U.S. Pat. Nos. 2,644,007 and 2,680,127, which are incorporated herein by reference. The PACM isomer mixtures, upon phosgenation, can produce PICM in a liquid phase, a partially liquid phase, or a solid phase at room temperature. The PACM isomer mixtures can be obtained by the hydrogenation of methylenedianiline and/or by fractional crystallization of PACM isomer mixtures in the presence of water and alcohols such as methanol and ethanol.

In some non-limiting embodiments, the isomeric mixture can comprise from about 10 to about 100 weight percent of the trans, trans isomer of 4,4'-methylenebis(cyclohexyl isocyanate) (PICM), or about 30 to about 100 weight percent, or about 50 to about 100 weight percent, or about 75 to about 100 weight percent. In other non-limiting embodiments, the cycloaliphatic isocyanate can consist essentially of the trans, trans isomer of 1,1'-methylene-bis-(4-isocyanatocyclohexane) (also known as 4,4'-methylene-bis-(cyclohexyl isocyanate)), e.g., at least about 80 weight percent of the trans, trans isomer of 1,1'-methylene-bis-(4-isocyanatocyclohexane), or at least about 90 weight percent of the trans, trans isomer of 1,1'-methylene-bis-(4-isocyanatocyclohexane), or at least about 95 weight percent of the trans, trans isomer of 1,1'-methylene-bis-(4-isocyanatocyclohexane) and in other non-limiting embodiments consists of about 100 weight percent of the trans, trans isomer of 1,1'-methylene-bis-(4-isocyanatocyclohexane).

Non-limiting examples of suitable polyisocyanates for use in the present invention include polyisocyanates and polyisothiocyanates having backbone linkages such as urethane linkages (—NH—C(O)—O—), thiourethane linkages (—NH—C(O)—S—), thiocarbamate linkages (—NH—C(S)—O—), dithiourethane linkages (—NH—C(S)—S—), polyamide linkages, and combinations thereof.

Other non-limiting examples of suitable polyisocyanates include ethylenically unsaturated polyisocyanates and polyisothiocyanates; alicyclic polyisocyanates and polyisothiocyanates; aromatic polyisocyanates and polyisothiocyanates wherein the isocyanate groups are not bonded directly to the aromatic ring, e.g., α,α'-xylylene diisocyanate; aromatic polyisocyanates and polyisothiocyanates wherein the isocyanate groups are bonded directly to the aromatic ring, e.g., benzene diisocyanate; aliphatic polyisocyanates and polyisothiocyanates containing sulfide linkages; aromatic polyisocyanates and polyisothiocyanates containing sulfide or disulfide linkages; aromatic polyisocyanates and polyisothiocyanates containing sulfone linkages; sulfonic ester-type polyisocyanates and polyisothiocyanates, e.g., 4-methyl-3-isocyanatobenzenesulfonyl-4'-isocyanato-phenol ester; aromatic sulfonic amide-type polyisocyanates and polyisothiocyanates; sulfur-containing heterocyclic polyisocyanates and polyisothiocyanates, e.g., thiophene-2,5-diisocyanate; halogenated, alkylated, alkoxylated, nitrated, carbodiimide modified, urea modified and biuret modified derivatives of isocyanates; and dimerized and trimerized products of isocyanates.

Non-limiting examples of suitable ethylenically unsaturated polyisocyanates include butene diisocyanate and 1,3-butadiene-1,4-diisocyanate. Non-limiting examples of suitable alicyclic polyisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-5-(2-isocyanatoethyl)-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Non-limiting examples of suitable aromatic polyisocyanates wherein the isocyanate groups are not bonded directly to the aromatic ring include α,α'-xylene diisocyanate, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl) phthalate, mesitylene triisocyanate and 2,5-di(isocyanatomethyl)furan.

Non-limiting examples of suitable aromatic polyisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene diisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

In some non-limiting embodiments, sulfur-containing isocyanates of the following general formula (I) can be used:

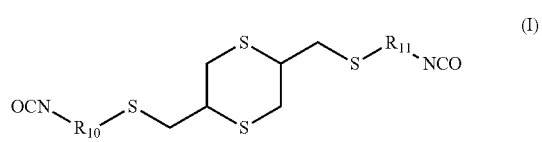

wherein $R_{10}$ and $R_{11}$ are each independently $C_1$ to $C_3$ alkyl.

Non-limiting examples of suitable aliphatic polyisocyanates containing sulfide linkages include thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Non-limiting examples of aromatic polyisocyanates containing sulfide or disulfide linkages include but are not limited to diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Non-limiting examples of suitable aromatic polyisocyanates containing sulfone linkages include diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Non-limiting examples of aromatic sulfonic amide-type polyisocyanates include 4-methyl-3-isocyanato-benzene-sulfonylanilide-3'-methyl-4'-isocyanate, dibenzenesulfonyl-ethylenediamine-4,4'-diisocyanate, 4,4'-methoxybenzene-sulfonyl-ethylenediamine-3,3'-diisocyanate and 4-methyl-3-isocyanato-benzene-sulfonylanilide-4-ethyl-3'-isocyanate.

Non-limiting examples of suitable isothiocyanates include cyclohexane diisothiocyanates; aromatic isothiocyanates wherein the isothiocyanate group(s) are not bonded directly to the aromatic ring; aromatic isothiocyanates wherein the isothiocyanate group(s) are bonded directly to the aromatic ring; heterocyclic isothiocyanates; carbonyl polyisothiocyanates; aliphatic polyisothiocyanates containing sulfide linkages; and mixtures thereof.

Other non-limiting examples of suitable isothiocyanates include aromatic polyisothiocyanates wherein the isothiocyanate groups are bonded directly to the aromatic ring, such as phenylene diisothiocyanate; heterocyclic polyisothiocyanates, such as 2,4,6-triisothicyanato-1,3,5-triazine and thiophene-2,5-diisothiocyanate; carbonyl polyisothiocyanates; aliphatic polyisothiocyanates containing sulfide linkages, such as thiobis(3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of these polyisothiocyanates; and dimerized and trimerized products of these isothiocyanates.

Non-limiting examples of suitable aliphatic polyisothiocyanates include 1,2-diisothiocyanatoethane, 1,3-diisothiocyanatopropane, 1,4-diisothiocyanatobutane and 1,6-diisothiocyanatohexane. Non-limiting examples of aromatic polyisothiocyanates having isothiocyanate groups bonded directly to the aromatic ring include 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis(4-isothiocyanatobenzene), 4,4'-diisothiocyanatobenzophenenone, 4,4'-diisothiocyanato-3,3'-dimethylbenzophenone, benzanilide-3,4'-diisothiocyanate, diphenylether-4,4'-diisothiocyanate and diphenylamine-4,4'-diisothiocyanate.

Non-limiting examples of suitable carbonyl isothiocyanates include hexane-dioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate. Non-limiting examples of suitable aromatic polyisothiocyanates containing sulfur atoms in addition to those of the isothiocyanate groups, include 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothicyanatobenzene-sulfonyl-4'-isothiocyanate phenyl ester and 4-methyl-3-isothiocyanatobenzene-sulfonylanilide-3'-methyl-4'-isothiocyanate.

Other non-limiting examples of isocyanates having isocyanate and isothiocyanate groups include materials having aliphatic, alicyclic, aromatic or heterocyclic groups and which optionally can contain sulfur atoms in addition to those of the isothiocyanate groups. Non-limiting examples of such materials include 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanato-diphenyl sulfide and 2-isocyanato-2'-isothiocyanatodiethyl disulfide.

In some non-limiting embodiments, the isocyanate comprises at least one triisocyanate or at least one polyisocyanate trimer. Non-limiting examples of such isocyanates include aromatic triisocyanates such as tris(4-iso-cyanatophenyl)methane (DESMODUR R), 1,3,5-tris(3-isocyanato-4-methylphenyl)-2,3,6-trioxohexahydro-1,3,5 triazine (DESMODUR IL); adducts of aromatic diisocyanates such as the adduct of 2,4-tolylene diisocyanate (TDI, 2,4-diisocyanatotoluene) and trimethylolpropane (DESMODUR L); and from aliphatic triisocyanates such as N-isocyanatohexylaminocarbonyl-N,N'-bis(isocyanatohexyl)urea (DESMODUR N), 2,4,6-trioxo-1,3,5-tris(6-isocyanatohexyl)hexahydro-1,3,5-triazine (DESMODUR N3390), 2,4,6-trioxo-1,3,5-tris(5-isocyanato-1,3,3-trimethylcyclo-hexylmethyl) hexahydro-1,3,5-triazine (DESMODUR Z4370), and 4-(isocyanatomethyl)-1,8-octane diisocyanate. The above DESMODUR products are commercially available from Bayer Corp. Also useful are the biuret of hexanediisocyanate, polymeric methane diisocyanate, and polymeric isophorone diisocyanate, and trimers of hexamethylene diisocyanate, isophorone diisocyanate and tetramethylxylylene diisocyanate.

In some non-limiting embodiments, the polyisocyanate used to make a polyurethane polyol prepolymer as a precursor is a cycloaliphatic compound, such as a dinuclear compound bridged by an isopropylidene group or an alkylene group of 1 to 3 carbon atoms.

The reaction components for preparing the polyurethane of Group A also comprise about 0.1 to about 0.9 equivalents of at least one branched polyol having 4 to 18 carbon atoms and at least 3 hydroxyl groups. As discussed above, the branched polyol may increase the free volume within the polymer matrix to provide space for the molecules to move or rotate when impacted.

As used herein, the term "polyol" includes compounds, monomers, oligomers and polymers comprising at least two hydroxyl groups (such as diols) or at least three hydroxyl groups (such as triols), higher functional polyols and mixtures thereof. Suitable polyols are capable of forming a covalent bond with a reactive group such as an isocyanate functional group.

Non-limiting examples of suitable polyols include aliphatic, cycloaliphatic, aromatic, heterocyclic, oligomeric, and polymeric polyols and mixtures thereof. In some embodiments, such as for transparencies or windows exposed to sunlight, aliphatic or cycloaliphatic polyols can be used.

The number of carbon atoms in the polyol described above for Group A can range from 4 to 18, or from 4 to 12, or from 4 to 10, or from 4 to 8, or from 4 to 6 carbon atoms. In some non-limiting embodiments, one or more carbon atoms in the polyol can be replaced with one or more heteroatoms, such as N, S, or O.

As discussed above, the branched polyol useful as a reaction product for preparing the polyurethane of Group A has 4 to 18 carbon atoms and at least 3 hydroxyl groups. Non-limiting examples of trifunctional, tetrafunctional or higher polyols suitable for use as the branched polyol include branched chain alkane polyols such as glycerol or glycerin, tetramethylolmethane, trimethylolethane (for example 1, 1,1-trimethylolethane), trimethylolpropane (TMP) (for example 1, 1,1-trimethylolpropane), erythritol, pentaerythritol, dipentaerythritol, tripentaerythritol, sorbitan, alkoxylated derivatives thereof (discussed below) and mixtures thereof.

In some non-limiting embodiments, the polyol can be a cycloalkane polyol, such as trimethylene bis(1,3,5-cyclohexanetriol).

In some non-limiting embodiments, the polyol can be an aromatic polyol, such as trimethylene bis(1,3,5-benzenetriol).

Further non-limiting examples of suitable polyols include the aforementioned polyols which can be alkoxylated derivatives, such as ethoxylated, propoxylated and butoxylated. In alternate non-limiting embodiments, the following polyols can be alkoxylated with from 1 to 10 alkoxy groups: glycerol, trimethylolethane, trimethylolpropane, benzenetriol, cyclohexanetriol, erythritol, pentaerythritol, sorbitol, mannitol, sorbitan, dipentaerythritol and tripentaerythritol. In alternate non-limiting embodiments, alkoxylated, ethoxylated and propoxylated polyols and mixtures thereof can be used alone or in combination with unalkoxylated, unethoxylated and unpropoxylated polyols having at least three hydroxyl groups and mixtures thereof. The number of alkoxy groups can be from 1 to 10, or from 2 to 8 or any rational number between 1 and 10. In a non-limiting embodiment, the alkoxy group can be ethoxy and the number of ethoxy groups can be 1 to 5 units. In another non-limiting embodiment, the polyol can be trimethylolpropane having up to 2 ethoxy groups. Non-limiting examples of suitable alkoxylated polyols include ethoxylated trimethylolpropane, propoxylated trimethylolpropane, ethoxylated trimethylolethane, and mixtures thereof.

Mixtures of any of the above polyols can be used.

In some embodiments, the polyurethanes of the present invention can be thermoplastics, for example those polyurethanes having a molecular weight per crosslink of at least about 6000 g/mole.

In some non-limiting embodiments, the branched polyol having 4 to 18 carbon atoms can have a number average molecular weight of about 100 to about 500 grams/mole. In some non-limiting embodiments, the polyol can have a number average molecular weight of less than about 450 grams/mole. In other non-limiting embodiments, the polyol can have a number average molecular weight of less than about 200 grams/mole.

The reaction components for preparing the polyurethane of Group A also comprise about 0.1 to about 0.9 equivalents of at least one diol having 2 to 18 carbon atoms, or from about 2 to about 14 carbon atoms, or from 2 to 10 carbon atoms, or from 2 to 6 carbon atoms. In some non-limiting embodiments, one or more carbon atoms in the diol can be replaced with one or more heteroatoms, such as N, S, or O.

Non-limiting examples of suitable diols include straight chain alkane diols such as ethylene glycol, diethylene glycol, triethylene glycol, tetraethylene glycol, 1,2-ethanediol, propane diols such as 1,2-propanediol and 1,3-propanediol, butane diols such as 1,2-butanediol, 1,3-butanediol, and 1,4-butanediol, pentane diols such as 1,5-pentanediol, 1,3-pentanediol and 2,4-pentanediol, hexane diols such as 1,6-hexanediol and 2,5-hexanediol, heptane diols such as 2,4-heptanediol, octane diols such as 1,8-octanediol, nonane diols such as 1,9-nonanediol, decane diols such as 1,10-decanediol, dodecane diols such as 1,12-dodecanediol, octadecanediols such as 1,18-octadecanediol, sorbitol, mannitol, and mixtures thereof. In some non-limiting embodiments, the diol is a propane diol such as 1,2-propanediol and 1,3-propanediol, or butane diol such as 1,2-butanediol, 1,3-butanediol, and 1,4-butanediol. In some non-limiting embodiments, one or more carbon atoms in the polyol can be replaced with one or more heteroatoms, such as N, S, or O, for example sulfonated polyols, such as dithio-octane bis diol, thiodiethanol such as 2,2-thiodiethanol, or 3,6-dithia-1,2-octanediol.

Other non-limiting examples of suitable diols include those represented by the following formula:

(I)

wherein R represents $C_0$ to $C_{18}$ divalent linear or branched aliphatic, cycloaliphatic, aromatic, heterocyclic, or oligomeric saturated alkylene radical or mixtures thereof; $C_2$ to $C_{18}$ divalent organic radical containing at least one element selected from the group consisting of sulfur, oxygen and silicon in addition to carbon and hydrogen atoms; $C_5$ to $C_{18}$ divalent saturated cycloalkylene radical; or $C_5$ to $C_{18}$ divalent saturated heterocycloalkylene radical; and R' and R" can be present or absent and, if present, each independently represent $C_1$ to $C_{18}$ divalent linear or branched aliphatic, cycloaliphatic, aromatic, heterocyclic, polymeric, or oligomeric saturated alkylene radical or mixtures thereof.

Other non-limiting examples of suitable diols include branched chain alkane diols, such as propylene glycol, dipropylene glycol, tripropylene glycol, neopentyl glycol, 2-methyl-butanediol, 2,2,4-trimethyl-1,3-pentanediol, 2-methyl-1,3-pentanediol, 2-ethyl-1,3-hexanediol, 2-methyl-1,3-propanediol, 2,2-dimethyl-1,3-propanediol, dibutyl 1,3-propanediol, polyalkylene glycols such as polyethylene glycols, and mixtures thereof.

In some non-limiting embodiments, the diol can be a cycloalkane diol, such as cyclopentanediol, 1,4-cyclohexanediol, cyclohexanedimethanols (CHDM), such as 1,4-cyclohexanedimethanol, cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane and mixtures thereof.

In some non-limiting embodiments, the diol can be an aromatic diol, such as dihydroxybenzene, 1,4-benzenedimethanol, xylene glycol, hydroxybenzyl alcohol and dihydroxytoluene; bisphenols, such as, 4,4'-isopropylidenediphenol, 4,4'-oxybisphenol, 4,4'-dihydroxybenzophenone, 4,4'-thiobisphenol, phenolphthalein, bis(4-hydroxyphenyl)methane, 4,4'-(1,2-ethenediyl)bisphenol and 4,4'-sulfonylbisphenol; halogenated bisphenols, such as 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, which can have, for example, ethoxy, propoxy, α-butoxy and β-butoxy groups; and biscyclohexanols, which can be prepared by hydrogenating the corresponding bisphenols, such as 4,4'-isopropylidene-biscyclohexanol, 4,4'-oxybiscyclohexanol, 4,4'-thiobiscyclohexanol and bis(4-hydroxycyclohexanol)methane, the alkoxylation product of 1 mole of 2,2-bis(4-hydroxyphenyl)propane (i.e., bisphenol-A) and 2 moles of propylene oxide, hydroxyalkyl terephthalates such as meta or para bis(2-hydroxyethyl)terephthalate, bis(hydroxyethyl)hydroquinone and mixtures thereof.

In some non-limiting embodiments, the diol can be an heterocyclic diol, for example a dihydroxy piperidine such as 1,4-bis(hydroxyethyl)piperazine.

In some non-limiting embodiments, the diol can be a diol of an amide or alkane amide (such as ethanediamide (oxamide)), for example N,N',bis(2-hydroxyethyl)oxamide.

In some non-limiting embodiments, the diol can be a diol of a propionate, such as 2,2-dimethyl-3-hydroxypropyl-2,2-dimethyl-3-hydroxypropionate.

In some non-limiting embodiments, the diol can be a diol of a hydantoin, such as bishydroxypropyl hydantoin.

In some non-limiting embodiments, the diol can be a diol of a phthalate, such as meta or para bis(2-hydroxyethyl)terephthalate.

In some non-limiting embodiments, the diol can be a diol of a hydroquinone, such as a dihydroxyethylhydroquinone.

In some non-limiting embodiments, the diol can be a diol of an isocyanurate, such as dihydroxyethyl isocyanurate.

In some non-limiting embodiments, the diol for use in the present invention can be an SH-containing material, such as polythiols having at least three thiol groups and 4 to 18 carbon atoms. Non-limiting examples of suitable polythiols can include but are not limited to aliphatic polythiols, cycloaliphatic polythiols, aromatic polythiols, heterocyclic polythiols, polymeric polythiols, oligomeric polythiols and mixtures thereof. The sulfur-containing active hydrogen-containing material can have linkages including but not limited to ether linkages (—O—), sulfide linkages (—S—), polysulfide linkages (—S$_x$—, wherein x is at least 2, or from 2 to 4) and combinations of such linkages. As used herein, the terms "thiol," "thiol group," "mercapto" or "mercapto group" refer to an —SH group which is capable of forming a thiourethane linkage, (i.e., —NH—C(O)—S—) with an isocyanate group or a dithiouruethane linkage (i.e., —NH—C(S)—S—) with an isothiocyanate group.

In some non-limiting embodiments, the components of the polyurethane are essentially free of SH-containing materials, i.e., comprise less than about 5 weight percent of SH-containing materials, in other non-limiting embodiments the components comprise less than about 2 weight percent of SH-containing materials, and in other non-limiting embodiments are free of SH-containing materials.

In some non-limiting embodiments, the diol having 4 to 18 carbon atoms can have a number average molecular weight of about 200 to about 10,000 grams/mole, or less than about 500 grams/mole, or less than about 200 grams/mole.

Mixtures of any of the above diols can be used.

In some non-limiting embodiments, the reaction components for preparing the polyurethane of Group A can further comprise one or more non-branched triols and/or one or more non-branched higher functional polyols.

Non-limiting examples of suitable non-branched triols and non-branched higher functional polyols include aliphatic, cycloaliphatic, aromatic, heterocyclic, oligomeric, and polymeric polyols and mixtures thereof.

In some non-limiting embodiments, the polyol can be a cycloalkane polyol, such as cyclohexanetriol (for example 1,3,5-cyclohexanetriol).

In some non-limiting embodiments, the polyol can be an aromatic polyol, such as benzenetriol (for example 1,2,3-benzenetriol, 1,2,4-benzenetriol, and 1,3,5-benzenetriol) and phenolphthalein.

In some non-limiting embodiments, the polyol can be a polyol of an isocyanurate, such as tris hydroxyethyl isocyanurate.

In some non-limiting embodiments, the reaction components for preparing the polyurethane of Group A can further comprise one or more branched or unbranched polyols (diols, triols, and/or higher functional polyols) having more than 18 carbon atoms.

Non-limiting examples of suitable polyols having more than 18 carbon atoms include straight or branched chain aliphatic polyols, cycloaliphatic polyols, cycloaliphatic polyols, aromatic polyols, heterocyclic polyols, oligomeric polyols, polymeric polyols and mixtures thereof.

Non-limiting examples of suitable straight or branched chain aliphatic polyols having more than 18 carbon atoms include 1,18-icosanediol and 1,24-tetracosanediol.

Other non-limiting examples of suitable polyols having more than 18 carbon atoms include those represented by the following formula:

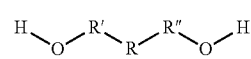

(II)

wherein R represents $C_0$ to $C_{30}$ divalent linear or branched aliphatic, cycloaliphatic, aromatic, heterocyclic, or oligomeric saturated alkylene radical or mixtures thereof; $C_2$ to $C_{30}$ divalent organic radical containing at least one element selected from the group consisting of sulfur, oxygen and silicon in addition to carbon and hydrogen atoms; $C_5$ to $C_{30}$ divalent saturated cycloalkylene radical; or $C_5$ to $C_{30}$ divalent saturated heterocycloalkylene radical; and R' and R" can be present or absent and, if present, each independently represent $C_1$ to $C_{30}$ divalent linear or branched aliphatic, cycloaliphatic, aromatic, heterocyclic, polymeric, or oligomeric saturated alkylene radical or mixtures thereof.

Non-limiting examples of suitable cycloaliphatic polyols having more than 18 carbon atoms include biscyclohexanols having more than 18 carbon atoms, which can be prepared by hydrogenating the corresponding bisphenols.

Non-limiting examples of suitable aromatic polyols having more than 18 carbon atoms include bisphenols, and alkoxylated bisphenols, such as alkoxylated 4,4'-isopropylidenediphenol which can have from 3 to 70 alkoxy groups.

Other non-limiting examples of suitable oligomeric or polymeric polyols having more than 18 carbon atoms include higher polyalkylene glycols such as polyethylene glycols having number average molecular weights ranging from about 200 grams/mole to about 2,000 grams/mole, and mixtures thereof.

In some non-limiting embodiments, the polyol for use in the present invention can be an SH-containing material, such as polythiols having at least two thiol groups or at least three thiol groups and at least 18 carbon atoms. Non-limiting examples of suitable polythiols can include but are not limited to aliphatic polythiols, cycloaliphatic polythiols, aromatic polythiols, heterocyclic polythiols, polymeric polythiols, oligomeric polythiols and mixtures thereof. The sulfur-containing active hydrogen-containing material can have linkages including but not limited to ether linkages (—O—), sulfide linkages (—S—), polysulfide linkages (—$S_x$—, wherein x is at least 2, or from 2 to 4) and combinations of such linkages. As used herein, the terms "thiol," "thiol group," "mercapto" or "mercapto group" refer to an —SH group which is capable of forming a thiourethane linkage, (i.e., —NH—C(O)—S—) with an isocyanate group or a dithioruethane linkage (i.e., —NH—C(S)—S—) with an isothiocyanate group.

In some non-limiting embodiments, the components of the polyurethane are essentially free of SH-containing materials, e.g., contain less than about 5 weight percent of SH-containing materials, in other non-limiting embodiments the components contain less than about 2 weight percent of SH-containing materials, and in other non-limiting embodiments are free of SH-containing materials.

In some non-limiting embodiments, the polyol having at least 18 carbon atoms can have a number average molecular weight of about 200 to about 5,000 grams/mole, or about 200 to about 4,000 grams/mole, or at least about 200 grams/mole, or at least about 400 grams/mole, or at least about 1000 grams/mole, or at least about 2000 grams/mole. In some non-limiting embodiments, the polyol can have a number average molecular weight of less than about 5,000 grams/mole, or less than about 4,000 grams/mole, or less than about 3,000 grams/mole, or less than about 2,000 grams/mole, or less than about 1,000 grams/mole, or less than about 500 grams/mole.

Mixtures of any of the above polyols can be used. For example, the polyol can comprise trimethylolpropane and the diol can comprise butanediol and/or pentanediol.

As discussed above, the amount of branched polyol used to form the polyurethane of Group A is about 0.1 to about 0.9 equivalents. In some non-limiting embodiments, the amount of branched polyol used to form the polyurethane is about 0.3 to about 0.9 equivalents. In other non-limiting embodiments, the amount of branched polyol used to form the polyurethane is about 0.3 equivalents.

As discussed above, the amount of diol used to form the polyurethane of Group A is about 0.1 to about 0.9 equivalents. In some non-limiting embodiments, the amount of diol used to form the polyurethane is about 0.3 to about 0.9 equivalents. In other non-limiting embodiments, the amount of diol used to form the polyurethane is about 0.3 equivalents.

In some non-limiting embodiments of the polyurethane of Group A, the reaction components comprise about 0.1 to about 0.9 equivalents of at least one branched polyol having 4 to 18 carbon atoms and at least 3 hydroxyl groups and about 0.1 to about 0.9 equivalents of at least one diol having 2 to 18 carbon atoms, per 1 equivalent of at least one polyisocyanate, wherein the reaction product components are essentially free of polyester polyol and polyether polyol and wherein the reaction components are maintained at a temperature of at least about 100° C. for at least about 10 minutes.

In some non-limiting embodiments, the polyurethane comprises a reaction product of components consisting of: about 1 equivalent of 4,4'-methylene-bis-(cyclohexyl isocyanate); about 0.3 to about 0.5 equivalents of trimethylolpropane; and about 0.3 to about 0.7 equivalents of butanediol or pentanediol, or about 0.7 equivalents of butanediol or pentanediol, wherein the reaction components are maintained at a temperature of at least about 100° C. for at least about 10 minutes.

In another embodiment, the present invention provides polyurethanes of Group A comprising a reaction product of components consisting of: about 1 equivalent of 4,4'-methylene-bis-(cyclohexyl isocyanate); about 0.3 equivalents of trimethylolpropane; and about 0.7 equivalents of 1,10-dodecanediol, wherein the reaction components are maintained at a temperature of at least about 100° C. for at least about 10 minutes.

In another embodiment, the present invention provides polyurethanes of Group A comprising a reaction product of components consisting of: about 1 equivalent of 4,4'-methylene-bis-(cyclohexyl isocyanate); about 0.3 equivalents of trimethylolpropane; and about 0.7 equivalents of 1,5-pentanediol, wherein the reaction components are maintained at a temperature of at least about 100° C. for at least about 10 minutes.

In another embodiment, the present invention provides polyurethanes of Group A comprising a reaction product of components consisting of: about 1 equivalent of 4,4'-methylene-bis-(cyclohexyl isocyanate); about 0.3 equivalents of trimethylolpropane; about 0.7 equivalents of 1,4-butanediol, wherein the reaction components are maintained at a temperature of at least about 100° C. for at least about 10 minutes.

In another embodiment, the present invention provides polyurethanes of Group A comprising a reaction product of components consisting of: about 1 equivalent of 4,4'-methylene-bis-(cyclohexyl isocyanate); about 0.4 equivalents of trimethylolpropane; about 0.6 equivalents of 1,18-octadecanediol, wherein the reaction components are maintained at a temperature of at least about 100° C. for at least about 10 minutes.

The polyurethanes of Group A can exhibit good ballistics resistance, e.g., resistance to perforation, penetration or cracking due to impact from a projectile such as a bullet or shot which is shot from a handgun, shotgun, rifle, AK-47, or other shooting device or explosives. In some embodiments, the polyurethanes of Group A of 0.75" (1.9 cm) thickness or greater will stop or deflect: a 9 mm, 125 grain bullet shot at an initial velocity of 1350 ft/sec (411.5 m/sec) from 20 feet; a .40 caliber bullet shot at an initial velocity of 987 ft/sec (300.8 m/sec) bullet from 20 feet (6.1 m); and/or a 12-gauge shotgun shot at an initial velocity of 1290 ft/sec (393.2 m/sec) from 20 feet (6.1 m).

Group B

In some non-limiting embodiments, the present invention provides polyurethanes of Group B comprising a reaction product of components comprising: (a) an isocyanate functional urethane prepolymer comprising a reaction product of components comprising: (i) about 1 equivalent of at least one polyisocyanate; and (ii) about 0.1 to about 0.5 equivalents of at least one diol having 2 to 18 carbon atoms; and (b) about 0.05 to about 0.9 equivalents of at least one polyol having 4 to 18 carbon atoms and at least 3 hydroxyl groups;

and (c) up to about 0.45 equivalents of at least one diol having 2 to 18 carbon atoms, wherein the reaction product components are essentially free of polyester polyol and polyether polyol.

In some non-limiting embodiments, the present invention provides polyurethanes comprising a reaction product of components comprising: (a) an isocyanate functional urethane prepolymer comprising a reaction product of components comprising: (i) about 1 equivalent of at least one polyisocyanate; and (ii) about 0.1 to about 0.5 equivalents of at least one polyol having 2 to 18 carbon atoms; and (b) about 0.05 to about 1.0 equivalents of at least one branched polyol having 4 to 18 carbon atoms and at least 3 hydroxyl groups; and (c) up to about 0.9 equivalents of at least one polyol different from branched polyol (b) and having 2 to 18 carbon atoms, wherein the reaction product components are essentially free of polyester polyol and polyether polyol.

In some non-limiting embodiments, the reaction product for forming the isocyanate functional urethane prepolymer can comprise about 0.2 to about 0.3 equivalents of the at least one polyol having 2 to 18 carbon atoms, or about 0.21, about 0.3, about 0.35, or about 0.4 equivalents. In some non-limiting embodiments, the equivalent ratio of polyisocyanate to polyol having 2 to 18 carbon atoms for preparing the isocyanate functional urethane prepolymer is about 1:0.3 to about 1:0.4, or about 1:0.35.

Additional components can be used to prepare the isocyanate functional urethane prepolymer, such as a small amount of at least one branched polyol having 4 to 18 carbon atoms and at least 3 hydroxyl groups, for example about 0.05 to about 0.3 equivalents of a branched polyol such as trimethylolpropane.

The "at least one polyol different from branched polyol (b) and having 2 to 18 carbon atoms" mentioned above can be any polyol having 2 to 18 carbon atoms discussed above or below which is not a branched polyol having 4 to 18 carbon atoms and at least 3 hydroxyl groups. For example, the polyol different from branched polyol (b) can be the same as polyol (ii) having 2 to 18 carbon atoms, for example a butanediol or pentanediol. If present, the amount of polyol different from branched polyol (b) can range from about 0.01 to about 0.9 equivalents, or about 0.1 to about 0.5 equivalents, or about 0.1 to about 0.3 equivalents, or about 0.15 equivalents, or about 0.2 equivalents.

In some non-limiting embodiments, the present invention provides polyurethanes comprising a reaction product of components comprising: (a) an isocyanate functional urethane prepolymer comprising a reaction product of components comprising: (i) about 1 equivalent of at least one polyisocyanate; and (ii) about 0.3 to about 0.4 equivalents of butanediol or pentanediol; and (b) about 0.3 to about 0.6 equivalents of trimethylolpropane; and (c) about 0.1 to about 0.4 equivalents of butanediol or pentanediol, wherein the reaction product components are essentially free of polyester polyol and polyether polyol.

In some non-limiting embodiments, the present invention provides polyurethanes comprising a reaction product of components comprising: (a) an isocyanate functional urethane prepolymer comprising a reaction product of components comprising: (i) about 1 equivalent of at least one polyisocyanate; and (ii) about 0.3 to about 0.4 equivalents of butanediol or pentanediol; and (b) about 0.3 to about 0.7 equivalents of trimethylolpropane; and (c) up to about 0.4 equivalents of butanediol or pentanediol, wherein the reaction product components are essentially free of polyester polyol and polyether polyol.

In some non-limiting embodiments, the polyurethanes can be essentially free of polyester polyol and/or polyether polyol, as discussed in detail below, for example less than about 0.1 equivalents of polyester polyol or polyether polyol.

In some non-limiting embodiments, the polyurethanes can be essentially free of amine curing agent, as discussed in detail below. As used herein, "essentially free of amine curing agent" means that the reaction product components comprise less than about 10 weight percent of amine curing agent, or less than about 5 weight percent of amine curing agent, or less than about 2 weight percent of amine curing agent, or in other non-limiting embodiments are free of amine curing agent.

In some non-limiting embodiments, the polyurethane has a hard segment content of about 10 to about 100 weight percent, or about 30 to about 70 weight percent. In some non-limiting embodiments, the polyurethane has a urethane content of about 20 to about 40 weight percent, or about 30 to about 43 weight percent. In some non-limiting embodiments, the polyurethane has a cyclic content of about 10 to about 80 weight percent, or about 30 to about 46 weight percent. In some non-limiting embodiments, the polyurethane has a molecular weight per crosslink of at least about 500 grams per mole, or about 1700 grams per mole.

Non-limiting examples and amounts of suitable polyisocyanates, diols and polyols for use as reaction products for preparing the polyurethanes of Group B are discussed in detail above with respect to Group A. Methods for preparing polyurethanes of Group B are discussed in detail below. In some non-limiting embodiments, the components are maintained at a temperature of at least about 100° C., or at least about 105° C., or at least about 110° C. for at least about 10 minutes or at least about 20 minutes The polyurethanes of Group B can be useful for any of the applications or uses described herein. In some non-limiting embodiments, the present invention provides polyurethanes suitable for use as transparencies or windows. Polyurethanes of Group B having good creep resistance (or low deflection) and high fracture toughness (K-factor) can be useful for airplane windows. Airplane windows typically deflect or deform over time due to extremes in temperature and pressure, which can increase interior cabin noise and decrease gas mileage due to increased drag. Therefore, resistance to creep or low deflection is a desirable characteristic. In some non-limiting embodiments, the maximum average deflection of the transparency or window is about 0.5 inch (about 1.3 mm). A flexural test (discussed in the Examples below) was developed to simulate the creep phenomenon under 3,294 psig (300 times the service pressure at 3,500 feet altitude) for 3 hrs. In some non-limiting embodiments for aircraft window applications, the values of Young's Modulus can be at least about 350,000 (about 2413 MPa). Thus, in some non-limiting embodiments, the present invention provides polyurethanes suitable for use as transparencies, such as airplane windows, which can have one or more of the following desirable properties: good deflection resistance, high fracture toughness (K-factor), lower weight than conventional airplane transparencies, and good abrasion resistance.

In some non-limiting embodiments in which articles having good optical properties are desired, such as low striation or no visible striation, the equivalent ratio of the prepolymer components of isocyanate functional material(s) (such as 4,4'-methylene-bis-(cyclohexyl isocyanate) to the polyol(s) having 2 to 18 carbon atoms (such as 1,5-pentane diol) can range from about 1.0:0.3 to about 1.0:0.4, or about 1.0:0.35. While not intending to be bound by any theory, it is believed that the formation of striations in a molded article may be related to the viscosity of the prepolymer. The higher viscosity prepolymer can wet the release-coated glass mold better so that flow into the casting cell is more uniform and smooth, and the urethane content is higher, making compatibility of the components occur faster. The striation of an article can be determined by forming a molded article, for example having a thickness of about one inch (2.54 cm), and holding the molded article in front of a white-coated board or substrate, and visually observing for the presence of striations when a light source is shined upon the molded article.

Group C

In some non-limiting embodiments, the present invention provides polyurethanes of Group C comprising a reaction product of components comprising: at least one polyisocyanate selected from the group consisting of polyisocyanate trimers and branched polyisocyanates, the polyisocyanate having at least three isocyanate functional groups; and at least one aliphatic polyol having 4 to 18 carbon atoms and at least two hydroxyl groups, wherein the reaction product components are essentially free of polyester polyol and polyether polyol.

In other non-limiting embodiments, the present invention provides polyurethanes of Group C comprising a reaction product of components consisting of: about 1 equivalent of 4,4'-methylene-bis-(cyclohexyl isocyanate); about 1.1 equivalents of butanediol; and about 0.1 equivalents of isophorone diisocyanate trimer.

Non-limiting examples of suitable polyisocyanate trimers, branched polyisocyanates and aliphatic polyols (including but not limited to straight chain, branched or cycloaliphatic polyols) for use in as reaction products for preparing the polyurethanes of Group C are discussed in detail above with respect to Group A. Similar amounts of polyisocyanate trimer(s) and/or branched polyisocyanate(s) can be used as described for the polyisocyanate of Group A above. Also, mixtures of polyisocyanate trimer(s) and/or branched polyisocyanate(s) with other non-branched and non-trimer polyisocyanates described above can be used to form the polyurethanes of Group C.

In some non-limiting embodiments of the polyurethane of Group C, the reaction components comprise about 0.1 to about 0.9 equivalents of at least one branched polyol having 4 to 18 carbon atoms and at least 2 hydroxyl groups per 1 equivalent of at least one polyisocyanate, and in other non-limiting embodiments about 0.3 to about 0.9 equivalents of at least one aliphatic polyol having 2 to 18 carbon atoms, wherein the reaction product components are essentially free of polyester polyol and polyether polyol.

As discussed above, in some non-limiting embodiments of Group A, Group B and Group C, the reaction product components are essentially free of polyester polyol and polyether polyol. As used herein, "essentially free of" polyester polyol and/or polyether polyol means that the reaction product components comprise less than about 10 weight percent of polyester polyol and/or polyether polyol, or less than about 5 weight percent of polyester polyol and/or polyether polyol, or less than about 2 weight percent of polyester polyol and/or polyether polyol, or is free of polyester polyol and/or polyether polyol, or less than about 0.1 equivalents of polyester polyol or polyether polyol.

Non-limiting examples of such polyester polyols include polyester glycols, polycaprolactone polyols, polycarbonate polyols and mixtures thereof. Polyester glycols can include the esterification products of one or more dicarboxylic acids having from four to ten carbon atoms, such as but not limited to adipic, succinic or sebacic acids, with one or more low molecular weight glycols having from two to ten carbon atoms, such as but not limited to ethylene glycol, propylene glycol, diethylene glycol, 1,4-butanediol, neopentyl glycol, 1,6-hexanediol and 1,10-decanediol. Esterification procedures for producing polyester polyols are described, for example, in the article by D. M. Young, F. Hostettler et al., "Polyesters from Lactone," Union Carbide F-40, p. 147.

Non-limiting examples of polycaprolactone polyols include those prepared by condensing caprolactone in the presence of difunctional active hydrogen material such as water or low molecular weight glycols, for example ethylene glycol and propylene glycol. Non-limiting examples of suitable polycaprolactone polyols can include commercially available materials designated as the CAPA series from Solvay Chemical of Houston, Tex.; such as CAPA 2047A and CAPA 2077A, and the TONE series from Dow Chemical of Midland, Mich., such as TONE 0201, 0210, 0230 & 0241. In some non-limiting embodiments, the polycaprolactone polyol has a molecular weight ranging from about 500 to about 2000 grams per mole, or about 500 to about 1000 grams per mole.

Non-limiting examples of polycarbonate polyols include aliphatic polycarbonate diols, for example those based upon alkylene glycols, ether glycols, alicyclic glycols or mixtures thereof. In some embodiments, the alkylene groups for preparing the polycarbonate polyol can comprise from 5 to 10 carbon atoms and can be straight chain, cycloalkylene or combinations thereof. Non-limiting examples of such alkylene groups include hexylene, octylene, decylene, cyclohexylene and cyclohexyldimethylene. Suitable polycarbonate polyols can be prepared, in non-limiting examples, by reacting a hydroxy terminated alkylene glycol with a dialkyl carbonate, such as methyl, ethyl, n-propyl or n-butyl carbonate, or diaryl carbonate, such as diphenyl or dinaphthyl carbonate, or by reacting of a hydroxy-terminated alkylene diol with phosgene or bischloroformate, in a manner well-known to those skilled in the art. Non-limiting examples of such polycarbonate polyols include those commercially available as Ravecarb™ 107 from Enichem S.p.A. (Polimeri Europa) of Italy, and polyhexylene carbonate diols, about 1000 number average molecular weight, such as KM10-1733 polycarbonate diol prepared from hexanediol, available from Stahl. Examples of other suitable polycarbonate polyols that are commercially available include KM10-1122, KM10-1667 (prepared from a 50/50 weight percent mixture of cyclohexane dimethanol and hexanediol) (commercially available from Stahl U.S.A. Inc. of Peabody, Mass.) and DESMOPHEN 2020E (commercially available from Bayer Corp).

The polycarbonate polyol can be produced by reacting diol, such as described herein, and a dialkyl carbonate, such as described in U.S. Pat. No. 4,160,853. The polycarbonate polyol can include polyhexamethylene carbonate such as $HO-(CH_2)_6-[O-C(O)-O-(CH_2)_6]_n-OH$, wherein n is an integer from 4 to 24, or from 4 to 10, or from 5 to 7.

Non-limiting examples of polyether polyols include poly(oxyalkylene)polyols or polyalkoxylated polyols. Poly(oxyalkylene)polyols can be prepared in accordance with known methods. In a non-limiting embodiment, a poly(oxyalkylene)polyol can be prepared by condensing an alkylene oxide, or a mixture of alkylene oxides, using acid- or base-catalyzed addition with a polyhydric initiator or a mixture of polyhydric initiators, such as ethylene glycol, propylene glycol, glycerol, and sorbitol. Compatible mixtures of polyether polyols can also be used. As used herein, "compatible" means that two or more materials are mutually soluble in each other so as to essentially form a single phase. Non-limiting examples of alkylene oxides can include ethylene oxide, propylene oxide, butylene oxide, amylene oxide, aralkylene oxides, such as styrene oxide, mixtures of ethylene oxide and propylene oxide. In some non-limiting embodiments, polyoxyalkylene polyols can be prepared with mixtures of alkylene oxide using random or step-wise oxyalkylation. Non-limiting examples of such poly(oxyalkylene)polyols include polyoxyethylene polyols, such as polyethylene glycol, and polyoxypropylene polyols, such as polypropylene glycol.

Other polyether polyols include block polymers such as those having blocks of ethylene oxide-propylene oxide and/or ethylene oxide-butylene oxide. In some non-limiting embodiments, the polyether polyol comprises a block copolymer of the following formula:

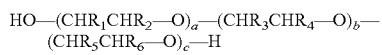

wherein $R_1$ through $R_6$ can each independently represent hydrogen or methyl; and a, b, and c can each be independently selected from an integer from 0 to 300, wherein a, b and c are selected such that the number average molecular weight of the polyol is less than about 32,000 grams/mole, or less than about 10,000 grams/mole, as determined by GPC. In other non-limiting embodiments a, b, and c each can be independently an integer from 1 to 300. In other non-limiting embodiments, $R_1$, $R_2$, $R_5$, and $R_6$ can be hydrogen, and $R_3$ and $R_4$ each can be independently selected from hydrogen and methyl, with the proviso that $R_3$ and $R_4$ are different from one another. In other non-limiting embodiments, $R_3$ and $R_4$ can be hydrogen, and $R_1$ and $R_2$ each can be independently selected from hydrogen and methyl, with the proviso that $R_1$ and $R_2$ are different from one another, and $R_5$ and $R_6$ each can be independently selected from hydrogen and methyl, with the proviso that $R_5$ and $R_6$ are different from one another.

In some non-limiting embodiments, polyalkoxylated polyols can be represented by the following general formula:

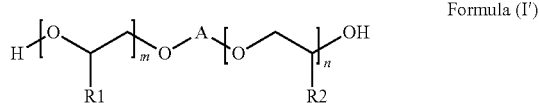

Formula (I')

wherein m and n can each be a positive integer, the sum of m and n being from 5 to 70; $R_1$ and $R_2$ are each hydrogen, methyl or ethyl; and A is a divalent linking group such as a straight or branched chain alkylene which can contain from 1 to 8 carbon atoms, phenylene, and $C_1$ to $C_9$ alkyl-substituted phenylene. The values of m and n can, in combination with the selected divalent linking group, determine the molecular weight of the polyol. Polyalkoxylated polyols can be prepared by methods that are known in the art. In a non-limiting embodiment, a polyol such as 4,4'-isopropylidenediphenol can be reacted with an oxirane-containing material such as ethylene oxide, propylene oxide or butylene oxide, to form what is commonly referred to as an ethoxylated, propoxylated or butoxylated polyol having hydroxyl functionality. Non-limiting examples of polyols suitable for use in preparing polyalkoxylated polyols can include those polyols described in U.S. Pat. No. 6,187,444 B1 at column 10, lines 1-20, incorporated herein by reference.

In some non-limiting embodiments, the polyether polyol can be PLURONIC ethylene oxide/propylene oxide block copolymers, such as PLURONIC R and PLURONIC L62D, and/or TETRONIC tetra-functional block copolymers based on ethylene oxide and propylene oxide, such as TETRONIC R, which are commercially available from BASF Corp. of Parsippany, N.J.

As used herein, the phrase "polyether polyols" also can include poly(oxytetramethylene) diols prepared by the polymerization of tetrahydrofuran in the presence of Lewis acid catalysts such as, but not limited to, boron trifluoride, tin (IV) chloride and sulfonyl chloride.

Group D

In some non-limiting embodiments, the present invention provides polyurethanes of Group D comprising a reaction product of components comprising: at least one polyisocyanate; at least one branched polyol having 4 to 18 carbon atoms and at least 3 hydroxyl groups; and at least one polyol having one or more bromine atoms, one or more phosphorus atoms or combinations thereof. Brominated or phosphonated polyols can provide the polyurethane with enhanced flame retardancy. The flame retardancy of polyurethanes of the present invention can be determined simply by exposure to flame to determine if the polymer is self-extinguishing or burns more slowly than a polymer without the brominated or phosphonated polyol, or according to Underwriter's Laboratory Test UL-94, incorporated by reference herein. Alternatively, horizontal and vertical burning rate can be determined according to EC Directive 95/28/EC, Annexes IV and VI respectively, incorporated by reference herein. Federal Aviation Regulation (FAR) 25.853 (a)(1)(ii) permits a burn length of 8 inches and flame time of 15 seconds.

In other non-limiting embodiments, the present invention provides polyurethanes of Group D comprising a reaction product of components consisting of: about 1 equivalent of 4,4'-methylene-bis-(cyclohexyl isocyanate); about 0.3 to about 0.5 equivalents of trimethylolpropane; about 0.2 to about 0.5 equivalents of bis(4-(2-hydroxyethoxy)-3,5-dibromophenyl)sulfone; about 0.2 to about 0.5 equivalents of 1,4-cyclohexane dimethanol; and about 0.2 to about 0.5 equivalents of 3,6-dithia-1,2-octanediol.

Non-limiting examples of suitable polyisocyanates and branched polyols having 4 to 18 carbon atoms and at least 3 hydroxyl groups for use as reaction products for preparing the polyurethanes of Group D are discussed in detail above with respect to Group A.

Non-limiting examples of suitable polyols having one or more bromine atoms, one or more phosphorus atoms or combinations thereof include 4,4'-isopropylidene bis(2,6-dibromophenol), isopropylidene bis[2-(2,6-dibromo-phenoxy)ethanol], bis(4-(2-hydroxyethoxy)-3,5-dibromophenyl)sulfone heptakis(dipropylene glycol)triphosphite, tris (dipropylene glycol) phosphate, diethyl-N,N-bis(2-hydroxyethyl)aminoethanol phosphonate and mixtures thereof. Non-limiting examples of suitable phosphonated polyols include those of the formula HO—Y—O[POOR—O—Y—O][POOR—Y—O—Y—OH, wherein each R is independently selected from an alkylene group having 1 to 10 repeat units, such as $CH_2$ to $(CH_2)_{10}$ and each Y is independently selected from an alkylene group having 1 to 6 repeat units, such as $CH_2$ to $(CH_2)_6$.

The amount of brominated polyols and/or phosphonated polyols used to form the polyurethane of Group D can be about 0.1 to about 0.9 equivalents, or about 0.3 to about 0.9 equivalents, or about 0.3 equivalents.

In some non-limiting embodiments, the reaction components can further comprise one or more of the polyether polyols and/or polyester polyols discussed above. If present, the amount of polyether polyols and/or polyester polyols used to form the polyurethane of Group D can be about 0.1 to about 0.9 equivalents, or about 0.3 to about 0.9 equivalents, or about 0.3 equivalents.

Groups A-D

In some non-limiting embodiments of the polyurethanes of Groups A-D, the reaction products can further comprise one or more of the following: polyurethane polyols, (meth)acrylamides, hydroxy(meth)acrylamides, polyvinyl alcohols, polymers containing hydroxy functional (meth)acrylates, polymers containing allyl alcohols, dihydroxy oxamides, dihydroxyamides, dihydroxypiperidines, dihydroxy phthalates, dihydroxyethyl hydroquinones, polyesteramides and mixtures thereof. In some embodiments, polymerization with acrylamides can form an interpenetrating network having high transparency, good impact strength, and high Young's Modulus.

Non-limiting examples of suitable polyurethane polyols include the reaction product of an excess of polyisocyanate and a branched or straight chain polyol. The equivalent ratio of polyisocyanate to polyol can range from about 1.0:0.05 to about 1.0:3, or about 1.0:0.7. The amount of polyurethane polyols used can range from about 1 to about 90 weight percent, about 5 to about 70 weight percent, or about 20 to about 50 weight percent on a basis of total weight of the components.

Non-limiting examples of suitable acrylamides include acrylamide, methacrylamide and dimethylacrylamide. The acrylamide can be added with all of the other reaction components, or it can be dissolved in the diol and then mixed with the other reaction components. The amount of acrylamide used can range from about 5 to about 70 weight percent, about 10 to about 50 weight percent, or about 10 to about 30 weight percent on a basis of total weight of the components.

Non-limiting examples of suitable polyvinyl alcohols include polyvinyl alcohol. The amount of polyvinyl alcohol used can range from about 5 to about 90 weight percent, about 10 to about 70 weight percent, or about 10 to about 40 weight percent on a basis of total weight of the components.

Non-limiting examples of suitable polymers containing hydroxy functional (meth)acrylates include hydroxypropylacrylate; hydroxyethylacrylate; hydroxypropylmethacrylate; hydroxyethylmethacrylate; and copolymers of hydroxy functional (meth)acrylates with acrylamides, cyanoethyl (meth)acrylates, methylmethacrylates, methacrylates, ethacrylates, propylacrylates and vinylpyrrolidinone. The amount of hydroxy functional (meth)acrylates used can range from about 10 to about 90 weight percent, about 10 to about 70 weight percent, or about 10 to about 30 weight percent on a basis of total weight of the components.

Non-limiting examples of suitable polymers containing allyl alcohols include diethylene glycol bis(allylcarbonate), allyloxytrimethylsilane, and diallylcarbonate. The amount of allyl alcohols used can range from about 5 to about 70 weight percent, about 10 to about 50 weight percent, or about 10 to about 30 weight percent.

Non-limiting examples of suitable polyesteramides include esteramide polymers obtained by the reaction of bis-oxamidodiols such as N,N'-bis(omega-hydroxyalkylene) oxamide with a dicarboxylic acid or diester such as diethyl oxalate, diethyl succinates, diethyl suberate, or dimethyl terephthalate. The amount of polyesteramides used can range from about 10 to about 80 weight percent, about 20 to about 60 weight percent, or about 30 to about 50 weight percent on a basis of total weight of the components.

In some non-limiting embodiments of the polyurethanes of Groups A-C, the reaction products can further comprise one or more amine curing agents. The amine curing agent, if present, can act as a catalyst in the polymerization reaction, be incorporated into the resulting polymerizate and can form poly(ureaurethane)s. The amount of amine curing agent used can range from about 0.05 to about 0.9 equivalents, about 0.1 to about 0.7 equivalents, or about 0.3 to about 0.5 equivalents.

Non-limiting examples of such amine curing agents include aliphatic polyamines, cycloaliphatic polyamines, aromatic polyamines and mixtures thereof. In some non-limiting embodiments, the amine curing agent can have at least two functional groups selected from primary amine (—NH$_2$), secondary amine (—NH—) and combinations thereof. In some non-limiting embodiments, the amine curing agent can have at least two primary amine groups. In some non-limiting embodiments, the amino groups are all primary groups.

Examples of such amine curing agents include compounds having the following formula:

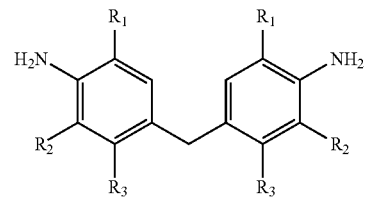

wherein $R_1$ and $R_2$ are each independently selected from methyl, ethyl, propyl, and isopropyl groups, and $R_3$ is selected from hydrogen and chlorine, such as the following compounds manufactured by Lonza Ltd. (Basel, Switzerland): LONZACURE® M-DIPA, in which $R_1$=$C_3H_7$; $R_2$=$C_3H_7$; $R_3$=H; LONZACURE® M-DMA, in which $R_1$=$CH_3$; $R_2$=$CH_3$; $R_3$=H; LONZACURE® M-MEA, in which $R_1$=$CH_3$; $R_2$=$C_2H_5$; $R_3$=H; LONZACURE® M-DEA, in which $R_1$=$C_2H_5$; $R_2$=$C_2H_5$; $R_3$=H; LONZACURE® M-MIPA, in which $R_1$=$CH_3$; $R_2$=$C_3H_7$; $R_3$=H; and LONZACURE® M-CDEA, in which $R_1$=$C_2H_5$; $R_2$=$C_2H_5$; $R_3$=Cl, each of which is commercially available from Air Products and Chemicals, Inc. of Allentown, Pa.

Such amine curing agents can include a diamine curing agent such as 4,4'-methylenebis(3-chloro-2,6-diethylaniline), (LONZACURE® M-CDEA); 2,4-diamino-3,5-diethyl-toluene, 2,6-diamino-3,5-diethyl-toluene and mixtures thereof (collectively "diethyltoluenediamine" or "DETDA"), which is commercially available from Albemarle Corporation under the trade name ETHACURE 100; dimethylthiotoluenediamine (DMTDA) (commercially available as ETHACURE 300); the color stabilized version of ETHACURE 100 (i.e., formulation which contains an additive to reduce yellow color), which is available under the name ETHACURE 100S; 4,4'-methylene-bis-(2-chloroaniline) (commercially available from Kingyorker Chemicals under the trade name MOCA). DETDA can be a liquid at room temperature with a viscosity of 156 centipoise (cp) at 25° C. DETDA can be isomeric, with the 2,4-isomer amount being from 75 to 81 percent while the 2,6-isomer amount can be from 18 to 24 percent.

Other non-limiting examples of amine curing agents include ethyleneamines, such as ethylenediamine (EDA), diethylenetriamine (DETA), triethylenetetramine (TETA), tetraethylenepentamine (TEPA), pentaethylenehexamine (PEHA), piperazine, morpholine, substituted morpholine, piperidine, substituted piperidine, diethylenediamine (DEDA), and 2-amino-1-ethylpiperazine. In some non-limiting embodiments, the amine curing agent can be selected from one or more isomers of $C_1$-$C_3$ dialkyl toluenediamine, such as 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and mixtures thereof. In some non-limiting embodiments, the amine curing agent can be methylene dianiline or trimethyleneglycol di(para-aminobenzoate).

Other non-limiting examples of amine curing agents include compounds of the following general structures (XIII-XV):

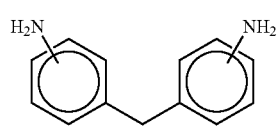
(XIII)

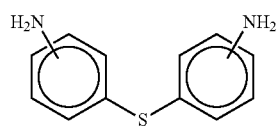
(XIV)

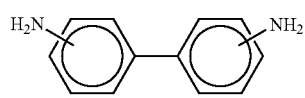
(XV)

Other non-limiting examples of amine curing agents include one or more methylene bis anilines represented by the general formulas XVI-XX, one or more aniline sulfides represented by the general formulas XXI-XXV, and/or one or more bianilines represented by the general formulas XXVI-XXVIX,

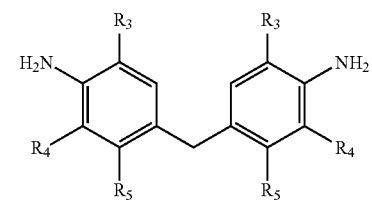
(XVI)

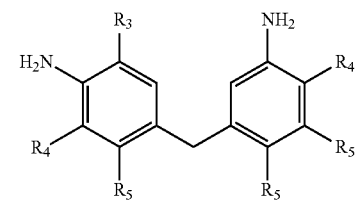
(XVII)

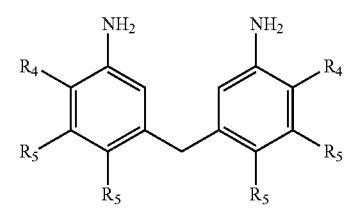
(XVIII)

-continued

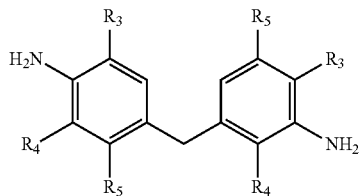
(XIX)

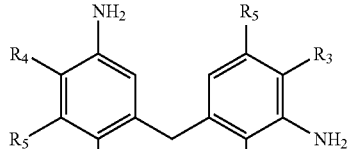
(XX)

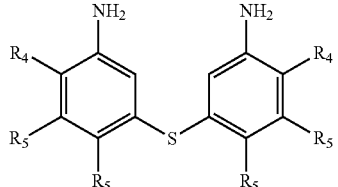
(XXI)

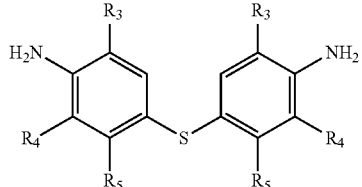
(XXII)

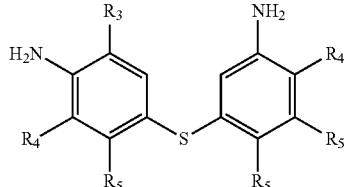
(XXIII)

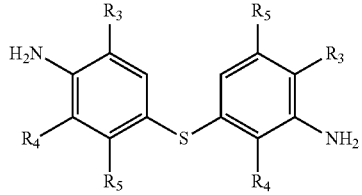
(XXIV)

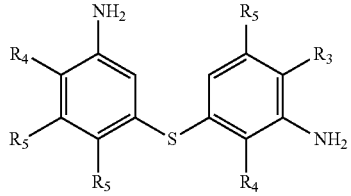
(XXV)

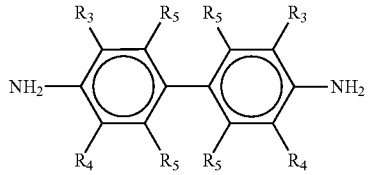
(XXVI)

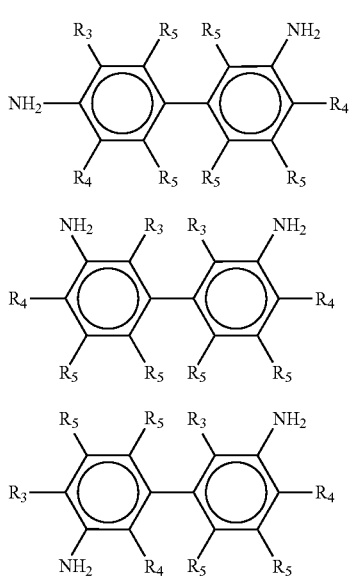

(XXVII)

(XXVIII)

(XXIX)

wherein $R_3$ and $R_4$ are each independently $C_1$-$C_3$ alkyl, and $R_5$ is selected from hydrogen and halogen, such as chlorine or bromine. The diamine represented by general formula XV can be described generally as a 4,4'-methylene-bis(dialkylaniline). Suitable non-limiting examples of diamines which can be represented by general formula XV include but are not limited to 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline).

The amine curing agent includes compounds represented by the following general structure (XXX):

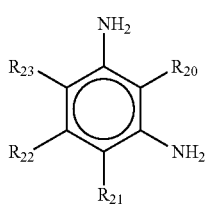

(XXX)

where $R_{20}$, $R_{21}$, $R_{22}$, and $R_{23}$ are each independently selected from H, $C_1$-$C_3$ alkyl, $CH_3$—S— and halogen, such as chlorine or bromine. The amine curing agent represented by general formula XXX can include diethyl toluene diamine (DETDA) wherein $R_{23}$ is methyl, $R_{20}$ and $R_{21}$ are each ethyl and $R_{22}$ is hydrogen. Also, the amine curing agent can include 4,4'-methylenedianiline.

In an embodiment wherein it is desirable to produce a poly(ureaurethane) having low color, the amine curing agent can be selected such that it has relatively low color and/or it can be manufactured and/or stored in a manner as to prevent the amine from developing a color (e.g., yellow).

In some non-limiting embodiments of the polyurethanes of Groups A-D, the reaction products can be essentially free of amine curing agent. As used herein, "essentially free of amine curing agent" means that the reaction product components comprise less than about 10 weight percent of amine curing agent, or less than about 5 weight percent of amine curing agent, or less than about 2 weight percent of amine curing agent, or in other non-limiting embodiments are free of amine curing agent.

Group E

In some non-limiting embodiments, the present invention provides polyurethanes of Group E comprising a reaction product of components comprising: about 1 equivalent of at least one polyisocyanate; about 0.3 to about 1 equivalents of at least one branched polyol having 4 to 18 carbon atoms and at least 3 hydroxyl groups; and about 0.01 to about 0.3 equivalents of at least one polycarbonate diol, wherein the reaction product components are essentially free of polyether polyol and amine curing agent and wherein the reaction components are maintained at a temperature of at least about 100° C. for at least about 10 minutes.

Non-limiting examples of suitable polyisocyanates, branched polyols having 4 to 18 carbon atoms and at least 3 hydroxyl groups, polycarbonate diols and diol having 2 to 18 carbon atoms for use in as reaction products for preparing the polyurethanes of Group E are discussed in detail above with respect to Group A.

In some non-limiting embodiments, the amount of branched polyol used to form the polyurethane of Group E can range from about 0.3 to about 0.98 equivalents, or about 0.5 to about 0.98 equivalents, or about 0.3 equivalents or about 0.9 to about 0.98 equivalents.

In some non-limiting embodiments, the amount of polycarbonate diol used to form the polyurethane of Group E can range from about 0.01 to about 0.1 equivalents, or about 0.05 to about 0.1 equivalents, or about 0.1 equivalents.

In another embodiment, the present invention provides polyurethanes of Group E comprising a reaction product of components consisting of: about 1 equivalent of 4,4'-methylene-bis-(cyclohexyl isocyanate); about 0.3 equivalents of trimethylolpropane; about 0.55 equivalents of 1,5-pentanediol and about 0.15 equivalents of KM10-1733 polycarbonate diol prepared from hexanediol, available from Stahl, wherein the reaction components are maintained at a temperature of at least about 100° C. for at least about 10 minutes.

In another embodiment, the present invention provides polyurethanes of Group E comprising a reaction product of components consisting of: about 1 equivalent of 4,4'-methylene-bis-(cyclohexyl isocyanate); about 0.3 equivalents of trimethylolpropane; about 0.5 equivalents of 1,5-pentanediol and about 0.2 equivalents of KM10-1733 polycarbonate diol prepared from hexanediol, available from Stahl, wherein the reaction components are maintained at a temperature of at least about 100° C. for at least about 10 minutes.

The polyurethanes of Group E can exhibit good ballistics resistance.

The polyurethanes of Group E are essentially free of polyether polyol and amine curing agent, the types and amounts of polyether polyol and amine curing agent being described above with respect to Groups A-D.

In some non-limiting embodiments of the polyurethanes of Group E, the reaction products can further comprise one or more of the following: polyurethane polyols, acrylamides, polyvinyl alcohols, polymers containing hydroxy functional (meth)acrylates, polymers containing allyl alcohols, polyesteramides and mixtures thereof, as described and in amounts as above with respect to Groups A-D.

Group F

In some non-limiting embodiments, the present invention provides polyurethanes comprising a reaction product of components comprising: (a) about 1 equivalent of at least one polyisocyanate; (b) about 0.05 to about 1 equivalents of at least one branched polyol having 4 to 18 carbon atoms and at least 3 hydroxyl groups; (c) about 0.01 to about 0.3 equivalents of at least one polycarbonate diol; and (d) about 0.1 to about 0.9 equivalents of at least one polyol different from the branched polyol (b) and having 2 to 18 carbon atoms, wherein the reaction product components are essentially free of polyether polyol and the reaction components are maintained at a temperature of at least about 100° C. for at least about 10 minutes.

In some non-limiting embodiments, an isocyanate functional prepolymer can be prepared from at least one polyisocyanate and a portion of the polyol (d) prior to reaction with the branched polyol and polycarbonate diol. Preparation of isocyanate functional prepolymers from polyisocyanate(s) and polyols are discussed herein.

In some non-limiting embodiments, the equivalents of branched polyol can range from about 0.1 to about 0.9 equivalents, or about 0.1 to about 0.5 equivalents, or about 0.1 to about 0.3 equivalents, or about 0.1 equivalents, or about 0.15 equivalents, or about 0.2 equivalents, or about 0.3 equivalents.

In some non-limiting embodiments, the equivalents of polycarbonate diol can range from about 0.5 to about 0.15 equivalents, or about 0.07 to about 0.15 equivalents, or about 0.07 equivalents, or about 0.1 equivalents, or about 0.15 equivalents.

In some non-limiting embodiments, the equivalents of polyol different from the branched polyol (b) and having 2 to 18 carbon atoms can range from about 0.5 to about 0.9 equivalents, or about 0.6 to about 0.8 equivalents, or about 0.63 equivalents, or about 0.7 equivalents, or about 0.8 equivalents. In some non-limiting embodiments, the polyol different from the branched polyol (b) and having 2 to 18 carbon atoms can be butanediol, pentanediol or cyclohexanedimethanol.

In some non-limiting embodiments, the present invention provides polyurethanes comprising a reaction product of components comprising: (a) an isocyanate functional urethane prepolymer comprising a reaction product of components comprising: (i) about 1 equivalent of at least one polyisocyanate; and (ii) about 0.3 to about 0.4 (or about 0.35) equivalents of butanediol or cyclohexane dimethanol; and (b) about 0.1 to about 0.3 equivalents of trimethylolpropane; (c) about 0.4 to about 0.5 equivalents of butanediol or cyclohexane dimethanol; and (d) about 0.01 to about 0.3 equivalents of at least one polycarbonate diol, wherein the reaction product components are essentially free of polyether polyol.

In some non-limiting embodiments, the present invention provides polyurethanes of Group F comprising a reaction product of components comprising: (a) about 1 equivalent of at least one polyisocyanate; (b) about 0.3 to about 1 equivalents of at least one branched polyol having 4 to 18 carbon atoms and at least 3 hydroxyl groups; (c) about 0.01 to about 0.3 equivalents of at least one polycarbonate diol; and (d) about 0.1 to about 0.9 equivalents of at least one diol having 2 to 18 carbon atoms, wherein the reaction product components are essentially free of polyether polyol and wherein the reaction components are maintained at a temperature of at least about 100° C. for at least about 10 minutes. The diol having 2 to 18 carbon atoms is chemically different from the polycarbonate diol, e.g., the diol has at least one different atom or a different arrangement of atoms compared to the polycarbonate diol.

Non-limiting examples of suitable polyisocyanates, branched polyols having 4 to 18 carbon atoms and at least 3 hydroxyl groups, polycarbonate diols, diols having 2 to 18 carbon atoms, and polyols different from the branched polyol (b) and having 2 to 18 carbon atoms for use in as reaction products for preparing the polyurethanes of Group F are discussed in detail above with respect to Groups A and B. In some non-limiting embodiments, the polyisocyanate can be dicyclohexylmethane diisocyanate.

In some non-limiting embodiments, the diol (d) is an aliphatic diol selected from the group consisting of ethylene glycol, diethylene glycol, triethylene glycol, tetraethylene glycol, 1,2-ethanediol, propanediol, butanediol, pentanediol, hexanediol, heptanediol, octanediol, nonanediol, decanediol, dodecane diol, sorbitol, mannitol, cyclopentanediol, 1,4-cyclohexanediol, cyclohexanedimethanol, 1,4-benzenedimethanol, xylene glycol, hydroxybenzyl alcohol, dihydroxytoluene bis(2-hydroxyethyl) terephthalate, 1,4-bis(hydroxyethyl)piperazine, N,N',bis(2-hydroxyethyl)oxamide and mixtures thereof.

In some non-limiting embodiments, the amount of branched polyol used to form the polyurethane of Group F can range from about 0.3 to about 0.98 equivalents, or about 0.5 to about 0.98 equivalents, or about 0.9 to about 0.98 equivalents.

In some non-limiting embodiments, the amount of polycarbonate diol used to form the polyurethane of Group F can range from about 0.01 to about 0.1 equivalents, or about 0.05 to about 0.1 equivalents, or about 0.1 equivalents.

In some non-limiting embodiments, the amount of diol used to form the polyurethane of Group F can range from about 0.01 to about 0.1 equivalents, or about 0.05 to about 0.1 equivalents, or about 0.1 equivalents.

The polyurethanes of Group F are essentially free of polyether polyol, the types and amounts of polyether polyol being described above with respect to Groups A-D.

In some non-limiting embodiments of the polyurethanes of Group F, the reaction products can further comprise one or more of the following: polyurethane polyols, acrylamides, polyvinyl alcohols, polymers containing hydroxy functional (meth)acrylates, polymers containing allyl alcohols, dihydroxy oxamides, dihydroxyamides, dihydroxy piperidines, dihydroxy phthalates, dihydroxyethyl hydroquinones, polyesteramides and mixtures thereof, as described and in amounts as above with respect to Groups A-D.

In some non-limiting embodiments of the polyurethanes of Group F, the reaction products can further comprise one or more amine curing agents as discussed above with respect to Group E. In other non-limiting embodiments, the reaction products for preparing the polyurethanes of Group F can be essentially free of or free of amine curing agent as discussed above with respect to Groups A-D. In other non-limiting embodiments, the reaction products for preparing the polyurethanes of Group F can be essentially free of or free of polyether polyol as discussed above with respect to Groups A-D, or in some embodiments comprise less than about 0.1 equivalents of polyether polyol.

The polyurethanes of Group F can be useful for any of the applications or uses described herein. In some non-limiting embodiments, the present invention provides polyurethanes suitable for use as transparencies or windows. Polyurethanes of Group F having good creep resistance (or low deflection) and high fracture toughness (K-factor) can be useful for airplane windows. Desirable properties for airplane windows are discussed above with respect to Group B.

Group G

In some non-limiting embodiments, the present invention provides polyurethanes of Group G comprising a reaction product of components comprising: about 1 equivalent of at least one polyisocyanate; about 0.3 to about 1 equivalents of at least one branched polyol having 4 to 18 carbon atoms and at least 3 hydroxyl groups; about 0.01 to about 0.3 equivalents of at least one polyol selected from the group consisting of polyester polyol, polycaprolactone polyol and mixtures thereof; and about 0.1 to about 0.7 equivalents of at least one aliphatic diol, wherein the reaction product components are essentially free of polyether polyol and amine curing agent and wherein the reaction components are maintained at a temperature of at least about 100° C. for at least about 10 minutes, wherein the reaction components are maintained at a temperature of at least about 100° C. for at least about 10 minutes.

Non-limiting examples of suitable polyisocyanates, branched polyols having 4 to 18 carbon atoms and at least 3 hydroxyl groups, polyester polyols, polycaprolactone polyols and aliphatic diols for use as reaction products for preparing the polyurethanes of Group G are discussed in detail above with respect to Group A. The aliphatic diol is chemically different from the polyester polyol and polycaprolactone polyol, e.g., the diol has at least one different atom or a different arrangement of atoms compared to the polyester polyol and polycaprolactone polyol.

In some non-limiting embodiments, the amount of branched polyol used to form the polyurethane of Group G can range from about 0.3 to about 0.9 equivalents, or about 0.3 to about 0.7 equivalents, or about 0.4 equivalents to about 0.6 equivalent, or about 0.7 equivalents.

In some non-limiting embodiments, the amount of polyester and/or polycaprolactone polyol used to form the polyurethane of Group G can range from about 0.01 to about 0.1 equivalents, or about 0.05 to about 0.1 equivalents, or about 0.1 equivalents.

In some non-limiting embodiments, the amount of aliphatic diol used to form the polyurethane of Group G can range from about 0.1 to about 0.6 equivalents, or about 0.1 to about 0.5 equivalents, or about 0.5 equivalents.

The polyurethanes of Group G are essentially free of or free of polyether polyol and/or amine curing agent, the types and amounts of polyether polyol and amine curing agent being described above with respect to Groups A-D.

In some non-limiting embodiments of the polyurethanes of Group G, the reaction products can further comprise one or more of the following: polyurethane polyols, acrylamides, polyvinyl alcohols, polymers containing hydroxy functional (meth)acrylates, polymers containing allyl alcohols, polyesteramides and mixtures thereof, as described and in amounts as above with respect to Groups A-D.

In other non-limiting embodiments, the present invention provides polyurethanes of Group G comprising a reaction product of components consisting of: about 1 equivalent of 4,4'-methylene-bis-(cyclohexyl isocyanate); about 0.3 equivalents of trimethylolpropane; about 0.5 equivalents of decanediol; and about 0.2 equivalents of polycaprolactone polyol, such as Dow TONE 0210 polycaprolactone polyol having a number average molecular weight of about 1000 grams/mole, wherein the reaction components are maintained at a temperature of at least about 100° C. for at least about 10 minutes.

In other non-limiting embodiments, the present invention provides polyurethanes of Group G prepared from a prepolymer which is the reaction product of components comprising: (1) about 0.4 equivalents of 4,4'-methylene-bis-(cyclohexyl isocyanate) (such as DESMODUR W); (2) about 0.3 equivalents of polycaprolactone diol (such as CAPA 2047 and CAPA 2077A polycaprolactone diols prepared from hexanediol); (3) about 0.05 equivalents of trimethylolpropane. The prepolymer is reacted with at least one aliphatic diol having 2 to 18 carbon atoms as described above, such as butanediol or pentanediol.

Group H

In other non-limiting embodiments, the present invention provides polyurethanes of Group H comprising a reaction product of components comprising: (a) a prepolymer which is the reaction product of components comprising: (1) at least one polyisocyanate; (2) at least one polycaprolactone polyol; and (3) at least one polyol selected from the group consisting of polyalkylene polyol, polyether polyol and mixtures thereof; and (b) at least one diol having 2 to 18 carbon atoms.

Non-limiting examples of suitable polyisocyanates, polycaprolactone polyols, polyalkylene polyols, polyether polyols and diols having 2 to 18 carbon atoms for use as reaction products for preparing the polyurethanes of Group H are discussed in detail above with respect to Group A. Non-limiting examples of suitable polyalkylene polyols include polyethylene glycols, polypropylene glycols and mixtures thereof. The polyalkylene glycol can have a number average molecular weight ranging from about 200 to about 1000 grams/mole, or from about 200 grams/mole to about 4,000 grams/mole.

The diol is chemically different from the polyalkylene polyol and polyether polyol, e.g., the diol has at least one different atom or a different arrangement of atoms compared to the polyalkylene polyol and polyether polyol.

In some non-limiting embodiments, the amount of branched polycaprolactone polyol used to form the polyurethane of Group H can range from about 0.05 to about 0.8 equivalents, or about 0.1 to about 0.6 equivalents, or about 0.1 equivalents to about 0.4 equivalents, or about 0.3 equivalents.

In some non-limiting embodiments, the amount of polyalkylene polyol and/or polyether polyol used to form the polyurethane of Group H can range from about 0.1 to about 0.9 equivalents, or about 0.2 to about 0.6 equivalents, or about 0.4 equivalents.

In some non-limiting embodiments, the amount of diol used to form the polyurethane of Group H can range from about 0.1 to about 0.9 equivalents, or about 0.3 to about 0.8 equivalents, or about 0.7 equivalents.

The polyurethanes of Group H are prepared by reacting reaction product components comprising: (1) at least one polyisocyanate; (2) at least one polycaprolactone polyol; and (3) at least one polyol selected from the group consisting of polyalkylene polyol, polyether polyol and mixtures thereof to form a prepolymer. The prepolymer is then reacted with at least one diol having 2 to 18 carbon atoms and any other optional reaction components as described below.

In some non-limiting embodiments of the polyurethanes of Group H, the reaction products can further comprise one or more of the following: branched polyols having at least three hydroxyl groups, polyurethane polyols, acrylamides, polyvinyl alcohols, polymers containing hydroxy functional (meth)acrylates, polymers containing allyl alcohols, polyesteramides and mixtures thereof, as described and in amounts as above with respect to Groups A-D.

In some non-limiting embodiments of the polyurethanes of Group H, the reaction products can further comprise one or more amine curing agents as discussed above with respect to Group E. In other non-limiting embodiments, the reaction products for preparing the polyurethanes of Group H can be essentially free of or free of amine curing agent as discussed above with respect to Groups A-D.

In other non-limiting embodiments, the present invention provides polyurethanes of Group H comprising a reaction product of components comprising: (a) a prepolymer which is the reaction product of components comprising: (1) aliphatic or cycloaliphatic diisocyanate; (2) polycaprolactone diol; (3) polyethylene glycol; and (4) polyoxyethylene and polyoxypropylene copolymer and (b) at least one diol having 2 to 18 carbon atoms.

In other non-limiting embodiments, the present invention provides polyurethanes of Group H prepared from a prepolymer which is the reaction product of components comprising: (1) about 0.4 equivalents of 4,4'-methylene-bis-(cyclohexyl isocyanate) (such as DESMODUR W); (2) about 0.003 equivalents of polycaprolactone diol (such as CAPA 2077A polycaprolactone diol prepared from hexanediol); (3) about 0.025 equivalents of polyethylene glycol (such as PLURACOL E400NF); (4) about 0.029 equivalents of polyoxyethylene and polyoxypropylene copolymer (such as PLURONIC L62D ethylene oxide/propylene oxide block copolymer); (5) about 0.05 equivalents of trimethylolpropane; and additives such as catalyst (for example dibutyltin dilaurate), antioxidant (such as IRGANOX 1010 and IRGANOX MD 1024), and ultraviolet light stabilizer(s) such as CYASORB UV 5411 and TINUVIN 328 (each described below).

The isocyanate-terminated prepolymer is reacted with at least one diol having 2 to 18 carbon atoms, such as 1,4-butanediol and/or 1,4-cyclohexane dimethanol in an equivalent ratio of about 0.75:0.25 1,4-butanediol to 1,4-cyclohexane dimethanol. The equivalent ratio of prepolymer to diol is about 1:1.

Groups A-H

Referring now to the inventions of Groups A-H, the polyurethanes of the present invention can be polymerized using a variety of techniques. In some non-limiting embodiments described in further detail below, polyisocyanate and polyol can be reacted together in a one-pot process to form the polyurethane. Sulfur-containing polyurethanes of the present invention can be produced by combining isocyanate and/or isothiocyanate and polyol and/or polythiol.

In other non-limiting embodiments, the polyurethane can be prepared by reacting polyisocyanate(s) and polyol(s) to form a polyurethane prepolymer and then introducing diol(s), and optionally catalyst and other optional reaction components.

In other non-limiting embodiments such as Group B, the polyurethane can be prepared by reacting polyisocyanate(s) and diol(s) to form an isocyanate functional urethane prepolymer and then introducing diol(s), polyols and optionally catalyst and other optional reaction components. In some non-limiting embodiments, the isocyanate functional urethane prepolymer, polyol and second portion of diol reaction components are maintained at a temperature of at least about 100° C. for at least about 10 minutes, or at least about 110° C., or at least about 120° C., for at least about 10 minutes or at least about 20 minutes.

In some non-limiting embodiments, the prepolymer and polyurethane can be prepared using a Max Urethane Processing System having a dynamic pin mixer, such as a Max Urethane Processing System Model No. 601-000-282 or Model No. 601-000-333 available from Max Machinery, Inc. of Healdsburg, Calif. The mixing head or chamber volume can be varied as desired, for example 62 cc, 70 cc, 140 cc, 205 cc or 250 cc. In some embodiments, increased residence time of the reactants in the mix head can provide improved physical properties, such as Young's Modulus and Gardner Impact strength. For some embodiments, a residence time of about 4 seconds to about 30 minutes, or about 4 seconds to about 15 minutes, or about 4 seconds to about 1 minute, or about 4 to about 30 seconds, or about 4 to about 15 seconds, or about 4 to about 8 seconds can be desirable.

Whether prepared in a one-shot process or in a multi-stage process using a prepolymer, in some non-limiting embodiments, the aforementioned ingredients each can be degassed prior to reaction. In some non-limiting embodiments, the prepolymer can be degassed, the difunctional material can be degassed, and then these two materials can be combined. One or more of the reactants can be preheated to a temperature of at least about 100° C., at least about 110° C., or at least about 120° C., prior to reaction.

In the "one shot", "one pot" or bulk polymerization method, all of the ingredients, that is, isocyanate, polyol and diol are mixed simultaneously. This method is generally satisfactory when all active hydrogens react at about the same rate such as when all contain hydroxyl groups as the only reactive sites. The urethane reaction can be conducted under anhydrous conditions with dry reactants such as in a nitrogen atmosphere of atmospheric pressure and at a temperature ranging from about 75° C. to about 140° C. If polycarbonate polyols or any hydroxy functional compounds are used, they are typically dried before reaction, usually to a moisture content ranging from about 0.01 to about 0.05 percent.

To obtain the randomness desired and a generally clear polymer, the diol, for example, anhydrous 1,4-butanediol (containing a maximum of 0.04 percent water) can be added to the polyol under a nitrogen atmosphere to exclude moisture and the temperature maintained sufficiently high so that there is no phase separation and a homogeneous mixture is obtained. The polyisocyanate, for example, 4,4'-methylene-bis-(cyclohexyl isocyanate), can be added rapidly and the mixture can be maintained at a temperature of at least about 75° C., or at least about 85° C., or at least about 90° C., or at least about 95° C. for at least about 10 minutes or at least about 20 minutes. In some embodiments, the mixture is maintained at a temperature of at least about 100° C., or at least about 105° C., or at least about 110° C. for at least about 10 minutes or at least about 20 minutes, so that there is no phase separation and the mixture remains homogeneous. The mixture can be maintained at a pressure of ranging from about 2 to about 6 mm Hg (about 266.6 to about 800 Pascal (Pa)), or about 266.6 Pa for a time period of about 10 minutes to about 24 hours, or about 10 minutes to about 4 hours.

In some non-limiting embodiments, the mixture can be vigorously agitated at a temperature of at least about 75° C., or at least about 85° C., or at least about 90° C., or at least about 95° C., or at least about 100° C., or at least about 105° C., or at least about 110° C., and degassed for a period of at least about 3 minutes during which time the pressure is reduced from atmospheric to about 3 millimeters of mercury. The reduction in pressure facilitates the removal of the dissolved gases such as nitrogen and carbon dioxide and then the ingredients can be reacted at a temperature ranging from about 100° C. to about 140° C., or about 110° C. to about 140° C., in the presence of a catalyst and the reaction continued until there are substantially no isocyanate groups present, in some embodiments for at least about 6 hours. In the absence of a catalyst, the reaction can be conducted for at least about 24 hours, such as under a nitrogen atmosphere.

In some non-limiting embodiments, wherein a window can be formed, the polymerizable mixture which can be optionally degassed can be introduced into a mold and the mold can be heated (i.e., thermal cure cycle) using a variety of conventional techniques known in the art. The thermal cure cycle can vary depending on the reactivity and molar ratio of the reactants. In a non-limiting embodiment, the thermal cure cycle can include heating the mixture of prepolymer and diol and optionally diol and dithiol; or heating the mixture of polyisocyanate, polyol and/or polythiol and diol or diol/dithiol, from room temperature to a temperature of about 200° C. over a period of from about 0.5 hour to about 72 hours; or from about 80° C. to about 150° C. for a period of from about 5 hours to about 48 hours.

In other non-limiting embodiments described in further detail below, isocyanate and polyol can be reacted together to form a polyurethane prepolymer and the prepolymer can be reacted with more of the same or a different polyol(s) and/or diol(s) to form a polyurethane or sulfur-containing polyurethane. When the prepolymer method is employed, the prepolymer and diol(s) can be heated so as to reduce the prepolymer viscosity to about 200 cp or at most a few thousand centipoise so as to aid in mixing. As in the bulk polymerization, reaction should be conducted under anhydrous conditions with dry reactants. The reactants can be preheated to a temperature of at least about 100° C., at least about 110° C., or at least about 120° C. prior to reaction. The reactants can be maintained at a temperature of at least about 100° C., at least about 110° C. or at least about 120° C. for at least about 10 minutes, or at least about 2 hours, to facilitate reaction. The mixture can be maintained at a pressure of ranging from about 2 to about 6 mm Hg (about 266.6 to about 800 Pascal (Pa)), or about 266.6 Pa for a time period of about 10 minutes to about 24 hours, or about 10 minutes to about 4 hours.

The polyurethane prepolymer can have a number average molecular weight (Mn) of less than about 50,000 grams/mole, or less than about 20,000 grams/mole, or less than about 10,000 grams/mole, or less than about 5,000 grams/mole, or at least about 1,000 grams/mole or at least about 2,000 grams/mole, inclusive of any range in between.

When polyurethane-forming components, such as polyols and isocyanates, are combined to produce polyurethanes, the relative amounts of the ingredients are typically expressed as a ratio of the available number of reactive isocyanate groups to the available number of reactive hydroxyl groups, i.e., an equivalent ratio of NCO:OH. For example, a ratio of NCO:OH of 1.0:1.0 is obtained when the weight of one NCO equivalent of the supplied form of the isocyanate component is reacted with the weight of one OH equivalent of the supplied form of the organic polyol component. The polyurethanes of the present invention can have an equivalent ratio of NCO:OH ranging from about 0.9:1.0 to about 1.1:1.0, or about 1.0:1.0.

In some non-limiting embodiments, when the isocyanate and polyol are reacted to form a prepolymer, the isocyanate is present in excess, for example the amount of isocyanate and the amount of polyol in the isocyanate prepolymer can be selected such that the equivalent ratio of (NCO):(OH) can range from about 1.0:0.05 to about 1.0:0.7.

In some non-limiting embodiments, the amount of isocyanate and the amount of polyol used to prepare isocyanate-terminated polyurethane prepolymer or isocyanate-terminated sulfur-containing polyurethane prepolymer can be selected such that the equivalent ratio of (NCO):(SH+OH) can be at least about 1.0:1.0, or at least about 2.0:1.0, or at least about 2.5:1.0, or less than about 4.5:1.0, or less than about 5.5:1.0; or the amount of isothiocyanate and the amount of polyol used to prepare isothiocyanate-terminated sulfur-containing polyurethane prepolymer can be selected such that the equivalent ratio of (NCS):(SH+OH) can be at least about 1.0:1.0, or at least about 2.0:1.0, or at least about 2.5:1.0, or less than about 4.5:1.0, or less than about 5.5:1.0; or the amount of a combination of isothiocyanate and isocyanate and the amount of polyol used to prepare isothiocyanate/isocyanate terminated sulfur-containing polyurethane prepolymer can be selected such that the equivalent ratio of (NCS+NCO):(SH+OH) can be at least about 1.0:1.0, or at least about 2.0:1.0, or at least about 2.5:1.0, or less than about 4.5:1.0, or less than about 5.5:1.0

The ratio and proportions of the diol and the polyol can affect the viscosity of the prepolymer. The viscosity of such prepolymers can be important, for example when they are intended for use with coating compositions, such as those for flow coating processes. The solids content of such prepolymers, however, also can be important, in that higher solids content can achieve desired properties from the coating, such as weatherability, scratch resistance, etc. In conventional coatings, coating compositions with higher solids content typically require greater amounts of solvent material to dilute the coating in order to reduce the viscosity for appropriate flow coating processes. The use of such solvents, however, can adversely affect the substrate surface, particularly when the substrate surface is a polymeric material. In the present invention, the viscosity of the prepolymer can be appropriately tailored to provide a material with lower viscosity levels at higher solids content, thereby providing an effective coating without the need for excessive amounts of solvents which can deleteriously affect the substrate surface.

In some non-limiting embodiments in which optional amine curing agent is used, the amount of isocyanate-terminated polyurethane prepolymer or sulfur-containing isocyanate-terminated polyurethane prepolymer and the amount of amine curing agent used to prepare sulfur-containing polyurethane can be selected such that the equivalent ratio of (NH+SH+OH):(NCO) can range from about 0.80:1.0 to about 1.1:1.0, or from about 0.85:1.0 to about 1.0:1.0, or from about 0.90:1.0 to about 1.0:1.0, or from about 0.90:1.0 to about 0.95:1.0, or from about 0.95:1.0 to about 1.0:1.0.

In some non-limiting embodiments, the amount of isothiocyanate or isothiocyanate/isocyanate terminated sulfur-containing polyurethane prepolymer and the amount of amine curing agent used to prepare sulfur-containing polyureaurethane can be selected such that the equivalent ratio of (NH+SH+OH):(NCO+NCS) can range from about 0.80:1.0 to about 1.1:1.0, or from about 0.85:1.0 to about 1.0:1.0, or from about 0.90:1.0 to about 1.0:1.0, or from about 0.90:1.0 to about 0.95:1.0, or from about 0.95:1.0 to about 1.0:1.0.

It is believed that the unusual energy absorption properties and transparency of the polyurethanes of the present invention may not only be dependent upon the urethane ingredients and proportions, but also may be dependent on the method of preparation. More particularly, it is believed that the presence of polyurethane regular block segments may adversely affect the polyurethane transparency and energy absorption properties and, consequently, it is believed that random segments within the polymer can provide optimal results. Consequently, whether the urethane contains random or regular block segments depends upon the particular reagents and their relative reactivity as well as the conditions of reaction. Generally speaking, the polyisocyanate will be more reactive with a low molecular weight diol or polyol, for example, 1,4-butanediol, than with a polymeric polyol and, hence, in some non-limiting embodiments, it is desirable to inhibit the preferential reaction between the low molecular weight diol or polyol and the polyisocyanate such as by rapidly adding the polyisocyanate to an intimate mixture of the low molecular weight diol or polyol and polymeric polyol with vigorous agitation, such as at a temperature of at least about 75° C. when no catalyst is employed, and then maintained at temperature of reaction of at least about 100° C. or about 110° C. after the exotherm has subsided. When a catalyst is employed, the initial mixing temperature can be lower, such as about 60° C., so that the exotherm does not carry the temperature of the mixture substantially above the reaction temperature desired. Inasmuch as the polyurethanes are thermally stable, however, reaction temperatures can reach as high as about 200° C. and as low as about 60° C., and in some non-limiting embodiments, ranging from about 75° C. to about 130° C. when a catalyst is employed, or ranging from about 80° C. to about 100° C. When no catalyst is employed, in some non-limiting embodiments the reaction temperature can range from about 130° C. to about 150° C.

It is also desirable to rapidly attain reaction temperatures after a homogeneous mixture is obtained when a catalyst is not employed, so that the polymer does not become hazy due to phase separation. For example, some mixtures can become hazy in less than one-half hour at less than 80° C. without catalyst. Thus, it can be desirable either to use a catalyst or introduce the reactants to rapidly reach a reaction temperature above about 100° C., or about 110° C. or about 130° C., for example by the use of a high-speed shear mixing head, so that the polymer does not become hazy. Suitable catalysts can be selected from those known in the art. In some non-limiting embodiments, degassing can take place prior to or following addition of catalyst.

In some non-limiting embodiments, a urethane-forming catalyst can be used in the present invention to enhance the reaction of the polyurethane-forming materials. Suitable urethane-forming catalysts include those catalysts that are useful for the formation of urethane by reaction of the NCO and OH-containing materials, and which have little tendency to accelerate side reactions leading to allophonate and isocyanate formation. Non-limiting examples of suitable catalysts are selected from the group of Lewis bases, Lewis acids and insertion catalysts as described in *Ullmann's Encyclopedia of Industrial Chemistry*, 5$^{th}$ Edition, 1992, Volume A21, pp. 673 to 674.

In some non-limiting embodiments, the catalyst can be a stannous salt of an organic acid, such as stannous octoate or butyl stannoic acid. Other non-limiting examples of suitable catalysts include tertiary amine catalysts, tertiary ammonium salts, tin catalysts, phosphines or mixtures thereof. In some non-limiting embodiments, the catalysts can be dimethyl cyclohexylamine, dibutyl tin dilaurate, dibutyltin diacetate, dibutyltin mercaptide, dibutyltin diacetate, dibutyl tin dimaleate, dimethyl tin diacetate, dimethyl tin dilaurate, 1,4-diazabicyclo[2.2.2]octane, bismuth carboxylates, zirconium carboxylates, zinc octoate, ferric acetylacetonate and mixtures thereof. The amount of catalyst used can vary depending on the amount of components, for example about 10 ppm to about 600 ppm.

In alternate non-limiting embodiments, various additives can be included in compositions comprising the polyurethane(s) of the present invention. Such additives include light stabilizers, heat stabilizers, antioxidants, colorants, fire retardants, ultraviolet light absorbers, light stabilizers such as hindered amine light stabilizers, mold release agents, static (non-photochromic) dyes, fluorescent agents, pigments, surfactants, flexibilizing additives, such as but not limited to alkoxylated phenol benzoates and poly(alkylene glycol)dibenzoates, and mixtures thereof. Non-limiting examples of anti-yellowing additives include 3-methyl-2-butenol, organo pyrocarbonates and triphenyl phosphite (CAS Registry No. 101-02-0). Examples of useful antioxidants include IRGANOX 1010, IRGANOX 1076, and IRGANOX MD 1024, each commercially available from Ciba Specialty Chemicals of Tarrytown, N.Y. Examples of useful UV absorbers include CYASORB UV 5411, TINUVIN 130 and TINUVIN 328 commercially available Ciba Specialty Chemicals, and SANDOVAR 3206 commercially available from Clariant Corp. of Charlotte, N.C. Examples of useful hindered amine light stabilizers include SANDOVAR 3056 commercially available from Clariant Corp. of Charlotte, N.C. Examples of useful surfactants include BYK 306 commercially available from BYK Chemie of Wesel, Germany.

Such additives can be present in an amount such that the additive constitutes less than about 30 percent by weight, or less than about 15 percent by weight, or less than about 5 percent by weight, or less than about 3 percent by weight, based on the total weight of the polymer. In some non-limiting embodiments, the aforementioned optional additives can be pre-mixed with the polyisocyanate(s) or isocyanate functional prepolymer. In other non-limiting embodiments, the optional additives can be pre-mixed with the polyol(s) or urethane prepolymer.

In some non-limiting embodiments, the present invention provides methods of preparing polyurethanes of Group A comprising the step of reacting in a one-potprocess components comprising: about 1 equivalent of at least one polyisocyanate; about 0.1 to about 0.9 equivalents of at least one branched polyol having 4 to 18 carbon atoms and at least 3 hydroxyl groups; and about 0.1 to about 0.9 equivalents of at least one diol having 2 to 18 carbon atoms, wherein the components are essentially free of polyester polyol and polyether polyol.

In other non-limiting embodiments, the present invention provides methods of preparing polyurethanes of Group A comprising the steps of: reacting at least one polyisocyanate and at least one branched polyol having 4 to 18 carbon atoms and at least 3 hydroxyl groups to form a polyurethane prepolymer; and reacting the polyurethane prepolymer with at least one diol having 2 to 18 carbon atoms to form the polyurethane.

In other non-limiting embodiments, the present invention provides methods of preparing polyurethanes of Group B comprising the steps of: (a) reacting (i) about 1 equivalent of at least one polyisocyanate; and (ii) about 0.1 to about 0.5 equivalents of at least one diol having 2 to 18 carbon atoms to form an isocyanate functional urethane prepolymer; (b) reacting the isocyanate functional urethane prepolymer with about 0.05 to about 0.9 equivalents of at least one branched polyol having 4 to 18 carbon atoms and at least 3 hydroxyl groups and up to about 0.45 equivalents of at least one diol having 2 to 18 carbon atoms, wherein the reaction product components are essentially free of polyester polyol and polyether polyol.

In some non-limiting embodiments, the present invention provides methods of preparing polyurethanes of Group B comprising reacting components comprising: (a) an isocyanate functional urethane prepolymer comprising a reaction product of components comprising: (i) about 1 equivalent of at least one polyisocyanate; and (ii) about 0.1 to about 0.5 equivalents of at least one polyol having 2 to 18 carbon atoms; and (b) about 0.05 to about 1.0 equivalents of at least one branched polyol having 4 to 18 carbon atoms and at least 3 hydroxyl groups; and (c) up to about 0.9 equivalents of at least one polyol different from branched polyol (b) and having 2 to 18 carbon atoms, wherein the reaction product components are essentially free of polyester polyol and polyether polyol.

In some non-limiting embodiments, the present invention provides methods of preparing polyurethanes of Group C comprising the step of reacting in a one-pot process components comprising: at least one polyisocyanate trimer or branched polyisocyanate, the polyisocyanate having at least three isocyanate functional groups; and at least one aliphatic polyol having 4 to 18 carbon atoms and at least two hydroxyl groups, wherein the reaction product components are essentially free of polyester polyol and polyether polyol.

In some non-limiting embodiments, the present invention provides methods of preparing polyurethanes of Group D comprising the step of reacting in a one-pot process components comprising: at least one polyisocyanate; at least one branched polyol having 4 to 18 carbon atoms and at least 3 hydroxyl groups; and at least one polyol having one or more bromine atoms, one or more phosphorus atoms or combinations thereof.

In other non-limiting embodiments, the present invention provides methods of preparing polyurethanes of Group D comprising the steps of: reacting at least one polyisocyanate and at least one branched polyol having 4 to 18 carbon atoms and at least 3 hydroxyl groups to form a polyurethane prepolymer; and reacting the polyurethane prepolymer with at least one polyol having one or more bromine atoms, one or more phosphorus atoms or combinations thereof to form the polyurethane. In some non-limiting embodiments, about 0.1 to about 0.15 equivalents of the branched polyol are reacted with about 1 equivalent of polyisocyanate in step (a) and step (b) further comprises reacting the polyurethane prepolymer with the polyol and about 0.15 to about 0.9 equivalents of the branched polyol to form the polyurethane.

In some non-limiting embodiments, the present invention provides methods of preparing polyurethanes of Group E comprising the step of reacting in a one-pot process components comprising: about 1 equivalent of at least one polyisocyanate; about 0.3 to about 1 equivalents of at least one branched polyol having 4 to 18 carbon atoms and at least 3 hydroxyl groups; and about 0.01 to about 0.3 equivalents of at least one polycarbonate diol, wherein the reaction product components are essentially free of polyether polyol and amine curing agent.

In other non-limiting embodiments, the present invention provides methods of preparing polyurethanes of Group E comprising the steps of: reacting at least one polyisocyanate and at least one branched polyol having 4 to 18 carbon atoms and at least 3 hydroxyl groups to form a polyurethane prepolymer; and reacting the polyurethane prepolymer with at least one polycarbonate diol to form the polyurethane.

In some non-limiting embodiments, the present invention provides methods of preparing polyurethanes of Group F comprising the step of reacting in a one-potprocess components comprising: (a) about 1 equivalent of at least one polyisocyanate; (b) about 0.3 to about 1 equivalents of at least one branched polyol having 4 to 18 carbon atoms and at least 3 hydroxyl groups; (c) about 0.01 to about 0.3 equivalents of at least one polycarbonate diol; and (d) about 0.1 to about 0.9 equivalents of at least one diol having 2 to 18 carbon atoms, wherein the reaction product components are essentially free of polyether polyol.

In other non-limiting embodiments, the present invention provides methods of preparing polyurethanes of Group F comprising the steps of: (a) reacting at least one polyisocyanate and at least one branched polyol having 4 to 18 carbon atoms and at least 3 hydroxyl groups to form a polyurethane prepolymer; and (b) reacting the polyurethane prepolymer with at least one polycarbonate diol and at least one diol having 2 to 18 carbon atoms to form the polyurethane, wherein the reaction product components are essentially free of polyether polyol.

In other non-limiting embodiments, the present invention provides methods of preparing polyurethanes of Group F comprising A polyurethane comprising a reaction product of components comprising: (a) about 1 equivalent of at least one polyisocyanate; (b) about 0.05 to about 1 equivalents of at least one branched polyol having 4 to 18 carbon atoms and at least 3 hydroxyl groups; (c) about 0.01 to about 0.3 equivalents of at least one polycarbonate diol; and (d) about 0.1 to about 0.9 equivalents of at least one polyol different from the branched polyol and having 2 to 18 carbon atoms, wherein the reaction product components are essentially free of polyether polyol and the reaction components are maintained at a temperature of at least about 100° C. for at least about 10 minutes.

In other non-limiting embodiments, the present invention provides methods of preparing a polyurethane from reaction components comprising: (a) reacting about 1 equivalent of at least one polyisocyanate and about 0.3 to about 0.4 equivalents of butanediol or cyclohexane dimethanol to form an isocyanate functional urethane prepolymer; and (b) reacting the isocyanate functional urethane prepolymer, about 0.1 to about 0.3 equivalents of trimethylolpropane, about 0.4 to about 0.5 equivalents of butanediol or cyclohexane dimethanol; and about 0.01 to about 0.3 equivalents of at least one polycarbonate diol, wherein the reaction product components are essentially free of polyether polyol.

In some non-limiting embodiments, the present invention provides methods of preparing polyurethanes of Group G comprising the step of reacting in a one-pot process components comprising: about 1 equivalent of at least one polyisocyanate; about 0.3 to about 1 equivalents of at least one branched polyol having 4 to 18 carbon atoms and at least 3 hydroxyl groups; and about 0.01 to about 0.3 equivalents of at least one polyol selected from the group consisting of polyester polyol, polycaprolactone polyol and mixtures thereof; and about 0.1 to about 0.7 equivalents of at least one aliphatic diol, wherein the reaction product components are essentially free of polyether polyol and amine curing agent.

In other non-limiting embodiments, the present invention provides methods of preparing polyurethanes of Group G comprising the steps of: reacting at least one polyisocyanate and at least one branched polyol having 4 to 18 carbon atoms and at least 3 hydroxyl groups to form a polyurethane prepolymer; and reacting the polyurethane prepolymer with at least one polyol selected from the group consisting of polyester polyol, polycaprolactone polyol and mixtures thereof and about 0.1 to about 0.7 equivalents of at least one aliphatic diol to form the polyurethane.

In some non-limiting embodiments, the present invention provides methods of preparing polyurethanes of Group H comprising the steps of: reacting components comprising: at least one polyisocyanate; at least one polycaprolactone polyol; and at least one polyol selected from the group consisting of polyalkylene polyol, polyether polyol and mixtures thereof, to form a polyurethane prepolymer; and reacting the prepolymer with at least one diol having 2 to 18 carbon atoms to form the polyurethane.

Poly(ureaurethanes)

Poly(ureaurethane)s can be prepared from any of the above polyurethanes of Groups A-H by including one or more amine curing agents in the reaction components. The amine functionality of the amine curing agent can react with isocyanate groups to form urea linkages or units within the polyurethane matrix. Suitable amounts of amine curing agents and reaction conditions are discussed in detail above.

Poly(ureaurethane) Synthesis A

Alternatively or additionally, urea linkages or units can be formed within the polyurethane matrix to the extent desired by reacting isocyanate functional groups of the polyisocyanate with water. As shown in Step 1 of the reaction scheme of Poly(ureaurethane) Synthesis A below, isocyanate functional groups are converted to carbamate functional groups by the reaction with water. In some non-limiting embodiments, the equivalent ratio of NCO:water ranges from about 10:1 to about 2:1, or about 5:1 to about 2:1, or about 3:1 to about 2:1.

The isocyanate shown in Step 1 is a diisocyanate in which R is any linking group, such as aliphatic, cycloaliphatic, aromatic, heterocycle, etc. as described in detail above. However, one skilled in the art would understand that the isocyanate can have one or more, two or more, three or more or a higher number of isocyanate functional groups, as desired. Examples of suitable isocyanates can be any of the isocyanates discussed above. In some non-limiting embodiments, the polyisocyanate is one or more aliphatic polyisocyanates. In some non-limiting embodiments, the polyisocyanate is 4,4'-methylene-bis-(cyclohexyl isocyanate) (such as DESMODUR W).

Removal of carbon dioxide facilitates conversion of the carbamate groups into amine groups. Excess isocyanate is desirable to ensure essentially complete consumption of the water. Also, it is desirable to remove essentially all of the carbon dioxide generated to facilitate conversion to amine groups. The water can be reacted with the polyisocyanate or polyurethane polyisocyanate prepolymer at a temperature of up to about 60° C. under vacuum. The vacuum pressure should be low enough so as not to remove water from the system, and can range for example from about 10 to about 20 mm Hg (about 1333 to about 2666 Pa) for a time period of about 10 to about 30 minutes. After the reaction is essentially complete, i.e., no further carbon dioxide is formed, the temperature can be increased to at least about 100° C. or about 110° C. and heated for about 2 to about 24 hours, or about 2 hours, using 10 ppm or more of catalyst such as dibutyltin diacetate. After substantially all of the water reacts with the excess isocyanate, the amine that is formed reacts essentially instantaneously with the isocyanate.

Poly(ureaurethane) Synthesis A

Step 1

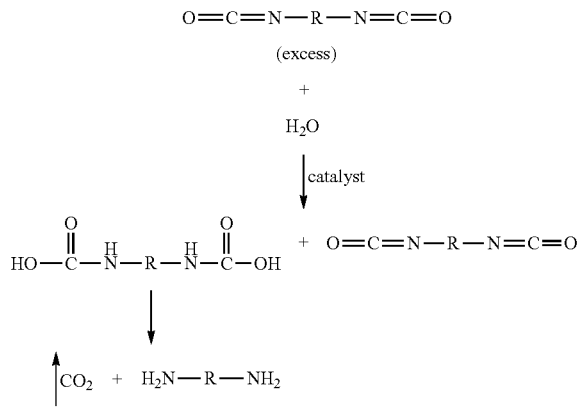

Step 2

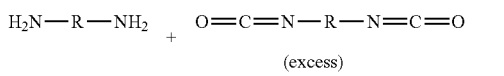

As is well known to those skilled in the art, certain amine curing agents (such as aliphatic amine curing agents having 2 to 18 carbon atoms, e.g., ethylene diamine, diethylenediamine, diaminobutane, PACM, diamine hexane, 1,10-decanediamine) are highly reactive and impractical to use under normal production conditions because the amine functionality begins to react with oxygen present in the ambient air very quickly to discolor the polymerizate. Aliphatic amine curing agents are typically very hygroscopic and difficult to keep dry. Generally, aliphatic amines are so reactive as to be impractical for making 100% solids, transparent, low color and low haze plastics.

By forming the amine in situ as discussed above and shown in Step 2, amines can be generated in situ that normally are not practical to use under normal production conditions without formation of undesirable side products, color or haze. Also, the rate of reaction can be more easily regulated. This reaction can be used for any type of polyisocyanate described above, but is especially useful for converting aliphatic polyisocyanates to amines as described above.

As shown in Step 2 above, the amine formed in situ reacts with another isocyanate to form a urea group. Use of excess polyisocyanate permits formation of an isocyanate functional urea prepolymer. In some non-limiting embodiments, the equivalent ratio of NCO:amine functional groups ranges from about 1:0.05 to about 1:0.7, or about 1:0.05 to about 1:0.5, or about 1:0.05 to about 1:0.3. Suitable reaction temperatures can range from about 25° C. to about 60° C. with a catalyst such as a tin catalyst. After the water is reacted and the carbon dioxide removed, the reaction temperature can be increased up to about 90° C. for about 2 to about 4 hours. Alternatively, the reaction can proceed at about 25° C. for up to about 8 hours until complete. Optionally, one or more polyols or diols as described above can be included in this reaction to form isocyanate functional urethane prepolymers, as shown in Poly(ureaurethane) Synthesis B, described in further detail below.

As shown in Step 3 of the reaction scheme of Poly (ureaurethane) Synthesis A above, the polyol and/or diol can be reacted with the isocyanate functional urea prepolymer(s) to form poly(ureaurethane)s of the present invention. The polyol shown in Step 3 can be a diol (m=2), triol (m=3) or higher hydroxyl functional material (m=4 or more) as described above in which R is any linking group, such as aliphatic, cycloaliphatic, aromatic, heterocycle, etc. as described in detail above with respect to the polyols. Examples of suitable polyols can be any of the polyols discussed above. In some non-limiting embodiments, the polyol can be trimethylolpropane and butanediol and/or pentanediol. Suitable amounts of polyols for reacting with the isocyanate functional urea prepolymer as polyisocyanate are discussed in detail above. In the above poly(ureaurethane), x can range from 1 to about 100, or about 1 to about 20.

In some non-limiting embodiments, to form the poly (ureaurethane) the isocyanate functional prepolymer is heated to a temperature of about 90° C., the polyol(s) are added and heated to about 90° C. The temperature can be increased to about 100° C. or about 110° C. to facilitate compatibilization, then about 2 to about 4 mm of vacuum can be applied for about 3 to about 5 minutes.

To prepare an article, for example, the mixture can be poured or pressure cast into a release-coated glass casting mold to form an article of desired thickness and dimensions. In some embodiments, the casting mold is preheated to a temperature of about 200° F. (93.3° C.). The filled mold or cell can be placed in an oven at a temperature of about 250° F. (121° C.) to about 320° F. (160° C.) and cured for about 24 to about 48 hours, for example. The cell can be removed from the oven and cooled to a temperature of about 25° C. and the cured polymer released from the casting mold.

Group I

In some non-limiting embodiments, the present invention provides poly(ureaurethane)s of Group I comprising a reaction product of components comprising: (a) at least one isocyanate functional urea prepolymer comprising a reaction product of: (1) at least one polyisocyanate; and (2) water; and (b) at least one branched polyol having 4 to 18 carbon atoms and at least 3 hydroxyl groups, wherein the reaction product components are essentially free or free of amine curing agents. Suitable polyisocyanates and branched polyol(s) having 4 to 18 carbon atoms are described in detail above. If present, the amine curing agent(s) can be present in an amount as defined above as essentially free. Any of the other optional polyols, catalysts or other additives described above can be included as reaction components in amounts as described above with respect to the foregoing Groups A-H.

In some non-limiting embodiments, the present invention provides methods of preparing poly(ureaurethane)s of Group I comprising the steps of: (a) reacting at least one polyisocyanate and water to form an isocyanate functional urea prepolymer; and (b) reacting reaction product components comprising the isocyanate functional urea prepolymer with at least one branched polyol having 4 to 18 carbon atoms and at least 3 hydroxyl groups, wherein the reaction product components are essentially free of amine curing agent. The reaction synthesis can be as described above with respect to Poly(ureaurethane) Synthesis A. Optionally, a portion of one or more polyols or diols as described above can be included in this reaction to form isocyanate functional urethane prepolymer which is then further reacted with another portion of polyol and/or diol, as shown in Poly(ureaurethane) Synthesis B, described in further detail below.

Group J

In some non-limiting embodiments, the present invention provides poly(ureaurethane)s of Group J comprising a reaction product of components comprising: (a) at least one isocyanate functional urea prepolymer comprising a reaction product of: (1) at least one polyisocyanate selected from the group consisting of polyisocyanate trimers and branched polyisocyanates, the polyisocyanate having at least three isocyanate functional groups; and (2) water; and (b) at least one aliphatic polyol having 4 to 18 carbon atoms and at least 2 hydroxyl groups.

Examples of suitable polyisocyanate trimers and branched polyisocyanates and polyol(s) are discussed above. Any of the other optional polyols, amine curing agent, catalysts or other additives described above can be included as reaction components in amounts as described above with respect to the foregoing Groups A-H. In some non-limiting embodiments, the reaction components are essentially free or free of amine curing agents as described above.

In other non-limiting embodiments, the present invention provides methods of preparing poly(ureaurethane) comprising the steps of: (a) reacting at least one polyisocyanate selected from the group consisting of polyisocyanate trimers and branched polyisocyanates and water to form an isocyanate functional urea prepolymer; and (b) reacting reaction product components comprising the isocyanate functional urea prepolymer with at least one aliphatic polyol having 4 to 18 carbon atoms and at least 2 hydroxyl groups, wherein the reaction product components are essentially free of amine curing agent.

The reaction synthesis can be as described above with respect to Poly(ureaurethane) Synthesis A. Optionally, a portion of one or more polyols or diols as described above can be included in this reaction to form isocyanate functional urethane prepolymer which is then further reacted with another portion of polyol and/or diol, as shown in Poly(ureaurethane) Synthesis B, described in further detail below.

Poly(ureaurethane) Synthesis B

As shown generally in Poly(ureaurethane) Synthesis B below, in other non-limiting embodiments urea linkages or units can be formed within the polyurethane matrix to the extent desired by reacting polyisocyanate(s) and a portion of the polyol(s) to form at least one isocyanate functional urethane prepolymer, and then reacting the isocyanate functional urethane prepolymer(s) with water. As shown in Step 1 of the reaction scheme of Poly(ureaurethane) Synthesis B below, a portion of the polyol(s) and/or diol(s) can be reacted with polyisocyanate(s) to form the at least one isocyanate functional urethane prepolymer. In some non-limiting embodiments, the equivalent ratio of NCO:OH functional groups ranges from about 1:0.05 to about 1:0.7, or about 1:0.05 to about 1:0.5, or about 1:0.05 to about 1:0.3. It is desirable to use excess isocyanate to ensure essentially complete conversion of the hydroxyl groups to urethane groups.

The isocyanate shown in Step 1 is a diisocyanate in which R is any linking group, such as aliphatic, cycloaliphatic, aromatic, heterocycle, etc. as described in detail above. However, one skilled in the art would understand that the isocyanate can have one or more, two or more, three or more or a higher number of isocyanate functional groups, as desired. Examples of suitable isocyanates can be any of the polyisocyanates discussed above. In some non-limiting embodiments, the polyisocyanate is one or more aliphatic polyisocyanates. In some non-limiting embodiments, the polyisocyanate is 4,4'-methylene-bis-(cyclohexyl isocyanate) (such as DESMODUR W).

The polyol shown in Step 1 can be a diol (m=2), triol (m=3) or higher hydroxyl functional material (m=4 or more) as described above in which R is any linking group, such as aliphatic, cycloaliphatic, aromatic, heterocycle, etc. as described in detail above with respect to the polyols. Examples of suitable polyols can be any of the polyols discussed above. In some non-limiting embodiments, the polyol can be trimethylolpropane and butanediol and/or pentanediol. Optionally, one or more catalysts such as are described above can be used to facilitate the reaction. The polyisocyanate can be reacted with the polyol to form the isocyanate functional urethane prepolymer by charging the reactants into a kettle and adding about 10 ppm or more of catalyst, such as a tin, bismuth or zirconium catalyst. The mixture can be heated to a temperature of about 100° C. or about 110° C. for about 2 to about 4 hours until all of the hydroxyl functionality is reacted. FTIR spectroscopy can be used to determine the extent of reaction.

Urea linkages or units can be formed within the polyurethane matrix to the extent desired by reacting isocyanate functional groups of the isocyanate functional urethane prepolymer with water. As shown in Step 2 of the reaction scheme of Poly(ureaurethane) Synthesis B below, isocyanate functional groups are converted to carbamate functional groups by the reaction with water. In some non-limiting embodiments, the equivalent ratio of NCO:water ranges from about 1:0.05 to about 1:0.7, or about 1:0.05 to about 1:0.5, or about 1:0.05 to about 1:0.3.

Removal of carbon dioxide facilitates conversion of the carbamate groups into amine groups. Excess isocyanate is desirable to ensure essentially complete consumption of the water. Also, it is desirable to remove essentially all of the carbon dioxide generated to facilitate conversion to amine groups. To prevent the removal of water under vacuum, the reaction can be started at a temperature of about 25° C., then raised to a temperature of about 60° C. while applying vacuum to remove the carbon dioxide. After cessation of carbon dioxide formation, the reaction temperature can be increased to about 100° C. or about 110° C. for about 2 to about 4 hours.

As discussed above, certain amine curing agents (such as aliphatic amine curing agents) are highly reactive and impractical to use under normal production conditions. By forming the amine in situ as discussed above and shown in Step 2, amines can be generated in situ that normally are not practical to use under normal production conditions without formation of undesirable side products. Also, the rate of reaction can be more easily regulated. This reaction can be used for any type of polyisocyanate described above, but is especially useful for converting aliphatic polyisocyanates to amines as described above.

As shown in Step 3 below, the amine formed in situ reacts with another isocyanate to form a urea group. Use of excess polyisocyanate permits formation of an isocyanate functional ureaurethane prepolymer. The isocyanate functional ureaurethane prepolymer can be prepared by reacting a stoichiometric excess of the polyisocyanate with the amine under substantially anhydrous conditions at a temperature ranging from about 25° C. and about 150° C. or about 110° C. until the reaction between the isocyanate groups and the amine groups is substantially complete. The polyisocyanate and amine components are suitably reacted in such proportions that the ratio of number of isocyanate groups to the number of amine groups is in the range of about 1:0.05 to about 1:0.7, or within the range of about 1:0.05 to 1:0.3.

As shown in Step 4 of the reaction scheme of Poly (ureaurethane) Synthesis B below, the isocyanate functional ureaurethane prepolymer can be reacted with another portion of polyol and/or diol to form the poly(ureaurethane)s of the present invention. The polyol shown in Step 4 can be a diol, triol or higher hydroxyl functional material as described above in which R is any linking group, such as aliphatic, cycloaliphatic, aromatic, heterocycle, etc. as described in detail above with respect to the polyols. Examples of suitable polyols can be any of the polyols discussed above. In some non-limiting embodiments, the polyol can be trimethylolpropane and butanediol and/or pentanediol. Suitable amounts of polyols for reacting with the isocyanate functional ureaurethane prepolymer as polyisocyanate are discussed in detail above.

The isocyanate functional ureaurethane prepolymer can be reacted with the other portion of polyol and/or diol (n=2 or more) under substantially anhydrous conditions at a temperature ranging from about 120° C. to about 160° C. until the reaction between the isocyanate groups and the hydroxyl groups is substantially complete. The isocyanate functional ureaurethane prepolymer and polyol(s) and/or diol(s) components are suitably reacted in such proportions that the ratio of number of isocyanate groups to the number of hydroxyl groups is in the range of about 1.05:1 to about 1:1 In the poly(ureaurethane) of Group K, y can range from 1 to about 500 or higher, or about 1 to about 200.

The cure temperature depends upon the glass transition temperature of the final polymer. In some embodiments, for complete cure the cure temperature should be greater than the glass transition temperature. For example, the cure temperature can range from about 140° C. to about 180° C. or about 143° C. to about 180° C.

Poly(ureaurethane) Synthesis B

Step 1

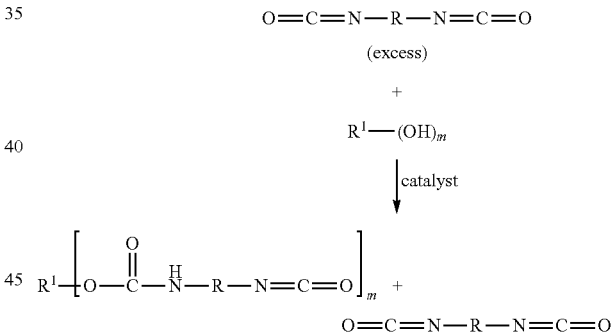

Step 2

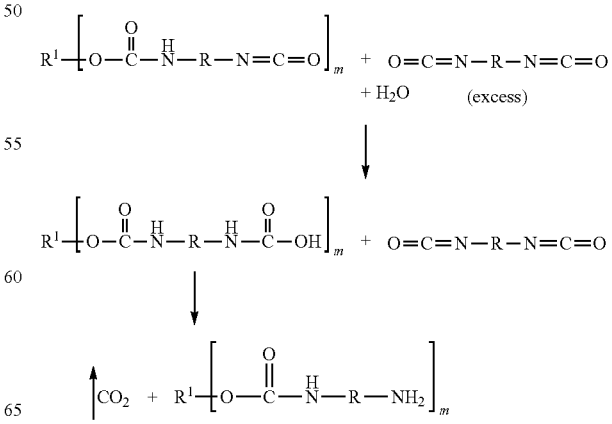

Step 3

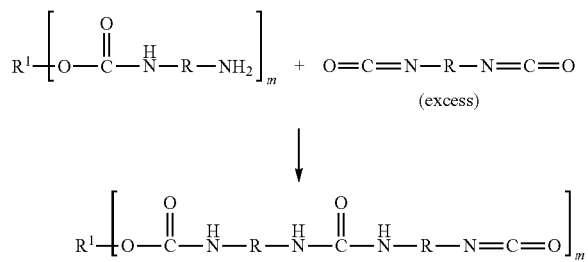

Step 4

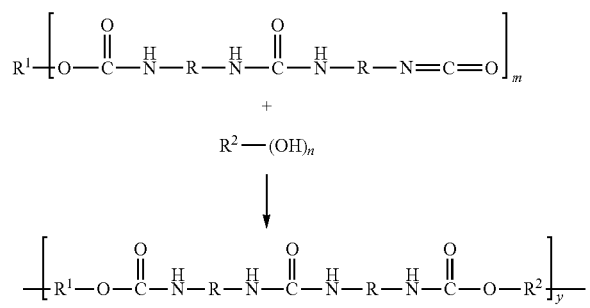

Group K

In some non-limiting embodiments, the present invention provides poly(ureaurethane)s of Group K comprising a reaction product of components comprising: (a) at least one isocyanate functional ureaurethane prepolymer comprising the reaction product of: (1) at least one isocyanate functional urethane prepolymer comprising the reaction product of: (i) a first amount of at least one polyisocyanate; and (ii) a first amount of at least one branched polyol; and (2) water, to form an isocyanate functional ureaurethane prepolymer; and (b) a second amount of at least one polyisocyanate and a second amount of at least one branched polyol.

Examples of suitable polyisocyanates and polyol(s) are discussed above. Any of the other optional polyols, amine curing agents, catalysts or other additives described above can be included as reaction components in amounts as described above with respect to the foregoing Groups A-G. In some non-limiting embodiments, the reaction components are essentially free or free of amine curing agent as described above, or free of amine curing agent.

In other non-limiting embodiments, the present invention provides methods of preparing poly(ureaurethane)s of Group K comprising the steps of: (a) reacting at least one polyisocyanate and at least one branched polyol having 4 to 18 carbon atoms and at least 3 hydroxyl groups to form an isocyanate functional urethane prepolymer; (b) reacting the isocyanate functional urethane prepolymer with water and polyisocyanate to form an isocyanate functional ureaurethane prepolymer; and (c) reacting reaction product components comprising the isocyanate functional ureaurethane prepolymer with at least one aliphatic polyol having 4 to 18 carbon atoms and at least 2 hydroxyl groups, wherein the reaction product components are essentially free of amine curing agent. The reaction synthesis can be as described above with respect to Poly(ureaurethane) Synthesis B.

Group L

In other non-limiting embodiments, the present invention provides poly(ureaurethane)s of Group L comprising a reaction product of components comprising: (a) at least one isocyanate functional ureaurethane prepolymer comprising the reaction product of: (a) (1) at least one isocyanate functional urethane prepolymer comprising the reaction product of: (i) a first amount of at least one polyisocyanate selected from the group consisting of polyisocyanate trimers and branched polyisocyanates, the polyisocyanate having at least three isocyanate functional groups; and (ii) a first amount of at least one aliphatic polyol; and (2) water, to form an isocyanate functional ureaurethane prepolymer; and (b) a second amount of at least one polyisocyanate and a second amount of at least one aliphatic polyol.

Examples of suitable polyisocyanate trimers and branched polyisocyanates having at least three isocyanate functional groups and polyol(s) are discussed above. Any of the other optional polyols, amine curing agent, catalysts or other additives described above can be included as reaction components in amounts as described above with respect to the foregoing Groups A-G. In some non-limiting embodiments, the reaction components are essentially free or free of amine curing agent as described above.

In other non-limiting embodiments, the present invention provides methods of preparing poly(ureaurethane)s of Group L comprising the steps of: (a) reacting at least one polyisocyanate selected from the group consisting of polyisocyanate trimers and branched polyisocyanates and at least one aliphatic polyol having 4 to 18 carbon atoms and at least 2 hydroxyl groups to form an isocyanate functional urethane prepolymer; (b) reacting the isocyanate functional urethane prepolymer with water and polyisocyanate to form an isocyanate functional ureaurethane prepolymer; and (c) reacting reaction product components comprising the isocyanate functional ureaurethane prepolymer with at least one aliphatic polyol having 4 to 18 carbon atoms and at least 2 hydroxyl groups, wherein the reaction product components are essentially free or free of amine curing agent. The reaction synthesis can be as described above with respect to Poly(ureaurethane) Synthesis B.

As discussed above, poly(ureaurethane)s can be prepared by including one or more amine curing agents in the reaction components. The amine functionality of the amine curing agent can react with isocyanate groups to form urea linkages or units within the polyurethane matrix.

Group M

In other non-limiting embodiments, the present invention provides poly(ureaurethane)s of Group M comprising a reaction product of components comprising: about 1 equivalent of at least one polyisocyanate; about 0.1 to about 0.9 equivalents of at least one branched polyol having 4 to 18 carbon atoms and at least 3 hydroxyl groups; about 0.1 to about 0.9 equivalents of at least one aliphatic diol having 2 to 18 carbon atoms; and at least one amine curing agent, wherein the reaction product components are essentially free or free of polyester polyol and polyether polyol.

Non-limiting examples of suitable polyisocyanates, branched polyols having 4 to 18 carbon atoms and at least 3 hydroxyl groups, aliphatic diols and amine curing agents for use as reaction components for preparing the polyurethanes of Group M are discussed in detail above with respect to Group A.

In some non-limiting embodiments, the amount of branched polyol used to form the polyurethane of Group M can be about 0.3 to about 0.98 equivalents, in other non-limiting embodiments about 0.5 to about 0.98 equivalents, and in other non-limiting embodiments about 0.3 equivalents or about 0.9 or about 0.98 equivalents.

In some non-limiting embodiments, the amount of aliphatic diols used to form the polyurethane of Group M can be about 0.1 to about 0.7 equivalents, in other non-limiting embodiments about 0.1 to about 0.5 equivalents, and in other non-limiting embodiments about 0.3 equivalents.

In some non-limiting embodiments, the amount of amine curing agent used to form the polyurethane of Group M can be about 0.1 to about 0.9 equivalents, in other non-limiting embodiments about 0.1 to about 0.7 equivalents, and in other non-limiting embodiments about 0.3 equivalents.

With respect to poly(ureaurethane)s of Group M, essentially free of polyester polyol and polyether polyol means that the polyester polyol and polyether polyol can be present as reaction components in respective amounts as described for the polyurethane of Group A above, or the reaction components can be free of one or both of polyester polyol and polyether polyol.

Any of the other optional polyols, catalysts or other additives described above can be included as reaction components in amounts as described above with respect to the foregoing Groups A-H.

In other non-limiting embodiments, the present invention provides methods of preparing poly(ureaurethane) comprising the step of reacting in a one-potprocess components comprising: at least one polyisocyanate; at least one branched polyol having 4 to 18 carbon atoms and at least 3 hydroxyl groups; at least one aliphatic diol having 2 to 18 carbon atoms; and amine curing agent, wherein the reaction product components are essentially free or free of polyester polyol and polyether polyol.

Group N

In other non-limiting embodiments, the present invention provides poly(ureaurethane)s of Group N comprising a reaction product of components comprising: (a) at least one polyisocyanate selected from the group consisting of polyisocyanate trimers and branched polyisocyanates, the polyisocyanate having at least three isocyanate functional groups; (b) about 0.1 to about 0.9 equivalents of at least one polyol having 4 to 18 carbon atoms and at least 2 hydroxyl groups; and (c) at least one amine curing agent, wherein the reaction product components are essentially free or free of polyester polyol and polyether polyol.

Non-limiting examples of suitable polyisocyanates, branched polyols having 4 to 18 carbon atoms and at least 3 hydroxyl groups, aliphatic diols and amine curing agents for use as reaction components for preparing the polyurethanes of Group N are discussed in detail above with respect to Groups A-C.

In some non-limiting embodiments, the amount of branched polyol used to form the polyurethane of Group N can be about 0.3 to about 0.98 equivalents, in other non-limiting embodiments about 0.5 to about 0.98 equivalents, and in other non-limiting embodiments about 0.3 equivalents or about 0.9 or about 0.98 equivalents.

In some non-limiting embodiments, the amount of aliphatic diols used to form the polyurethane of Group N can be about 0.1 to about 0.7 equivalents, in other non-limiting embodiments about 0.1 to about 0.5 equivalents, and in other non-limiting embodiments about 0.3 equivalents.

In some non-limiting embodiments, the amount of amine curing agent used to form the polyurethane of Group N can be about 0.1 to about 0.7 equivalents, in other non-limiting embodiments about 0.1 to about 0.5 equivalents, and in other non-limiting embodiments about 0.3 equivalents.

With respect to poly(ureaurethane)s of Group N, essentially free of polyester polyol and polyether polyol means that the polyester polyol and polyether polyol can be present as reaction components in respective amounts as described for the polyurethane of Group A above, or the reaction components can be free of one or both of polyester polyol and polyether polyol.

Any of the other optional polyols, catalysts or other additives described above can be included as reaction components in amounts as described above with respect to the foregoing Groups A-H.

In other non-limiting embodiments, the present invention provides methods of preparing poly(ureaurethane) comprising the step of reacting in a one-potprocess components comprising: at least one polyisocyanate selected from the group consisting of polyisocyanate trimers and branched polyisocyanates; at least one aliphatic polyol having 4 to 18 carbon atoms and at least 3 hydroxyl groups; at least one aliphatic diol having 2 to 18 carbon atoms; and amine curing agent, wherein the reaction product components are essentially free or free of polyester polyol and polyether polyol.

In some embodiments, the poly(ureaurethanes) of Groups I-N of the present invention can be thermosetting.

Group O

In some non-limiting embodiments, the present invention provides polyurethane materials comprising a first portion of crystalline particles having self-orientation and bonded together to fix their orientation along a first crystallographic direction and a second portion of crystalline particles having self-orientation and bonded together to fix their orientation along a second crystallographic direction, the first crystallographic direction being different from the second crystallographic direction, wherein said crystalline particles comprise at least about 30% of the total volume of the polyurethane material.

The particles interact with one another or with a substrate surface to align their crystallographic axes in one, two or three dimensions. As used herein, "align" or "aligned" with respect to the crystalline particles means that the particles of that crystalline portion are arranged in an array of generally fixed position and orientation. The preferred degree of alignment will depend on the intended application for the material. For purposes of alignment, it is desirable that the particles have uniform shapes with dominant planar surfaces in a suitable orientation, such as perpendicular to or parallel to, with respect to the desired direction of alignment.

In some non-limiting embodiments, the first portion of the crystalline particles is aligned in two dimensions. In some non-limiting embodiments, the first portion of the crystalline particles is aligned in three dimensions. In some embodiments, the crystalline particles are aligned along a distance ranging from about 1 nm to about 50 nm along any direction.

In some non-limiting embodiments, the second portion of the crystalline particles is aligned in two dimensions. In some non-limiting embodiments, the second portion of the crystalline particles is aligned in three dimensions.

The crystalline particles of the present invention have at least "Self-Aligning" morphologies. As used herein, "Self-Aligning" morphologies include any particles that are capable of self-organizing to form a polycrystalline structure wherein the single particles are aligned along at least one crystallographic direction into areas of higher density and order, for example like lamellae. Examples of crystal particle morphologies with Self-Aligning morphologies include cubic particles, hexagonal platelets, hexagonal fibers, rectangular platelets, rectangular particles, triangular platelets, square platelets, tetrahedral, cube, octahedron and mixtures thereof.

Self-Aligning morphologies may establish an orientation that could be up to about 10 degrees from the desired alignment direction, yet still sufficiently capture the desired properties. Thus, particles having such morphologies include particles that essentially have the desired morphology. For instance, for particles that are cubes, the particles need not be perfect cubes. The axes need not be at perfect 90 degree angles, nor exactly equal in length. Corners may also be cut off of the particles. Furthermore, "cube" or "cubic" is intended to refer to morphology, and is not intended to limit the particles to cubic crystal systems. Instead, single crystal particles that have orthorhombic, tetragonal or rhombohedral crystal structure may also be employed as cubes if they possess the defined cubic morphology. In other words, any essentially orthogonal single crystal particles in which the faces are essentially square, essentially rectangular, or both, that possess an essentially cubic morphology are considered cubes for purposes of the present invention.

The crystalline particles can be aligned in monolithic structures consisting of a single layer of crystals or multiple layers of crystals. The layer or layers are generally planar, although the layers can conform to curved surfaces or complex geometries depending on the shape of the supporting substrate material during formation and curing of the polyurethane.

The polycrystalline materials of the present invention are prepared by packing and aligning a plurality of single crystal particles into an aligned array to achieve one, two and three-dimensional alignment. In some non-limiting embodiments, the particles can self-assemble into arrays upon aging or heat treatment. In some non-limiting embodiments, to obtain a level of solid state diffusion sufficient to bind together adjacent particles, a temperature above about half of the melting temperature is required, which is most generally in the range of about 35° C. to about 100° C. The temperature range selected will depend upon the material being bonded, but can be readily determined by those of ordinary skill in the art without undue experimentation within the defined range. The preparation steps may be repeated to form a polycrystalline material having multiple layers of aligned particles. The resulting material is essentially a three-dimensional object with one, two, or three dimensional alignment of single crystal particles within.

Figure 4:
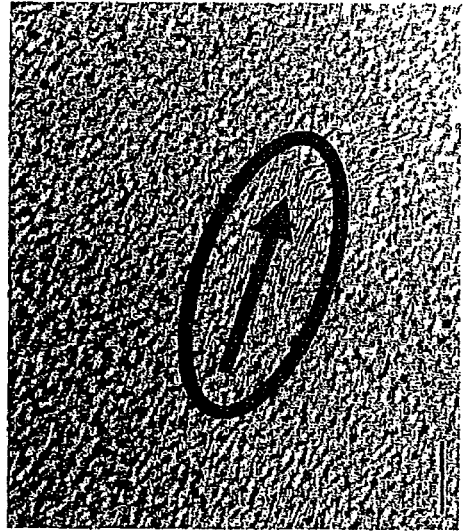
FIG. 4 is a TEM photomicrograph showing a casting of a polyurethane according to Example A, Formulation 2 analyzed two weeks after formation according to the present invention.

FIG. 4 is a TEM photomicrograph showing a casting prepared from a polyurethane according to Example A, Formulation 2. This casting was analyzed, using TEM, two weeks after polymerization of the polyurethane. The casting had been stored at ambient temperature (about 25° C.) for the two-week period. As shown in FIG. 4, no discernible regions of aligned crystals were observed.

Figure 5:
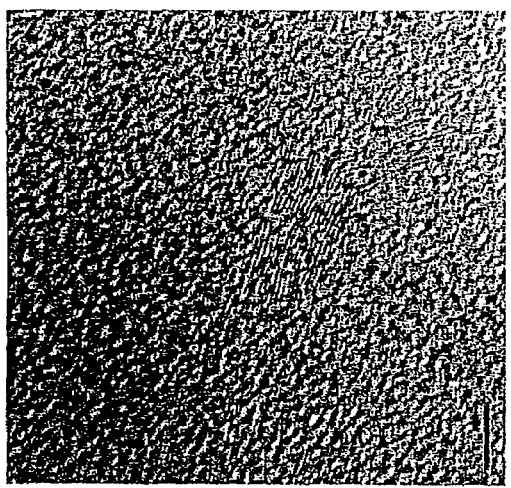
FIG. 5 is a TEM photomicrograph showing a casting of a polyurethane according to Example A, Formulation 2 analyzed about three weeks after formation according to the present invention.

FIG. 5 is a TEM photomicrograph showing a casting of a polyurethane according to Example A, Formulation 2. This casting was analyzed, using TEM, three weeks after polymerization of the polyurethane. The casting had been stored at ambient temperature (about 25° C.) for the three-week period. As shown in FIG. 5, initial formation of crystalline domains is observed.

Figure 6:
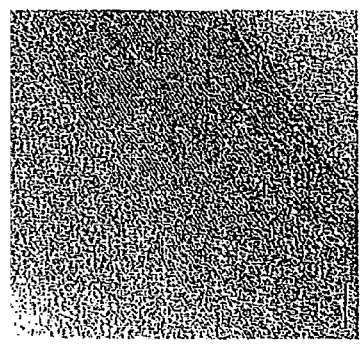
FIG. 6 is a TEM photomicrograph showing a first portion of a casting of a polyurethane according to Example A, Formulation 2 analyzed about seven months after formation according to the present invention.

FIG. 6 is a TEM photomicrograph showing a casting of a polyurethane according to Example A, Formulation 2. This casting was analyzed, using TEM, seven months after polymerization of the polyurethane. The casting had been stored at ambient temperature (about 25° C.) for the seven-month period. In the photomicrograph FIG. 6, a region of aligned crystals generally parallel to the arrows is shown.

Figure 7:
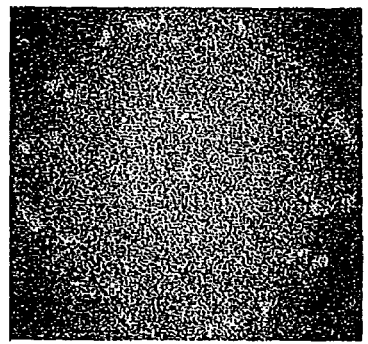
FIG. 7 is an electron diffraction pattern of a casting of the polyurethane of Example A, Formulation 2 of FIG. 6.

FIG. 7 is an electron diffraction pattern of the polyurethane Example A, Formulation 2 stored at ambient temperature (about 25° C.) for seven months. The bright spots in the pattern are reflections from the crystalline lattice planes, which are about 8 nanometers by about 4 nanometers in size.

Figure 8:
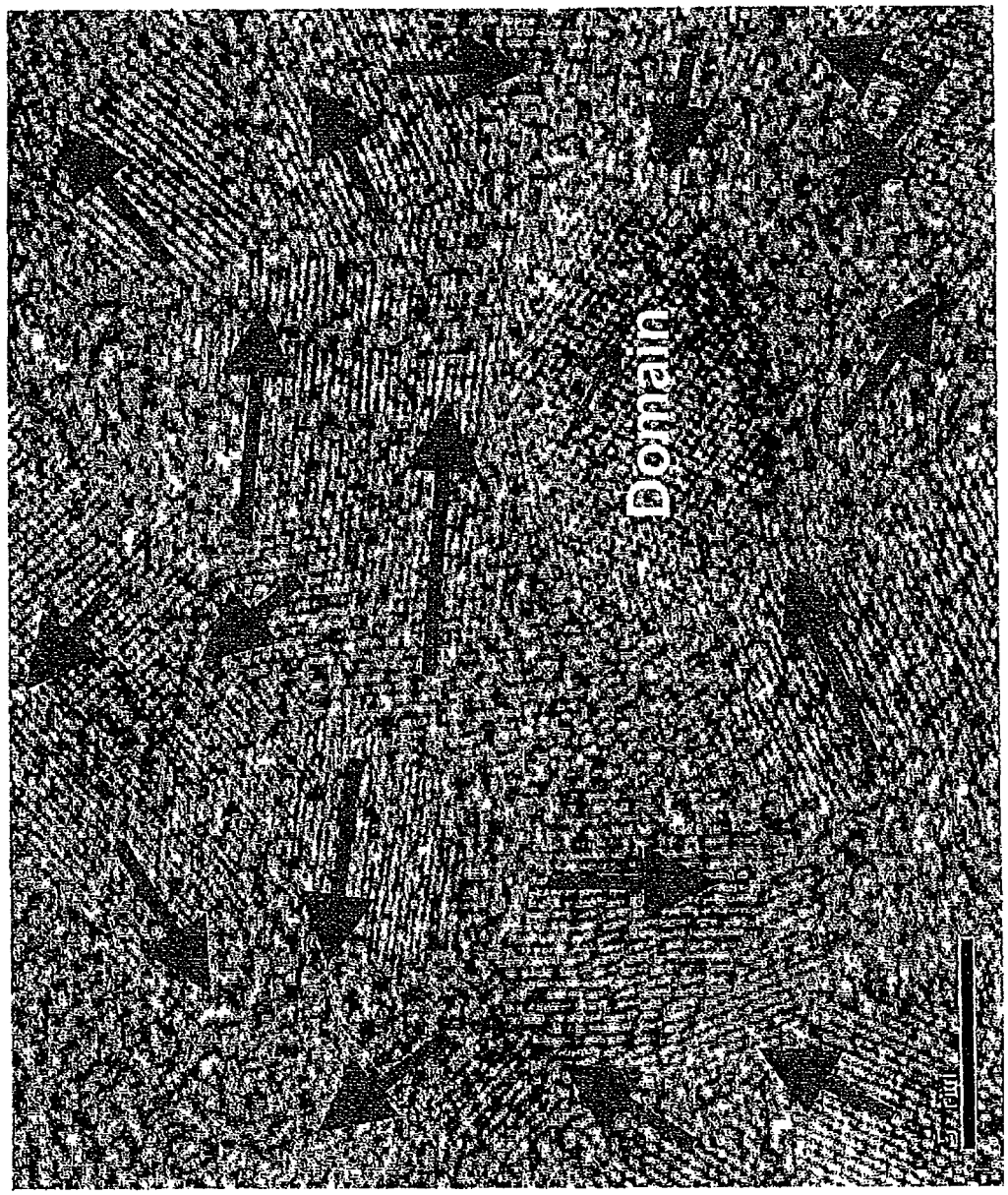
FIG. 8 is a TEM photomicrograph showing a second portion of the casting of the polyurethane of FIG. 6 according to Example A, Formulation 2 prepared after aging at ambient conditions for about seven months according to the present invention.

FIG. 8 is a TEM photomicrograph showing a casting of a polyurethane according to Example A, Formulation 2 prepared after aging at ambient temperature for about 7 months. In this photomicrograph, FIG. 8, many regions or domains of aligned crystals generally parallel to the arrows are shown, the domains being oriented in different directions and showing a higher density of domains than the samples aged for three weeks.

Figure 9:
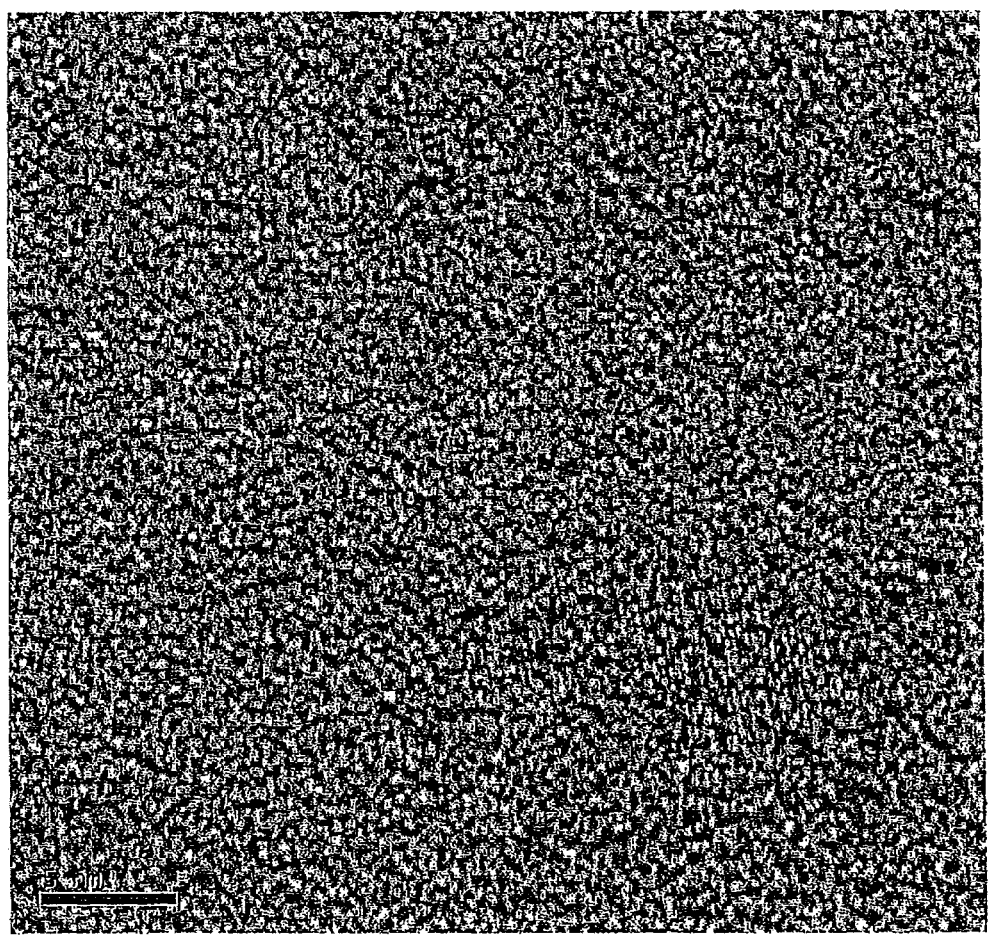
FIG. 9 is a TEM photomicrograph showing a first portion of a casting of a polyurethane according to Example A, Formulation 2 prepared after aging at ambient temperature for about two to four weeks.

FIG. 9 is a TEM photomicrograph showing a first portion of a casting of a polyurethane according to Example A, Formulation 2 prepared after aging at ambient temperature for about two to four weeks. The casting had been stored at ambient temperature for the two- to four-week period. As shown in FIG. 9, no discernible regions of aligned crystals were observed.

Figure 10:
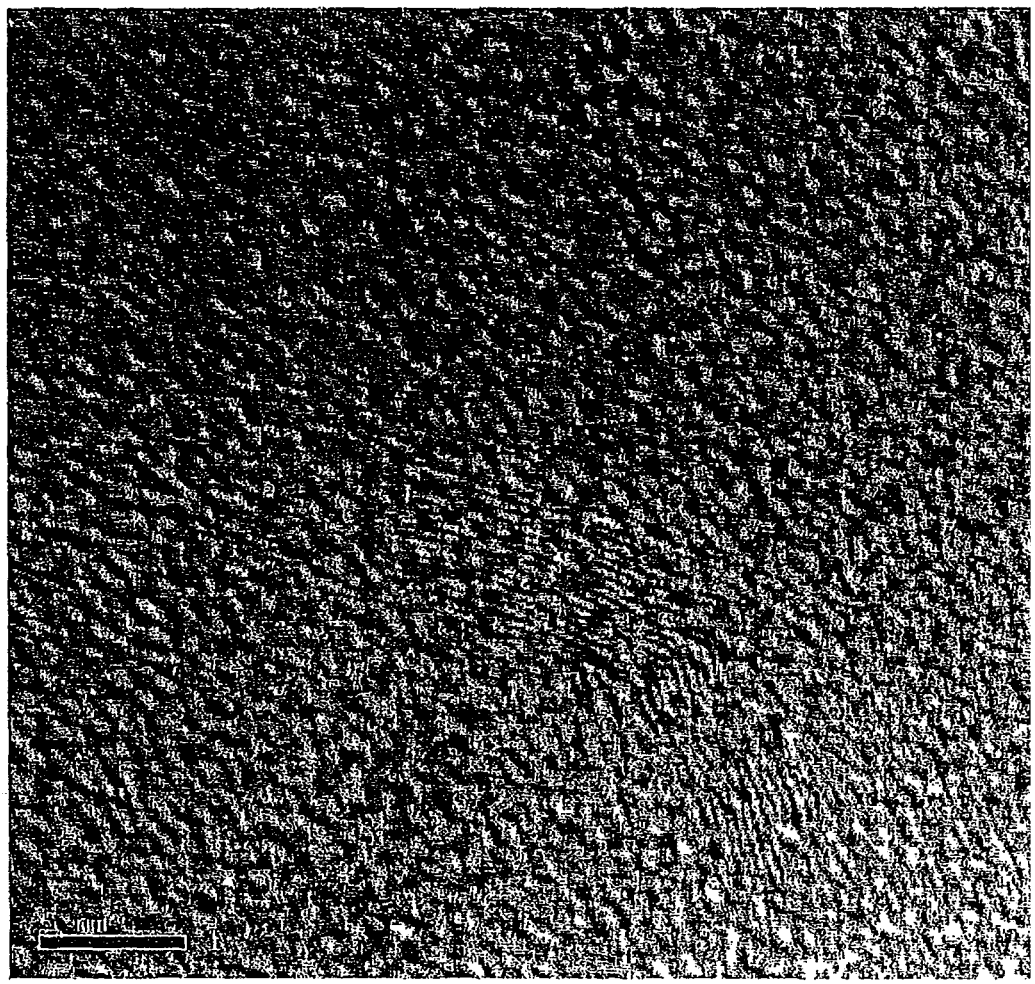
FIG. 10 is a TEM photomicrograph showing a second portion of the casting of the polyurethane according to Example A, Formulation 2 shown in FIG. 9.

FIG. 10 is a TEM photomicrograph showing a second portion of the casting of the polyurethane according to Example A, Formulation 2 shown in FIG. 9. As shown in the circled area in FIG. 10, initial formation of crystalline domains is observed.

The sample shown in FIGS. 9 and 10 had a Gardner Impact Strength of 180 in-lbs.

Figure 11:
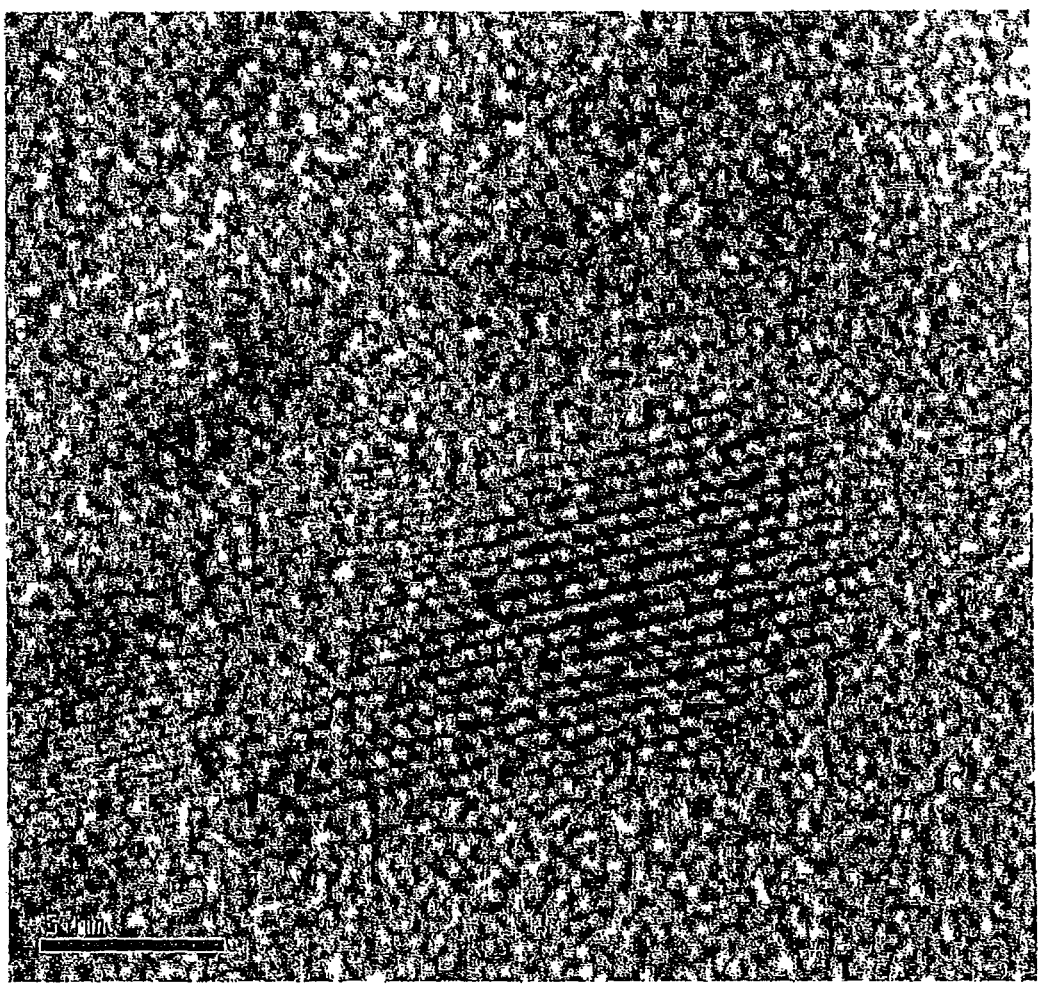
FIG. 11 is a TEM photomicrograph showing a casting of a polyurethane according to Example A, Formulation 2.

FIG. 11 is a TEM photomicrograph showing a casting of a polyurethane according to Example A, Formulation 2. This casting was analyzed, using TEM, about two to about four weeks after polymerization of the polyurethane. The casting had been stored at ambient temperature for the two- to four-week period. In the photomicrograph, FIG. 11, regions of aligned crystals in the circled areas are shown.

Figure 12:
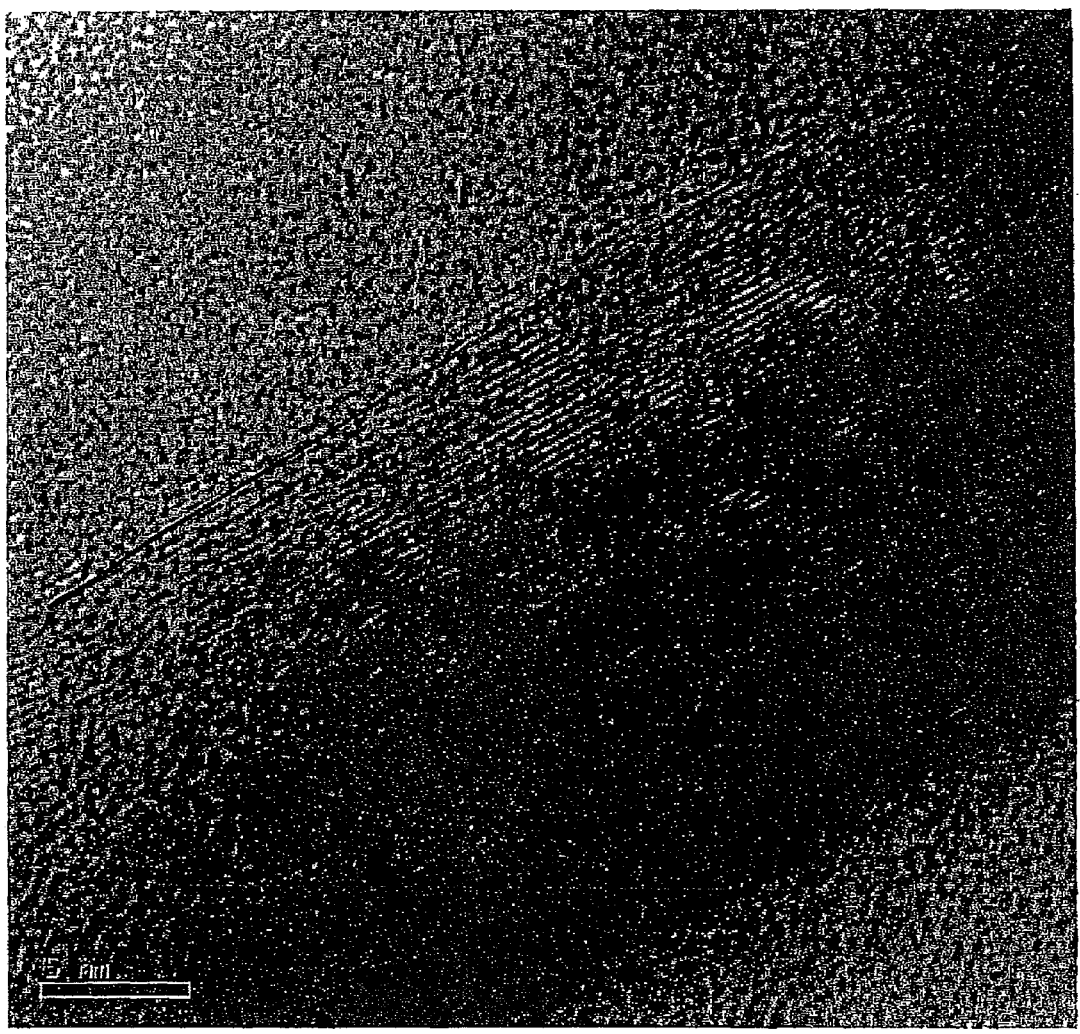
FIG. 12 is a TEM photomicrograph showing a first portion of a casting of a polyurethane according to Example A, Formulation 2 prepared after aging at ambient temperature for about seven months.

FIG. 12 is a TEM photomicrograph showing a first portion of a casting of a polyurethane according to Example A, Formulation 2 prepared after aging at ambient temperature for about 7 months. In this photomicrograph FIG. 12, a large region or domain of aligned crystals is shown.

Figure 13:
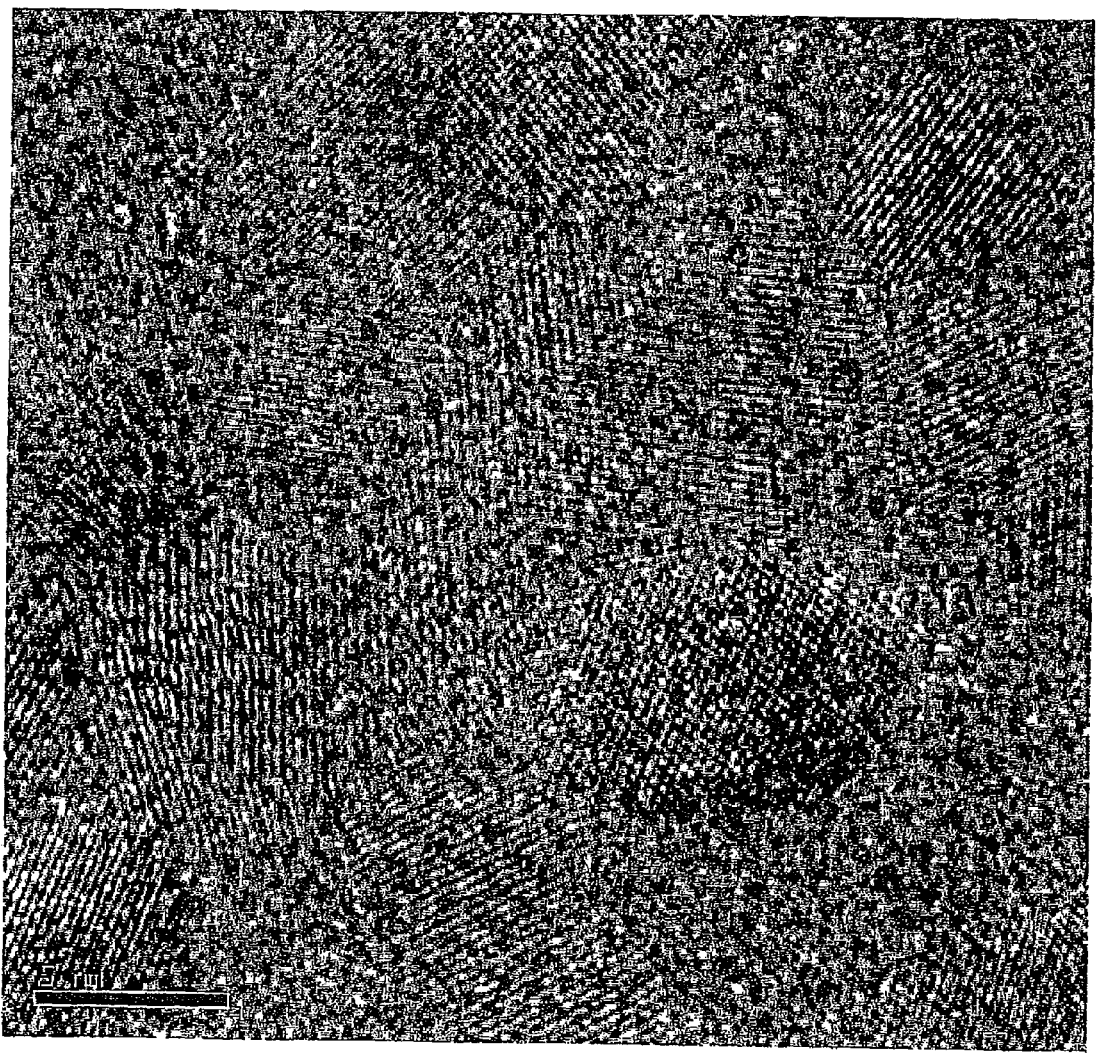
FIG. 13 is a TEM photomicrograph showing a second portion of a casting of a polyurethane according to Example A, Formulation 2 shown in FIG. 12.

FIG. 13 is a TEM photomicrograph showing a second portion of a casting of a polyurethane according to Example A, Formulation 2 shown in FIG. 12. In this photomicrograph FIG. 13, many regions or domains of aligned crystals are shown, the domains being oriented in different directions and showing a higher density of domains than the samples aged for a shorter period of time.

The sample shown in FIGS. 12 and 13 had a Gardner Impact Strength of 640 in-lbs.

Figure 14:
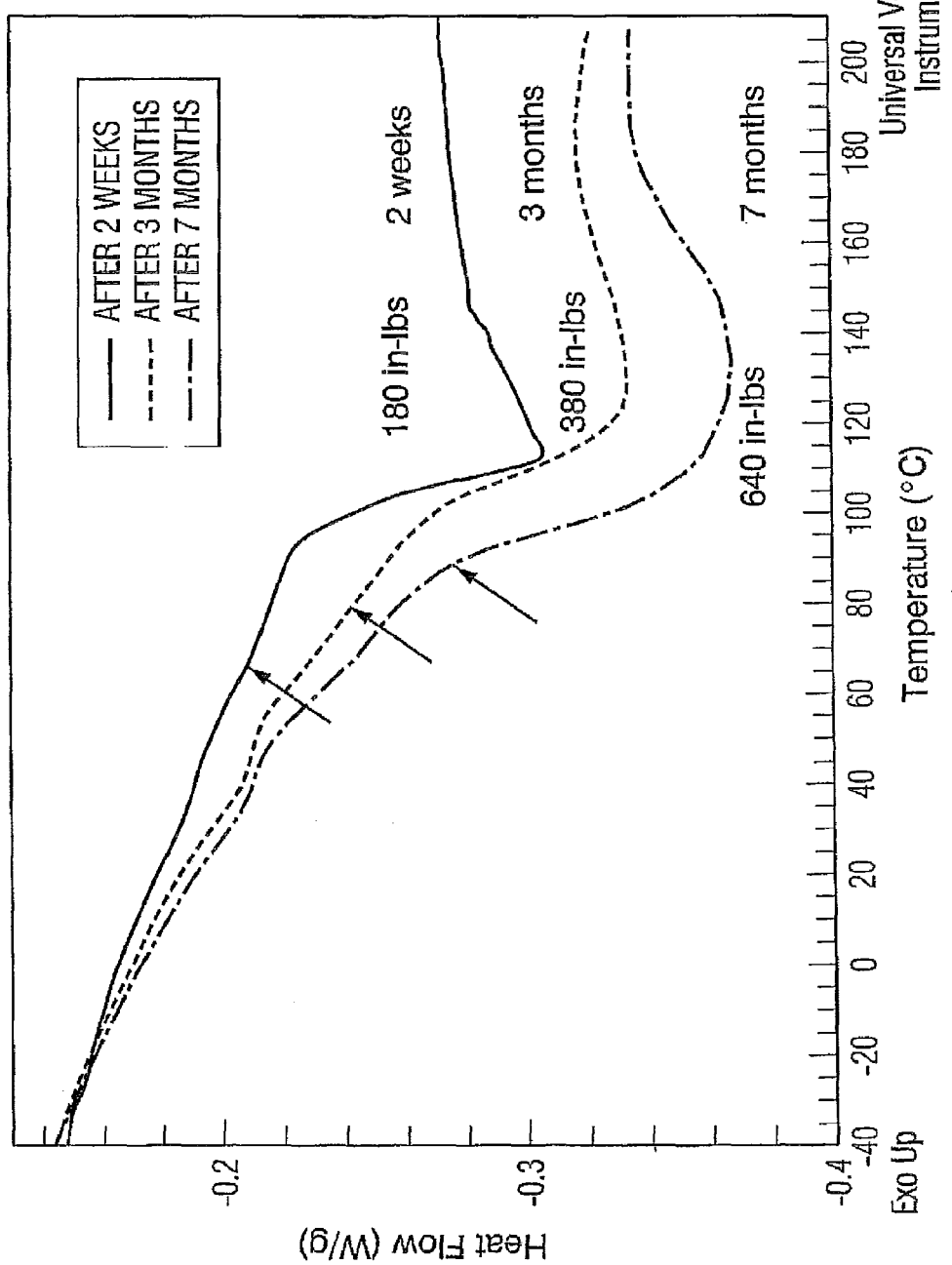
FIG. 14 is a graph of heat flow as a function of temperature measured using Differential Scanning Calorimetry (DSC) for castings of a polyurethane according to Example A, Formulation 2 measured after aging at ambient conditions for two weeks, three months and seven months, respectively, according to the present invention.

FIG. 14 is a graph of heat flow as a function of temperature measured using Differential Scanning Calorimetry (DSC) for castings of a polyurethane according to Example A, Formulation 2 measured after aging at ambient conditions for two weeks, three months and seven months, respectively. The melting endotherm enthalpy of the crystalline domains increases with time, showing a change in polymer morphology and microstructure with time, even though the polymer is glassy and highly crosslinked with a glass transition temperature of 235° F. (113° C.). As the number and size of the crystalline domains increases, the melting enthalpy increases. The Gardner Impact Strength increased over time. At two weeks, the Gardner Impact Strength was 180 in-lbs. At three months, the Gardner Impact Strength was 380 in-lbs. At seven months, the Gardner Impact Strength was 640 in-lbs.

Figure 15:
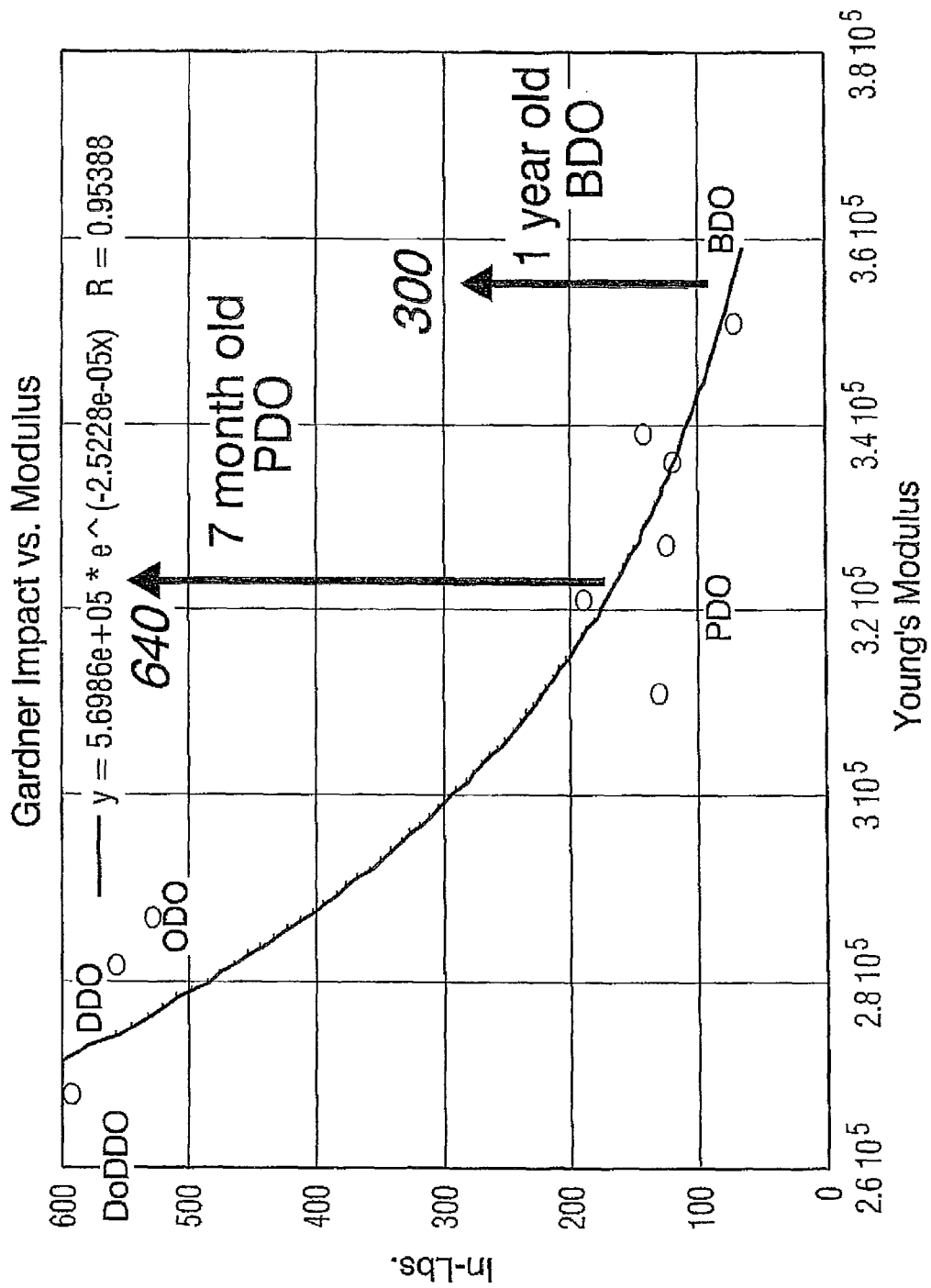
FIG. 15 is a graph of Gardner Impact as a function of Young's Modulus for castings of a polyurethane according to Example A, Formulations 1 and 2 measured after aging at ambient conditions for seven months and one year, respectively, according to the present invention.

FIG. 15 is a graph of Gardner Impact strength as a function of Young's Modulus for castings of a polyurethane according to Example A, Formulations 2 and 1, respectively, measured after aging at ambient conditions for seven months and one year, respectively. At seven months for Formulation 2, the Gardner Impact strength was 640 in-lbs. At one year for Formulation 1, the Gardner Impact Strength was 400 in-lbs.

In some non-limiting embodiments, the polyurethane material comprises a monolithic agglomerate of the first portion of the crystalline particles with low-angle grain boundaries therebetween bonded together by a polymer phase.

In some non-limiting embodiments, the polyurethane material comprises a monolithic agglomerate of the second portion of the crystalline particles with low-angle grain boundaries therebetween bonded together by a polymer phase.

In some non-limiting embodiments, the polyurethane material comprises a monolithic agglomerate of the first portion of the crystalline particles with low-angle grain boundaries and a generally amorphous phase therebetween.

In some non-limiting embodiments, the polyurethane material comprises a monolithic agglomerate of the second portion of the crystalline particles with low-angle grain boundaries and a generally amorphous phase therebetween.

In some non-limiting embodiments, the thickness of the first portion of crystalline particles is less than about 50 nanometers. In some non-limiting embodiments, the thickness of the second portion of crystalline particles is less than about 50 nanometers. The length and width, respectively, of the first portion can vary, for example about 4 nm by about 8 nm.

In some non-limiting embodiments, the thickness of the first portion of crystalline particles can range from about 10 nanometers to about 100 nanometers. In some non-limiting embodiments, the thickness of the second portion of crystalline particles can range from about 4 nanometers to about 50 nanometers. The length and width, respectively, of the second portion can vary, for example about 4 nm by about 8 nm.

In some non-limiting embodiments, the crystalline particles comprise at least about 30% of the total volume of the material. In other non-limiting embodiments, the crystalline particles comprise at least about 40%, or at least about 50%, or at least about 60%, or at least about 70%, or at least about 80%, or at least about 90% of the total volume of the material. The percentage of crystalline particles can be determined using DSC. For example, an article prepared from Formulation 2 as described below, aged at ambient conditions (about 25° C.) for about 7 months had a crystallinity of about 43% by volume.

In some non-limiting embodiments, the polyurethane comprises a reaction product of components consisting of: (a) about 1 equivalent of 4,4'-methylene-bis-(cyclohexyl isocyanate); (b) about 0.3 equivalents of trimethylolpropane; and (c) about 0.7 equivalents of butanediol or pentanediol. In some non-limiting embodiments, the butanediol is 1,4-butanediol. In some non-limiting embodiments, the pentanediol is 1,5-pentanediol.

In some non-limiting embodiments, the impact resistance of polyurethanes and poly(ureaurethane)s of Groups A-M above according to the present invention can be improved by aging or heat treatment.

In some non-limiting embodiments, the polyurethane material can be aged for at least about 2 weeks after formation. In some non-limiting embodiments, the polyurethane material can be aged for at least about 2 months after formation. In some non-limiting embodiments, the polyurethane material has been aged for at least about 7 months after formation.

In some non-limiting embodiments, the polyurethane material has been heated to a temperature of about 90° C. to about 150° C. or about 200° F. (about 93° C.) to about 290° F. (about 143° C.) for about 1 to about 24 hours after formation. In some non-limiting embodiments, the polyurethane is heated at a temperature sufficient to induce grain boundary mobility, so that the particles grow until impingement of adjacent crystal grain boundaries prevent further growth. The net result is a polycrystalline microstructure, the grains of which for all practical purposes are aligned in two or three dimensions so that it performs like a single crystal with respect to some desired property.

Impact resistance or flexibility can be measured using a variety of conventional methods known to those skilled in the art. The flexibility of the materials can be measured by the Gardner Impact Test using a Gardner Variable Impact Tester in accordance with ASTM-D 5420-04, which consists of a 40-inch (101.6 cm) aluminum tube in which an 8- or 16-lb (17.6- or 35.2-kg) weight is dropped from various heights onto a metal dart resting onto the substrate being tested (2 inch by 2 inch by ⅛ inch (5.1 cm by 5.1 cm by 0.3 cm) specimen size. In a non-limiting embodiment, the impact strength results of the Gardner Impact Test of at least about 65 in-lb (7.3 Joules) or from about 65 in-lb (7.3 Joules) to about 640 in-lb (72 joules).

In another embodiment, the impact resistance can be measured using the Dynatup Test in accordance with ASTM-D 3763-02, which consists of a high velocity test with a load cell which measures total energy absorption in the first microseconds of the impact. The impact strength can be measured in Joules. In a non-limiting embodiment, the substrate can have an impact strength of at least about 35 Joules or from about 35 to about 105 Joules.

Group P

In some non-limiting embodiments, the present invention provides polyurethane powder coating compositions. The powder coating compositions can be prepared from any of the polyurethanes or poly(ureaurethane)s of Groups A-N discussed in detail above.

In some non-limiting embodiments, the present invention provides methods of preparing a polyurethane powder coating composition comprising the steps of: reacting at least one polyisocyanate with at least one aliphatic polyol to form a generally solid, hydroxy functional prepolymer; melting the hydroxy functional prepolymer; melting at least one generally solid polyisocyanate to form a melted polyisocyanate; mixing the melted hydroxy functional prepolymer and melted polyisocyanate to form a mixture; and solidifying the mixture to form a generally solid powder coating composition.

The generally solid, hydroxy functional prepolymer can be prepared by reacting the polyisocyanate(s) with excess aliphatic polyol(s) and catalyst in amounts as described above and heating the prepolymer to a temperature of about 140° C. or about 150° C. to about 180° C. for about 1 to about 24 hours to facilitate essentially complete reaction of the components and formation of a generally solid prepolymer.

In some non-limiting embodiments, the polyisocyanate is branched or a trimer as discussed above and the aliphatic polyol is an aliphatic diol having from 4 to 18 carbon atoms, or 4 or 5-carbon atoms, such as propanediol, butanediol, cyclohexane dimethanol, 1,10-decanediol and/or 1,12-dodecanediol. In other non-limiting embodiments, the polyisocyanate can be any polyisocyanate as discussed above and the aliphatic polyol can be a branched diol having from 4 to 18 carbon atoms, such as trimethylolpropane.

The equivalent ratio of isocyanate functional groups to hydroxyl functional groups can range from about 1:0.9 to about 1:1.1, or about 1:1.

The generally solid polyisocyanate can be melted by, for example, heating at a temperature of about 35° C. to about 150° C. for about 2 to about 24 hours to form the melted polyisocyanate. The melted hydroxy functional prepolymer and melted polyisocyanate can be mixed and solidified to form a generally homogeneous mixture suitable for forming a powder coating, as discussed below. The equivalent ratio of isocyanate functional groups of the polyisocyanate to hydroxyl functional groups of the hydroxy functional prepolymer can range from about 1.05:1 to about 0.95:1, or about 1:1.

In other non-limiting embodiments, the present invention provides methods of preparing a polyurethane powder coating composition comprising the steps of: reacting at least one polyisocyanate with at least one aliphatic polyol to form a generally solid, hydroxy functional prepolymer; dissolving the hydroxy functional prepolymer in a first solvent to form a first solution; dissolving at least one generally solid polyisocyanate in a second solvent that is the same as or compatible with the first solvent to form a second solution; mixing the first and second solutions; and removing substantially all of the solvent to form a generally solid powder coating composition.

In some non-limiting embodiments, the polyisocyanate(s) are branched or a trimer as discussed above and the aliphatic polyol is an aliphatic diol having from 4 to 18 carbon atoms, or 4 or 5 carbon atoms, such as propanediol and/or butanediol. In other non-limiting embodiments, the polyisocyanate can be any polyisocyanate as discussed above and the aliphatic polyol can be a branched diol having from 4 to 18 carbon atoms, such as trimethylolpropane.

The generally solid, hydroxy functional prepolymer can be prepared by reacting the polyisocyanate(s) with excess aliphatic polyol(s) and catalyst in types and amounts as described above. The hydroxy functional prepolymer is dissolved in a first solvent to form a first solution. The solvent can be any solvent capable of dissolving the hydroxy functional prepolymer, such as a dipolar aprotic solvent, for example m-pyrole (N-methyl-2-pyrrolidone), N,N-dimethylformamide, N,N-dimethylacetamide, dimethyl sulfoxide (DMSO), methylene chloride, dichlorobutane, cyclohexanone, dimethyl formamide and/or acetonitrile solvent. The amount of solvent can range from about 20 to about 95 weight percent based upon weight of solids of the hydroxy functional prepolymer.

The generally solid polyisocyanate in a second solvent that is the same as or compatible with the first solvent to form a second solution. The solvent can be any solvent capable of dissolving the generally solid polyisocyanate, such as a dipolar aprotic solvent, for example m-pyrole (N-methyl-2-pyrrolidone), N,N-dimethylformamide, N,N-dimethylacetamide, dimethyl sulfoxide (DMSO), methylene chloride, dimethyl formamide and/or acetonitrile solvent. The amount of solvent can range from about 20 to about 95 weight percent based upon weight of the solids of polyisocyanate.

The first and second solutions are mixed and substantially all of the solvent is removed, for example by vacuum in an oven, to form a generally solid powder suitable for use as a coating composition. The powder can be milled or micronized, if desired.

Curable powder coating compositions useful in the present invention are typically prepared by first dry blending the polymer, e.g., polyurethane or poly(ureaurethane) polymer, the crosslinking agent (if present), the particles and additives, such as degassing agents, flow control agents and catalysts, in a blender, e.g., a Henshel blade blender. The blender is operated for a period of time sufficient to result in a homogenous dry blend of the materials charged thereto. The homogeneous dry blend is then melt blended in an extruder, e.g., a twin screw co-rotating extruder, operated within a temperature range sufficient to melt but not gel the components.

Optionally, curable powder coating compositions of the present invention may be melt blended in two or more steps. For example, a first melt blend is prepared in the absence of a cure catalyst. A second melt blend is prepared at a lower temperature, from a dry blend of the first melt blend and the cure catalyst. The melt blended curable powder coating composition is typically milled to an average particle size of from, for example, 15 to 30 microns.

Alternatively, the powder coating compositions of the present invention can be prepared by blending and extruding the ingredients as described above, but without the particles. The particles can be added as a post-additive to the formulation by simply mixing the particles into the milled powder coating composition, such as by mixing using a Henschel mixer. In some non-limiting embodiments, the powder coating composition is slurried in a liquid medium, such as water, which may be spray applied.

Group Q

In some non-limiting embodiments, the compositions of the present invention can further comprise one or more types of reinforcing materials. These reinforcing materials can be present in any physical form desired, for example as particles, including but not limited to nanoparticles, agglomerates, fibers, chopped fibers, mats, etc.

The reinforcing materials can be formed from materials selected from the group consisting of polymeric inorganic materials, nonpolymeric inorganic materials, polymeric organic materials, nonpolymeric organic materials, composites thereof and mixtures thereof that are chemically different from the polyurethane or poly(ureaurethane). As used herein, "chemically different" from the polyurethane or poly(ureaurethane) means that the reinforcing material has at least one different atom or has a different arrangement of atoms compared to the polyurethane or poly(ureaurethane).

As used herein, the term "polymeric inorganic material" means a polymeric material having a backbone repeat unit based on an element or elements other than carbon. See James Mark et al., *Inorganic Polymers*, Prentice Hall Polymer Science and Engineering Series, (1992) at page 5, incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon-containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., *Hawley's Condensed Chemical Dictionary*, (12th Ed. 1993) at pages 761-762, and M. Silberberg, *Chemistry The Molecular Nature of Matter and Change* (1996) at page 586, which are incorporated by reference herein.

As used herein, the term "inorganic material" means any material that is not an organic material.

As used herein, the term "composite material" means a combination of two or more differing materials. For example a composite particle can be formed from a primary material that is coated, clad or encapsulated with one or more secondary materials to form a composite particle that has a softer surface. In some non-limiting embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202, incorporated by reference herein.

The reinforcing materials suitable for use in the compositions of the invention can comprise inorganic elements or compounds known in the art. Suitable nonpolymeric, inorganic reinforcing materials can be formed from ceramic materials, metallic materials, and mixtures of any of the foregoing. Nonpolymeric, inorganic materials useful in forming the reinforcing materials of the present invention comprise inorganic materials selected from the group consisting of graphite, metals, oxides, carbides, nitrides, borides, sulfides, silicates, carbonates, sulfates, and hydroxides. Suitable ceramic materials comprise metal oxides, metal nitrides, metal carbides, metal sulfides, metal silicates, metal borides, metal carbonates, and mixtures of any of the foregoing. Non-limiting examples of suitable metals include molybdenum, platinum, palladium, nickel, aluminum, copper, gold, iron, silver, alloys, and mixtures of any of the foregoing. Non-limiting examples of metal nitrides are, for example, boron nitride; non-limiting examples of metal oxides are, for example, zinc oxide; non-limiting examples of suitable metal sulfides are, for example, molybdenum disulfide, tantalum disulfide, tungsten disulfide, and zinc sulfide; non-limiting examples of metal silicates are, for example aluminum silicates and magnesium silicates such as vermiculite. In some non-limiting embodiments, the reinforcing material is essentially free of (less than 5 weight percent or less than 1 weight percent) or free of fillers such as sodium carbonate, calcium carbonate, silicates, alginates, carbon black, and metal oxides such as titanium dioxide, silica, and zinc oxide.

In some non-limiting embodiments, the reinforcing materials can comprise a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. In some non-limiting embodiments, the reinforcing materials should not seriously interfere with the optical properties of the cured composition. As used herein, "transparent" means that the cured coating has a BYK Haze index of less than 50 as measured using a BYK/Haze Gloss instrument.

The composition can comprise precursors suitable for forming silica particles in situ by a sol-gel process. The composition according to the present invention can comprise alkoxy silanes which can be hydrolyzed to form silica particles in situ. For example tetraethylortho silicate can be hydrolyzed with an acid such as hydrochloric acid and condensed to form silica particles. Other useful particles include surface-modified silicas such as are described in U.S. Pat. No. 5,853,809 at column 6, line 51 to column 8, line 43, incorporated herein by reference.

Sols, such as an organosols, of reinforcement particles can be used in the present invention. These sols can be of a wide variety of small-particle, colloidal silicas having an average particle size in ranges such as are described below. The colloidal silicas can be surface modified during or after the particles are initially formed. These surface modified silicas may contain on their surface chemically bonded carbon-containing moieties, as well as such groups as anhydrous $SiO_2$ groups and SiOH groups, various ionic groups physically associated or chemically bonded within the surface of the silica, adsorbed organic groups, or combinations of any of the foregoing, depending on the characteristics of the particular silica desired. Such surface modified silicas are described in detail in U.S. Pat. No. 4,680,204, incorporated by reference herein. Such small particle colloidal silicas are readily available, are essentially colorless and have refractive indices which permit their inclusion in compositions that, without additional pigments or components known in the art to color and/or decrease the transparency of such compositions, result in colorless, transparent compositions or coatings.

Other suitable non-limiting examples of reinforcing materials include colloidal silicas, such as those commercially available from Nissan Chemical Company under the trademark ORGANOSILICASOLS™ such as ORGANOSILICASOL™ MT-ST, and from Clariant Corporation as HIGH-LINK™; colloidal aluminas, such as those commercially available from Nalco Chemical under the trademark NALCO 8676®; and colloidal zirconias, such as those commercially available from Nissan Chemical Company under the trademark HIT-32M®.

In some non-limiting embodiments of the present invention, the reinforcing material is a nanostructure. As used herein, the term "nanostructure" refers to a three dimensional object wherein the length of the longest dimension ranges from 1 nm to 1000 nm, for example, from 1 nm to 500 nm, or from 1 nm to 100 nm, or from 1 to 40 nm.

Nanostructural reinforcing materials can be incorporated into the matrix of a polymer by dispersing pre-made nanostructures, such as for example nanoclays, into the polymer solution. Alternatively or additionally, nanostructural reinforcement materials can be incorporated into the polymer matrix by forming the nanostructures in situ. For example, the nanostructural reinforcement materials can be formed in situ by mixing a precursor solution for the polyurethane or poly(ureaurethane) with a precursor for the nanostructures to form a mixture, forming nanostructures in the matrix of the polymer from the precursor of the nanostructures, and forming a polymer from the precursor solution of the polymer.

As used herein, the phrase "precursor solution for the polyurethane or poly(ureaurethane)" refers to any material that can be used as a starting material to form the polyurethane or poly(ureaurethane), as discussed above. For example, if the desired end product is an aliphatic polyurethane, suitable precursors for the polymer include, but are not limited to, 1,4-butanediol, trimethylolpropane, and bis (4-isocyanatocyclohexyl)methane and thiodiethanol.

As used herein, the phrase "precursor for the nanostructures" refers to any material that can be used as a starting material to form the nanostructures.

In some non-limiting embodiments of the invention, a solvent such as water, ethanol, iso-propanol, butanol, etc. is added to the mixture.

The nanostructures are formed while the viscosity of the polymer is low so that the nanostructures can incorporate themselves into the matrix of the polymer. The formation of the nanostructures can be initiated using various techniques. In a non-limiting embodiment of the invention, the nanostructures are formed by adjusting the pH of the mixture. An acid or base, such as ammonia, can be used to adjust the pH of the solution. Depending on the exact precursor solution of the polymer and the exact precursor for the nanostructures, there is an optimum pH range in which the nanostructures will form. One of ordinary skill in the art would know what the optimum pH range is based on both precursors.

In another non-limiting embodiment, the mixture can be heated to initiate the formation of the nanoparticles. The mixture can be heated to any temperature provided the mixture is not heated to a temperature above that at which the precursor solution would break down. For example, a precursor solution comprising polyurethane or poly(ureaurethane) cannot be heated above 200° C. because that is the temperature at which polyurethane or poly(ureaurethane) begins to decompose. Similarly to the pH range, the optimum temperature range at which the particles will form depends on the exact precursor solution of the polyurethane or poly(ureaurethane) and the exact precursor for the nanostructures. One of ordinary skill in the art would know what the optimum temperature range is based on both precursors. Generally, the higher the temperature to which the mixture is heated and/or the longer the mixture is heated, the larger the size of the nanostructures that will be formed.

In yet another non-limiting embodiment of the invention, forming the nanostructures is accomplished by heating the mixture after the pH of the mixture is adjusted. In a further non-limiting embodiment of the invention, forming the nanostructures is accomplished by heating the mixture and then adjusting the pH of the mixture.

In various other non-limiting embodiments of the invention, the nanostructures can be formed by using one or more of the following: increasing the pressure on the mixture, by changing the concentration of the precursor solution for the polyurethane or poly(ureaurethane); by using an initiator for nanostructure formation; and by seeding (adding no greater than 5% of the desired nanostructure material based on the projected weight of the formed nanostructures as is well known in the art).

The formed nanostructures are charged species. If the pH of the solution was adjusted to cause the formation of the nanostructures, the charge is a result of the pH adjustment. If no pH adjustment was performed during the nanostructure formation step, a polymeric stabilizer such as, but not limited to, sodium polymethacrylate in water and ammonium polymethacrylate in water, which are both commercially available as Darvan® 7 and as Darvan® C, respectively, from R.T. Vanderbilt Company, Inc. in Norwalk, Conn. can be added to the solution to create the charge.

The third step involves forming the polyurethane or poly(ureaurethane) from a mixture including the precursor solution of the polyurethane or poly(ureaurethane). The formation of the polyurethane or poly(ureaurethane) can be initiated using various techniques (as discussed in detail above) based on the precursor solution of the polyurethane or poly(ureaurethane) and the precursor for the nanostructures.

In another embodiment of the present invention, the second and third steps described above are switched.

The method of making polymers having nanostructures incorporated into the matrix of the polymer according to the present invention is referred to as an "in-situ" process. This means the nanostructures are formed during the same process that produces the polymer as opposed to pre-formed nanostructures being dispersed into a polymer solution.

During some methods of the present invention, ions (cations and/or anions) can form in the mixture. The formed ions and other process variables, such as the pressure of the system in which the mixture is held, can affect the final polymer. For example, the amount of nanostructure formation and the morphology of the nanostructures will vary depending on the types and amount of ions present in the solution.

In the polymer matrix, the nanostructures typically continually approach one another and collide because they possess kinetic energy. Under normal circumstances, some of the nanostructures would become bound together and agglomerate due to various forces such as Van der Waals forces. As discussed above, agglomeration is not desirable because the nanostructures can effectively become regular sized particles and the desired effect of incorporating the nanostructures is reduced.

However, the methods described above can produce polymers having nanostructures in the matrix of the polymer that do not agglomerate to the extent that the performance of the polymer is compromised, for example to improve the thermal stability of the polymer and/or to decrease the chemical activity of the polymer. The nanostructures do not agglomerate because they are stabilized. The stabilization can occur via electrostatic stabilization and/or steric stabilization.

Because the nanostructures in the polymer matrix are similarly charged species, they repel each other. This prevents the nanostructures from coming so close together that they agglomerate. This phenomenon is referred to as electrostatic stabilization.

Because the nanostructures are surrounded by polymer precursor solution when they are formed, the nanostructures lose a degree of freedom which they would otherwise possess as the nanostructures approach each other. This loss of freedom is expressed, in thermodynamic terms, as a reduction in entropy, which provides the necessary barrier to hinder agglomeration. This phenomenon is referred to as steric stabilization. The same principle applies when the method involves forming the polymer before forming the nanostructures.

The concentration of the nanostructures in the polymer matrix can range from 0.1% to 90%, for example from 3% to 85% or from 15% to 80% based on total volume. The nanostructures in the polymer matrix can have the following shapes: spherical, polyhedral-like cubic, triangular, pentagonal, diamond shaped, needle shaped, rod shaped, disc shaped etc. The nanostructures in the polymer matrix can have an aspect ratio of 1:1 to 1:1,000, for example 1:1 to 1:100.

Non-limiting examples of suitable nanostructure materials include titania, alumina, indium tin oxide (ITO), antimony tin oxide (ATO), monobutyl tin tri-chloride, indium acetate, and antimony tri-chloride nanostructures incorporated into the polymer matrix is formed. Suitable precursors for titania nanostructures include, but are not limited to, titanium iso-propoxide, titanium (IV) chloride and potassium titanyl oxalate. Suitable precursors for alumina nanostructures include, but are not limited to, aluminum iso-propoxide, aluminum tri-tert-butoxide, aluminum tri-sec-butoxide, aluminum triethoxide, and aluminum pentanedionate. Suitable precursors for zirconia nanostructures include, but are not limited to, zirconium iso-propoxide, zirconium tert-butoxide, zirconium butoxide, zirconium ethoxide, zirconium 2,4-pentanedionate, and zirconium tri-fluoropentane-dionate.

In the first step, a precursor solution for polyurethane or poly(ureaurethane) is mixed with a precursor for the nanostructures.

In the second step, nanostructures are formed from the precursor of the nanostructures in the polymer matrix. The nanostructure formation can be caused by adjusting the pH of the mixture followed by heating. The pH can be adjusted by introducing an agent, such as ammonia, into the mixture.

For ITO nanostructures in a urethane or ureaurethane aqueous solution, the nanostructures begin to form at a pH>8. After the pH is adjusted, the mixture is heated to a temperature of up to 100° C. Heating the solution to a temperature greater than 100° C. may cause the polymer matrix to decompose. As discussed above, heating the mixture for a longer time period can increase the size of the nanostructures.

In the third step, the precursor solution for the polymer is converted to the polymer, as discussed above for forming the polyurethane and poly(ureaurethane).

In a non-limiting embodiment of the invention, the final reinforced polymer is used as an interlayer in a laminated glass transparency for automotive and architectural applications. As is well known in the art, a laminated glass transparency can be manufactured by interposing an interlayer between at least two transparent glass sheets.

In this particular embodiment of the invention, a laminated glass transparency for an automotive and architectural applications embodiment, it is important that the nanostructures do not agglomerate. If the nanostructures were to agglomerate and effectively achieve a diameter of greater than 200 nm, the nanostructures would scatter visible light rays to such an extent that transmittance through the interlayer would be insufficient for the application. A polymer with nanostructures having an acceptable size for the application, can be determined using a "haze value". The haze value is associated with the degree to which transparency is prevented. The larger the nanostructures present in the polymer matrix, the higher the haze value. According to the present invention, laminated glass for automotive and architectural applications has a haze value of less than or equal to about 1%, for example, less than or equal to about 0.3%, or less than or equal to about 0.2%, as measured using a Hazeguard System from BYK-Gardner in Columbia, Md.

In the embodiment where a polyurethane or poly(ureaurethane) is being formed having titania nanostructures incorporated into the polymer matrix, the first step can comprise mixing titanium iso-propoxide with a 1-10 wt % $H_2O_2$ solution and suitable polyurethane or poly(ureaurethane) precursors as discussed above. The $H_2O_2$ acts as an initiator for titania nanostructures; particularly, titania nanostructures in the anatase form. Optionally, polymers such as polyoxyethylene (20) sorbitan monooleate commercially available as Tween® 80 from ICI Ltd. (Bridgewater, N.J.) can be added to the solution to help stabilize the titania nanostructures.

In the second step, the titania nanostructures are formed from the precursor by heating the mixture to a temperature of up to 100° C.

In the third step, the precursor solution for the polymer is converted into polyurethane or poly(ureaurethane) as discussed in detail above.

In a non-limiting embodiment of the invention, polyurethane or poly(ureaurethane) having titania, alumina, or zirconia nanostructures incorporated into the matrix of the polymer can be used as an optical lens. A polymer with nanostructures having an acceptable size for optical lens applications can be determined using a "haze value". According to the present invention, an optical lens has a haze value of less than or equal to 0.5%, for example less than or equal to 0.2%, as measured using a Hazeguard System from BYK Gardner.

In a non-limiting embodiment of the invention, a polyurethane having ITO or ATO nanostructures incorporated into the polymer matrix is formed. Such a polymer can be formed in the following manner. In the first step, a precursor solution for the trimethylol propane, methylene bis(4-cyclohexylisocyanate) and thiodiethanol is mixed with a precursor for ITO or ATO nanostructures.

A suitable precursor solution for the polyurethane is trimethylol propane, methylene bis(4-cyclohexylisocyanate), thiodiethanol and 1,4-butanediol. Suitable precursors for ITO nanostructures include monobutyl tin tri-chloride and indium acetate. A suitable precursor for ATO nanostructures is antimony tri-chloride.

In the second step, ITO or ATO nanostructures are formed from the precursor. The nanostructure formation can be caused by adjusting the pH of the solution by introducing an agent, such as ammonia, into the mixture followed by heating the mixture. For ITO nanostructures, the ITO nanostructures start to form at pH>8. After the pH is adjusted, the mixture is heated to a temperature of up to 100° C. As discussed above, heating the mixture for a longer time period can increase the size of the nanostructures.

In the third step, the 1,4-butanediol is mixed into trimethylol propane, methylene bis(4-cyclohexylisocyanate), thiodiethanol as is well known in the art. For example, 1,4 butanediol, thiodiethanol, trimethylol propane (TMP), and DESMODUR® W can all be mixed into a vessel and heated to 180° F. The mixture is mixed under vacuum for approximately 15 minutes, and then a tin catalyst, such as dibutyltindilaurate or bismuth carboxylate, is added to the mixture in a 25 ppm concentration. The mixture is then cast into a glass mold and cured for at least 20 hours at 250° F. (121° C.) to form the polyurethane.

In a non-limiting embodiment, trimethylol propane, methylene bis(4-cyclohexylisocyanate), thiodiethanol having ITO or ATO nanostructures incorporated into the polymer matrix is used to form an anti-static coating for aircraft windows. The polymer with the nanostructures has an elastic modulus that is greater than that of the standard trimethylol propane, methylene bis(4-cyclohexylisocyanate)thiodiethanol without ITO/ATO nanoparticles.

In other non-limiting embodiments, the reinforcement material is a nanostructural reinforcement material formed in situ by swelling the polyurethane in a solvent comprising a precursor for the nanostructures, and forming nanostructures in the matrix of the polyurethane from the precursor of the nanostructures. Non-limiting examples of suitable solvents for mild swelling of the polymer include methanol, propylene glycol methyl ether such as DOWANOL PM (commercially available from Dow Chemical Co. of Midland, Mich.), diacetone alcohol, 2-propanol, 1-propanol and acetylpropanol.

A polymer with nanostructures having an acceptable size for the aircraft window application can be determined using a "haze value". According to the present invention, a laminated aircraft window has a haze value of less than or equal to about 1%, for example less than or equal to about 0.5%, as measured using a Hazeguard System from BYK Gardner.

In some non-limiting embodiments of the present invention, the reinforcing materials have a hardness value greater than the hardness value of materials that can abrade a polymeric coating or a polymeric substrate. Examples of materials that can abrade the polymeric coating or polymeric substrate include, but are not limited to, dirt, sand, rocks, glass, carwash brushes, and the like. The hardness values of the particles and the materials that can abrade the polymeric coating or polymeric substrate can be determined by any conventional hardness measurement method, such as Vickers or Brinell hardness, or can be determined according to the original Mohs' hardness scale which indicates the relative scratch resistance of the surface of a material on a scale of one to ten. The Mohs' hardness values of several non-limiting examples of particles formed from inorganic materials suitable for use in the present invention are given in Table 1 below.

TABLE A

| Particle material | Mohs' hardness (original scale) |
|---|---|
| Boron nitride | $2^1$ |
| Graphite | $0.5-1^2$ |
| Molybdenum disulfide | $1^3$ |
| Talc | $1-1.5^4$ |
| Mica | $2.8-3.2^5$ |
| Kaolinite | $2.0-2.5^6$ |
| Gypsum | $1.6-2^7$ |
| Calcite (calcium carbonate) | $3^8$ |
| Calcium fluoride | $4^9$ |
| Zinc oxide | $4.5^{10}$ |
| Aluminum | $2.5^{11}$ |
| Copper | $2.5-3^{12}$ |
| Iron | $4-5^{13}$ |
| Gold | $2.5-3^{14}$ |
| Nickel | $5^{15}$ |
| Palladium | $4.8^{16}$ |
| Platinum | $4.3^{17}$ |
| Silver | $2.5-4^{18}$ |
| Zinc sulfide | $3.5-4^{19}$ |

[1] K. Ludema, *Friction, Wear, Lubrication*, (1996) at page 27, incorporated by reference herein.
[2] R. Weast (Ed.), *Handbook of Chemistry and Physics*, CRC Press (1975) at page F-22.
[3] R. Lewis, Sr., *Hawley's Condensed Chemical Dictionary*, (12th Ed. 1993) at page 793, incorporated by reference herein.
[4] *Hawley's Condensed Chemical Dictionary*, (12th Ed. 1993) at page 1113, incorporated by reference herein.
[5] *Hawley's Condensed Chemical Dictionary*, (12th Ed. 1993) at page 784, incorporated by reference herein.
[6] *Handbook of Chemistry and Physics* at page F-22.
[7] *Handbook of Chemistry and Physics* at page F-22.
[8] *Friction, Wear, Lubrication* at page 27.
[9] *Friction, Wear, Lubrication* at page 27.
[10] *Friction, Wear, Lubrication* at page 27.
[11] *Friction, Wear, Lubrication* at page 27.
[12] *Handbook of Chemistry and Physics* at page F-22.
[13] *Handbook of Chemistry and Physics* at page F-22.
[14] *Handbook of Chemistry and Physics* at page F-22.
[15] *Handbook of Chemistry and Physics* at page F-22.
[16] *Handbook of Chemistry and Physics* at page F-22.
[17] *Handbook of Chemistry and Physics* at page F-22.
[18] *Handbook of Chemistry and Physics* at page F-22.
[19] R. Weast (Ed.), *Handbook of Chemistry Physics*, CRC Press (71.sup.st Ed. 1990) at page 4-158

In some non-limiting embodiments, the reinforcing material can be formed from a primary material that is coated, clad or encapsulated with one or more secondary materials to form a composite material that has a harder surface. In other non-limiting embodiments, reinforcement particles can be formed from a primary material that is coated, clad or encapsulated with a differing form of the primary material to form a composite material that has a harder surface.

In some non-limiting examples, inorganic particles formed from an inorganic material such as silicon carbide or aluminum nitride can be provided with a silica, carbonate or nanoclay coating to form a useful composite particle. In other nonlimiting examples, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. One non-limiting example of such composite particles is DUAL-ITE™, which is a synthetic polymeric particle coated with calcium carbonate that is commercially available from Pierce and Stevens Corporation of Buffalo, N.Y.

In some non-limiting embodiments, the particles are formed from solid lubricant materials. As used herein, the term "solid lubricant" means any solid used between two surfaces to provide protection from damage during relative movement and/or to reduce friction and wear. In some non-limiting embodiments, the solid lubricants are inorganic solid lubricants. As used herein, "inorganic solid lubricant" means that the solid lubricants have a characteristic crystalline habit which causes them to shear into thin, flat plates which readily slide over one another and thus produce an antifriction lubricating effect. See R. Lewis, Sr., *Hawley's Condensed Chemical Dictionary*, (12th Ed. 1993) at page 712, incorporated by reference herein. Friction is the resistance to sliding one solid over another. F. Clauss, *Solid Lubricants and Self-Lubricating Solids* (1972) at page 1, incorporated by reference herein.

In some non-limiting embodiments, the particles have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid particles having a lamellar fullerene (i.e., buckyball) structure can also be useful in the present invention.

Non-limiting examples of suitable materials having a lamellar structure that are useful in forming the particles of the present invention include boron nitride, graphite, metal dichalcogenides, mica, talc, gypsum, kaolinite, calcite, cadmium iodide, silver sulfide, and mixtures of any of the foregoing. Suitable metal dichalcogenides include molybdenum disulfide, molybdenum diselenide, tantalum disulfide, tantalum diselenide, tungsten disulfide, tungsten diselenide, and mixtures of any of the foregoing.

In some non-limiting embodiments, the reinforcing material can be glass fiber strands. The glass fiber strands are formed from glass filaments, a class of filaments generally accepted to be based upon oxide compositions such as silicates selectively modified with other oxide and non-oxide compositions. Useful glass filaments can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. As used herein, the term "fiberizable" means a material capable of being formed into a generally continuous filament, fiber, strand or yarn. As used herein, "E-glass derivatives" means glass compositions that include minor amounts of fluorine and/or boron or can be fluorine-free and/or boron-free. Furthermore, as used herein, "minor amounts of fluorine" means less than 0.5 weight percent fluorine, or less than 0.1 weight percent fluorine, and "minor amounts of boron" means less than 5 weight percent boron, or less than 2 weight percent boron. Basalt and mineral wool are examples of other fiberizable glass materials useful in the present invention. Non-limiting examples of suitable non-glass fiberizable inorganic materials include ceramic materials such as silicon carbide, carbon, quartz, graphite, mullite, aluminum oxide and piezoelectric ceramic materials. In some non-limiting embodiments, the glass filaments are formed from E-glass. Such compositions and methods of making glass filaments therefrom are well known to those skilled in the art, such glass compositions and fiberization methods are disclosed in K. Loewenstein, *The Manufacturing Technology of Continuous Glass Fibres*, (3d Ed. 1993) at pages 30-44, 47-60, 115-122 and 126-135, incorporated by reference herein.

The glass fibers can have a nominal filament diameter ranging from about 5.0 to about 30.0 micrometers (corresponding to a filament designation of D through Y). Typically, the glass fiber strands have a strand coating composition which is compatible with the composition applied to at least a portion of surfaces of the glass fiber strands, such as an essentially dried residue. The glass fiber strand reinforcements can be used in chopped form, generally continuous strands, mats, etc.

The particles also can be hollow particles formed from materials selected from polymeric and nonpolymeric inorganic materials, polymeric and nonpolymeric organic materials, composite materials, and mixtures of any of the foregoing. Non-limiting examples of suitable materials from which the hollow particles can be formed are described above. In some embodiments, the hollow particles are hollow glass spheres.

In some non-limiting embodiments, the reinforcing materials can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

In some non-limiting embodiments, the particles can be formed from inorganic polymeric materials. Nonlimiting examples of useful inorganic polymeric materials include polyphosphazenes, polysilanes, polysiloxane, polygermanes, polymeric sulfur, polymeric selenium, silicones, and mixtures of any of the foregoing. A non-limiting example of a particle formed from an inorganic polymeric material suitable for use in the present invention is TOSPEARL[1], which is a particle formed from cross-linked siloxanes and is commercially available from Toshiba Silicones Company, Ltd. of Japan.

[1] See R. J. Perry "Applications for Cross-Linked Siloxane Particles" *Chemtech.* February 1999 at pp. 39-44.

The particles can be formed from synthetic, organic polymeric materials that are chemically different from the polyurethane or poly(ureaurethane). Nonlimiting examples of suitable organic polymeric materials include, but are not limited to, thermoset materials and thermoplastic materials. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

In some non-limiting embodiments, the polymeric organic material is a (meth)acrylic polymer or copolymer comprising at least one functional group selected from the group consisting of silane groups, carboxyl groups, hydroxyl groups and amide groups. In some non-limiting embodiments, these (meth)acrylic polymer or copolymers can be present as nanofibers having a diameter up to about 5000 nm, such as about 5 to about 5000 nm, or less than the wavelength of visible light, for example 700 nanometers or less, such as about 50 to about 700 nanometers. The fibers may have a ribbon shape and, in this case, diameter is intended to mean the largest dimension of the fiber. Typically the width of the ribbon shaped fibers can be up to about 5000 nanometers, such as about 500 to about 5000 nm and the thickness up to about 200 nm, such as about 5 to about 200 nm. The fibers can be prepared by electrospinning a ceramic melt, a polymer melt or a polymer solution.

Suitable (meth)acrylic polymers can be made by addition polymerization of unsaturated polymerizable materials that contain silane groups, carboxyl groups, hydroxyl groups and amine or amide groups. Non-limiting examples of useful silane groups include groups that have the structure Si—$X_n$ (wherein n is an integer having a value ranging from 1 to 3 and X is selected from chlorine, alkoxy esters, and/or acyloxy esters). Such groups hydrolyze in the presence of water including moisture in the air to form silanol groups that condense to form —Si—O—Si— groups. The (meth)acrylic polymer can contain hydroxyl functionality, for example by using a hydroxyl functional ethylenically unsaturated polymerizable monomer such as hydroxyalkyl esters of (meth)acrylic acids having from 2 to 4 carbon atoms in the hydroxyalkyl group. The (meth)acrylic polymer optionally contains nitrogen functionality introduced from nitrogen-containing ethylenically unsaturated monomers, such as amines, amides, ureas, imidazoles and pyrrolidones. Further discussion of such (meth)acrylic polymers and fiberizing methods are disclosed in U.S. patent application Ser. No. 11/610,755 entitled "Transparent Composite Articles" and U.S. patent application Ser. No. 11/610,651 entitled "Organic-Inorganic Polymer Composites and Their Preparation by Liquid Infusion", each filed on Dec. 14, 2006, and incorporated by reference herein.

Non-limiting examples of suitable fiberizable organic materials include cotton, cellulose, natural rubber, flax, ramie, hemp, sisal and wool. Non-limiting examples of suitable fiberizable organic polymeric materials include those formed from polyamides (such as nylon and aramids), (such as KEVLAR™ aramid fibers), thermoplastic polyesters (such as polyethylene terephthalate and polybutylene terephthalate), acrylics (such as polyacrylonitriles), polyolefins, polyurethanes and vinyl polymers (such as polyvinyl alcohol). Non-glass fiberizable materials useful in the present invention and methods for preparing and processing such fibers are discussed at length in the *Encyclopedia of Polymer Science and Technology*, Vol. 6 (1967) at pages 505-712, which is specifically incorporated by reference herein.

It is understood that blends or copolymers of any of the above materials and combinations of fibers formed from any of the above materials can be used in the present invention, if desired. Moreover, the term "strand" can encompass at least two different fibers made from differing fiberizable materials. As used herein, the term "fiberizable" means a material capable of being formed into a generally continuous filament, fiber, strand or yarn.

Suitable thermoplastic fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507-508.

Non-limiting examples of useful polyamide fibers include nylon fibers such as nylon 6 (a polymer of caprolactam), nylon 6,6 (a condensation product of adipic acid and hexamethylenediamine), nylon 12 (which can be made from butadiene) and nylon 10, polyhexamethylene adipamide, polyamide-imides and aramids such as KEVLAR™, which is commercially available from E. I. duPont de Nemours, Inc. of Wilmington, Del.

Non-limiting examples of useful thermoplastic polyester fibers include those composed of polyethylene terephthalate and polybutylene terephthalate.

Non-limiting examples of useful fibers formed from acrylic polymers include polyacrylonitriles having at least about 35% by weight acrylonitrile units, or at least about 85% by weight, which can be copolymerized with other vinyl monomers such as vinyl acetate, vinyl chloride, styrene, vinylpyridine, acrylic esters or acrylamide. See *Encyclopedia of Polymer Science and Technolog*, Vol. 6 at 559-561.

Non-limiting examples of useful polyolefin fibers are generally composed of at least 85% by weight of ethylene, propylene, or other olefins. See *Encyclopedia of Polymer Science and Technology*. Vol. 6 at 561-564.

Non-limiting examples of useful fibers formed from vinyl polymers can be formed from polyvinyl chloride, polyvinylidene chloride, polytetrafluoroethylene, and polyvinyl alcohol.

Further non-limiting examples of thermoplastic fiberizable materials believed to be useful in the present invention include fiberizable polyimides, polyether sulfones, polyphenyl sulfones, polyetherketones, polyphenylene oxides, polyphenylene sulfides and polyacetals.

It is understood that blends or copolymers of any of the above materials and combinations of fibers formed from any of the above materials can be used in the present invention, if desired. Also, the thermoplastic fibers can have an antistatic agent coated thereon.

Suitable reinforcing materials can include mats or fabrics comprised of any of the fibers discussed above. An increasingly popular process for forming composites is by compression molding or stamping a moldable sheet of a thermoplastic resin reinforced with fibers such as a glass fiber mat, often referred to as glass mat thermoplastics or "GMT". These composite sheets can be used to form articles such as automobile components and housings for computers. An example of a commercially successful GMT sheet is the AZDEL® moldable composite sheet which is formed by extruding layers of polypropylene resin sheet with needled mats of continuous glass fiber strand. The AZDEL® composite sheet is commercially available from Azdel, Inc. of Shelby, N.C.

For reinforcing a resin matrix material, U.S. Pat. Nos. 3,664,909, 3,713,962 and 3,850,723 disclose fibrous mats of unstranded filaments which can be layered with reinforcing mats of fiber strands.

U.S. Pat. No. 4,847,140 discloses an insulation medium formed by needling a loose layer of inorganic fibers, such as glass, bonded together by a carrier web which is a blend of inorganic and organic fibers, with the carrier web comprising up to about 10% by weight organic fibers.

U.S. Pat. Nos. 4,948,661, 5,011,737, 5,071,608 and 5,098,624 disclose fiber reinforced thermoplastic molded products produced by intimately blending reinforcing glass fibers and thermoplastic fibers into a web and heating the web to the melting point of the thermoplastic fibers while applying pressure to the web to press the web into a consolidated structure.

A non-limiting example of a useful polypropylene spunbonded fiber mat is commercially available from Fiberweb N.A., Inc. of Simpsonville, S.C.

Nonlimiting examples of suitable thermoset reinforcement materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle.

The concentration of reinforcement particles present in the cured article or coating can be determined, if desired, by a variety of analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy.

In some non-limiting embodiments, the present invention is directed to cured compositions as previously described wherein the reinforcement particles have an average particle size of less than about 100 microns prior to incorporation into the composition, or less than about 50 microns prior to incorporation into the composition. In other non-limiting embodiments, the present invention is directed to cured compositions as previously described wherein the reinforcement particles have an average particle size ranging from about 1 to less than about 1000 nanometers prior to incorporation into the composition, or about 1 to about 100 nanometers prior to incorporation into the composition.

In other non-limiting embodiments, the present invention is directed to cured compositions as previously described wherein the particles have an average particle size ranging from about 5 to about 50 nanometers prior to incorporation into the composition, or about 5 to about 25 nanometers prior to incorporation into the composition.

In an embodiment where the average particle size of the particles is at least about one micron, the average particle size can be measured according to known laser scattering techniques. For example the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In an embodiment of the present invention wherein the size of the particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image, and a description of one such method is disclosed in the examples set forth below. In one nonlimiting embodiment of the present invention, a TEM image with 105,000× magnification is produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the reinforcing material can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), *Handbook of Fillers and Plastics* (1987) at pages 9-10, incorporated by reference herein.

It will be recognized by one skilled in the art that mixtures of one or more particles having different average particle sizes can be incorporated into the compositions in accordance with the present invention to impart the desired properties and characteristics to the compositions. For example particles of varying particle sizes can be used in the compositions according to the present invention.

In some non-limiting embodiments, the reinforcing material(s) are present in the composition in an amount ranging from about 0.01 to about 75 weight percent, or about 25 to about 50 weight percent, based on total weight of the components which form the composition.

Reinforcement particles can be present in a dispersion, suspension or emulsion in a carrier. Nonlimiting examples of suitable carriers include, but are not limited to, water, solvents, surfactants, or a mixture of any of the foregoing. Nonlimiting examples of suitable solvents include, but are not limited to, mineral oil, alcohols such as methanol or butanol, ketones such as methyl amyl ketone, aromatic hydrocarbons such as xylene, glycol ethers such as ethylene glycol monobutyl ether, esters, aliphatics, and mixtures of any of the foregoing.

Dispersion techniques such as grinding, milling, microfluidizing, ultrasounding, or any other dispersing techniques well known in the art of coatings or molded article formulation can be used. Alternatively, the particles can be dispersed by any other dispersion techniques known in the art. If desired, the particles in other than colloidal form can be post-added to an admixture of other composition components and dispersed therein using any dispersing techniques known in the art.

A further embodiment of the present invention is directed to a coated automobile substrate comprising an automobile substrate and a cured composition coated over at least a portion of the automobile substrate, wherein the cured composition is selected from any of the foregoing compositions. In yet another embodiment, the present invention is directed to a method of making a coated automobile substrate comprising providing an automobile substrate and applying over at least a portion of the automotive substrate a coating composition selected from any of the foregoing compositions. Again, the components used to form the cured compositions in these embodiments can be selected from the components discussed above, and additional components also can be selected from those recited above.

Suitable flexible elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM"), and thermoplastic polyurethane ("TPU").

Nonlimiting examples of thermoset materials useful as substrates for coating with compositions of the present invention include polyesters, epoxides, phenolics, polyurethanes such as "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

Nonlimiting examples of suitable metal substrates useful as substrates for coatings with compositions of the present invention include ferrous metals (e.g., iron, steel, and alloys thereof), nonferrous metals (e.g., aluminum, zinc, magnesium, and alloys thereof), and mixtures of any of the foregoing. In the particular use of automobile components, the substrate can be formed from cold rolled steel, electrogalvanized steel such as hot dip electrogalvanized steel, electrogalvanized iron-zinc steel, aluminum, and magnesium.

When the substrates are used as components to fabricate automotive vehicles (including, but not limited to, automobiles, trucks and tractors) they can have any shape, and can be selected from the metallic and flexible substrates described above. Typical shapes of automotive body components can include bodies (frames), hoods, doors, fenders, mirror housings, bumpers, and trim for automotive vehicles.

In embodiments of the present invention directed to automotive applications, the cured compositions can be, for example, the electrodeposition coating, the primer coating, the basecoat and/or the topcoat. Suitable topcoats include monocoats and basecoat/clearcoat composites. Monocoats are formed from one or more layers of a colored coating composition.

In some non-limiting embodiments, the polyurethanes and poly(ureaurethane)s of Groups A-P can be reinforced with fiberglass to form a composite article, such as for example a windmill blade, blast-resistant panels, bullet resistant panels and radomes.

Group R

In some non-limiting embodiments, the polyurethanes and poly(ureaurethane)s of Groups A-Q can be useful as one or more layers in a multilayer article. If desired, the multilayered article can be laminated.

In some non-limiting embodiments, the polymer is cut while warm, granulated, extruded and/or milled and calendered to sheets and assembled into laminates and aged for several days, a week, or longer at ambient temperature (about 25° C.).

In some non-limiting embodiments, the present invention provides articles having multiple layers of polyurethanes and/or poly(ureaurethanes) of the present invention. The thickness of each layer and overall thickness of the article can vary as desired. Non-limiting examples of suitable thicknesses of the layers and articles are discussed below. The layers can be laminated together, if desired.

In some non-limiting embodiments, the present invention provides multilayered articles or laminates comprising: (a) at least one layer of the polyurethane(s) or poly(ureaurethane)s of the present invention as discussed above; and (b) at least one layer of a substrate selected from the group consisting of paper, glass, ceramic, wood, masonry, textile, metal or organic polymeric material and combinations thereof. In some non-limiting embodiments, the layer (a) of polyurethane(s) or poly(ureaurethane)s of the present invention is chemically or physically different from the organic polymeric material of layer (b), i.e., it has at least one different atom, arrangement of atoms or configuration. In other embodiments, two or more layers of the same or similar polyurethane(s) or poly(ureaurethane)s of the present invention can be used.

In some non-limiting embodiments, the substrate is an optically clear polymerized organic material prepared from a thermoplastic polycarbonate resin, such as the carbonate-linked resin derived from bisphenol A and phosgene, which is sold under the trademark LEXAN® by GE Plastics of Pittsfield, Mass.; a polyester, such as the material sold under the trademark MYLAR by E.I. duPont de Nemours Co. of Wilmington, Del.; a poly(methyl methacrylate), such as the material sold under the trademark PLEXIGLAS by Altuglas International of Philadelphia, Pa.; polyhexylene-polycarbonate-based polyurethanes; polymerizates of a polyol(allyl carbonate) monomer, especially diethylene glycol bis(allyl carbonate), which monomer is sold under the trademark CR-39 by PPG Industries, Inc., and polymerizates of copolymers of a polyol (allyl carbonate), e.g., diethylene glycol bis(allyl carbonate), with other copolymerizable monomeric materials, such as copolymers with vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polymers of members of the group consisting of diethylene glycol dimethacrylate monomers, diisopropenyl benzene monomers, and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile. In some non-limiting embodiments, the article comprises at least one layer of polyurethane or polyureaurethane of the present invention and at least one layer of polycarbonate.

A non-limiting example of a suitable polyhexylene-polycarbonate-based polyurethane can be prepared as follows: a hydroxyl-terminated prepolymer is made from 0.2 equivalents of a 1000 molecular weight hexanediol-based carbonate diol (PC-1733 commercially available from Stahl), 0.8 equivalents of 1,5 pentanediol, and 1.0 equivalents of trimethylhexanediisocyanate. The components are heated to 180° F. (82° C.) and using 100 ppm of dibutyltin dilaurate as a catalyst. The prepolymer has an equivalent weight of 218 grams/equivalent. The trimeric hydroxyl terminated prepolymer is dissolved into cyclohexanone solvent and 1 equivalent of Desmodur 3390 (triisocyanurate trimer of hexanediisocyanate) is added as a crosslinker and mixed. The coating solution is 95% solids with a viscosity of 3000 centipoise. The solution can be flow-coated onto any bisphenol A polycarbonate such as Lexan and cured in an oven at 250° F. (121° C.) for 4 hours. The coating thickness can range from 2 to 5 mils thick and is elastomeric.

The number and thickness of the layers can vary as desired. For example, the thickness of a single layer can range from about 0.1 mm to about 60 cm, or about 2 mm to about 60 cm, or about 0.3 cm to about 2.5 cm. The number of layers can range from 2 to 10, or 2 to 4, as desired. The overall thickness of the multilayer article or laminate can range from about 2 mm to about 15 cm or more, or about 2 mm to about 5 cm. For ballistics applications, the overall thickness of the polyurethane or poly(ureaurethane) of the present invention can range from about 2 mm to about 15 cm or more, or about 2 mm to about 5 cm. Also, for ballistics applications suitable substrates for layering with the polyurethane(s) and/or poly(ureaurethane)s of the present invention include polyesters, polycarbonates, or polyether thermoplastic elastomers, for example. The layer(s) of polyurethane or poly(ureaurethane) of the present invention can be positioned on the outside of the laminate (facing the potential ballistic impact), on the inside of the laminate, or elsewhere in between.

Groups A-R

In some non-limiting embodiments, polyurethanes and poly(ureaurethane)s of the present invention can have a hard segment content of about 10 to about 100 weight percent, or about 20 to about 80 weight percent, or about 30 to about 75 weight percent. Hard segment calculation is discussed in detail above.

In some non-limiting embodiments, the polyurethanes and poly(ureaurethane)s of the present invention generally have a urethane content ($W_u$) of about 20 to about 40 weight percent, or about 21 to about 36 weight percent, or about 30 to about 40 weight percent. The urethane content is the percentage by weight of the urethane linkages present in the polymer and can be calculated by determining the total number of equivalents, and from this the total weight of all reactants, and dividing the total weight of the urethane linkages obtainable from these reactants by the total weight of the reactants themselves. The following example will further explain the calculation. In Example I, Formulation 1 which follows, a polyurethane article according to the invention was prepared by reacting 0.7 equivalents of 1,4-butanediol, 0.3 equivalents of trimethylolpropane and one equivalent of 4,4'-methylene-bis-(cyclohexyl isocyanate) (DESMODUR W). The equivalent weight of the 1,4-butanediol is 45, the equivalent weight of the trimethylolpropane is 44.7 (corrected for impurities) and the equivalent weight of the DESMODUR W is 131.2. Therefore, the actual weight of ingredients used is 31.54 parts by weight of 1,4-butanediol, 13.2 parts by weight of trimethylolpropane and 131.2 parts by weight of DESMODUR W or a total reactant weight of 175.9 parts by weight. One equivalent of DESMODUR W will yield one equivalent of urethane linkage. The equivalent weight of a urethane linkage is 59 so that the total weight of the urethane linkages determined by multiplying the equivalent weight by the number of equivalents would also be 59. Thus, the total weight of the urethane linkage, 59, divided by the total weight of the reactants, 175.9, multiplied by 100 to convert to percentages would give a percentage by weight of urethane linkage of 33.49 percent by weight.

In an analogous manner, the percentage by weight of cyclic structures ($W_c$) (such as for example cyclohexyl) can be calculated. In Example I, Formulation 1, the only material contributing cyclohexyl moieties is the DESMODUR W. One equivalent of DESMODUR W would yield one equivalent of cyclohexyl moiety which has an equivalent weight of 81. Thus, the total weight of cyclohexyl moiety would be equal to 81 and this divided by the total weight of reactants or 175.9 would yield a $W_c$ of 46 percent. In some non-limiting embodiments, the polyurethanes and poly(ureaurethane)s of the present invention can have a cyclic content of about 10 to about 80 weight percent, about 20 to about 70 weight percent, about 30 to about 70 weight percent, or about 30 to about 60 weight percent.

In some non-limiting embodiments, the resulting polyurethanes or poly(ureaurethane)s of the present invention when cured can be solid, and essentially transparent. In some non-limiting embodiments, the polyurethane can be partially cured or fully cured such that essentially no further reaction occurs.

In some non-limiting embodiments, the polyurethanes and poly(ureaurethane)s of the present invention generally have a number average molecular weight, as estimated from inherent viscosity measurements, of at least about 20,000 grams/mole, or ranging from about 20,000 to about 1,000,000 grams/mole, or ranging from about 20,000 to about 800,000 grams/mole. The polyurethanes and poly(ureaurethane)s of the present invention generally have an average molecular weight per crosslink of at least about 500 grams per mole, in some embodiments ranging from about 500 and about 15,000 grams/mole, or ranging from about 1800 and about 15,000 grams/mole. The polyurethanes and poly(ureaurethane)s of the present invention generally have a crosslink density of at least about 11,000 grams per mole.

In some non-limiting embodiments, the polyurethane(s) and poly(ureaurethane)s of the present invention when cured can have low density. In some non-limiting embodiments, the density can be from at least 0.9 to less than 1.25 grams/cm$^3$, or from at least 1.0 to less than 1.45 grams/cm$^3$, or from 1.08 to 1.37 grams/cm$^3$, or from 1.08 to 1.13. In some non-limiting embodiments, the density of polyurethanes and poly(ureaurethane)s of the present invention can be less than LEXAN (density about 1.21 g/cm$^3$) and conventional stretched acrylic (density about 1.18 g/cm$^3$). The density can be measured using a DensiTECH instrument manufactured by Tech Pro, Incorporated. In some non-limiting embodiments, the density is measured in accordance with ASTM D 792-00.

Also, some optically clear polyurethanes and poly(ureaurethane)s upon heating can exhibit a low temperature exotherm at about −70° C. (differential thermal analysis can be determined using a du Pont 900 thermal analyzer), and about 11° C., indicating that the polymers are generally amorphous.

In some non-limiting embodiments, softening points of about 65° C. to about 200° C., melting points of about 80° C. to about 220° C., and decomposition temperatures of about 280° C. to about 330° C. under nitrogen atmosphere are typical.

The polyurethanes and poly(ureaurethane)s of the present invention can be used to form articles having good impact resistance or flexibility, high impact strength, high tensile strength, resistance to heat distortion, resistance to deflection under pressure, good hardness, high Young's Modulus, high K factor, good solvent resistance, good clarity or transparency, high light transmittance, low haze, good weatherability, good energy absorption, good moisture stability, good ultraviolet light stability, and/or good ballistics resistance.

In some non-limiting embodiments, the polyurethanes and poly(ureaurethane)s of the present invention can be used to form articles having a Gardner Impact strength of at least about 100 in-lb, or at least about 200 in-lb, or at least about 400 in-lb (45 Joules), or at least about 500 in-lb or at least about 600 in-lb, according to ASTM-D 5420-04. Non-limiting examples of suitable methods and equipment for measuring impact resistance and impact strength are discussed in detail above.

In some embodiments, the heat distortion temperature of cured articles of the invention can be at least about 190° F. (88° C.) or above about 200° F. (93° C.), as determined according to ASTM-D-648.

Hardness of the polyurethanes and poly(ureaurethanes) can be determined by the Shore hardness and, accordingly, in some embodiments articles of the invention have a Shore D hardness at room temperature (25° C.) using a Shore D durometer of at least about 75 or at least about 80.

Tensile strength at yield or break can be measured according to ASTM-D 638-03. In some non-limiting embodiments, the tensile strength at yield is at least about 6,800 lb/in$^2$ (47 MPa) according to ASTM-D 638-03, or about 6,800 to about 20,000 lb/in$^2$ (about 47 to about 138 MPa), or about 12,000 to about 20,000 lb/in$^2$ (about 83 to about 138 MPa).

Young's Modulus can be measured according to ASTM-D 638-03. In some non-limiting embodiments, the Young's Modulus is at least about 215,000 lb/in$^2$ (about 1482 MPa), or about 215,000 (about 1482 MPa) to about 600,000 lb/in$^2$ (about 4137 MPa), or about 350,000 (about 2413 MPa) to about 600,000 lb/in$^2$ (about 4137 MPa). For commercial airplane cabin window applications, when the cabin pressure is 10 psi (0.07 MPa) or more greater than the external pressure, the cabin windows can deflect into the airstream, thereby increasing noise and decreasing fuel efficiency. Higher values of Young's Modulus indicate increased stiffness and less tendency for the window to deflect into the airstream. In some non-limiting embodiments for aircraft window applications, the values of Young's Modulus can be at least about 350,000 (about 2413 MPa). In typical ballistics applications, the outer plies are glass, which is hard enough to deform a bullet by spreading the impact stress over a large area before it penetrates the underlying plies. A poly(ureaurethane) prepared according to Example A, Formulation 125, according to the present invention, having a thickness of about 0.125 inches (0.3 cm) flattened a 9 mm bullet fired at 1350 ft/sec (411 m/sec) from a distance of 20 feet (6.1 m). Though the ply broke into two cracked areas, it did not shatter over a large area like glass, which would provide greater visibility for an occupant to escape attack on a vehicle.

K factor is a measure of crack propagation. Crack propagation can be measured according to U.S. Dept. of Defense MIL-PRF-25690B (Jan. 29, 1993). In some non-limiting embodiments, the polyurethanes and poly(ureaurethane)s of the present invention have a K-Factor crack propagation resistance of at least about 1000 lb/in$^{3/2}$ (1,098,800 N/m$^{3/2}$), or about 1000 lb/in$^{3/2}$ (1,098,800 N/m$^{3/2}$) to about 4000 lb/in$^{3/2}$ (4,395,200 N/m$^{3/2}$), or about 2000 lb/in$^{3/2}$ (2,197,600 N/m$^{3/2}$) to about 4000 lb/in$^{3/2}$ (4,395,200 N/m$^{3/2}$).

Compositions suitable for use in automobile windshields meet the standard requirement of minimum light transmission of 70 percent or 86.5 percent or above (Illuminant A. Tungsten lamp 2,840° K.) and less than 2 percent haze (ANSI CODE Z-26.1, 1966, Test No. 18). The percent light transmission and percent haze can be measured by a Hunter Pivotable Sphere Haze Meter according to ASTM E903-82.

The polyurethanes and poly(ureaurethane)s of the present invention can have outstanding weather characteristics as measured by UV light stability and hydrolytic stability. Fade-O-Meter® exposure can be conducted according to ASTM G-25-70, Method A using a Fade-O-Meter, Type FDA-R, Serial No. F02951, manufactured by Atlas Electric Devices Co., Chicago, Ill. The light source can be a carbon arc lamp enclosed in a fused silica globe. The operating temperature of the Fade-O-Meter (black panel) can be 140° F. (60° C.) and the instrument operated with no water in the atomizing unit. Sample sizes are 2½ inches by 6 inches by ⅛ inch (6.35 cm by 15.24 cm by 0.32 cm). Weather-O-Meter® exposure can be conducted according to ASTM D-1499-64 using a Weather-O-Meter, Type DMC, Serial No. WO-1305. The type of light source can be a twin carbon arc lamp enclosed in a fused silica globe. The operating black panel temperature can be 140° F. (60° C.). The spray of water is deionized water at a temperature of about 70° F. (21° C.). The number and type of water spray nozzles which are used are four No. 50 nozzles. Alternatively, the UV resistance can be determined using QUV at 1000 hours according to ASTM G-53.

Abrasion resistance can be measured using a Taber Abrader having a CS-10F abrasion wheel with 500 grams of weight, for a sample size 3 inches by 3 inches by ⅛ inch (7.62 cm by 7.62 cm by 0.32 cm) according to ASTM D 1044-99. In some non-limiting embodiments, 100 cycles of Taber can result in 30% haze for stretched acrylic and from 5% to 40%, or from 10% to 15% or less than about 5% for the polyurethanes and poly(ureaurethane)s of the present invention.

The polyurethanes and poly(ureaurethane)s of the present invention can have good craze resistance to solvents and acids. Craze resistance can be measured according to U.S.

Dept. of Defense MIL-PRF-25690B (Jan. 29, 1993). Non-limiting examples of solvents and acids for Stress Craze Testing include methanol, isopropanol, ethylene glycol, propylene glycol, ethyl acetate, acetone, toluene, isobutyl acetate, Skydrol (hydraulic fluid), jet fuel such as JP-4, and 75% aqueous solution of sulfuric acid. In some non-limiting embodiments, uncoated articles prepared from the polyurethanes and poly(ureaurethane)s of the present invention have a stress craze resistance in organic solvent and 75% by weight aqueous solution of sulfuric acid of at least about 1000 psi (6.9 MPa) tensile stress, or about 1000 psi (6.9 MPa) to about 4000 psi (27.6 MPa), or about 2000 psi (13.8 MPa) to about 4000 psi (27.6 MPa). In some non-limiting embodiments, the polyurethanes and poly(ureaurethane)s of the present invention when uncoated can withstand 75% sulfuric acid for up to thirty days or any organic solvent at between 1000 psi (6.9 MPa) and 4000 psi (27.6 MPa) membrane stress.

In some non-limiting embodiments, the polyurethanes and poly(ureaurethane)s of the present invention when polymerized can produce a polymerizate having a refractive index of at least 1.55, or at least 1.56, or at least 1.57, or at least 1.58, or at least 1.59, or at least 1.60, or at least 1.62, or at least 1.65. In other non-limiting embodiments, the poly(ureaurethane)s of the present invention when polymerized can produce a polymerizate having an Abbe number of at least 32, or at least 35, or at least 38, or at least 39, or at least 40, or at least 44, or at least 59, or having an Abbe number of 59. The refractive index and Abbe number can be determined by methods known in the art such as American Standard Test Method (ASTM) Number D 542-00. Further, the refractive index and Abbe number can be determined using various known instruments. In a non-limiting embodiment of the present invention, the refractive index and Abbe number can be measured in accordance with ASTM D 542-00 with the following exceptions: (i) test one to two samples/specimens instead of the minimum of three specimens specified in Section 7.3; and (ii) test the samples unconditioned instead of conditioning the samples/specimens prior to testing as specified in Section 8.1. Further, in a non-limiting embodiment, an Atago, model DR-M2 Multi-Wavelength Digital Abbe Refractometer can be used to measure the refractive index and Abbe number of the samples/specimens.

Solid articles that can be prepared using the polyurethanes or poly(ureaurethanes) of the present invention include but are not limited to optical articles or lenses, photochromic articles or lenses, windows, transparencies, such as generally transparent windows, windshields, sidelights and backlights, aircraft or airplane transparencies, ballistic resistant articles, windmill components such as blades, and glazings.

In some non-limiting embodiments, the polymeric substrate material, including the coating composition applied thereto, may be in the form of optical elements such as windows, plano and vision correcting ophthalmic lenses, exterior viewing surfaces of liquid crystal displays, cathode ray tubes, e.g., video display tubes for televisions and computers, clear polymeric films, transparencies, e.g., windshields, aircraft transparencies, plastic sheeting, etc.

The polyurethanes and poly(ureaurethane)s of the present invention are desirable for a wide variety of uses. They are particularly useful as glazing materials for aircraft safety glass windows. Besides aircraft glazing, the polyurethanes and poly(ureaurethane)s of the invention in sheet form can be used in architectural applications and can be tinted or made opaque by pigmenting if desired. In such applications, the polyurethanes and poly(ureaurethane)s of the invention can be in sheet form and may be used alone or laminated to other materials as discussed above. The layers in the composite can have the same or different modulus values, as desired. Also, in some embodiments the polyurethanes and poly(ureaurethane)s of the invention can be used for optical lenses since they can be optically clear, unaffected by ultraviolet light and humidity exposure and abrasion resistant.

In other non-limiting embodiments, the polyurethanes and poly(ureaurethane)s of the present invention can be used as low thermal expansion substrates for deposition of conductive films for electrochromic applications, microwave absorbing films or low resistance films. In other non-limiting embodiments, a stretched acrylic substrate can be coated with a cyanoethyl acrylate/acrylic copolymer and further coated with the polyurethanes and poly(ureaurethane)s of the present invention.

The polyurethanes and poly(ureaurethane)s of the invention can be used in sheet form and can vary in thickness from about 2 to 500 mils, although somewhat thinner and thicker sheets can be used, depending upon the application. For aircraft use, in some embodiments the thickness can vary between ⅛ inch and ½ inch (0.32 cm to 1.27 cm).

In some non-limiting embodiments, an automobile window can be prepared from a thermoplastic polycarbonate resin, such as that sold under the trademark LEXAN, with the coating composition of the present invention applied as a weather layer on the outboard side of the window to increase the weatherability of the window. Alternatively, an automobile window can be prepared as a glass/LEXAN laminate, with the glass as the outboard layer and the coating composition of the present invention applied as a layer on the inboard side of the laminate.

The coating composition of the present invention can be applied to the substrate surface using any known coating procedures. Desirably, the coating composition is flow coated over the substrate surface by an automated flow-coating system in which the surface tension of the liquid pulls a coherent sheet of liquid across the substrate surface as the mechanical flow-coating device traverses across the substrate sheet. An automatic flow-coating device typically consists of an articulating arm that holds a nozzle connected to a pressure pot where the resin solution is held. The arm runs on a track above the sheet to be coated. The rate of flow of the liquid is adjusted using the pressure pot. The rate of traverse of the articulating arm is set using a potentiometer. The nozzle distance from the sheet is optimized and kept constant, via the articulating arm. This is particularly important for curved sheets. The thickness of the coating is determined by the initial viscosity of the resin solution and the rate of solvent evaporation. The evaporation rate is mainly controlled by the solvent choice and the cubic feet/minute airflow in the ventilated coating booth. Alternatively, the coating compositions can be prepared and cast in an appropriate mold to form a desired structure, which can then be applied as a layer to a suitable substrate, such as through a lamination process, or may used as a monolithic structure.

The coating composition generally may be applied to a substrate by itself as a transparent or pigmented monocoat, or as the pigmented base coat and/or transparent topcoat in a color-plus-clear composite coating as known to those skilled in the art. In some embodiments, the coating can be applied before the isocyanate and hydroxyl groups are fully reacted, for example by spraying the isocyanate and hydroxyl components separately through a mixing nozzle to apply the coating to the substrate. Alternatively, the coating can be partially cured in an oven and then subjected to a high moisture environment, such as high humidity or water spray, to further react and cure the coating. If desired, the coating composition may contain additional materials well known in the art of formulated surface coatings, such as surfactants, flow control agents, thixotropic agents, fillers, antigassing agents, organic cosolvents, catalysts, and other customary auxiliaries. These materials can constitute up to 40 percent by weight of the total weight of the coating composition.

As aforementioned, although the cured compositions can be formed from liquid coating compositions, they also can be formed from coating compositions formulated as powder coating compositions.

In another non-limiting embodiment, the cured compositions of the present invention also can be useful as decorative or protective coatings for pigmented plastic (elastomeric) substrates or mold-in-color ("MIC") plastic substrates. In these applications, the compositions can be applied directly to the plastic substrate or included in the molding matrix. Optionally, an adhesion promoter can first be applied directly to the plastic or elastomeric substrate and the composition applied as a topcoat thereover.

In another non-limiting embodiment, the compositions of the present invention also can be useful as a spalling shield layer, an anti-lacerative coating layer or a break-in resistant coating layer for glass or other substrates.

In a non-limiting embodiment, the polyurethane polymerizate of the present invention can be used to prepare photochromic articles. In a further embodiment, the polymerizate can be transparent to that portion of the electromagnetic spectrum which activates the photochromic substance(s), i.e., that wavelength of ultraviolet (UV) light that produces the colored or open form of the photochromic substance and that portion of the visible spectrum that includes the absorption maximum wavelength of the photochromic substance in its UV activated form, i.e., the open form.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The general mechanism responsible for the reversible change in color, i.e., a change in the absorption spectrum in the visible range of light (400-700 nm), exhibited by different types of photochromic compounds has been described and categorized. See John C. Crano, "Chromogenic Materials (Photochromic)", Kirk-Othmer Encyclopedia of Chemical Technology, Fourth Edition, 1993, pp. 321-332. The general mechanism for the most common classes of photochromic compounds, e.g., indolino spiropyrans and indolino spirooxazines, involves an electrocyclic mechanism. When exposed to activating radiation, these compounds transform from a colorless closed ring compound into a colored open ring species. In contrast, the colored form of fulgide photochromic compounds is produced by an electrocyclic mechanism involving the transformation of a colorless open ring form into a colored closed ring form.

A wide variety of photochromic substances can be used in the present invention. In a non-limiting embodiment, organic photochromic compounds or substances can be used. In alternate non-limiting embodiments, the photochromic substance can be incorporated, e.g., dissolved, dispersed or diffused into the polymerizate, or applied as a coating thereto.

In a non-limiting embodiment, the organic photochromic substance can have an activated absorption maximum within the visible range of greater than 590 nanometers. In a further non-limiting embodiment, the activated absorption maximum within the visible range can be from at least 590 to 700 nanometers. These materials can exhibit a blue, bluish-green, or bluish-purple color when exposed to ultraviolet light in an appropriate solvent or matrix. Non-limiting examples of such substances that are useful in the present invention include but are not limited to spiro(indoline) naphthoxazines and spiro(indoline)benzoxazines. These and other suitable photochromic substances are described in U.S. Pat. Nos. 3,562,172; 3,578,602; 4,215,010; 4,342,668; 5,405,958; 4,637,698; 4,931,219; 4,816,584; 4,880,667; 4,818,096.

In another non-limiting embodiment, the organic photochromic substances can have at least one absorption maximum within the visible range ranging from 400 and less than 500 nanometers. In a further non-limiting embodiment, the substance can have two absorption maxima within this visible range. These materials can exhibit a yellow-orange color when exposed to ultraviolet light in an appropriate solvent or matrix. Non-limiting examples of such materials can include certain chromenes, such as but not limited to benzopyrans and naphthopyrans. Many of such chromenes are described in U.S. Pat. Nos. 3,567,605; 4,826,977; 5,066,818; 4,826,977; 5,066,818; 5,466,398; 5,384,077; 5,238,931; and 5,274,132.

In another non-limiting embodiment, the photochromic substance can have an absorption maximum within the visible range ranging from 400 to 500 nanometers and an absorption maximum within the visible range ranging from 500 to 700 nanometers. These materials can exhibit color(s) ranging from yellow/brown to purple/gray when exposed to ultraviolet light in an appropriate solvent or matrix. Non-limiting examples of these substances can include certain benzopyran compounds having substituents at the 2-position of the pyran ring and a substituted or unsubstituted heterocyclic ring, such as a benzothieno or benzofurano ring fused to the benzene portion of the benzopyran. Further non-limiting examples of such materials are disclosed in U.S. Pat. No. 5,429,774.

In some non-limiting embodiments, the photochromic substance for use in the present invention can include photochromic organo-metal dithizonates, such as, but not limited to (arylazo)-thioformic arylhydrazidates, such as, but not limited to mercury dithizonates which are described, for example, in U.S. Pat. No. 3,361,706. Fulgides and fulgimides, such as, but not limited to 3-furyl and 3-thienyl fulgides and fulgimides which are described in U.S. Pat. No. 4,931,220 at column 20, line 5 through column 21, line 38, can be used in the present invention. The relevant portions of the aforedescribed patents are incorporated herein by reference.

In other non-limiting embodiments, the photochromic articles of the present invention can include one photochromic substance or a mixture of more than one photochromic substances. In other non-limiting embodiments, various mixtures of photochromic substances can be used to attain activated colors such as a near neutral gray or brown.

The amount of photochromic substance employed can vary. In some non-limiting embodiments, the amount of photochromic substance and the ratio of substances (for example, when mixtures are used) can be such that the polymerizate to which the substance is applied, or in which it is incorporated, exhibits a desired resultant color, e.g., a substantially neutral color such as shades of gray or brown when activated with unfiltered sunlight, i.e., as near a neutral color as possible given the colors of the activated photochromic substances. In some non-limiting embodiments, the amount of photochromic substance used can depend upon the intensity of the color of the activated species and the ultimate color desired.

In some non-limiting embodiments, the photochromic substance can be applied to or incorporated into the polymerizate by various methods known in the art. In a non-limiting embodiment, the photochromic substance can be dissolved or dispersed within the polymerizate. In other non-limiting embodiments, the photochromic substance can be imbibed into the polymerizate by methods known in the art. The term "imbibition" or "imbibe" includes permeation of the photochromic substance alone into the polymerizate, solvent assisted transfer absorption of the photochromic substance into a porous polymer, vapor phase transfer, and other such transfer mechanisms. In a non-limiting embodiment, the imbibing method can include coating the photochromic article with the photochromic substance; heating the surface of the photochromic article; and removing the residual coating from the surface of the photochromic article. In alternate non-limiting embodiments, the imbibition process can include immersing the polymerizate in a hot solution of the photochromic substance or by thermal transfer.

In some non-limiting embodiments, the photochromic substance can be a separate layer between adjacent layers of the polymerizate, e.g., as a part of a polymer film; or the photochromic substance can be applied as a coating or as part of a coating placed on the surface of the polymerizate.

The amount of photochromic substance or composition containing the same applied to or incorporated into the polymerizate can vary. In some non-limiting embodiments, the amount can be such that a photochromic effect discernible to the naked eye upon activation is produced. Such an amount can be described in general as a photochromic amount. In some non-limiting embodiments, the amount used can depend upon the intensity of color desired upon irradiation thereof and the method used to incorporate or apply the photochromic substance. In general, the more photochromic substance applied or incorporated, the greater the color intensity. In some non-limiting embodiments, the amount of photochromic substance incorporated into or applied onto a photochromic optical polymerizate can be from 0.15 to 0.35 milligrams per square centimeter of surface to which the photochromic substance is incorporated or applied.

In another embodiment, the photochromic substance can be added to the polyurethane prior to polymerizing and/or cast curing the material. In this embodiment, the photochromic substance used can be chosen such that it is resistant to potentially adverse interactions with, for example, the isocyanate present. Such adverse interactions can result in deactivation of the photochromic substance, for example, by trapping them in either an open or closed form.

Further non-limiting examples of suitable photochromic substances for use in the present invention can include photochromic pigments and organic photochromic substances encapsulated in metal oxides such as those disclosed in U.S. Pat. Nos. 4,166,043 and 4,367,170; organic photochromic substances encapsulated in an organic polymerizate such as those disclosed in U.S. Pat. No. 4,931,220.

The invention will be further described by reference to the following examples. Unless otherwise indicated, all parts and percentages are by weight.

EXAMPLES

The physical properties set forth below were measured as follows:

Light Transmittance (%) was measured according to ASTM E903-82;

Yellowness Index was measured according to ASTM D 1925-70;

Refractive index was measured on a multiple wavelength Abbe Refractometer Model DR-M2 manufactured by ATAGO Co., Ltd.; the refractive index of liquids were measured in accordance with ASTM-D 1218; and the refractive index of solids were measured in accordance with ASTM-D 542;

Density (grams/cm$^3$) of solids was measured in accordance with ASTM-D 792-00;

Taber Abrasion (% haze) was measured for up to 100 cycles using a Taber Abrader having a CS-10F abrasion wheel with 500 grams of weight, for a sample size 3 inches by 3 inches by ⅛ inch (7.62 cm by 7.62 cm by 0.32 cm) according to ASTM D 1044-99;

Bayer Abrasion (% haze) was measured for according to ASTM F 735-94 (Reapproved 2001);

K-Factor crack propagation resistance was measured according to U.S. Dept. of Defense MIL-PRF-25690B (Jan. 29, 1993).

Tensile strength at yield, percent elongation at yield, and Young's Modulus were measured at about 25° C. in accordance with ASTM-D 638-03;

Gardner Impact Strength was measured in accordance with ASTM-D 5420-04;

Dynatup Multiaxial Impact Strength was measured in accordance with ASTM-D 3763-02;

Shore D Hardness was measured in accordance with a Shore D durometer;

QUV-B testing was conducted for 333 hours or 1000 hours (as specified) according to ASTM G-53;

Glass transition temperature (Tg) was measured using Dynamic Mechanical Analysis; and Linear Coefficient of Thermal Expansion was measured using a duPont Thermomechanical analyzer (TMA) according to ASTM E 228-95.

The following abbreviations were used herein:

CHDM: 1,4-cyclohexane dimethanol;

Des N 3400: 60% hexamethylene diisocyanate dimer and 40% hexamethylene diisocyanate trimer commercially available from Bayer;

Des W or DESMODUR W: 4,4'-methylene-bis-(cyclohexyl isocyanate) commercially available from Bayer;

MDI: Methylene diphenyl 4,4'-diisocyanate;

PDO: 1,5-pentanediol;

Polycaprolactone diol: Tone 0210 polycaprolactone diol having a molecular weight of 1000 g/mol commercially available from Solvay;

Polycarbonate diol 1: KM-10-1733 polycarbonate diol prepared from hexanediol having a molecular weight of 1000 g/mol commercially available from Stahl (also known as PC-1733);

Polycarbonate diol 2: KM10-1667 polycarbonate diol prepared from hexanediol having a molecular weight of 1000 g/mol commercially available from Stahl;

TMDI: trimethylhexamethylene diisocyanate;

TMP: trimethylolpropane; and

TMXDI: meta-tetramethylxylylene diisocyanate.

Example A

Polyurethanes and poly(ureaurethane)s of Formulations 1 through 133 were prepared from the components in amounts listed in Tables 1-18.

The polyurethanes (formulations not including water) were prepared in a glass kettle under nitrogen blanket with stirring. The polyisocyanate was preheated to a temperature of about 100° C. before addition of the other components. The mixture was heated to a temperature of about 110° C. over about 10 minutes and maintained at this temperature for about 30 minutes.

The poly(ureaurethane)s (formulations including water) also were prepared in a glass kettle under nitrogen blanket with stirring. The polyisocyanate was preheated to a temperature of about 60° C.

For Formulations 123-127, 131, 132 and 133, the water was added to the polyisocyanate and the temperature was maintained for about 30 minutes to form an isocyanate functional urea prepolymer. The other components were added and the mixture was heated to a temperature of about 90° C. over about 10 minutes and maintained at this temperature for about 30 minutes.

For Formulations 128-130, about 0.15 equivalents of trimethylolpropane was added to the polyisocyanate and the temperature was maintained for about 120 minutes to form an isocyanate functional ureaurethane prepolymer. The other components were added and the mixture was heated to a temperature of about 110° C. over about 120 minutes and maintained at this temperature for about four hours.

Each of the polyurethane and poly(ureaurethane) mixtures was degassed to remove carbon dioxide and cast into a 12"×13"×0.125" (30.5 cm×33 cm×0.3 cm) casting cell which had been preheated to a temperature of about 121° C. The filled cell was then cured in an oven for a period of about 48 hours at about 121° C.

TABLE 1

| Formulation | Polyisocyanate | | Branched Polyol | | Diol | | Urethane Content | Cyclic Content | Molecular Weight per Crosslink | Hard Segment Content |
|---|---|---|---|---|---|---|---|---|---|---|
| No. | Type | Equivalents | Type | Equivalents | Type | Equivalents | (wt. %) | (wt. %) | (g/mole) | (wt. %) |
| 1 | Des W | 1.00 | TMP | 0.3 | 1,4-butanediol | 0.7 | 33.49 | 45.98 | 1762 | 70.00 |
| 2 | Des W | 1.00 | TMP | 0.3 | 1,5-pentanediol | 0.7 | 32.59 | 44.74 | 1810 | 71.00 |
| 3 | Des W | 1.00 | TMP | 0.6 | 1,5-pentanediol | 0.4 | 32.99 | 45.29 | 1788 | 41.00 |
| 4 | Des W | 1.00 | TMP | 0.3 | 1,6-hexanediol | 0.7 | 31.73 | 43.56 | 1860 | 71.00 |
| 5 | Des W | 1.00 | TMP | 0.3 | Xylene glycol<br>CHDM | 0.35<br>0.35 | 30.41 | 76.00 | 1940 | 71.00 |
| 6 | Des W | 1.00 | TMP | 0.3 | 1,5-pentanediol<br>CHDM | 0.35<br>0.35 | 31.37 | 58.00 | 1881 | 72.00 |
| 7 | Des W | 1.00 | TMP | 0.3 | 1,6-hexanediol<br>CHDM | 0.35<br>0.35 | 30.97 | 57.34 | 1905 | 72.00 |
| 8 | Des W | 1.00 | TMP | 0.3 | 1,8-octanediol | 0.7 | 30.14 | 41.37 | 1958 | 73.00 |
| 9 | Des W | 1.00 | TMP | 0.3 | 1,10-decanediol | 0.7 | 28.70 | 39.40 | 2056 | 74.00 |
| 10 | Des W | 1.00 | TMP | 0.3 | 1,8-octanediol<br>1,10-decanediol | 0.35<br>0.35 | 29.40 | 40.36 | 2007 | 74.00 |
| 11 | Des W | 1.00 | TMP | 0.8 | CHDM | 0.2 | 32.53 | 53.60 | 1814 | 22.00 |
| 12 | Des W | 1.00 | TMP | 0.3 | CHDM | 0.7 | 30.24 | 70.50 | 1951 | 73.00 |
| 13 | Des W | 1.00 | TMP | 0.8 | 1,5-pentanediol | 0.2 | 33.26 | 45.67 | 1774 | 21.00 |
| 14 | Des W | 1.00 | TMP | 0.3 | 1,7-heptanediol | 0.7 | 30.91 | 42.44 | 1909 | 72.00 |
| 15 | Des | 1.00 | TMP | 0.3 | 1,9-nonanediol | 0.7 | 29.40 | 40.36 | 2007 | 73.00 |
| 16 | Des W | 1.00 | TMP | 0.3 | 1,12-dodecanediol | 0.7 | 27.39 | 37.60 | 2154 | 75.60 |
| 17 | Des W | 1.00 | TMP | 0.6 | 1,10-decanediol | 0.4 | 30.59 | 42.00 | 1929 | 45.00 |
| 18 | Des W | 1.00 | TMP. | 0.4 | 1,10-decanediol<br>CHDM | 0.4<br>0.2 | 29.75 | 40.84 | 1983 | 45.00 |
| 19 | Des W | 1.00 | TMP | 0.3 | 1,10-decanediol<br>Polycarbonate diol 1 | 0.65<br>0.05 | 26.52 | 36.40 | 2225 | 63.00 |
| 20 | TMDI | 1.00 | TMP | 0.3 | CHDM | 0.7 | 34.91 | 47.92 | 1690 | 73.00 |

TABLE 2

| Formulation | Polyisocyanate | | Branched Polyol | | Diol | | Urethane Content | Cyclic Content | Molecular Weight per Crosslink | Hard Segment Content |
|---|---|---|---|---|---|---|---|---|---|---|
| No. | Type | Equivalents | Type | Equivalents | Type | Equivalents | (wt. %) | (wt. %) | (g/mole) | (wt. %) |
| 21 | Des W | 1.00 | TMP | 0.3 | 1,4-butanediol<br>Polycarbonate diol 1 | 0.6<br>0.1 | 27.54 | 37.81 | 2142 | 49.00 |
| 22 | Des W | 1.00 | TMP | 0.3 | Isopropylidene dicyclohexanol | 0.7 | 25.79 | 35.41 | 2287 | 77.00 |
| 23 | Des W | 1.00 | TMP | 0.4 | 1,10-decanediol<br>Polycarbonate diol 1 | 0.5<br>0.1 | 25.08 | 34.44 | 2352 | 46.00 |
| 24 | Des W | 1.00 | TMP | 0.3 | 1,10-decanediol<br>Polycarbonate diol 1 | 0.6<br>0.1 | 24.64 | 33.83 | 2395 | 46.00 |
| 25 | Des W | 1.00 | TMP | 0.3 | 1,4-butanediol<br>Polycarbonate diol 1 | 0.5<br>0.2 | 23.38 | 32.10 | 2523 | 54.00 |

TABLE 2-continued

| Formulation No. | Polyisocyanate Type | Equivalents | Branched Polyol Type | Equivalents | Diol Type | Equivalents | Urethane Content (wt. %) | Cyclic Content (wt. %) | Molecular Weight per Crosslink (g/mole) | Hard Segment Content (wt. %) |
|---|---|---|---|---|---|---|---|---|---|---|
| 26 | Des W | 1.00 | TMP | 0.4 | 1,10-decanediol | 0.6 | 29.30 | 40.23 | 2013 | 65.00 |
| 27 | Des W MDI | 0.5 0.5 | TMP | 0.3 | 1,10-decanediol | 0.7 | 29.13 | 39.99 | 2025 | |
| 28 | Des W | 1.00 | TMP | 0.3 | 1,12-cyclododecanediol | 0.7 | 27.48 | 37.72 | 2147 | |
| 29 | TMDI | 1.00 | TMP | 0.2 | CHDM | 0.8 | 34.35 | 47.16 | 1718 | 73.00 |
| 30 | | 1.00 | TMP | 0.3 | Decanediol Xylene Glycol | 0.45 0.25 | 29.34 | 40.28 | 2011 | |
| 31 | Des W TMDI | 0.3 0.7 | TMP | 0.3 | 1,10-decanediol | 0.7 | 31.50 | 43.24 | 1873 | |
| 32 | Des W | 0.8 | TMP | 0.3 | 1,10-decanediol Bis(2-hydroxyethyl) terephthalate | 0.5 0.2 | 27.62 | 37.92 | 2136 | 75.00 |
| 34 | Des W MDI | 0.75 0.25 | TMP | 0.3 | 1,10-decanediol | 0.7 | 28.91 | 39.69 | 2041 | |

TABLE 3

| Formulation No. | Polyisocyanate Type | Equivalents | Branched Polyol Type | Equivalents | Diol Type | Equivalents | Urethane Content (wt. %) | Cyclic Content (wt. %) | Molecular Weight per Crosslink (g/mole) | Hard Segment Content (wt. %) |
|---|---|---|---|---|---|---|---|---|---|---|
| 35 | Des W MDI | 0.85 0.15 | TMP | 0.3 | 1,10-decanediol | 0.7 | 28.83 | 39.58 | 2047 | |
| 36 | TMXDI | 1.00 | TMP | 0.3 | 1,4-butanediol | 0.7 | 35.31 | 48.47 | 1671 | |
| 37 | Des W | 1.00 | TMP | 0.3 | 1,10-decanediol 1,4-cyclohexane dimethanol | 0.6 0.1 | 28.91 | 39.69 | 2041 | 75.00 |
| 38 | Des W | 1.00 | TMP | 0.3 | 1,10-decanediol Isopropylidene Dicyclohexanol | 0.6 0.10 | 28.24 | 38.78 | 2089 | 74.00 |
| 39 | Des W | 1.00 | TMP | 0.3 | 1,8-octanediol 1,10-decanediol | 0.45 0.25 | 29.61 | 40.65 | 1993 | 70.00 |
| 40 | Des W | 1.00 | TMP | 0.35 | 1,10-decanediol | 0.65 | 29.00 | 39.81 | 2035 | 74.00 |
| 41 | Des W | 1.00 | TMP | 0.3 | 1,8-octanediol 1,10-decanediol | 0.4 0.30 | 29.50 | 40.50 | 2000 | |
| 42 | Des W | 1.00 | TMP | 0.3 | 1,8-octanediol 1,10-decanediol | 0.5 0.20 | 29.71 | 40.79 | 1986 | 73.00 |
| 43 | Des W | 1.00 | TMP | 0.3 | 1,4-butanediol 1,12-dodecanediol | 0.1 0.60 | 28.12 | 38.61 | 2098 | 75.00 |
| 44 | Des W | 1.00 | TMP | 0.3 | 1,10-decanediol Isopropylidene dicyclohexanol | 0.35 0.35 | 26.60 | 36.52 | 2218 | 76.00 |
| 45 | Des N 3400 | 1.00 | | | 1,10-decanediol | 1. | 20.93 | 28.73 | 2820 | |
| 46 | Des N 3400 | 1.00 | | | 1,10-decanediol CHDM | 0.8 0.20 | 21.15 | 29.04 | 2790 | |
| 47 | Prepolymer | 1.00 | | | 1,4-butanediol CHDM | 0.75 0.25 | 13.29 | 18.24 | 4441 | |

TABLE 4

| Formulation No. | Polyisocyanate Type | Equivalents | Branched Polyol Type | Equivalents | Diol Type | Equivalents | Urethane Content (wt. %) | Cyclic Content (wt. %) | Molecular Weight per Crosslink (g/mole) | Hard Segment Content (wt. %) |
|---|---|---|---|---|---|---|---|---|---|---|
| 48 | Des W | 1.00 | TMP | 0.3 | 1,4-butanediol 1,5-pentanediol | 0.35 0.35 | 33.04 | 45.35 | 1786 | 70.00 |
| 49 | Des W | 1.00 | TMP | 0.3 | 1,5-pentanediol 1,8-octanediol | 0.6 0.10 | 32.22 | 44.23 | 1831 | 71.00 |
| 50 | Des W | 1.00 | TMP | 0.3 | 1,5-pentanediol 1,10-decanediol | 0.6 0.10 | 31.97 | 43.89 | 1845 | 71.00 |

TABLE 4-continued

| Formulation | Polyisocyanate | | Branched Polyol | | Diol | | Urethane Content (wt. %) | Cyclic Content (wt. %) | Molecular Weight per Crosslink (g/mole) | Hard Segment Content (wt. %) |
|---|---|---|---|---|---|---|---|---|---|---|
| No. | Type | Equivalents | Type | Equivalents | Type | Equivalents | | | | |
| 51 | Des W | 1.00 | TMP | 0.3 | 1,4-butanediol<br>1,5-pentanediol | 0.2<br>0.50 | 32.84 | 45.09 | 1796 | 71.00 |
| 52 | Des W | 1.00 | TMP | 0.3 | 1,4-butanediol<br>1,5-pentanediol | 0.5<br>0.20 | 33.23 | 45.62 | 1775 | 70.00 |
| 53 | Des W | 1.00 | TMP | 0.3 | 1,4-butanediol<br>CHDM | 0.6<br>0.10 | 32.99 | 45.29 | 1789 | 70.00 |
| 54 | Des W | 1.00 | TMP | 0.3 | 1,5-pentanediol<br>CHDM | 0.6<br>0.10 | 32.23 | 44.25 | 1830 | 71.00 |
| 55 | Des W | 1.00 | TMP | 0.3 | 1,5-pentanediol<br>CHDM | 0.5<br>0.20 | 31.88 | 43.77 | 1850 | 71.00 |
| 56 | Des W | 1.00 | TMP | 0.3 | 1,5-pentanediol<br>Bis(2-hydroxyethyl) terephthalate | 0.5<br>0.20 | 30.09 | 41.32 | 1960 | 71.00 |
| 57 | Des W | 1.00 | TMP | 0.3 | 1,5-pentanediol<br>Isopropylidene dicyclohexanol | 0.6<br>0.10 | 31.19 | 42.82 | 1892 | 73.00 |
| 58 | Des W | 1.00 | TMP | 0.3 | 1,5-pentanediol<br>Polycarbonate diol 1 | 0.5<br>0.2 | 22.99 | 31.56 | 2566 | 35.00 |
| 59 | Des W | 1.00 | TMP | 0.3 | 1,5-pentanediol<br>Polycarbonate diol 1 | 0.6<br>0.1 | 26.96 | 37.01 | 2188 | 50.00 |
| 60 | Des W | 1.00 | TMP | 0.3 | 1,5-pentanediol<br>CHDM<br>Polycarbonate diol 1 | 0.3<br>0.3<br>0.10 | 26.25 | 36.04 | 2247 | 64.00 |
| 61 | Des W | 1.00 | TMP | 0.4 | 1,5-pentanediol<br>CHDM<br>Polycarbonate diol 1 | 0.1<br>0.3<br>0.20 | 22.55 | 30.95 | 2617 | 37.00 |

TABLE 5

| Formulation | Polyisocyanate | | Branched Polyol | | Diol | | Urethane Content (wt. %) | Cyclic Content (wt. %) | Molecular Weight per Crosslink (g/mole) | Hard Segment Content (wt. %) |
|---|---|---|---|---|---|---|---|---|---|---|
| No. | Type | Equivalents | Type | Equivalents | Type | Equivalents | | | | |
| 62 | Des W | 1.00 | TMP | 1.0 | Polycarbonate diol 1 | 0.05 | 30.24 | 41.52 | 616 | 0.00 |
| 63 | Des W | 1.00 | TMP | 1.0 | Polycarbonate diol 1 | 0.25 | 31.81 | 43.67 | 560 | 0.00 |
| 64 | Des W | 1.00 | TMP | 0.9 | Polycarbonate diol 1 | 0.1 | 27.53 | 37.80 | 716 | 0.00 |
| 65 | Des W | 1.00 | TMP | 1.0 | Polycarbonate diol 1 | 0.01 | 32.82 | 45.06 | 543 | 0.00 |
| 66 | Des W | 1.00 | TMP | 1.00 | | | 33.54 | 46.05 | 1759 | 0.00 |
| 67 | Des W | 1.00 | TMP | 0.35 | 1,5-pentanediol | 0.65 | 32.66 | 44.83 | 1562 | 66.00 |
| 68 | Des W | 1.00 | TMP | 0.40 | 1,5-pentanediol | 0.6 | 32.72 | 44.93 | 1363 | 61.00 |
| 69 | Des W | 1.00 | TMP | 0.70 | 1,5-pentanediol | 0.3 | 33.13 | 45.48 | 770 | 31.00 |
| 70 | Des W | 1.00 | TMP | 0.65 | 1,5-pentanediol | 0.35 | 33.06 | 45.39 | 1785 | 36.00 |
| 71 | Des W | 1.00 | TMP | 0.55 | 1,5-pentanediol | 0.45 | 32.92 | 45.20 | 1792 | 46.00 |
| 72 | Des W | 1.00 | TMP | 0.50 | 1,5-pentanediol | 0.5 | 32.86 | 45.11 | 1796 | 51.00 |
| 73 | Des W | 1.00 | TMP | 0.45 | 1,5-pentanediol | 0.55 | 32.79 | 45.02 | 1799 | 56.00 |
| 74 | Des W | 1.00 | TMP | 0.70 | 1,10-decanediol | 0.3 | 31.28 | 42.94 | 1886 | 35.00 |
| 75 | Des W | 1.00 | TMP | 0.65 | 1,10-decanediol | 0.35 | 30.93 | 42.47 | 1907 | |
| 76 | Des W | 1.00 | TMP | 0.55 | 1,10-decanediol | 0.45 | 30.26 | 41.54 | 1950 | 51.00 |
| 77 | Des W | 1.00 | TMP | 0.50 | 1,10-decanediol | 0.5 | 29.93 | 41.10 | 1971 | 55.00 |
| 78 | Des W | 1.00 | TMP | 0.45 | 1,10-decanediol | 0.55 | 30.26 | 41.54 | 1950 | |
| 79 | Des W | 1.00 | TMP | 0.25 | 1,10-decanediol | 0.75 | 28.41 | 39.00 | 2077 | 79.00 |
| 80 | Des W | 1.00 | TMP | 0.20 | 1,10-decanediol | 0.8 | 28.12 | 38.60 | 2098 | 83.00 |
| 81 | Des W | 1.00 | TMP | 0.15 | 1,10-decanediol | 0.85 | 27.84 | 38.22 | 2119 | 88.00 |
| 82 | Des W | 1.00 | TMP | 0.10 | 1,10-decanediol | 0.9 | 27.56 | 37.84 | 2141 | 61.00 |
| 83 | Prepolymer | 1.00 | | | 1,4-butanediol | 1.00 | 20.12 | 27.62 | 2933 | |
| 84 | Prepolymer | 1.00 | | | 1,4-butanediol<br>CHDM | 0.75<br>0.25 | 19.66 | 27.00 | 3001 | |
| 85 | Des W | 0.41 | PEG | 0.03 | 1,4-butanediol<br>Polycaprolactone diol<br>Pluronic | 0.3565<br>0.003<br>0.03 | 56.78 | 77.95 | 1039 | |
| 86 | Des W | 1.00 | TMP | 0.30 | 1,5-pentanediol<br>Polycarbonate diol 1 | 0.46<br>0.24 | 21.71 | 29.80 | 2718 | 31.00 |
| 87 | Des W | 1.00 | TMP | 0.30 | 1,5-pentanediol<br>Polycarbonate diol 1 | 0.47<br>0.23 | 22.02 | 30.22 | 2680 | |
| 88 | Des W | 1.00 | TMP | 0.30 | 1,5-pentanediol<br>Polycarbonate diol 1 | 0.48<br>0.22 | 22.33 | 30.66 | 2642 | |

TABLE 6

| Formulation | Polyisocyanate | | Branched Polyol | | Diol | | Urethane Content | Cyclic Content | Molecular Wt. per Crosslink | Hard Segmt Content |
|---|---|---|---|---|---|---|---|---|---|---|
| No. | Type | Equivalents | Type | Equivalents | Type | Equivalents | (wt. %) | (wt. %) | (g/mole) | (wt. %) |
| 89 | Des W | 1.00 | TMP | 0.30 | 1,5-pentanediol<br>Polycarbonate diol 1 | 0.49<br>0.21 | 22.65 | 31.10 | 2604 | |
| 90 | Des W | 1.00 | TMP | 0.30 | 1,5-pentanediol<br>Polycarbonate diol 1 | 0.51<br>0.19 | 23.33 | 32.03 | 2529 | |
| 91 | Des W | 1.00 | TMP | 0.30 | 1,5-pentanediol<br>Polycarbonate diol 1 | 0.52<br>0.18 | 23.69 | 32.52 | 2491 | |
| 92 | Des W | 1.00 | TMP | 0.30 | 1,5-pentanediol<br>Polycarbonate diol 1 | 0.53<br>0.17 | 24.05 | 33.02 | 2453 | |
| 93 | Des W | 1.00 | TMP | 0.30 | 1,5-pentanediol<br>Polycarbonate diol 1 | 0.54<br>0.16 | 24.43 | 33.54 | 2415 | |
| 94 | Des W | 1.00 | TMP | 0.30 | 1,5-pentanediol<br>Polycarbonate diol 1 | 0.55<br>0.15 | 24.82 | 34.07 | 2377 | 42.00 |
| 95 | Des W | 1.00 | TMP | 0.3 | 1,5-pentanediol<br>Polycarbonate diol 2 | 0.5<br>0.2 | 22.80 | 31.30 | 2020 | |
| 96 | Des W | 1.00 | TMP | 0.3 | 1,5-pentanediol<br>Polycarbonate diol 2 | 0.65<br>0.05 | 29.43 | 40.41 | 2005 | 59.00 |
| 97 | Des W | 1.00 | TMP | 0.3 | 1,4-butanediol<br>Polycarbonate diol 2 | 0.65<br>0.05 | 30.11 | 41.34 | 1959 | |
| 98 | Des W | 1.00 | TMP | 0.3 | 1,5-pentanediol<br>Polycarbonate diol 2 | 0.6<br>0.1 | 26.83 | 36.84 | 2199 | |
| 99 | Des W | 1.00 | TMP | 0.3 | 1,4-butanediol<br>Polycarbonate diol 1 | 0.5<br>0.2 | 23.31 | 32.00 | 2532 | |
| 100 | Des W | 1.00 | TMP | 0.3 | 1,4-butanediol<br>Polycarbonate diol 1 | 0.6<br>0.1 | 27.49 | 37.73 | 2147 | |
| 101 | Des W | 1.00 | TMP | 0.30 | 1,4-butanediol<br>Polycarbonate diol 1 | 0.46<br>0.24 | 21.97 | 30.16 | 2686 | |
| 102 | Des W | 1.00 | TMP | 0.30 | 1,4-butanediol<br>Polycarbonate diol 1 | 0.47<br>0.23 | 22.29 | 30.60 | 2647 | |
| 103 | Des W | 1.00 | TMP | 0.30 | 1,4-butanediol<br>Polycarbonate diol 1 | 0.48<br>0.22 | 22.62 | 31.05 | 2609 | |
| 104 | Des W | 1.00 | TMP | 0.30 | 1,4-butanediol<br>Polycarbonate diol 1 | 0.49<br>0.21 | 22.96 | 31.52 | 2570 | |
| 105 | Des W | 1.00 | TMP | 0.30 | 1,4-butanediol<br>Polycarbonate diol 1 | 0.51<br>0.19 | 23.67 | 32.49 | 2493 | |

TABLE 7

| Formulation | Polyisocyanate | | Branched Polyol | | Diol | | Urethane Content | Cyclic Content | Molecular Weight per Crosslink | Hard Segment Content |
|---|---|---|---|---|---|---|---|---|---|---|
| No. | Type | Equivalents | Type | Equivalents | Type | Equivalents | (wt. %) | (wt. %) | (g/mole) | (wt. %) |
| 106 | Des W | 1.00 | TMP | 0.30 | 1,4-butanediol<br>Polycarbonate diol 1 | 0.52<br>0.18 | 24.04 | 33.00 | 2455 | |
| 107 | Des W | 1.00 | TMP | 0.30 | 1,4-butanediol<br>Polycarbonate diol 1 | 0.53<br>0.17 | 24.42 | 33.52 | 2416 | |
| 108 | Des W | 1.00 | TMP | 0.30 | 1,4-butanediol<br>Polycarbonate diol 1 | 0.54<br>0.16 | 24.81 | 34.07 | 2378 | |
| 109 | Des W | 1.00 | TMP | 0.30 | 1,4-butanediol<br>Polycarbonate diol 1 | 0.55<br>0.15 | 25.22 | 34.63 | 2339 | |
| 110 | Des W | 1.00 | TMP | 0.05 | CHDM | 0.95 | 29.22 | 40.11 | 2019 | |
| 111 | Des W | 1.00 | TMP | 0.05 | Isopropylidene bis [(2-(2,6-dibromo-phenoxy)ethanol | 0.95 | 13.43 | 18.44 | 12900 | 96.00 |
| 112 | Des W | 1.00 | TMP | 0.05 | CHDM<br>Xylene glycol | 0.5<br>0.45 | 29.42 | 40.38 | 2006 | 96.00 |
| 113 | Des W | 1.00 | TMP | 0.05 | 1,8-octanediol | 0.95 | 29.08 | 39.92 | 2029 | |
| 114 | Des W | 1.00 | TMP | 0.05 | 1,10-decanediol | 0.95 | 27.29 | 37.47 | 2162 | |
| 115 | Des W | 1.00 | TMP | 0.05 | CHDM<br>Polycarbonate diol 1 | 0.95<br>0.05 | 26.69 | 36.64 | 10965 | |
| 116 | Des W | 1.00 | TMP | 0.05 | 1,4-butanediol | 0.95 | 33.48 | 78.00 | 10570 | 95.00 |
| 117 | Des W | 1.00 | TMP | 0.05 | 1,5-pentanediol | 0.95 | 32.26 | 44.30 | 11000 | 96.00 |
| 118 | Des W | 1.00 | TMP | 0.30 | Polycaprolactone diol<br>1,5-pentanediol | 0.2<br>0.5 | 23.31 | 32.00 | 2531 | |
| 119 | Des W | 1.00 | TMP | 0.30 | Polycaprolactone diol<br>1,5-pentanediol | 0.15<br>0.55 | 25.10 | 34.46 | 2351 | |
| 120 | Des W | 1.00 | TMP | 0.30 | Dibutyl-1,3-propanediol | 0.7 | 28.03 | 38.48 | 2105 | 75.00 |
| 121 | Des W | 1.00 | TMP | 0.30 | Neopentyl glycol | 0.7 | 32.58 | 44.74 | 1811 | 71.00 |
| 122 | Des W | 1.00 | TMP | 0.30 | Ethylene glycol | 0.7 | 35.50 | 48.80 | 1661 | 70.00 |

TABLE 8

| Formulation No. | Light Transmittance (%) | Yellowness Index | Refractive Index | Density (g/cm³) |
|---|---|---|---|---|
| 1 | 91.84 | 0.44 | 1.524 | 1.1417 |
| 2 | 91.91 | 0.34 | 1.531 | 1.1307 |
| 3 | 91.9 | 0.33 | 1.531 | 1.1388 |
| 4 | 91.88 | 0.4 | 1.531 | 1.1209 |
| 5 | 91.58 | 0.66 | 1.544 | 1.1346 |
| 6 | 91.84 | 0.37 | 1.533 | 1.1261 |
| 7 | 91.87 | 0.34 | 1.531 | 1.1144 |
| 8 | 91.8 | 1.65 | 1.524 | 1.1051 |
| 9 | 91.93 | 0.5 | 1.527 | 1.0912 |
| 10 | 91.72 | 1.7 | 1.527 | 1.0929 |
| 15 | | | 1.524 | 1.0969 |
| 16 | | | 1.52 | 1.0685 |
| 17 | | | 1.525 | 1.1002 |
| 18 | | | 1.517 | 1.0976 |
| 19 | | | 1.521 | 1.0886 |
| 20 | | | 1.517 | 1.0979 |
| 21 | | | 1.517 | 1.1327 |
| 23 | | | 1.523 | 1.1043 |
| 24 | | | 1.517 | 1.0971 |
| 25 | | | 1.521 | 1.1372 |
| 26 | | | 1.525 | 1.0876 |
| 29 | | | 1.512 | 1.0984 |
| 30 | | | 1.531 | 1.1049 |
| 31 | | | 1.508 | 1.072 |
| 32 | | | 1.527 | 1.1123 |
| 37 | | | 1.522 | 1.086 |
| 38 | | | 1.522 | 1.0831 |
| 39 | | | 1.524 | 1.0921 |
| 40 | | | 1.525 | 1.0846 |
| 41 | | | 1.522 | 1.0866 |
| 42 | | | 1.524 | 1.0928 |
| 43 | | | 1.525 | 1.076 |
| 44 | | | 1.526 | 1.0796 |
| 58 | | | | 1.145 |

TABLE 9

| Formulation No. | Taber Abrasion # Cycles | Taber Abrasion % Haze | Bayer Abrasion % Haze | K-Factor | Tensile Modulus at Yield (lb/in²) | Elongation at Yield (%) | Gardner Impact Strength (In-lbs) |
|---|---|---|---|---|---|---|---|
| 1 | 100 | 28.5 | 29.45 | 1245.6 | 336000 | 41 | 427 |
| 2 | 60+ | 30.8 | 31.48 | 1362.4 | 367000 | 19/38 | 628 |
| 3 | 100 | 20.5 | 22.55 | 781.83 | 350000 | 3.9/19 | 100 |
| 4 | 100 | 29 | 35.87 | 1313.6 | 311000 | 56 | 595 |
| 5 | 100 | 27.8 | 26.53 | 902.82 | 338000 | 4.7 | 168 |
| 6 | 100 | 24.7 | 28.75 | 1152.1 | 339000 | 32 | 214 |
| 7 | 100 | 28.6 | 33.05 | 1230.1 | 327000 | 34 | 236 |
| 8 | 100+ | 31.1 | 39.92 | 1522.3 | 287000 | 55 | 584 |
| 9 | 100+ | 32.4 | 47.7 | 3564.8 | 251000 | 14 | 576 |
| 10 | 100+ | 31 | 44.75 | 3104.1 | 258000 | 17 | 593 |
| 15 | 60+ | 32.7 | 42.17 | 2073 | 259000 | 16 | 512 |
| 16 | 60 | 45.9 | 45.5 | 3621 | 238000 | 19 | 365 |
| 17 | 100 | 28.7 | 32.7 | 940 | 295000 | 8.4 | 158 |
| 18 | | 26.4 | 34.68 | 1227 | 286000 | 14 | 220 |
| 19 | | 33.9 | 45.9 | 4309 | 260000 | 14 | 595 |
| 20 | | 25.1 | 42.88 | 1765 | 378000 | 4.3 | 553 |
| 21 | | 28 | 40.77 | 3211 | 312000 | 14 | 536 |
| 23 | | 38 | 43.08 | 4628 | 265000 | 12 | 461 |
| 24 | | 39.1 | 43.17 | 4869 | 251000 | 15 | 497 |
| 25 | | 24.5 | 37.83 | 4528 | 246000 | 14 | 627 |
| 26 | | 38.1 | 38.78 | 1415 | 262000 | 19 | 179 |
| 28 | | 42.6 | | 834 | 327000 | 3 | |
| 29 | | 40.4 | 33.88 | 2351 | 369000 | 4.4 | 146 |
| 30 | | 22.4 | 38.78 | 1150 | 274000 | 16 | 204 |
| 31 | | 41.8 | 25.32 | 2252 | 216000 | | 433 |
| 32 | | 41.83 | 46.55 | 1852 | 278000 | 14 | 518 |

TABLE 10

| Formulation No. | Taber Abrasion # Cycles | Taber Abrasion % Haze | Bayer Abrasion % Haze | K-Factor | Tensile Modulus at Yield (lb/in²) | Elongation at Yield (%) | Gardner Impact Strength (In-lbs) |
|---|---|---|---|---|---|---|---|
| 38 | | 45.82 | 41.72 | 1319 | 264000 | 15 | 614 |
| 39 | | 46.58 | 38.47 | 1749 | 256000 | 18 | 632 |
| 40 | | 45.78 | 44.52 | 1651 | 255000 | 22 | 531 |
| 41 | | 45.02 | 41.7 | 1771 | 247000 | 16 | 356 |
| 42 | | 36.23 | 41.12 | 1777 | 249000 | 18 | 581 |
| 43 | | 43.12 | 40.85 | 4005 | 238000 | 15 | 598 |
| 44 | | 41.88 | 35.67 | 997 | 279000 | 4.6 | 71 |
| 48 | | | | | 295000 | 5.4 | 192 |
| 49 | | | | | 295000 | 6.1 | 327 |

TABLE 10-continued

| Formulation No. | Taber Abrasion # Cycles | Taber Abrasion % Haze | Bayer Abrasion % Haze | K-Factor | Tensile Modulus at Yield (lb/in²) | Elongation at Yield (%) | Gardner Impact Strength (In-lbs) |
|---|---|---|---|---|---|---|---|
| 50 | | | | | 284000 | 8.6 | 104 |
| 51 | | | | | 290000 | 5.6 | 426 |
| 52 | | | | | 294000 | 8.3 | 71 |
| 53 | | | | | 299000 | 5.3 | 112 |
| 54 | | | | | 292000 | 5.3 | 111 |
| 55 | | | | | 292000 | 5.9 | 164 |
| 56 | | | | | 314000 | 5.7 | 40 |
| 57 | | | | | 299000 | 5.1 | 70 |
| 58 | | | | | 215000 | 20 | 365 |
| 59 | | | | 4035 | 283000 | 10 | 299 |
| 60 | | | | 1598 | 284000 | 18 | 379 |
| 61 | | | | | 260000 | 17 | 546 |
| 62 | | | | 876 | 346000 | 3.2 | 24 |
| 63 | | | | 737 | 334000 | 4.2 | 14 |
| 64 | | | | 1119 | 349000 | 2.9 | 27 |
| 65 | | | | 669 | 357000 | 2.8 | |
| 66 | | | | 638 | 368000 | 2.4 | 12 |
| 67 | | | | | | | 216 |

TABLE 11

| Formulation No. | Taber Abrasion # Cycles | Taber Abrasion % Haze | Bayer Abrasion % Haze | K-Factor | Tensile Modulus at Yield (lb/in²) | Elongation at Yield (%) | Gardner Impact Strength (In-lbs) |
|---|---|---|---|---|---|---|---|
| 68 | | | | | | | 203 |
| 69 | | | | | | | 133 |
| 70 | | | | | | | 80 |
| 71 | | | | | | | 56 |
| 72 | | | | | | | 106 |
| 73 | | | | | | | 136 |
| 74 | | | | | | | 40 |
| 75 | | | | | | | 38 |
| 76 | | | | | | | 63 |
| 77 | | | | | | | 64 |
| 78 | | | | | | | 125 |
| 79 | | | | | | | 333 |
| 80 | | | | | | | 376 |
| 81 | | | | | | | 376 |
| 82 | | | | | | | 346 |
| 83 | | | 2235 | | | | |
| 84 | | | 2185 | | | | |
| 86 | | | | | | | 317 |
| 87 | | | | | | | 328 |
| 88 | | | | | | | 451 |
| 89 | | | | | 227000 | 15 | 472 |
| 90 | | | | | 244000 | 11 | 445 |
| 91 | | | | | 255000 | 21 | 411 |
| 92 | | | | | 263000 | 19 | 426 |
| 93 | | | | | 266000 | 9 | 443 |
| 94 | | | | | 270000 | 12 | 403 |
| 95 | | | | | 259000 | 13 | 406 |
| 96 | | | | | 280000 | 19 | 255 |
| 97 | | | | | 299000 | 5 | 290 |
| 98 | | | | | 272000 | 13 | 405 |
| 99 | | | | | | | 346 |
| 100 | | | | | | | 333 |
| 101 | | | | | | | 363 |
| 102 | | | | | | | 364 |

TABLE 12

| Formulation No. | Taber Abrasion # Cycles | Taber Abrasion % Haze | Bayer Abrasion % Haze | K-Factor | Tensile Modulus at Yield (lb/in$^2$) | Elongation at Yield (%) | Gardner Impact Strength (In-lbs) |
|---|---|---|---|---|---|---|---|
| 103 | | | | | | | 367 |
| 104 | | | | | | | 367 |
| 105 | | | | | | | 360 |
| 106 | | | | | | | 404 |
| 107 | | | | | | | 362 |
| 108 | | | | | | | 371 |
| 109 | | | | | | | 327 |
| 110 | | | | | | | 97 |
| 113 | | | | | | | 334 |
| 114 | | | | | | | 552 |
| 118 | | | | | | | 82 |

TABLE 13

| Formulation No. | Dynatup Impact Strength | Shore D Hardness | Glass Transition Temp. | Coefficient of Thermal Expansion (in/in) |
|---|---|---|---|---|
| 1 | 17.6 | 79 | 126 | |
| 2 | 24.28 | 88 | 119 | 81.91 |
| 3 | 4.04 | 88 | 140 | |
| 4 | 25.4 | 86 | 117.1 | |
| 5 | 8.6 | 88 | 156 | |
| 6 | 15.2 | 86 | 132 | |
| 7 | 27.2 | 86 | 129.9 | |
| 8 | 31.5 | 82 | 106 | |
| 9 | 38.4 | 80 | 99.1 | 94.65 |
| 10 | 35.5 | 81 | 102 | |
| 15 | 24.8 | 80 | 105 | |
| 16 | 34.4 | 79 | 93 | |
| 17 | 13.9 | 88 | 123.9 | |
| 18 | 40.9 | 83 | 119 | |
| 19 | 44.3 | 81 | 89.1 | |
| 20 | 26.1 | 83 | 75.1 | 70.01 |
| 21 | 39.6 | 81 | 97 | |
| 23 | 17.9 | 79 | 87 | 101.11 |
| 24 | 33.4 | 80 | 79.2 | 97.2 |
| 25 | 44.9 | 78 | 76.1 | 95.66 |
| 26 | 28.6 | 84 | 106 | |
| 29 | 5.34 | 85 | 71.1 | 72.36 |
| 30 | 30.7 | 85 | 120.1 | |
| 31 | 41 | 79 | 52.1 | 96.91 |
| 32 | 46.5 | 82 | 104 | |
| 38 | 33.2 | 81 | 111.1 | |
| 39 | 32.9 | 81 | 103.9 | |
| 40 | 41.9 | 81 | 101.1 | |
| 41 | 27.5 | 80 | | |
| 42 | 25.1 | 81 | | |
| 43 | 35.3 | 80 | 97 | |
| 44 | 3.15 | 86 | | |
| 48 | 25.2 | | | |
| 49 | 4.24 | | | |
| 50 | 26.3 | | | |
| 51 | 21.6 | | | |
| 52 | 31.6 | | | |
| 53 | 22.2 | | | |
| 54 | 26.7 | | | |
| 55 | 41.6 | | | |
| 56 | 20..7 | | | |

TABLE 14

| Formulation No. | Dynatup Impact Strength | Shore D Hardness | Glass Transition Temp. | Coefficient of Thermal Expansion (in/in) |
|---|---|---|---|---|
| 57 | 17.2 | | | |
| 58 | 62.3 | | 66 | |
| 59 | 36.6 | | | |
| 60 | 37.4 | | | |
| 61 | 38.9 | | | |
| 62 | | | 152 | |
| 63 | | | 134 | |
| 64 | | | 150 | |
| 65 | | | 174 | |
| 66 | | | 166 | |
| 67 | | | 161 | |
| 89 | 42.6 | | | |
| 90 | 48.4 | | | |
| 91 | 50.2 | | | |
| 92 | 48 | | | |
| 93 | 56.5 | | | |
| 94 | 45.1 | | | |
| 95 | 47.5 | | | |
| 96 | 47.5 | | | |
| 97 | 34.3 | | | |
| 98 | 39.2 | | | |

TABLE 15

| Formulation No. | Polyisocyanate Type | Polyisocyanate Equivalents | Branched Polyol Type | Branched Polyol Equivalents | Diol Type | Diol Equivalents | Urethane Content (wt. %) | Cyclic Content (wt. %) | Molecular Weight per Crosslink (g/mole) | Hard Segment Content (wt. %) | Water (Equivalents) |
|---|---|---|---|---|---|---|---|---|---|---|---|
| 123 | Des W | 1.00 | TMP | 0.3 | 1,5-pentanediol | 0.554 | 29.67 | 40.74 | 1988 | | 0.19 |
| | | | | | Polycarbonate diol 1 | 0.57 | | | | | |

TABLE 15-continued

| Formulation No. | Polyisocyanate Type | Equivalents | Branched Polyol Type | Equivalents | Diol Type | Equivalents | Urethane Content (wt. %) | Cyclic Content (wt. %) | Molecular Weight per Crosslink (g/mole) | Hard Segment Content (wt. %) | Water (Equivalents) |
|---|---|---|---|---|---|---|---|---|---|---|---|
| 124 | Des W | 1.00 | TMP | 0.3 | 1,5-pentanediol<br>Polycarbonate diol 1 | 0.374<br>0.11 | 27.73 | 38.07 | 2128 | | 0.22 |
| 125 | Des W | 1.00 | TMP | 0.3 | 1,5-pentanediol | 0.5 | 34.22 | 46.98 | 1724 | | 0.20 |
| 126 | Des W | 1.00 | TMP | 0.3 | 1,5-pentanediol<br>Polycarbonate diol 1 | 0.45<br>0.05 | 30.85 | 42.35 | 1913 | | 0.20 |
| 127 | Des W | 1.00 | TMP | 0.3 | 1,5-pentanediol<br>Polycarbonate diol 1 | 0.4<br>0.1 | 28.08 | 38.55 | 2101 | | 0.20 |
| 128 | Des W | 1.00 | TMP | 0.30 | CHDM | 0.6 | 31.25 | 42.91 | 1888 | | 0.1 |
| 129 | Des W | 1.00 | TMP | 0.90 | | | 34.24 | 47.00 | 1723 | | 0.1 |
| 130 | Des W | 1.00 | TMP | 0.30 | CHDM | 0.55 | 31.79 | 43.64 | 1856 | | 0.15 |
| 131 | Des W | 1.00 | TMP | 0.3 | 1,5-pentanediol<br>Polycarbonate diol 1 | 0.55<br>0.05 | 30.17 | 41.42 | 1956 | | 0.10 |
| 132 | Des W | 1.00 | TMP | 0.3 | 1,5-pentanediol<br>Polycarbonate diol 1 | 0.5<br>0.1 | 27.52 | 37.78 | 2144 | | 0.10 |
| 133 | Des W | 1.00 | TMP | 0.3 | 1,5-pentanediol | 0.55 | 33.80 | 46.40 | 1746 | | 0.15 |

TABLE 16

| Formulation No. | Light Transmittance (%) | Yellow Index | Refractive Index | Density (g/cm$^3$) |
|---|---|---|---|---|
| 125 | | | | 1.119 |
| 126 | | | | 1.125 |
| 127 | | | | 1.133 |
| 128 | | | | 1.113 |
| 129 | | | | 1.128 |
| 130 | | | | 1.113 |
| 131 | | | | 1.127 |
| 132 | | | | 1.129 |

TABLE 17

| Formulation No. | Taber Abrasion # Cycles | Taber Abrasion % Haze | Bayer Abrasion % Haze | K-Factor | Tensile Modulus at Yield (lb/in$^2$) | Elongation at Yield (%) | Gardner Impact Strength (In-lbs) |
|---|---|---|---|---|---|---|---|
| 125 | | | | | 355000 | 13 | 51 |
| 126 | | | | 1113 | 305000 | 4 | 24 |
| 127 | | | | 1551 | 282000 | 12 | 244 |
| 128 | | | | 853 | 369000 | 16 | 56 |
| 129 | | | | 686 | 441000 | 7.5 | 8 |
| 130 | | | | 766 | 389000 | 15 | 37 |
| 131 | | | | | 290000 | 7.7 | 126 |
| 132 | | | | | 289000 | 19 | 328 |
| 133 | | | | | 289000 | 11 | 224 |

TABLE 18

| Formulation No. | Dynatup Impact Strength | Shore D Hardness | Glass Transition Temp. | Coefficient of Thermal Expansion (in/in) |
|---|---|---|---|---|
| 125 | | | 137 | |
| 126 | 14.6 | | 115 | |
| 127 | 30 | | 67 | |
| 128 | 3.31 | | 161 | |
| 129 | 3 | | | |
| 130 | 8.67 | | 153 | |
| 131 | 32.5 | | | |
| 132 | | | | |
| 133 | 9.29 | | | |

The above samples exhibited low yellowness, high light transmittance, high impact strength and good ballistic resistance.

A 6"×6" (15.2 cm×15.2 cm) laminate of 2" (5.1 cm) of molded Formulation 2 below facing outward, laminated to a 1" (2.5 cm) ply of molded Formulation 9 below, and 0.5" (1.3 cm) of molded Formulation 60 stopped or deflected four consecutive AK-47, 7.62 mm×39 mm shots from 150 feet (45.7 m). Each layer was molded as described above. No glass ply was used in the laminate. The laminate was heated in an autoclave at about 300° F. (149° C.) for about 2 hours.

Samples of Polycast 84 aerospace stretched acrylic (commercially available from Spartech of Clayton, Mo.) and samples of polymer of Example A, Formulation 2 (synthesized at 110° C. and cured at 143° C. as discussed above) were evaluated for physical properties as set forth in Table 19 below. The Sample of Example A, Formulation 2 had lower density, higher impact strength and elongation, and was tougher than the tested sample of stretched acrylic. LEXAN #8574K26 polycarbonate (commercially available from McMaster Carr Supply Co. of Cleveland, Ohio) and samples of polymer of Example A, Formulation 84 (synthesized at 110° C. and cured at 143° C. as discussed above) were evaluated for physical properties as set forth in Table 20 below. The Example A, Formulation 84 had better solvent resistance, UV resistance and higher impact strength than the tested sample of LEXAN.

TABLE 19

| Property | Stretched Acrylic | Sample of Formulation 2 of Example A |
|---|---|---|
| Light Transmission | 92 | 92 |
| % Haze | <1% | <0.1% |
| Density | 1.18 | 1.13 |
| Solvent/75% aqueous sulfuric acid resistance | 1000-4000 psi stress | |
| K factor | 2400 | 1500 |
| Gardner Impact Test (in-lbs) | 16 | 628 |
| High Speed Multiaxial Impact | 3.6 (unprocessed) | 26.5 |
| % Elongation (at break) | <5 | 38% |
| % Elongation (1000 hrs QUV-B) | <5 | 40% |
| Tensile Strength | 11,250 | 11,800 |
| Tensile Modulus | 450,000 | 367,000 |
| Glass Transition Temperature | 205 | 247° F. (119° C.) |
| Heat Distortion Temp. | shrinks above 180° F. | 235° F. (113° C.) |
| Abrasion Resistance: % Haze, 100 cycles Taber Abrader | 30 | 15 |
| Refractive Index | 1.49 | 1.519 |
| Shore D Durometer | 94 | 90 |

TABLE 20

| Property | Polycarbonate | Sample of Formulation 84 of Example A |
|---|---|---|
| Light Transmission | 88 | 92 |
| Density | 1.2 | 1.08 |
| Solvent Resistance | Poor OH, H+, Acetone | Good OH, H+, Acetone |
| Gardner Impact Mean Failure Energy | 588 in-lb | >640 in-lbs (>72 J) |
| High Speed Multiaxial Impact | 72 joules | 105 Joules |
| % Haze, 100 cycles Taber Abrader | 60% | 15% |
| Refractive Index | 1.586 | 1.519 |
| Tensile Modulus | 320,000 | 300,000 |
| Tensile Strength | 8000 psi | 8500 psi |
| % Elongation (at break) | 100% | 200% |

TABLE 20-continued

| Property | Polycarbonate | Sample of Formulation 84 of Example A |
|---|---|---|
| % Elongation (1000 hrs QUV-B) | severe degradation brittle-yellow | 97% |
| Heat Distortion Temp. | 275° F. | 220° F. |
| Glass Transition Temperature | 305 F. | 240 F. |
| Shore D Durometer | 85 | 80 |

DMA Testing

Figure 16:
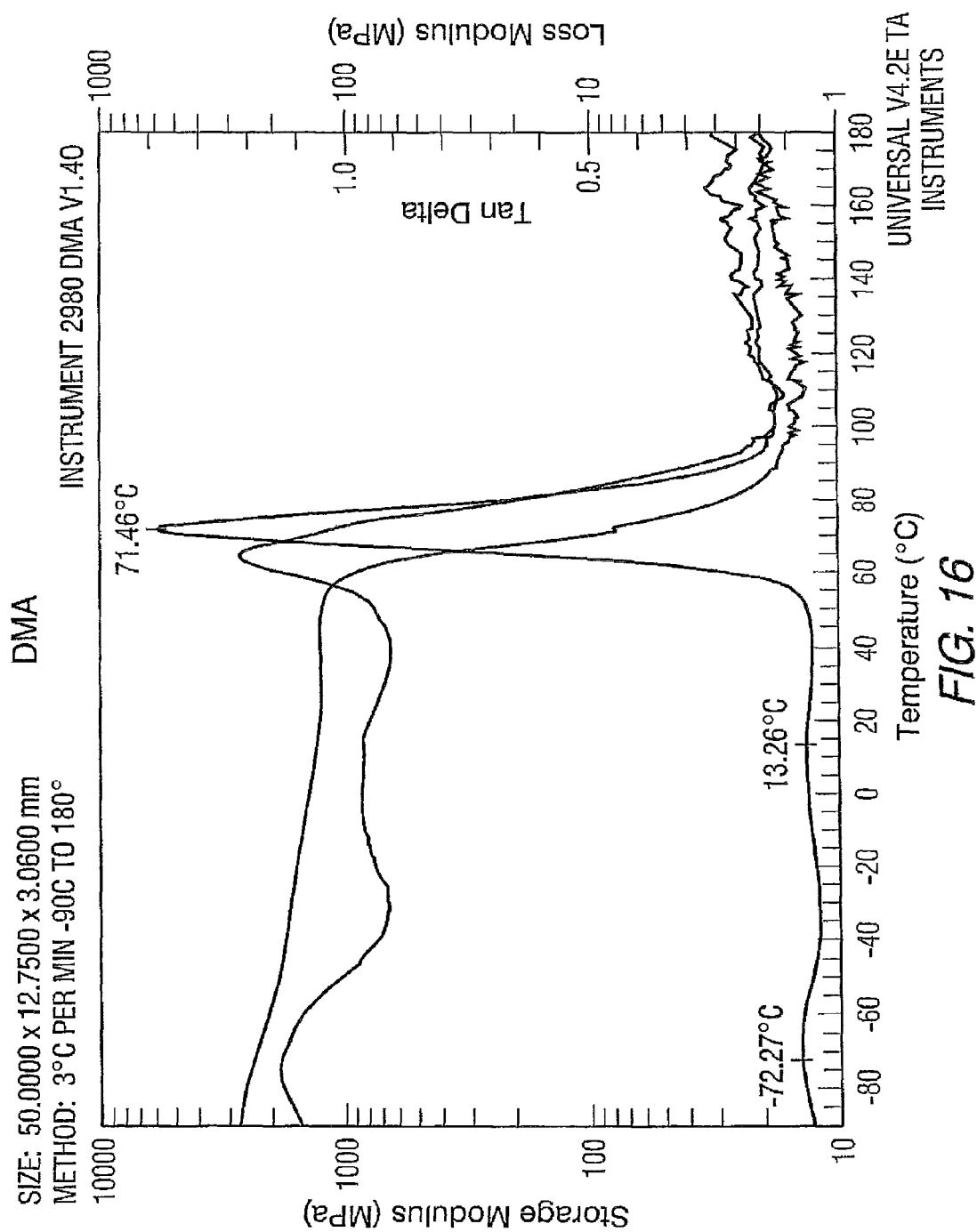
FIG. 16 is a graph of storage modulus, loss modulus and tan Delta as a function of temperature measured using DMA for a casting of a polyurethane prepared according to Example A, Formulation 114, according to the present invention.

A sample of Formulation 114 (prepared from 0.95 equivalents of 1,10-decanediol, 0.05 equivalents of trimethylolpropane and 1.0 equivalents of 4,4'-methylene-bis-(cyclohexyl isocyanate) (DESMODUR W)) using Dynamic Mechanical Analysis (DMA) for storage modulus, loss modulus and tan Delta. The DMA analysis was conducted on a solid, clamped sample (2"×2"×⅛") (5.1 cm×5.1 cm×0.3 cm) vibrated at a frequency of 1 Hz over a wide temperature range increased at a rate of 3° C./min. As shown in FIG. 16, the sample exhibited a low temperature transition in the loss modulus at about −70° C., which is unusual for glass polymers and indicates molecular torsional motion at this low temperature. A second transition is present at about 14° C. The glass transition temperature of this polymer is 71° C., which is a maximum in the tan Delta graph. At this temperature, the polymer is most efficient at converting mechanical vibrations into heat, thus it is at this temperature that the polymer reaches a maximum in damping properties. The storage modulus is the energy conserved by the polymer and can be related to the Young's Modulus or stiffness of the polymer.

Ballistics Testing

Example AA

Figure 17:
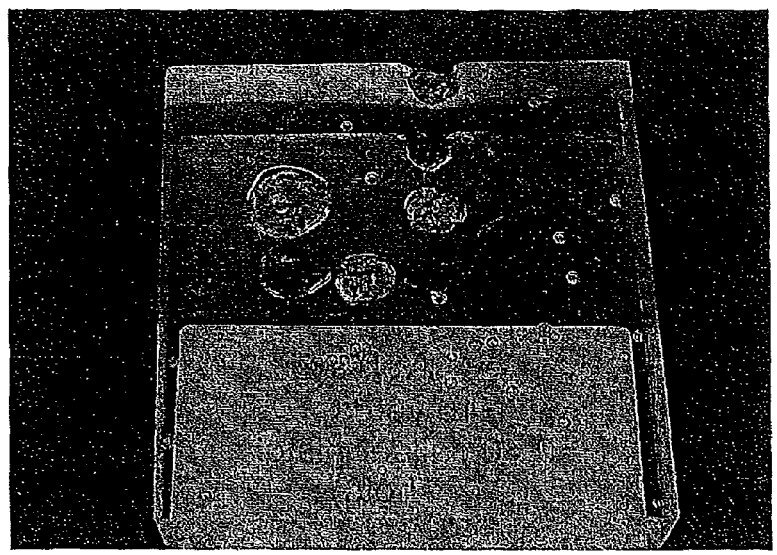
FIG. 17 is a photograph of a perspective view of a test sample of Formulation 2, Example A after shooting of the sample with .40 caliber bullets from 30 feet (9.2 m) at a velocity of 987 ft/sec (300.8 m/sec)

A 6"×6"×1" (15.2 cm×15.2 cm×2.5 cm) thick sample of Formulation 2 from Example A above was cured by heating at 290° F. (143° C.) for 48 hours. Four .40 caliber bullets shot from 30 feet (9.1 m) at a velocity of 987 ft/sec (300 m/sec) ricocheted off the surface of the sample and the plastic did not crack. A photograph of a perspective view of the test sample is shown in FIG. 17.

Example AB

Figure 18:
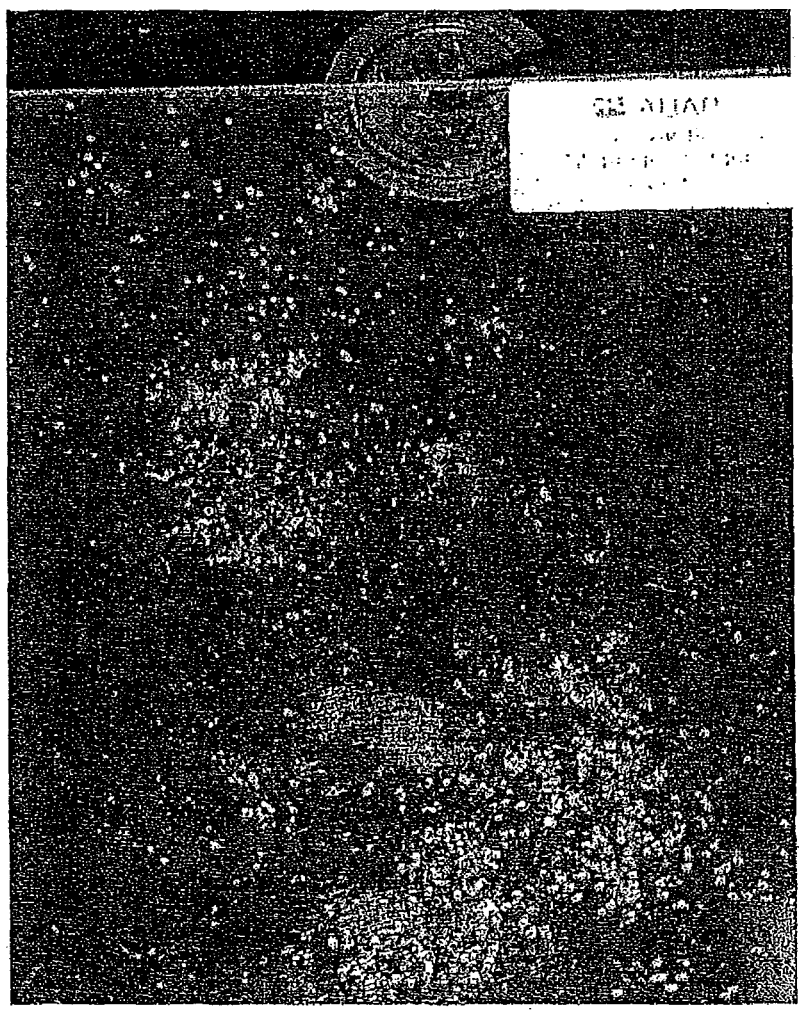
FIG. 18 is a photograph of a front elevational view of a test sample of Formulation 2, Example A after shooting of the sample with a 12-gauge shotgun shot from 20 feet (6.1 m) at a velocity of 1290 ft/sec (393.2 m/sec) using heavy game lead shot pellets.

A 6"×6"×⅜" (15.2 cm×15.2 cm×1 cm) formulation thick sample of Formulation 2 from Example A above was cured by heating at 290° F. (143° C.) for 48 hours. A 12-gauge shotgun shot from 20 feet (6.1 m) at a velocity of 1290 ft/sec (393 m/sec) using heavy game lead shot pellets ricocheted off the surface of the sample and the plastic did not crack. A photograph of a front elevational view of the test sample is shown in FIG. 18.

Example AC

Figure 19:
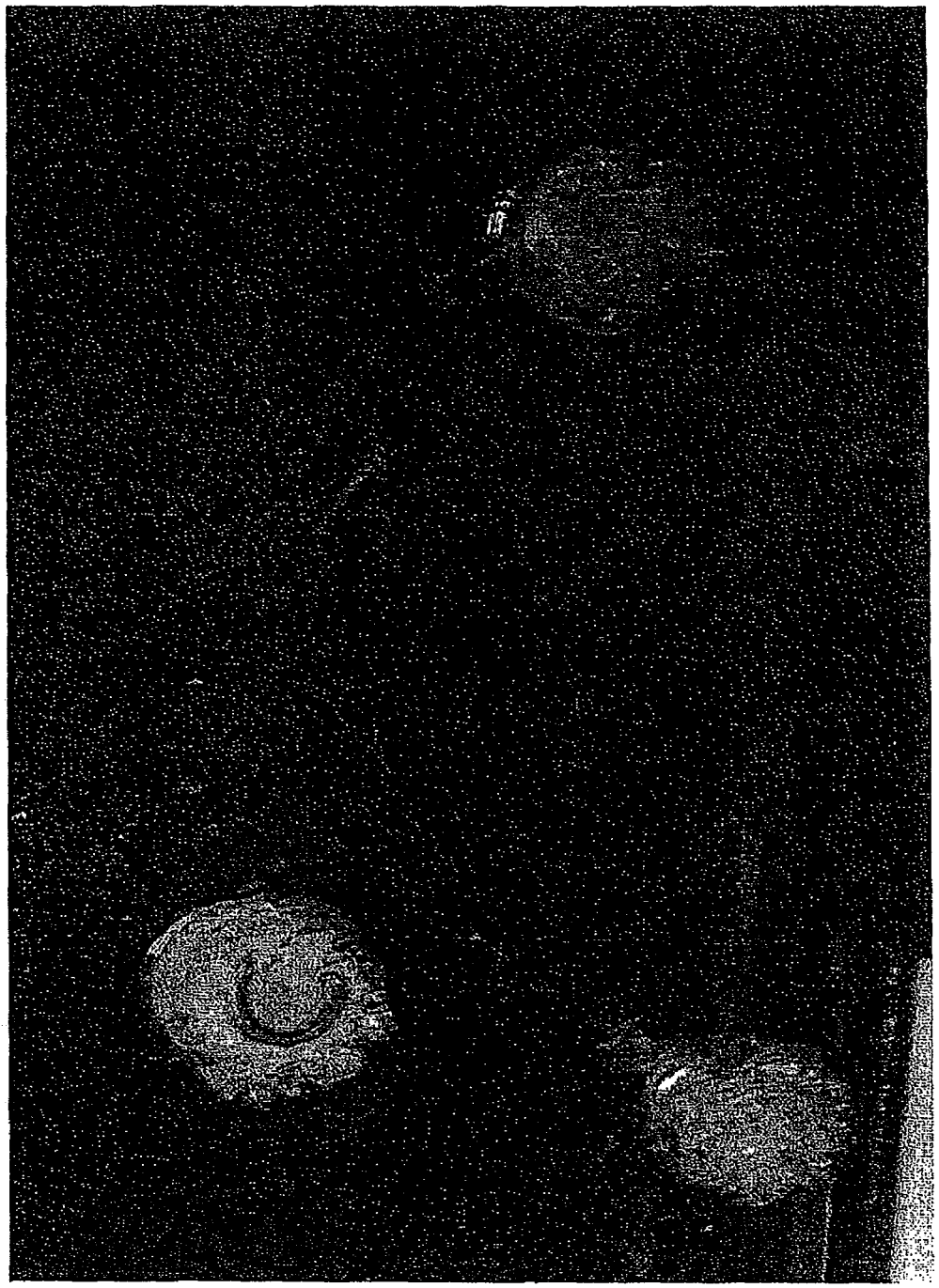
FIG. 19 is a photograph of a front elevational view of a test sample of Formulation 93, Example A is a photograph of a front elevational view of a test sample of 9 mm bullets shot from 20 feet (6.1 m) at a velocity of 1350 ft/sec (411.5 m/sec)

A 6"×6"×1" (15.2 cm×15.2 cm×2.5 cm) thick sample of Formulation 93 from Example A above was cured by heating at 290° F. (143° C.) for 48 hours. Three 9 mm bullets shot from 20 feet (6.1 m) at a velocity of 1350 ft/sec (411 m/sec) stuck in the sample. A photograph of a front elevational view of the test sample is shown in FIG. 19.

Example AD

Figure 20:
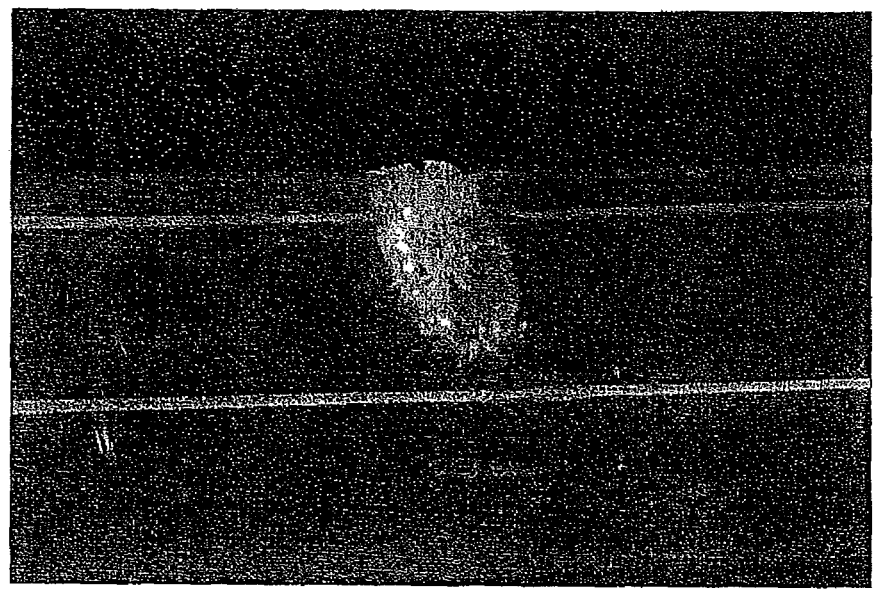
FIG. 20 is a photograph of a perspective view of a test sample of Formulation 94, Example A after shooting of the sample with a 9 mm bullet shot from 20 feet (6.1 m) at an initial velocity of 1350 ft/sec (411.5 m/sec)
Figure 21:
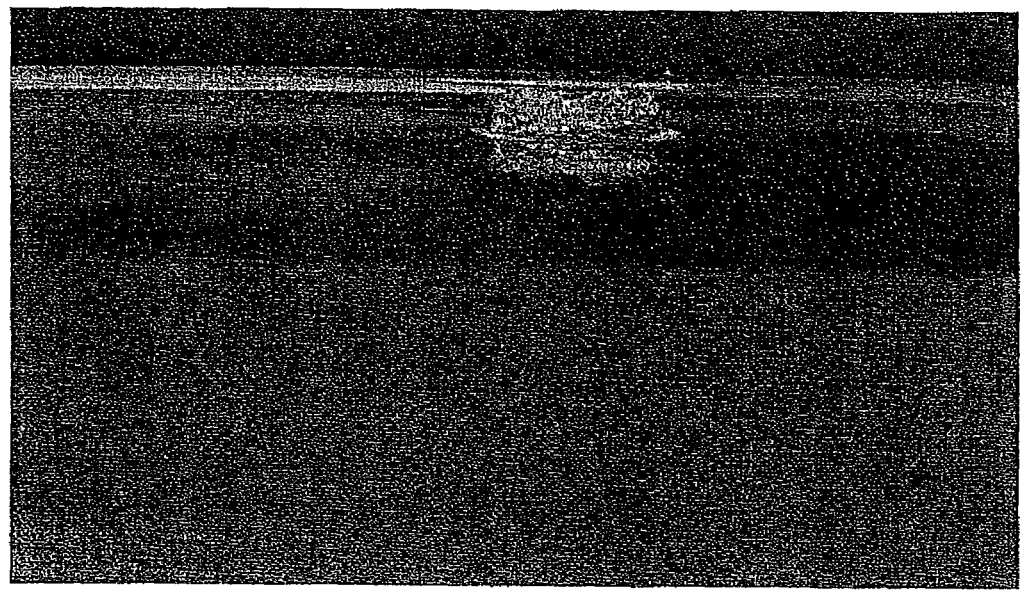
FIG. 21 is a side elevational view of the sample shown in FIG. 20.

A 6"×6"×1" (15.2 cm×15.2 cm×2.5 cm) thick sample of Formulation 94 from Example A above was cured by heating at 290° F. (143° C.) for 48 hours. A 9 mm bullet shot from 20 feet (6.1 m) at am initial velocity of 1350 ft/sec (411 m/sec) stuck in the sample. Photographs of the test sample is shown in FIGS. 20 and 21. FIG. 20 is a perspective view of the sample showing the bullet embedded in the sample surface. FIG. 21 is a side elevational view of the sample showing the bullet entrance into the sample.

Example AE

A 6"×6"×1" (15.2 cm×15.2 cm×2.5 cm) thick sample of Formulation 2 from Example A above was cured by heating at 290° F. (143° C.) for 48 hours. A 6"×6"×1" thick sample of Formulation 9 from Example A above was cured by heating at 290° F. (143° C.) for 48 hours. A 6"×6"×0.5" (15.2 cm×15.2 cm×1.75 cm) thick sample of Formulation 58 from Example A above was cured by heating at 290° F. (143° C.) for 48 hours. A composite was prepared by assembling a 1" (2.5 cm) thick layer of the sample of Formulation 2, a 1" (2.5 cm) thick layer of the sample of Formulation 9, and a 0.5" (1.25 cm) thick layer of the sample of Formulation 58 such that the layer of Formulation 2 faced the rifle.

Figure 22:
FIG. 22 is front elevational view of a portion of a composite according to the present invention after shooting of the sample with four 7.62×39 mm bullets having a steel core shot from an AK-47 rifle from a distance of 30 yards (27.4 m) at an initial velocity of 2700 ft/sec (823 m/sec)
Figure 23:
FIG. 23 is a rear perspective view of the sample of FIG. 22.

Four 7.62×39 mm bullets having a steel core were shot from an AK-47 rifle from a distance of 30 yards (27.4 m) at an initial velocity of 2700 ft/sec (823 m/sec). The first bullet stopped in the middle layer of Formulation 9, generally parallel to the initial shot direction. The second through fourth bullets stopped in the far layer of Formulation 58, generally parallel to the initial shot direction. Photographs of the test sample is shown in FIGS. 22 and 23. FIG. 22 is a front elevational view of a portion of the sample showing bullet entry points and two bullets embedded in the sample surface. FIG. 23 is a rear perspective view of the sample showing the two exiting bullets lodged in the Formulation 58 layer of the sample.

Example AF

Samples prepared from Formulations 58 and 89-97 of Example A above performed similarly, i.e., all "caught" bullets. A sample prepared from Formulation 94 showed the least amount of sample penetration with about ⅛" of the back of the bullet protruding from the surface. No ductile bulge was observed in the back of the sample prepared from Formulation 94. Penetration was greatly reduced compared to samples prepared from Formulations 58 and 89-92

Example B

Comparative Non-Limiting Example of Processing Temperature of 80° C. vs. 110° C.

Short chain diols (aliphatic diols having 4 to 8 carbon atoms as discussed above) are typically immiscible in isocyanates due to the polarity difference and surface tension difference between the two materials. It has been found that when the short chain diol and isocyanate are mixed at 80° C. or less, they take longer to become a clear solution than at 110° C. or higher. Although the solutions may both appear clear, it has been found that there is an inhomogeneity that manifests itself in cured articles at much lower impact strengths than when the solutions are made at or above 110° C. In addition, when casting or reaction injection molding into a glass mold, any cooling that occurs from pouring and exposure to air, or the mold temperature being below 100° C., exacerbates the inhomogeneity problem as further cooling increases the inhomogeneity. If temperatures drop even further, the short chain diol and isocyanate will phase separate and appear as haze. This haze generally will not clear in an oven heated to 120° C. to 140° C. after pouring into a mold and heating for 24 to 48 hours. Higher variations in impact strength also have been observed as the processing temperatures drop below 100° C. Above 110° C., the initial Gardner Impact strengths for polymers of this invention are higher initially, and show less variation in impact strengths from batch to batch when processed above 110° C. The examples below illustrate the temperature effect.

Example B1

The following components 20.1 grams of 1,5 pentanediol, 7.5 grams of trimethylolpropane and 72.45 grams of DESMODUR W containing 20% trans-trans isomer of 4,4'-methylene-bis-(cyclohexyl isocyanate) were charged into a glass kettle fitted with a thermometer and overhead stirrer. The charge was brought up to a temperature of 110° C. to 120° C. while mixing and applying vacuum (2 mm mercury (266 Pa)) to remove bubbles. The batch was mixed for 10 to 20 minutes after reaching 110° C. to 120° C.

The batch was cast into a heated glass mold that was preheated in an oven at 140° C. The polymer was cured for 48 hours at 140° C. without catalyst. After curing, the mold was removed from the oven and allowed to cool to room temperature. The plastic sheet was then removed from the glass mold and cut into 2"×2"×⅛" (5.1 cm×5.1 cm×0.3 cm) samples for Gardner Impact testing. The initial Gardner Impact strength averaged 260 in-lbs (30 J).

Example B2

The following components: 20.1 grams of 1,5 pentanediol, 7.5 grams of trimethylolpropane and 72.45 grams of DESMODUR W containing 20% trans-trans isomer of 4,4'-methylene-bis-(cyclohexyl isocyanate) were charged into a glass kettle fitted with a thermometer and overhead stirrer. The charge was brought up to a temperature of 80° C. to 90° C. while mixing and applying vacuum (2 mm mercury (266 Pa)) to remove bubbles. The batch was mixed for 1 to 2 hours after reaching 80° C. to 90° C. until the batch appeared clear.

The batch was cast into a heated glass mold that had been preheated in an oven at 140° C. The polymer was cured for 48 hours at 140° C. without catalyst. After curing, the mold was removed from the oven and allowed to cool to room temperature. The plastic sheet was removed from the glass mold and cut into 2"×2"×⅛" (5.1 cm×5.1 cm×0.3 cm) samples for Gardner Impact testing. The initial Gardner Impact strength averaged 62 in-lbs (7 J).

Example B3

The following components 17.9 grams of 1,4 butanediol, 7.4 grams of trimethylolpropane and 74.47 grams of DESMODUR W containing 20% trans-trans isomer of 4,4'-methylene-bis-(cyclohexyl isocyanate) were charged into a glass kettle fitted with a thermometer and overhead stirrer. The charge was brought up to a temperature of 110° C. to 120° C. while mixing and applying vacuum (2 mm mercury (266 Pa)) to remove bubbles. The batch was mixed for 10 to 20 minutes after reaching 110° C. to 120° C.

The batch was cast into a heated glass mold that had been preheated in an oven at 140° C. The polymer was cured for 48 hours at 140° C. without catalyst. After curing, the mold was removed from the oven and allowed to cool to room temperature. The plastic sheet was removed from the glass mold and cut into 2"×2"×⅛" (5.1 cm×5.1 cm×0.3 cm) samples for Gardner Impact testing. The initial Gardner Impact strength averaged 180 in-lbs (21 J).

Example B4

The following components: 17.9 grams of 1,4 butanediol, 7.4 grams of trimethylolpropane and 74.47 grams of DESMODUR W containing 20% trans-trans isomer of 4,4'-methylene-bis-(cyclohexyl isocyanate) were charged into a glass kettle fitted with a thermometer and overhead stirrer. The charge was brought up to a temperature of 80° C. to 90° C. while mixing and applying vacuum (2 mm mercury (266 Pa)) to remove bubbles. The batch was mixed for 1 hour to 2 hours after reaching 80° C. to 90° C. until clear.

The batch was cast into a heated glass mold that had been preheated in an oven at 140° C. The polymer was cured for 48 hours at 140° C. without catalyst. After curing, the mold was removed from the oven and allowed to cool to room temperature. The plastic sheet was removed from the glass mold and cut into 2"×2"×⅛" (5.1 cm×5.1 cm×0.3 cm) samples for Gardner Impact testing. The initial Gardner Impact strength averaged 10-15 in-lbs (1 J-1.5 J).

Example C

To estimate the overall percentage of aligned crystalline domains in samples of polyurethanes according to the present invention, samples of Formulation No. 2 (0.7 equivalents of 1,5-pentanediol (PDO), 0.3 equivalents of trimethylolpropane (TMP) and 1 equivalent of 4,4'-methylene-bis-(cyclohexyl isocyanate) (DESMODUR W)) and Formulation No. 136 (0.95 equivalents of PDO, 0.05 equivalents of TMP and 1 equivalent of 4,4'-methylene-bis-(cyclohexyl isocyanate) (DESMODUR W)) were tested using Differential Scanning Calorimetry (DSC) at 2° C./min and Thermogravimetric Analysis (TGA).

Each sample was prepared by mixing all components in the respective formulation at about 110° C. for about 30 minutes, degassed under vacuum for about 5 to about 10 minutes, then casting in a glass mold heated to about 200° F. (93° C.) for about 48 hours and cooled to room temperature (25° C.) and released from the mold. The sample of Formulation No. 2 was aged at about 25° C. for about seven months.

Figure 24:
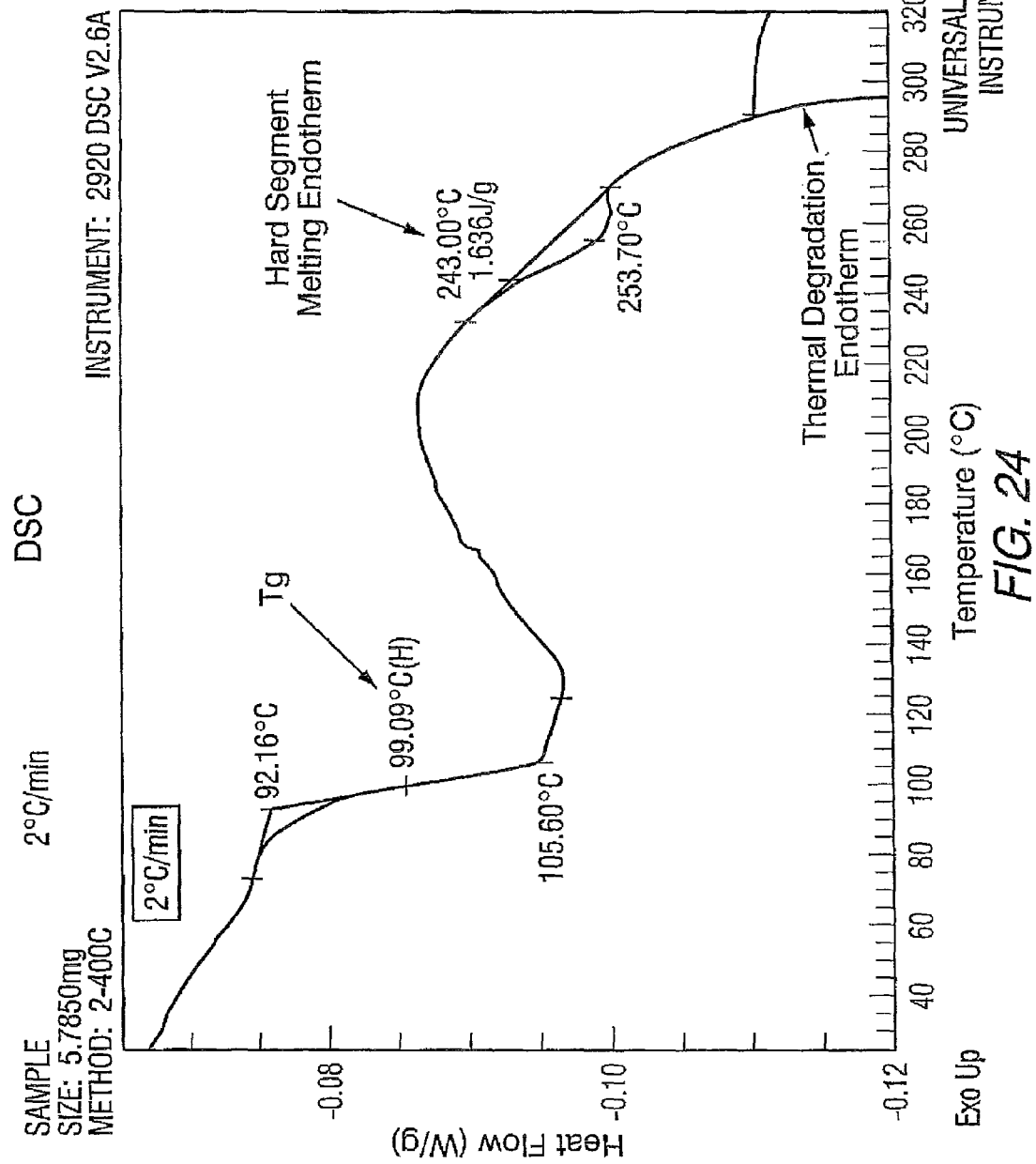
FIG. 24 is a graph of heat flow as a function of temperature measured using Differential Scanning Calorimetry (DSC) for a casting of a polyurethane prepared according to Example A, Formulation 2 of the present invention.
Figure 25:
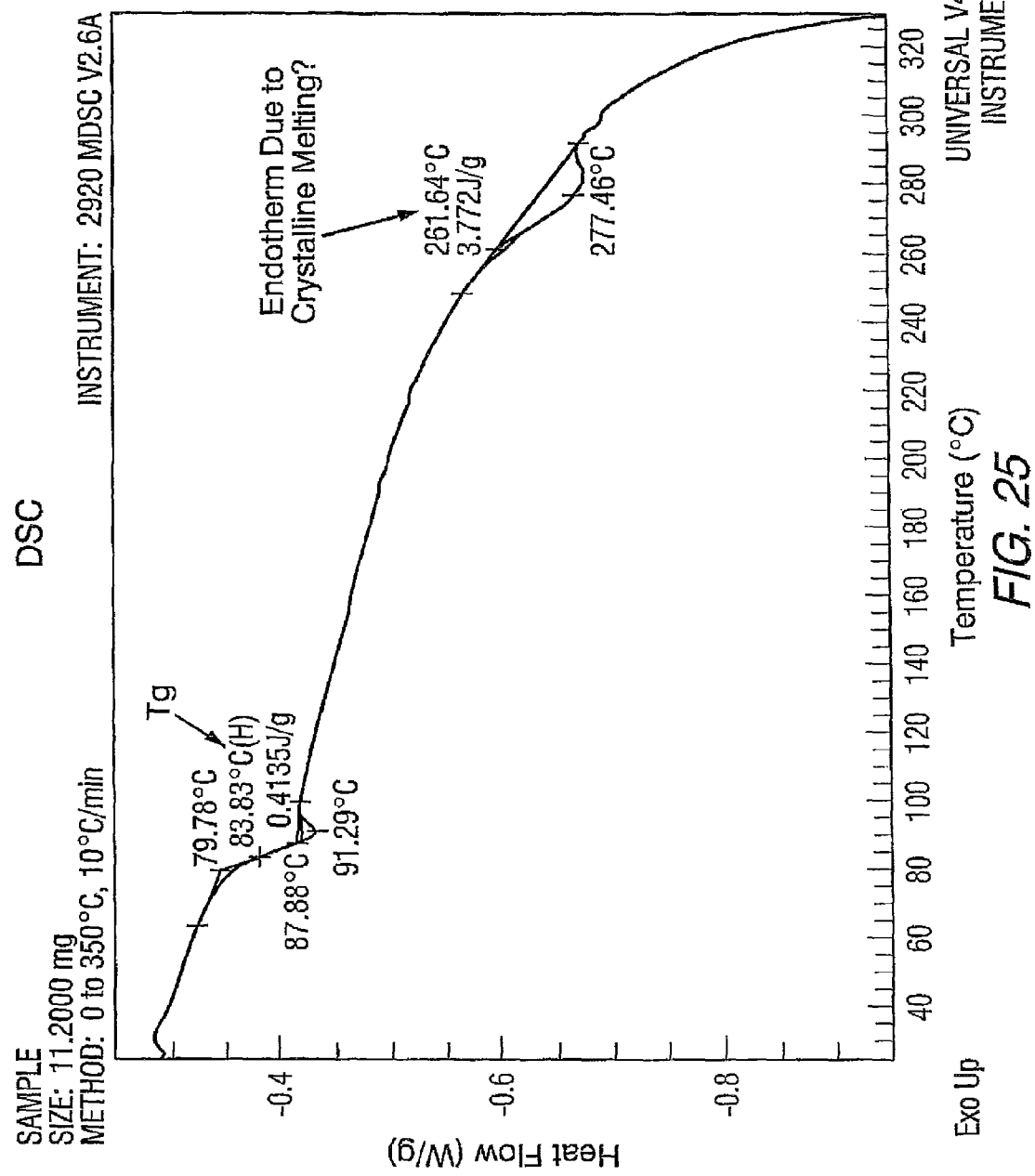
FIG. 25 is a graph of heat flow as a function of temperature measured using (DSC) for a casting of a polyurethane prepared according to Example A, Formulation 136 of the present invention.
Figure 26:
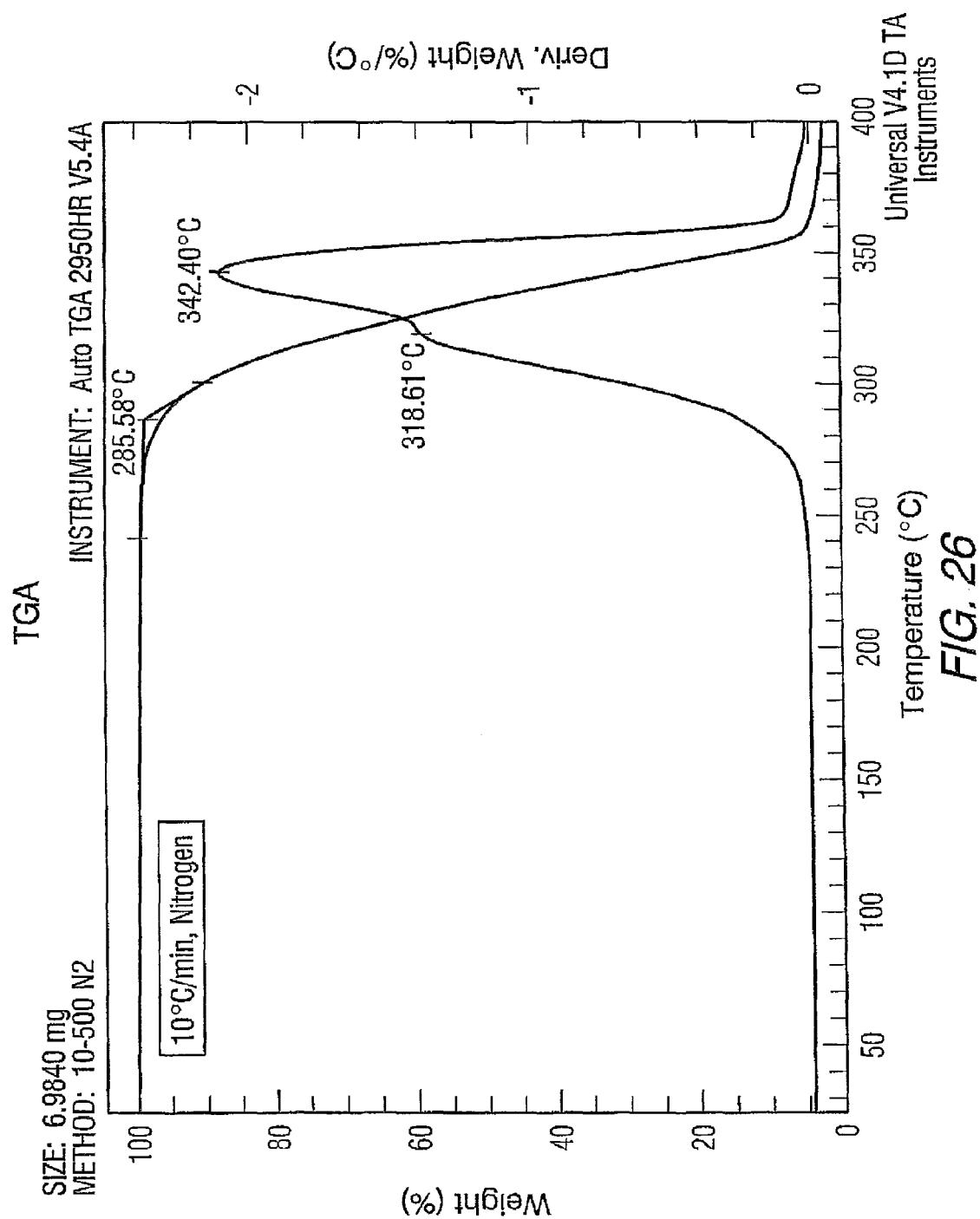
FIG. 26 is a graph of weight loss as a function of temperature measured using Thermogravimetric Analysis (TGA) for a casting of a polyurethane prepared according to Example A, Formulation 136 of the present invention.

The sample of Formulation No. 136 (aged at about 25° C. for about two weeks) was used as a control sample, and its percentage of aligned crystalline domains was used as a reference for 100% crystallinity. With respect to the 100% crystallinity of the sample of Formulation No. 136, the percentage of aligned crystalline domains in Formulation No. 2 was calculated to be 42%. An endothermic peak at around ~260° C. was found for both samples and attributed to the melting of their ordered domains. The DSC data for each of the samples of Formulation Nos. 2 and 136 are presented in Table 21 below and in FIGS. 24 and 25, respectively. Thermogravimetric Analysis data (TGA) for a sample of Formulation 136 is presented in FIG. 26.

TABLE 21

Summary of DSC Test Results

| | Sample No. | |
|---|---|---|
| | 136 | 2 |
| Equivalents and Components of Formulation | 0.95 PDO + 0.05 TMP + 1 Des W | 0.7 PDO + 0.3 TMP + 1 Des W |

TABLE 21-continued

Summary of DSC Test Results

| | Sample No. | |
|---|---|---|
| | 136 | 2 |
| Tg (° C.) | 99 | |
| Peak Endotherm (° C.) | 260 | 260 |
| Heat Capacity (J/g) | 3.77 | 1.63 |
| Estimated Crystalline Domain (%) | 100 (Control) | 42 |

Example D: Ballistic Testing

Example D1

A polyurethane polymer according to the present invention was prepared from the components listed below in Table 22:

TABLE 22

| Monomer Name | Solids | | | Polymer Wt. (g) | Desired Batch Size (g) |
|---|---|---|---|---|---|
| | 1,10-decanediol | TMP | Des W | 205.30 | 300.00 |
| OH # | — | — | — | | |
| Acid # | — | — | — | | |
| Equivalent Wt. | 87 | 44.00 | 131.2 | | |
| Equivalents desired | 0.7 | 0.3 | 1.0 | | |
| Mass Monomer | 60.90 | 13.20 | 131.20 | | |
| Weight % Monomer | 29.66% | 6.43% | 63.91% | | |
| Monomer masses for experiment | 88.99 | 19.29 | 191.72 | | |
| Weight % Hard Segment | 74.40 | | | | |
| Weight % Urethane | 28.74 | | | | |
| Molecular Weight per Crosslink (g/mole) ($M_c$) | 2053.00 | | | | |

The 1,10 decanediol, trimethylolpropane and DESMODUR W were preheated to 80° C. and added to a glass kettle. Under nitrogen blanket and with constant stirring, the mixture was heated to ~115° C. and allowed to compatibilize. Once clear, the mixture was degassed, and cast into a 12"×12"×0.125" (30.5 cm×30.5 cm 0.3 cm) casting cell preheated to 121° C. The filled cell was cured for 48 hours at 143° C.

This formulation in a 6"×6"×1" (15.2 cm×15.2 cm×2.5 cm) thickness passed a .40 caliber pistol shot from 30 feet (9.1 m) and 987 ft/sec speed with no cracking. From 20 feet (6.1 m) the bullet was also stopped and no cracking was observed. The formulation also passed multiple 9 mm, 1350 ft/sec (411 m/sec) shots from 20 feet (6.1 m) without cracking. In addition, the formulation also passed 3 consecutive 12-gauge shotgun shots (1290 ft/sec) from 30 feet (9.1 m) in a ⅜" thickness (18"×12"×⅜") (46 cm×30 cm×1 cm) using heavy game lead shot. In each test, the bullets ricocheted off the target.

Example D2

A polyurethane polymer according to the present invention was prepared from the components listed below in Table 23:

TABLE 23

|  | Solids | | | | Polymer Wt. (g) | Desired Batch Size (g) |
| --- | --- | --- | --- | --- | --- | --- |
| Monomer Name | PC-1733 | 1,5-pentanediol | TMP | Des W | 239.04 | 300.00 |
| OH # | — | — | — | — | | |
| Acid # | — | — | — | — | | |
| Equivalent Wt. | 440 | 52.08 | 44.00 | 131.2 | | |
| Equivalents desired | 0.15 | 0.55 | 0.3 | 1.0 | | |
| Mass Monomer | 66.00 | 28.64 | 13.20 | 131.20 | | |
| Weight % Monomer | 27.61% | 11.98% | 5.52% | 54.89% | | |
| Monomer masses for experiment | 82.83 | 35.95 | 16.57 | 164.66 | | |
| Weight % Hard Segment | 35.84 | | | | | |
| Weight % Urethane | 24.68 | | | | | |
| Molecular Weight per Crosslink (g/mole) ($M_c$) | 2390.4 | | | | | |

The 1,5 pentanediol, PC-1733, and trimethylolpropane and DESMODUR W preheated to 80° C. were added to a glass kettle. Under nitrogen blanket and with constant stirring, the mixture was heated to ~105° C. and allowed to compatibilize. Once clear, the mixture was degassed, and cast into a 12"×12"×0.125" (30.5 cm×30.5 cm 0.3 cm) casting cell preheated to 121° C. The filled cell was cured for 48 hours at 143° C.

This formulation passed multiple 9 mm, 115 grain, 1350 ft/sec shots by "catching" in bulk of the polymer in a 6"×6"×1" (15.2 cm×15.2 cm×2.5 cm) sample. The bullet penetration was approximately 0.25" (0.6 cm) with no ductile bulge in the back of the sample. The same formulation 4"×4"×1" (10.1 cm×10.1 cm×2.5 cm) sample also passed multiple .40 caliber shots in which the bullet was not caught or ricocheted. The bullet was sitting, slightly deformed, at the base of the sample. In a ⅜" (1 cm) thickness, this formulation passed three 12-gauge shotgun shots from 30 feet (9.1 m). Most of the shots were embedded in the surface of the sample.

Example D3

A polyurethane polymer according to the present invention was prepared from the components listed below in Table 24:

TABLE 24

|  | Solids | | | Polymer Wt. (g) | Desired Batch Size (g) |
| --- | --- | --- | --- | --- | --- |
| Monomer Name | 1,4-butanediol | TMP | Des W | 175.94 | 300.00 |
| OH # | — | — | — | | |
| Acid # | — | — | — | | |
| Equivalent Wt. | 45.06 | 44.00 | 131.2 | | |
| Equivalents desired | 0.7 | 0.3 | 1.0 | | |
| Mass Monomer | 31.54 | 13.20 | 131.20 | | |
| Weight % Monomer | 17.93% | 7.50% | 74.57% | | |

TABLE 24-continued

|  | Solids | | | Polymer Wt. (g) | Desired Batch Size (g) |
| --- | --- | --- | --- | --- | --- |
| Monomer masses for experiment | 53.78 | 22.51 | 223.71 | | |
| Weight % Hard Segment | 70.13 | | | | |
| Weight % Urethane | 33.53 | | | | |
| Molecular Weight per Crosslink (g/mole) ($M_c$) | 1759.42 | | | | |

The 1,4-butanediol, trimethylolpropane and DESMODUR W preheated to 80° C. were added to a glass kettle. Under nitrogen blanket and with constant stirring, the mixture was heated to ~105° C. and allowed to compatibilize. Once clear, the mixture was degassed, and cast into a 12"×12"×0.125" (30.5 cm×30.5 cm 0.3 cm) casting cell preheated to 121° C. The filled cell was cured for 48 hours at 143° C.

This formulation in a 6"×6"×1" (15.2 cm×15.2 cm×2.5 cm) sample passed multiple .40 caliber shots from 30 feet (9.1 m) with no cracking. The speed of the .40 caliber was 987 ft/sec (300 m). In ⅜" thickness at 60 ft (18.2 m), it passed multiple 12-gauge shotgun impacts with heavy gauge shot at 1290 ft/sec (393 m/sec) muzzle velocity. At 20 ft (6.1 m) and 30 ft (9.1 m), this formulation in 1" (2.5 cm) thickness broke when shot with a 9 mm pistol, 115 grain bullet with a speed of 1350 ft/sec (411 m/sec).

Example D4

A polyurethane polymer according to the present invention was prepared from the components listed below in Table 25:

TABLE 25

|  | Solids | | | Polymer Wt. (g) | Desired Batch Size (g) |
|---|---|---|---|---|---|
| Monomer Name | 1,5-pentanediol | TMP | Des W | 180.85 | 300.00 |
| OH # | — | — | — | | |
| Acid # | — | — | — | | |
| Equivalent Wt. | 52.075 | 44.00 | 131.2 | | |
| Equivalents desired | 0.7 | 0.3 | 1.0 | | |
| Mass Monomer | 36.45 | 13.20 | 131.20 | | |
| Weight % Monomer | 20.16% | 7.30% | 72.55% | | |
| Monomer masses for experiment | 60.47 | 21.90 | 217.64 | | |
| Weight % Hard Segment | 70.94 | | | | |
| Weight % Urethane | 32.62 | | | | |
| Molecular Weight per Crosslink (g/mole) ($M_c$) | 1808.53 | | | | |

The 1,5-pentanediol, trimethylolpropane and DESMODUR W preheated to 80° C. were added to a glass kettle.

TABLE 26

|  | Solids | | | | Polymer Wt. (g) | Desired Batch Size (g) |
|---|---|---|---|---|---|---|
| Monomer Name | KM10-1733 | 1,5-pentanediol | TMP | Des W | 258.44 | 300.00 |
| OH # | — | — | — | — | | |
| Acid # | — | — | — | — | | |
| Equivalent Wt. | 440 | 52.075 | 44.00 | 131.2 | | |
| Equivalents desired | 0.2 | 0.5 | 0.3 | 1.0 | | |
| Mass Monomer | 88.00 | 26.04 | 13.20 | 131.20 | | |
| Weight % Monomer | 34.05% | 10.07% | 5.11% | 50.77% | | |
| Monomer masses for experiment | 102.15 | 30.22 | 15.32 | 152.30 | | |
| Weight % Hard Segment | 44.20 | | | | | |
| Weight % Urethane | 22.83 | | | | | |
| Molecular Weight per Crosslink (g/mole) ($M_c$) | 2584.38 | | | | | |

The 1,5 pentanediol, KM10-1733 polycarbonate diol, and trimethylolpropane and DESMODUR W preheated to 80° C. were added to a glass kettle. Under nitrogen blanket and with constant stirring, the mixture was heated to ~105° C. and allowed to compatibilize. Once clear, the mixture was degassed, and cast into a 12"×12"×0.125" (30.5 cm×30.5 cm 0.3 cm) casting cell preheated to 143° C. The filled cell was cured for 48 hours at 121° C.

This formulation passed multiple 9 mm, 115 grain, 1350 ft/sec (393 m/sec) shots by "catching" in bulk of the polymer in a 6"×6"×1" (15.2 cm×15.2 cm×2.5 cm) sample. The bullet penetration was approximately 0.5" (1.2 cm) with a slight ductile bulge in the back of the sample. The same sample 4"×4"×1" (10.1 cm×10.1 cm×2.5 cm) also passed multiple .40 caliber shots in which the bullet was not caught or ricocheted. It was sitting, slightly deformed at the base of the sample. In a ⅜" (1 cm) thickness this formulation passed three 12-gauge shotgun shots from 30 feet (9.1 m). Most of the shots were embedded in the surface of the sample.

All 9 mm shots were 115 grain, 1350 ft/sec (411 m/sec) muzzle velocity shot from a Ruger 9 mm pistol. All .40 caliber shots were shot at 987 ft/sec (300 m) muzzle velocity from a Smith & Wesson .40 caliber pistol. All 12-gauge shotgun shots were shot using a Remington 12-gauge shotgun using lead shot, heavy game load, at 1290 ft/sec (393 m/sec) muzzle velocity. Samples were shot attached to a 12" thick wooden block using Velcro® with no framing to hold the sample. Shooting was conducted outdoors at temperatures ranging from about 60° F. (15° C.) to about 80° F. (27° C.).

Under nitrogen blanket and with constant stirring, the mixture was heated to ~115° C. and allowed to compatibilize. Once clear, the mixture was degassed, and cast into a 12"×12"×0.125" (30.5 cm×30.5 cm 0.3 cm) casting cell preheated to 121° C. The filled cell was cured for 48 hours at 143° C.

This formulation in a 6"×6"×1" (15.2 cm×15.2 cm×2.5 cm) sample passed a .40 caliber pistol shot from 30 feet (9.1 m) and 987 ft/sec (300 m) speed with no cracking. From 20 feet (6.1 m) the bullet was also stopped but some small cracks were observed. The formulation also passed multiple 9 mm, 1350 ft/sec (411 m/sec) shots from 20 feet (6.1 m) without cracking. In addition, the formulation also passed three consecutive 12-gauge shotgun shots (1290 ft/sec) (393 m/sec) from 30 feet (9.1 m) in a ⅜" (1 cm) thickness using heavy game lead shot.

Example D5

A polyurethane polymer according to the present invention was prepared from the components listed below in Table 26:

Example E

Samples prepared from Formulation 2 of Example A above were prepared and tested for Gardner Impact Strength as in Example A above. Sample E1 was prepared using a 35 weight percent trans, trans isomer of 4,4'-methylene-bis-(cyclohexyl isocyanate). Sample E2 was prepared using a 17 weight percent trans, trans isomer of 4,4'-methylene-bis-(cyclohexyl isocyanate). The Gardner Impact Strength of Sample E1 was 150 in-lbs (17 J). The Gardner Impact Strength of Sample E2 was 40 in-lbs (5 J). The Sample E1 prepared using a higher weight percentage of trans, trans 4,4'-methylene-bis-(cyclohexyl isocyanate) had higher Gardner Impact Strength than Sample E2, which was prepared using a lower weight percentage of trans, trans 4,4'-methylene-bis-(cyclohexyl isocyanate).

Example F

Samples were prepared from Formulation 1 of Example 1 above, further including 3 weight percent of CIBA TINUVIN B75 liquid light stabilizer system (commercially available from Ciba Specialty Chemicals) (which is a mixture of 20 weight percent IRGANOX 1135, 40 weight percent of TINUVIN 571 and 40 weight percent of TINUVIN 765). The initial Gardner Impact Strength was 75 in-lbs (9 J). After 1000 hours QUV-B, the Gardner Impact Strength was 75 in-lbs (9 J). The initial tensile strength was 13,400 psi (92.4 MPa) and after 1000 hours QUV-B was 13,100 psi (90.3 MPa). The initial percent elongation was 40% and after 1000 hours QUV-B was 50%.

Example G

Elastoplastic Polyurethane Examples

Example G1

The following reactants: 131.2 grams of DESMODUR W, 13.41 grams of trimethylolpropane, 26.015 grams of 1,5 pentanediol, and 81.712 grams Stahl KM-1733 1000 molecular weight polycarbonate diol based on hexanediol were mixed together, heated to 80° C. and degassed. Ten ppm of dibutyltindiacetate was added and mixed until the solution was homogeneous. The mixture was poured into a glass mold and cured for 48 hours at 290° F. (143° C.). After curing, the cell was allowed to cool to room temperature (25° C.) and the polymer was released from the mold. The polymer had a Young's Modulus of 215,000 psi (about 1482 MPa). The weight % urethane content was 23.4%. The molecular weight per crosslink was 2548 grams/mole. The weight % cyclic content was 32%.

An article of 6"×6"×1" (15.2 cm×15.2 cm×2.5 cm) thickness prepared from this polymer stopped a 9 mm, 125 grain, bullet shot an initial velocity of 1350 ft/sec (411 m/sec) (from 20 feet (6.1 m) distance by trapping the bullet in the polymer. The back of the bullet penetrated approximately ⅛" (0.3 cm) into the sample with a very small raise on the backside.

Example G2

The following reactants: 131.2 grams of DESMODUR W, 13.41 grams of trimethylolpropane, 28.096 grams of 1,5 pentanediol, and 65.370 grams Stahl KM-1733 1000 molecular weight polycarbonate diol based on hexanediol were mixed together, heated to 80° C. and degassed. Ten ppm of dibutyltindiacetate was added and mixed until the solution was homogeneous. The mixture was poured into a glass mold and cured for 48 hours at 290° F. (143° C.). After curing, the cell was allowed to cool to room temperature (25° C.) and the polymer was released from the mold. The polymer had a Young's Modulus of 215,000 psi (about 1482 MPa). The weight % urethane content was 24.8%. The molecular weight per crosslink was 2404 grams/mole. The weight % cyclic content was 34%.

An article of 6"×6"×1" (15.2 cm×15.2 cm×2.5 cm) prepared from this polymer stopped a 9 mm, 125 grain, bullet shot an initial velocity of 1350 ft/sec (411 m/sec) from 20 feet (6.1 m) distance by trapping the bullet in the polymer. Four/fifths (⅘) of the length of the bullet penetrated the sample with the back of the bullet protruding out of the impacted surface approximately ⅛" (0.3 cm).

Example G3

The following reactants: 131.2 grams of DESMODUR W, 13.41 grams of trimethylolpropane, 28.617 grams of 1,5 pentanediol, and 61.284 grams Stahl KM-1733 1000 molecular weight polycarbonate diol based on hexanediol were mixed together, heated to 80° C. and degassed. Ten ppm of dibutyltindiacetate was added and mixed until the solution was homogeneous. The mixture was poured into a glass mold and cured for 48 hours at 290° F. (143° C.). After curing, the cell was allowed to cool to room temperature (25° C.) and the polymer was released from the mold. The polymer had a Young's Modulus of 215,000 psi (about 1482 MPa). The weight % urethane content was 25.15%. The molecular weight per crosslink was 2369 grams/mole. The weight % cyclic content was 34.53%.

An article of 6"×6"×1" (15.2 cm×15.2 cm×2.5 cm) prepared from this polymer stopped a 9 mm, 125 grain, bullet shot an initial velocity of 1350 ft/sec (411 m/sec) from 20 feet (6.1 m) distance by trapping the bullet. Four/fifths (⅘) of the length of the bullet penetrated the sample with the back of the bullet protruding out of the impacted surface approximately ⅛" (0.3 cm).

Poly(ureaurethane) Examples

Example G4

The following reactants: 318.26 grams of DESMODUR W and 0.84 grams of trimethylolpropane containing 0.5% of dibutyltindiacetate were charged into a glass kettle and heated and stirred at 75° C. Deionized water (4.37 grams) was added, mixed, and reacted to form polyurea hard segments within the polyurethane prepolymer. Carbon dioxide foam was removed under vacuum. The temperature was then increased to 80° C. and reacted for 30 minutes. Outgassing was performed using 2 mm mercury vacuum and 63.42 grams of 1,5 pentanediol was added along with 32.76 grams of trimethylolpropane. The mixture was stirred and vacuum increased slowly. The exothermic temperature reached 95° C. at which time the mixture was poured into a 6"×6"×⅛" (15.2 cm×15.2 cm×0.3 cm) glass mold. The material was cured at 290° F. (143° C.) for 48 hours. The material was released from the mold at room temperature (25° C.) yielding a clear, highly transparent plastic.

Example G5

The following reactants: 2.23 grams of trimethylolpropane was reacted with 76.133 grams of DESMODUR W containing 10 ppm of dibutyltindiacetate at 80° C. to form a branched polyurethane terminated with isocyanate groups. Water (0.9 grams) was added to the batch after the temperature was lowered to 60° C., and reacted for two hours to form the polyurea portion of the polyurethane polyurea prepolymer. The carbon dioxide was then removed with vacuum and 38 grams of trimethylolpropane was added, mixed, degassed under vacuum and poured into a glass mold as described above at 75° C. After curing for 48 hours at 290° F. (143° C.), the plastic was removed from the mold at room temperature (25° C.) yielding a high modulus, highly transparent plastic. The Young's Modulus was 441,000 psi measured on an Instron testing machine at a 6"/minute crosshead speed.

Example G6

The following reactants: 2.23 grams of trimethylolpropane was reacted with 131.2 grams of DESMODUR W using 10 ppm of dibutyltindiacetate by weight of total batch to make a branched, isocyanate-terminated polyurethane prepolymer. Deionized water (1.34 grams) was added and reacted at 60° C. The carbon dioxide was removed via vacuum degassing. The temperature was increased to 75° C. and 39.66 grams of cyclohexanedimethanol was added as a chain extender. After mixing and degassing, the liquid was poured into a glass mold as described above and cured at 290° F. (143° C.) for 48 hours. Demolding was done at room temperature (25° C.) and yielded a high optical quality plastic sheet.

Example H

Example H1

A polyurethane was prepared from the following components:

|  | Solids |  |  | Polymer Wt. (g) | Desired Batch Size (g) |
|---|---|---|---|---|---|
| Monomer Name | 1,4-butanediol | TMP | Des W | 175.94 | 300.00 |
| OH # | — | — | — |  |  |
| Acid # | — | — | — |  |  |
| Equivalent Wt. | 45.06 | 44.00 | 131.2 |  |  |
| Equivalents desired | 0.7000 | 0.300 | 1.000 |  |  |
| Mass Monomer | 31.54 | 13.20 | 131.20 |  |  |
| Weight % Monomer | 17.93% | 7.50% | 74.57% |  |  |
| Monomer masses for experiment | 53.78 | 22.51 | 223.71 |  |  |

The 1,4-butanediol, trimethylolpropane, and DESMODUR W (preheated to 80° C.) were added to a glass kettle. Under nitrogen blanket and with constant stirring, the mixture was heated to ~105° C. and allowed to compatibilize. Once clear, the mixture was degassed and cast into a 12"×12"×0.125" (30 cm×30 cm×0.3 cm) casting cell preheated to 121° C. The casting was cured for 48 hours at 121° C. and 6 hours at 150° C. The mean Gardner Impact Strength was 102 in-lbs (12 J).

Example H2

A polyurethane was prepared from the following components:

|  | Solids |  |  | Polymer Wt. (g) | Desired Batch Size (g) |
|---|---|---|---|---|---|
| Monomer Name | 1,4-butanediol | TMP | Des W |  |  |
| OH # | — | — | — |  |  |
| Acid # | — | — | — |  |  |
| Equivalent Wt. | 45.06 | 44.00 | 131.2 |  |  |
| Equivalents desired | 0.7000 | 0.300 | 1.000 |  |  |
| Mass Monomer | 31.54 | 13.20 | 131.20 |  |  |
| Weight % Monomer | 17.93% | 7.50% | 74.57% |  |  |
| Monomer masses for experiment | 53.78 | 22.51 | 223.71 |  |  |
| Weight % Hard Segment | 70.13 |  |  |  |  |
| Weight % Urethane | 33.53 |  |  |  |  |
| $M_c$ | 1759.42 |  |  |  |  |

The 1,4-butanediol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 110 in-lbs (13 J).

Example H3

A polyurethane was prepared from the following components:

|  | Solids |  |  | Polymer Wt. (g) | Desired Batch Size (g) |
|---|---|---|---|---|---|
| Monomer Name | 1,4-butanediol | TMP | Des W | 175.94 | 300.00 |
| OH # | — | — | — |  |  |
| Acid # | — | — | — |  |  |
| Equivalent Wt. | 45.06 | 44.00 | 131.2 |  |  |
| Equivalents desired | 0.7000 | 0.300 | 1.000 |  |  |
| Mass Monomer | 31.54 | 13.20 | 131.20 |  |  |
| Weight % Monomer | 17.93% | 7.50% | 74.57% |  |  |
| Monomer masses for experiment | 53.78 | 22.51 | 223.71 |  |  |
| Weight % Hard Segment | 70.13 |  |  |  |  |
| Weight % Urethane | 33.53 |  |  |  |  |
| $M_c$ | 1759.42 |  |  |  |  |

The 1,4-butanediol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 131 in-lbs (15 J).

Example H4

A polyurethane was prepared from the following components:

| | Solids | | | Polymer Wt. (g) | Desired Batch Size (g) |
|---|---|---|---|---|---|
| Monomer Name | 1,5-pentanediol | TMP | Des W | 180.85 | 300.00 |
| OH # | — | — | — | | |
| Acid # | — | — | — | | |
| Equivalent Wt. | 52.075 | 44.00 | 131.2 | | |
| Equivalents desired | 0.7000 | 0.300 | 1.000 | | |
| Mass Monomer | 36.45 | 13.20 | 131.20 | | |
| Weight % Monomer | 20.16% | 7.30% | 72.55% | | |
| Monomer masses for experiment | 60.47 | 21.90 | 217.64 | | |
| Weight % Hard Segment | 70.94 | | | | |
| Weight % Urethane | 32.62 | | | | |
| $M_c$ | 1808.53 | | | | |

The 1,5-pentanediol, trimethylolpropane, and DESMODUR W (preheated to 80° C.) were added to a glass kettle. Under nitrogen blanket and with constant stirring, the mixture was heated to ~115° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 135 in-lbs (15 J).

Example H5

A polyurethane was prepared from the following components:

| | Solids | | | Polymer Wt. (g) | Desired Batch Size (g) |
|---|---|---|---|---|---|
| Monomer Name | 1,5-pentanediol | TMP | Des W | 178.43 | 300.00 |
| OH # | — | — | — | | |
| Acid # | — | — | — | | |
| Equivalent Wt. | 52.075 | 44.00 | 131.2 | | |
| Equivalents desired | 0.4000 | 0.600 | 1.000 | | |
| Mass Monomer | 20.83 | 26.40 | 131.20 | | |
| Weight % Monomer | 11.67% | 14.80% | 73.53% | | |
| Monomer masses for experiment | 35.02 | 44.39 | 220.59 | | |
| Weight % Hard Segment | 41.09 | | | | |
| Weight % Urethane | 33.07 | | | | |
| $M_c$ | 892.15 | | | | |

The 1,5-pentanediol, trimethylolpropane, and DESMODUR W (preheated to 80° C.) were added to a glass kettle. Under nitrogen blanket and with constant stirring, the mixture was heated to ~115° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 71 in-lbs (8 J).

Example H6

A polyurethane was prepared from the following components:

| | Solids | | | | Polymer Wt. (g) | Desired Batch Size (g) |
|---|---|---|---|---|---|---|
| Monomer Name | CHDM | 1,5-pentanediol | TMP | Des W | 187.86 | 300.00 |
| OH # | — | — | — | — | | |
| Acid # | — | — | — | — | | |
| Equivalent Wt. | 72.11 | 52.075 | 44.00 | 131.2 | | |
| Equivalents desired | 0.3500 | 0.3500 | 0.300 | 1.000 | | |
| Mass Monomer | 25.24 | 18.23 | 13.20 | 131.20 | | |
| Weight % Monomer | 13.43% | 9.70% | 7.03% | 69.84% | | |
| Monomer masses for experiment | 40.30 | 29.11 | 21.08 | 209.51 | | |
| Weight % Hard Segment | 37.88 | | | | | |
| Weight % Urethane | 31.41 | | | | | |
| $M_c$ | 1878.65 | | | | | |

The 1,5-pentanediol, CHDM, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 143 in-lbs (16 J).

Example H7

A polyurethane was prepared from the following components:

| Monomer Name | CHDM | TMP | Des W | Polymer Wt. (g) | Desired Batch Size (g) |
|---|---|---|---|---|---|
| | Solids | | | | |
| OH # | — | — | — | 194.88 | 352.00 |
| Acid # | — | — | — | | |
| Equivalent Wt. | 72.11 | 44.00 | 131.2 | | |
| Equivalents desired | 0.7000 | 0.300 | 1.000 | | |
| Mass Monomer | 50.48 | 13.20 | 131.20 | | |
| Weight % Monomer | 25.90% | 6.77% | 67.32% | | |
| Monomer masses for experiment | 91.17 | 23.84 | 236.98 | | |
| Weight % Hard Segment | 73.03 | | | | |
| Weight % Urethane | 30.28 | | | | |
| $M_c$ | 1948.77 | | | | |

The CHDM, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 63 in-lbs (7 J).

Example H8

A polyurethane was prepared from the following components:

| Monomer Name | CHDM | 1,4-butanediol | TMP | Des W | Polymer Wt. (g) |
|---|---|---|---|---|---|
| | Solids | | | | |
| OH # | — | — | — | — | 185.41 |
| Acid # | — | — | — | — | |
| Equivalent Wt. | 72.11 | 45.06 | 44.00 | 131.2 | |
| Equivalents desired | 0.3500 | 0.3500 | 0.300 | 1.000 | |
| Mass Monomer | 25.24 | 15.77 | 13.20 | 131.20 | |
| Weight % Monomer | 13.61% | 8.51% | 7.12% | 70.76% | |
| Monomer masses for experiment | 40.84 | 25.52 | 21.36 | 212.29 | |
| Weight % Hard Segment | 38.38 | | | | |
| Weight % Urethane | 31.82 | | | | |
| $M_c$ | 1854.10 | | | | |

The 1,4-butanediol, CHDM, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 47 in-lbs (5 J).

Example H9

A polyurethane was prepared from the following components:

| Monomer Name | 1,6-hexanediol | TMP | Des W | Polymer Wt. (g) | Desired Batch Size (g) |
|---|---|---|---|---|---|
| | Solids | | | | |
| OH # | — | — | — | 185.76 | 300.00 |
| Acid # | — | — | — | | |
| Equivalent Wt. | 59.09 | 44.00 | 131.2 | | |
| Equivalents desired | 0.7000 | 0.300 | 1.000 | | |
| Mass Monomer | 41.36 | 13.20 | 131.20 | | |
| Weight % Monomer | 22.27% | 7.11% | 70.63% | | |
| Monomer masses for experiment | 66.80 | 21.32 | 211.88 | | |
| Weight % Hard Segment | 71.71 | | | | |
| Weight % Urethane | 31.76 | | | | |
| $M_c$ | 1857.63 | | | | |

The 1,6-hexanediol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 130 in-lbs (15 J).

Example H10

A polyurethane was prepared from the following components:

| Monomer Name | 1,6-hexanediol | 1,4-butanediol | TMP | Des W | Polyther Wt. (g) | Desired Batch Size (g) |
|---|---|---|---|---|---|---|
| | Solids | | | | | |
| OH # | — | — | — | — | 180.85 | 300.00 |
| Acid # | — | — | — | — | | |
| Equivalent Wt. | 59.09 | 45.06 | 44.00 | 131.2 | | |
| Equivalents desired | 0.3500 | 0.3500 | 0.300 | 1.000 | | |
| Mass Monomer | 20.68 | 15.77 | 13.20 | 131.20 | | |
| Weight % Monomer | 11.44% | 8.72% | 7.30% | 72.55% | | |

|  | Solids |  |  | Polyther Wt. (g) | Desired Batch Size (g) |
|---|---|---|---|---|---|
| Monomer masses for experiment | 34.31 | 26.16 | 21.90 | 217.64 |  |
| Weight % Hard Segment | 91.09 |  |  |  |  |
| Weight % Urethane | 32.62 |  |  |  |  |
| $M_c$ | 1808.53 |  |  |  |  |

The 1,6-hexanediol, 1,4-butanediol, trimethylolpropane, and DESMODUR W (preheated to 80° C.) were added to a glass kettle. Under nitrogen blanket and with constant stirring, the mixture was heated to ~115° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 53 in-lbs (6 J).

Example H11

A polyurethane was prepared from the following components:

|  | Solids |  |  | Polymer Wt. (g) | Desired Batch Size (g) |
|---|---|---|---|---|---|
| Monomer Name | 1,4-cyclohexanediol | TMP | Des W | 185.06 | 352.00 |
| OH # | — | — | — |  |  |
| Acid # | — | — | — |  |  |
| Equivalent Wt. | 58.08 | 44.00 | 131.2 |  |  |
| Equivalents desired | 0.7000 | 0.300 | 1.000 |  |  |

|  | Solids |  |  |  | Polymer Wt. (g) | Desired Batch Size (g) |
|---|---|---|---|---|---|---|
| Monomer Name | CHDM | 1,6-hexanediol | TMP | Des W | 190.32 | 300.00 |
| OH # | — | — | — | — |  |  |
| Acid # | — | — | — | — |  |  |
| Equivalent Wt. | 72.11 | 59.09 | 44.00 | 131.2 |  |  |
| Equivalents desired | 0.3500 | 0.3500 | 0.300 | 1.000 |  |  |
| Mass Monomer | 25.24 | 20.68 | 13.20 | 131.20 |  |  |
| Weight % Monomer | 13.26% | 10.87% | 6.94% | 68.94% |  |  |
| Monomer masses for experiment | 39.78 | 32.60 | 20.81 | 206.81 |  |  |
| Weight % Hard Segment | 96.51 |  |  |  |  |  |
| Weight % Urethane | 31.00 |  |  |  |  |  |
| $M_c$ | 1903.20 |  |  |  |  |  |

The 1,6-hexanediol, CHDM, trimethylolpropane, and DESMODUR W (preheated to 80° C.) were added to a glass kettle. Under nitrogen blanket and with constant stirring, the mixture was heated to ~115° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 124 in-lbs (14 J).

Example H12

A polyurethane was prepared from the following components:

-continued

|  | Solids |  |  | Polymer Wt. (g) | Desired Batch Size (g) |
|---|---|---|---|---|---|
| Mass Monomer | 40.66 | 13.20 | 131.20 |  |  |
| Weight % Monomer | 21.97% | 7.13% | 70.90% |  |  |
| Monomer masses for experiment | 77.33 | 25.11 | 249.56 |  |  |
| Weight % Hard Segment | 71.60 |  |  |  |  |

|  | Solids | Polymer Wt. (g) | Desired Batch Size (g) |
|---|---|---|---|
| Weight % Urethane | 31.88 |  |  |
| $M_c$ | 1850.56 |  |  |

The 1,4-cyclohexanediol, trimethylolpropane, and DESMODUR W (preheated to 80° C.) were added to a glass kettle. Under nitrogen blanket and with constant stirring, the mixture was heated to ~95° C. and allowed to compatibilize. Once clear, the mixture was degassed, and cast into a 6"×6"×0.25" (15 cm×15 cm×0.3 cm) casting cell preheated to 121° C. The casting was cured for 48 hours at 121° C. The Gardner Impact Strength was 7 in-lbs (1 J).

Example H13

A polyurethane was prepared from the following components:

|  | Solids | | | Polymer Wt. (g) | Desired Batch Size (g) |
|---|---|---|---|---|---|
| Monomer Name | Ethylene glycol | TMP | Des W | 166.12 | 300.00 |
| OH # | — | — | — |  |  |
| Acid # | — | — | — |  |  |
| Equivalent Wt. | 31.035 | 44.00 | 131.2 |  |  |
| Equivalents desired | 0.7000 | 0.300 | 1.000 |  |  |
| Mass Monomer | 21.72 | 13.20 | 131.20 |  |  |
| Weight % Monomer | 13.08% | 7.95% | 78.98% |  |  |
| Monomer masses for experiment | 39.23 | 23.84 | 236.93 |  |  |
| Weight % Hard Segment | 68.36 |  |  |  |  |
| Weight % Urethane | 35.52 |  |  |  |  |
| $M_c$ | 1661.25 |  |  |  |  |

The ethylene glycol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 4 in-lbs (4 J).

Example H14

A polyurethane was prepared from the following components:

|  | Solids | | | Polymer Wt. (g) | Desired Batch Size (g) |
|---|---|---|---|---|---|
| Monomer Name | 1,4-butanediol | pentaerythritol | Des W | 172.95 | 300.00 |
| OH # | — | — | — |  |  |
| Acid # | — | — | — |  |  |
| Equivalent Wt. | 45.06 | 34.04 | 131.2 |  |  |
| Equivalents desired | 0.7000 | 0.300 | 1.000 |  |  |
| Mass Monomer | 31.54 | 10.21 | 131.20 |  |  |
| Weight % Monomer | 18.24% | 5.90% | 75.86% |  |  |
| Monomer masses for experiment | 54.71 | 17.71 | 227.58 |  |  |
| Weight % Hard Segment | 71.34 |  |  |  |  |
| Weight % Urethane | 34.11 |  |  |  |  |
| $M_c$ | 2306.04 |  |  |  |  |

The 1,4-butanediol, pentaerythritol, and DESMODUR W (preheated to 80° C.) were added to a glass kettle. Under nitrogen blanket and with constant stirring, the mixture was heated to ~150° C. The pentaerythritol never dissolved.

Example H15

A polyurethane was prepared from the following components:

|  | Solids | | | Polymer Wt. (g) | Desired Batch Size (g) |
|---|---|---|---|---|---|
| Monomer Name | 1,4-benzenedimethanol | TMP | Des W | 192.76 | 300.00 |
| OH # | — | — | — |  |  |
| Acid # | — | — | — |  |  |
| Equivalent Wt. | 69.085 | 44.00 | 131.2 |  |  |
| Equivalents desired | 0.7000 | 0.300 | 1.000 |  |  |
| Mass Monomer | 48.36 | 13.20 | 131.20 |  |  |
| Weight % Monomer | 25.09% | 6.85% | 68.06% |  |  |
| Monomer masses for experiment | 75.26 | 20.54 | 204.19 |  |  |
| Weight % Hard Segment | 95.81 |  |  |  |  |
| Weight % Urethane | 72.73 |  |  |  |  |
|  | 30.61 |  |  |  |  |
| $M_c$ | 1927.60 |  |  |  |  |

The 1,4-benzenedimethanol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 63 in-lbs (7 J).

Example H16

A polyurethane was prepared from the following components:

| | Solids | | | | Polymer Wt. (g) | Desired Batch Size (g) |
|---|---|---|---|---|---|---|
| Monomer Name | CHDM | 1,4-benzenedimethanol | TMP | Des W | 193.82 | 300.00 |
| OH # | — | — | — | — | | |
| Acid # | — | — | — | — | | |
| Equivalent Wt. | 72.11 | 69.085 | 44.00 | 131.2 | | |
| Equivalents desired | 0.3500 | 0.3500 | 0.300 | 1.000 | | |
| Mass Monomer | 25.24 | 24.18 | 13.20 | 131.20 | | |
| Weight % Monomer | 13.02% | 12.48% | 6.81% | 67.69% | | |
| Monomer masses for experiment | 39.07 | 37.43 | 20.43 | 203.08 | | |
| Weight % Hard Segment | 98.38 | | | | | |
| Weight % Urethane | 30.44 | | | | | |
| $M_c$ | 1938.18 | | | | | |

The 1,4-benzenedimethanol, CHDM, trimethylolpropane, and DESMODUR W (preheated to 80° C.) were added to a glass kettle. Under nitrogen blanket and with constant stirring, the mixture was heated to ~115° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 75 in-lbs (9 J).

Example H17

A polyurethane was prepared from the following components:

| | Solids | | | | Polymer Wt. (g) | Desired Batch Size (g) |
|---|---|---|---|---|---|---|
| Monomer Name | 1,4-benzenedimethanol | 1,4-butanediol | TMP | Des W | 184.35 | 300.00 |
| OH # | — | — | — | — | | |
| Acid # | — | — | — | — | | |
| Equivalent Wt. | 69.085 | 45.06 | 44.00 | 131.2 | | |
| Equivalents desired | 0.3500 | 0.3500 | 0.300 | 1.000 | | |
| Mass Monomer | 24.18 | 15.77 | 13.20 | 131.20 | | |
| Weight % Monomer | 13.12% | 8.55% | 7.16% | 71.17% | | |
| Monomer masses for experiment | 39.35 | 25.66 | 21.48 | 213.51 | | |
| Weight % Hard Segment | 93.16 | | | | | |
| Weight % Urethane | 32.00 | | | | | |
| $M_c$ | 1843.51 | | | | | |

The 1,4-benzenedimethanol, 1,4-butanediol, trimethylolpropane, and DESMODUR W (preheated to 80° C.) were added to a glass kettle. Under nitrogen blanket and with constant stirring, the mixture was heated to ~115° C. and allowed to compatibilize. Once clear, the mixture was degassed, and cast into a 12"×12"×0.125" (30 cm×30 cm×0.3 cm) casting cell preheated to 121° C. The casting was cured for 48 hours at 121° C. The Gardner Impact Strength was 62 in-lbs (7 J).

Example H18

A polyurethane was prepared from the following components:

|  | Solids | | | | Polymer Wt. (g) |
| --- | --- | --- | --- | --- | --- |
| Monomer Name | 1,4-benzenedimethanol | 1,6-hexanediol | TMP | Des W | 189.26 |
| OH # | — | — | — | — | |
| Acid # | — | — | — | — | |
| Equivalent Wt. | 69.085 | 59.09 | 44.00 | 131.2 | |
| Equivalents desired | 0.3500 | 0.3500 | 0.300 | 1.000 | |
| Mass Monomer | 24.18 | 20.68 | 13.20 | 131.20 | |
| Weight % Monomer | 12.78% | 10.93% | 6.97% | 69.32% | |
| Monomer masses for experiment | 38.33 | 32.78 | 20.92 | 207.97 | |
| Weight % Hard Segment | 95.93 | | | | |
| Weight % Urethane | 31.17 | | | | |
| $M_c$ | 1892.61 | | | | |

The 1,4-benzenedimethanol, 1,6-hexanediol, trimethylolpropane, and DESMODUR W (preheated to 80° C.) were added to a glass kettle. Under nitrogen blanket and with constant stirring, the mixture was heated to ~115° C. and allowed to compatibilize. Once clear, the mixture was degassed, and cast into a 12"×12"×0.125" (30 cm×30 cm×0.3 cm) casting cell preheated to 121° C. The casting was cured for 48 hours at 121° C. The Gardner Impact Strength was 64 in-lbs (7 J).

Example H19

A polyurethane was prepared from the following components:

|  | Solids | | | Polymer Wt. (g) | Desired Batch Size (g) |
| --- | --- | --- | --- | --- | --- |
| Monomer Name | 4,4'-trimethylene dipiperidine | TMP | Des W | 213.80 | 300.00 |
| OH # | — | — | — | | |
| Acid # | — | — | — | | |
| Equivalent Wt. | 99.14 | 44.00 | 131.2 | | |
| Equivalents desired | 0.7000 | 0.300 | 1.000 | | |
| Mass Monomer | 69.40 | 13.20 | 131.20 | | |
| Weight % Monomer | 32.46% | 6.17% | 61.37% | | |
| Monomer masses for experiment | 97.38 | 18.52 | 184.10 | | |
| Weight % Hard Segment | 75.42 | | | | |
| Weight % Urethane | 27.60 | | | | |
| $M_c$ | 2137.98 | | | | |

The 4,4'-trimethylene dipiperidine, TMP and DEMO-DUR W (preheated to 80° C.) were added to a glass kettle. The initial temperature was about 50° C., and when stirred jumped to about 60° C. and gelled into a white mass.

Example H20

A polyurethane was prepared from the following components:

| Monomer Name | 1,4-bis(hydroxyethyl) piperazine | TMP | Des W | Polymer Wt. (g) | Desired Batch Size (g) |
|---|---|---|---|---|---|
| | Solids | | | | |
| | | | | 205.38 | 300.00 |
| OH # | — | — | — | | |
| Acid # | — | — | — | | |
| Equivalent Wt. | 87.12 | 44.00 | 131.2 | | |
| Equivalents desired | 0.7000 | 0.300 | 1.000 | | |
| Mass Monomer | 60.98 | 13.20 | 131.20 | | |
| Weight % Monomer | 29.69% | 6.43% | 63.88% | | |
| Monomer masses for experiment | 89.08 | 19.28 | 191.64 | | |
| Weight % Hard Segment | 74.41 | | | | |
| Weight % Urethane | 28.73 | | | | |
| $M_c$ | 2053.84 | | | | |

The 1,4-bis(hydroxyethyl)piperazine, trimethylolpropane, and DESMODUR W (preheated to 80° C.) were added to a glass kettle. Under nitrogen blanket and with constant stirring, the mixture was heated to ~105° C., when the viscosity raised to a point where it could no longer be stirred. The mixture was not clear and non-melted 1,4-bis(hydroxyethyl)piperazine was present in the mixture.

Example H21

A polyurethane was prepared from the following components:

| Monomer Name | N,N'-bis(2-hydroxyethyl) oxamide | 1,4-butanediol | TMP | Des W |
|---|---|---|---|---|
| | Solids | | | |
| OH # | — | — | — | — |
| Acid # | — | — | — | — |
| Equivalent Wt. | 88.08 | 45.06 | 44.00 | 131.2 |
| Equivalents desired | 0.3500 | 0.3500 | 0.300 | 1.000 |
| Mass Monomer | 30.83 | 15.77 | 13.20 | 131.20 |
| Weight % Monomer | 16.14% | 8.26% | 6.91% | 68.69% |
| Monomer masses for experiment | 22.60 | 11.56 | 9.68 | 96.17 |
| | — | 11.61 | 4.83 | 47.94 |
| Weight % Hard Segment | 40.18 | | | |
| Weight % Urethane | 30.89 | | | |
| $M_c$ | 1909.99 | | | |

The N,N'-bis(2-hydroxyethyl) oxamide, 1,4-butanediol, trimethylolpropane, and DESMODUR W (preheated to 80° C.) were added to a glass kettle. Under nitrogen blanket and with constant stirring, the mixture was heated to ~105° C., when the viscosity raised to a point where it could no longer be stirred. The mixture was not clear and non-melted N,N'-bis(2-hydroxyethyl) oxamide was present in the mixture.

Example H22

A polyurethane was prepared from the following components:

| Monomer Name | 3,6-dithia-1,2-octanediol | TMP | Des W | Polymer Wt. (g) | Desired Batch Size (g) |
|---|---|---|---|---|---|
| | Solids | | | | |
| | | | | 208.52 | 300.00 |
| OH # | — | — | — | | |
| Acid # | — | — | — | | |
| Equivalent Wt. | 91.6 | 44.00 | 131.2 | | |
| Equivalents desired | 0.7000 | 0.300 | 1.000 | | |
| Mass Monomer | 64.12 | 13.20 | 131.20 | | |
| Weight % Monomer | 30.75% | 6.33% | 62.92% | | |
| Monomer masses for experiment | 92.25 | 18.99 | 188.76 | | |
| Weight % Hard Segment | 74.79 | | | | |
| Weight % Urethane | 28.29 | | | | |
| $M_c$ | 2085.20 | | | | |

The 3,6-dithia-1,2-octanediol, trimethylolpropane, and DESMODUR W (preheated to 80° C.) were added to a glass kettle. Under nitrogen blanket and with constant stirring, the mixture was heated to ~105° C., when the viscosity raised to the point that it could no longer be stirred. The mixture was degassed, and cast into a 6"×6"×0.25" (15 cm×15 cm×0.3 cm) casting cell preheated to 121° C. The casting was cured for 48 hours at 121° C. The mean Gardner Impact Strength was 81 in-lbs (9 J).

Example H23

A polyurethane was prepared from the following components:

| | Solids | | | | | Polymer Wt. (g) |
|---|---|---|---|---|---|---|
| Monomer Name | 3,6-dithia-1,2-octanediol | bis(4-(2-hydroxyethoxy)-3,5-dibromophenyl) sulfone | CHDM | TMP | Des W | 258.90 |
| OH # | — | — | — | — | — | |
| Acid # | — | — | — | — | — | |
| Equivalent Wt. | 91.6 | 326.985 | 72.11 | 44.00 | 131.2 | |
| Equivalents desired | 0.2333 | 0.2333 | 0.2333 | 0.300 | 1.000 | |
| Mass Monomer | 21.37 | 76.30 | 16.83 | 13.20 | 131.20 | |
| Weight % Monomer | 8.26% | 29.47% | 6.50% | 5.10% | 50.68% | |
| Monomer masses for experiment | 24.77 | 88.41 | 19.50 | 15.30 | 152.03 | 300.00 |
| Weight % Hard Segment | 99.10 | | | | | |
| Weight % Urethane | 22.79 | | | | | |
| $M_c$ | 2588.96 | | | | | |

The 3,6-dithia-1,2-octanediol, bis(4-(2-hydroxyethoxy)-3,5-dibromophenyl) sulfone, CHDM, trimethylolpropane, and DESMODUR W (preheated to 80° C.) were added to a glass kettle. Under nitrogen blanket and with constant stirring, the mixture was heated to ~115° C. and allowed to compatibilize. The mixture was degassed, and cast into a 12"×12"×0.125" (30 cm×30 cm×0.3 cm) casting cell preheated to 121° C. The casting was cured for 48 hours at 121° C.

Example H24

A polyurethane polymer according to the present invention was prepared from the components listed below:

| | Solids | | | Polymer Wt. (g) | Desired Batch Size (g) |
|---|---|---|---|---|---|
| Monomer Name | 2,2-thiodiethanol | TMP | Des W | 187.17 | 200.00 |
| OH # | — | — | — | | |
| Acid # | — | — | — | | |
| Equivalent Wt. | 61.10 | 44.00 | 131.2 | | |
| Equivalents desired | 0.7000 | 0.300 | 1.000 | | |
| Mass Monomer | 42.77 | 13.20 | 131.20 | | |
| Weight % Monomer | 22.85% | 7.05% | 70.10% | | |
| Monomer masses for experiment | 45.70 | 14.11 | 140.20 | | |
| Weight % Hard Segment | 71.92 | | | | |
| Weight % Urethane | 31.52 | | | | |
| $M_c$ | 1871.67 | | | | |

The 2,2-thiodiethanol, trimethylolpropane, and DESMODUR W (preheated to 80° C.) were added to a glass kettle. Under nitrogen blanket and with constant stirring, the mixture was heated to ~95° C. and allowed to compatibilize. Once clear, the mixture was degassed, and cast into a 6"×6"×0.25" (15 cm×15 cm×0.3 cm) casting cell preheated to 121° C. The casting was cured for 48 hours at 121° C. The Gardner Impact Strength was 5 in-lbs. (1 J) and the sample was brittle.

Example H25

A polyurethane was prepared from the following components:

| | Solids | | | | Polymer Wt. (g) | Desired Batch Size (g) |
|---|---|---|---|---|---|---|
| Monomer Name | thiodiethanol | 1,4-butanediol | TMP | Des W | 181.56 | 300.00 |
| OH # | — | — | — | — | | |
| Acid # | — | — | — | — | | |
| Equivalent Wt. | 61.1 | 45.06 | 44.00 | 131.2 | | |
| Equivalents desired | 0.3500 | 0.3500 | 0.300 | 1.000 | | |
| Mass Monomer | 21.39 | 15.77 | 13.20 | 131.20 | | |
| Weight % Monomer | 11.78% | 8.69% | 7.27% | 72.26% | | |
| Monomer masses for experiment | 35.34 | 26.06 | 21.81 | 216.79 | | |

|  | Solids | Polymer Wt. (g) | Desired Batch Size (g) |
|---|---|---|---|
| Weight % Hard Segment | 37.07 | | |
| Weight % Urethane | 32.50 | | |
| $M_c$ | 1815.56 | | |

The thiodiethanol, 1,4-butanediol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 39 in-lbs (4 J).

Example H26

A polyurethane was prepared from the following components:

|  | Solids | | | | Polymer Wt. (g) | Desired Batch Size (g) |
|---|---|---|---|---|---|---|
| Monomer Name | thiodiethanol | 1,6-hexanediol | TMP | Des W | 186.47 | 300.00 |
| OH # | — | — | — | — | | |
| Acid # | — | — | — | — | | |
| Equivalent Wt. | 61.1 | 59.09 | 44.00 | 131.2 | | |
| Equivalents desired | 0.3500 | 0.3500 | 0.300 | 1.000 | | |
| Mass Monomer | 21.39 | 20.68 | 13.20 | 131.20 | | |
| Weight % Monomer | 11.47% | 11.09% | 7.08% | 70.36% | | |
| Monomer masses for experiment | 34.41 | 33.27 | 21.24 | 211.08 | | |
| Weight % Hard Segment | 36.09 | | | | | |
| Weight % Urethane | 31.64 | | | | | |
| $M_c$ | 1864.67 | | | | | |

The thiodiethanol, 1,6-hexanediol, trimethylolpropane, and DESMODUR W (preheated to 80° C.) were added to a glass kettle. Under nitrogen blanket and with constant stirring, the mixture was heated to ~105° C. and allowed to compatibilize. The mixture was degassed, and cast into a 12"×12"×0.125" (30 cm×30 cm×0.3 cm) casting cell preheated to 121° C. The casting was cured for 48 hours at 121° C. The mean Gardner Impact Strength was 55 in-lbs (6 J).

Example H27

A polyurethane was prepared from the following components:

|  | Solids | | | Polymer Wt. (g) | Desired Batch Size (g) |
|---|---|---|---|---|---|
| Monomer Name | 1,4-butanediol | Des N 3400 | Des W | 182.80 | 300.00 |
| OH # | — | — | — | | |
| Acid # | — | — | — | | |
| Equivalent Wt. | 45.06 | 153.00 | 131.2 | | |
| Equivalents desired | 1.0000 | 0.300 | 0.700 | | |
| Mass Monomer | 45.06 | 45.90 | 91.84 | | |
| Weight % Monomer | 24.65% | 25.11% | 50.24% | | |
| Monomer masses for experiment | 73.95 | 75.33 | 150.72 | | |
| Weight % Hard Segment | 96.42 | | | | |
| Weight % Urethane | 32.28 | | | | |
| $M_c$ | 1828.00 | | | | |

The 1,4-butanediol, Des N 3400 and DESMODUR W (preheated to 80° C.) were added to a glass kettle. Under nitrogen blanket and with constant stirring, the mixture was heated to ~105° C. The mixture was degassed, and cast into a 6"×6"×0.25" (15 cm×15 cm×0.3 cm) casting cell preheated to 121° C. The casting was cured for 48 hours at 121° C. The mean Gardner Impact Strength was 35 in-lbs (4 J).

Example H28

A polyurethane was prepared from the following components:

|  | Solids | | | | Polymer Wt. (g) | Desired Batch Size (g) |
|---|---|---|---|---|---|---|
| Monomer Name | H$_2$O | 1,4-butanediol | TMP | Des W | 163.32 | 300.00 |
| OH # | — | — | — | — | | |
| Acid # | — | — | — | — | | |
| Equivalent Wt. | 9.01 | 45.06 | 44.00 | 131.2 | | |
| Equivalents desired | 0.3500 | 0.3500 | 0.300 | 1.000 | | |
| Mass Monomer | 3.15 | 15.77 | 13.20 | 131.20 | | |
| Weight % Monomer | 1.93% | 9.66% | 8.08% | 80.33% | | |
| Monomer masses for experiment | 5.79 | 28.97 | 24.25 | 240.99 | | |
| Weight % Hard Segment | 79.41 | | | | | |
| Weight % Urethane | 36.12 | | | | | |
| M$_c$ | 1633.25 | | | | | |

The 1,4-butanediol, TMP, DESMODUR W (preheated to 80° C.), and deionized water were added to a glass kettle. Under nitrogen blanket and with constant stirring, the mixture was heated to ~105° C. and allowed to compatibilize. After compatibilization, condensation (water) was observed on the sides of the kettle.

Example H29

A polyurethane was prepared from the following components:

| Component | Equivalent Weight | Equivalents | Weight (g) | Weight (%) |
|---|---|---|---|---|
| TMP | 44.7 | 0.05 | 2.2 | 1.3 |
| 1,4-butanediol | 45 | 0.95 | 42.8 | 24.3 |
| Des W | 131 | 1.0 | 131 | 74.4 |

The 1,4-butanediol, TMP and DESMODUR W (preheated to 80° C.) were added to a glass kettle. Under nitrogen blanket and with constant stirring, the mixture was heated to ~110° C. The mixture was degassed, and cast into a 15"×15"×0.125" (38 cm×38 cm×0.3 cm) casting cell preheated to 121° C. The casting was cured for 48 hours at 121° C. The mean Gardner Impact Strength was 300 in-lbs (35 J). The W$_u$ was 33.5%, the W$_c$ was 46% and the M$_c$ was 10,569 g/mol.

Example H30

A polyurethane was prepared from the following components:

| Component | Equivalent Weight | Equivalents | Weight (g) | Weight (%) |
|---|---|---|---|---|
| TMP | 44.7 | 0.05 | 2.2 | 1.2 |
| 1,5-pentanediol | 52 | 0.95 | 49.5 | 27.1 |
| Des W | 131 | 1.0 | 131 | 71.7 |

The 1,5-pentanediol, TMP and DESMODUR W (preheated to 80° C.) were added to a glass kettle. Under nitrogen blanket and with constant stirring, the mixture was heated to ~110° C. The mixture was degassed, and cast into a 15"×15"×0.125" (38 cm×38 cm×0.3 cm) casting cell preheated to 121° C. The casting was cured for 48 hours at 121° C. The mean Gardner Impact Strength was 400 in-lbs (46 J). The W$_u$ was 32.3%, the W$_c$ was 44.3% and the M$_c$ was 10,973 g/mol.

Example H31

A polyurethane was prepared from the following components:

| Component | Equivalent Weight | Equivalents | Weight (g) | Weight (%) |
|---|---|---|---|---|
| TMP | 44.7 | 0.05 | 2.2 | 1.0 |
| 1,10-decanediol | 87 | 0.95 | 82.8 | 38.3 |
| Des W | 131 | 1.0 | 131 | 60.6 |

The 1,10-decanediol, TMP and DESMODUR W (preheated to 80° C.) were added to a glass kettle. Under nitrogen blanket and with constant stirring, the mixture was heated to ~110° C. The mixture was degassed, and cast into a 15"×15"×0.125" (38 cm×38 cm×0.3 cm) casting cell preheated to 121° C. The casting was cured for 48 hours at 121° C. The mean Gardner Impact Strength was >640 in-lbs (>74 J). The W$_u$ was 27.3%, the W$_c$ was 37.5% and the M$_c$ was 12,974 g/mol. The Dynatup Impact Strength was 77 Joules.

Example H32

A polyurethane was prepared from the following components:

| Component | Equivalent Weight | Equivalents | Weight (g) | Weight (%) |
|---|---|---|---|---|
| TONE 210 | 406.4 | 0.2 | 81.3 | 32.3 |
| 1,5-pentanediol | 52 | 0.5 | 26.0 | 10.3 |
| TMP | 44.7 | 0.3 | 13.4 | 5.3 |
| Des W | 131 | 1.0 | 131 | 52.0 |

The TONE 210, 1,5-pentanediol, TMP and DESMODUR W (preheated to 80° C.) were added to a glass kettle. Under nitrogen blanket and with constant stirring, the mixture was heated to ~110° C. The mixture was degassed, and cast into a 15"×15"×0.125" (38 cm×38 cm×0.3 cm) casting cell preheated to 121° C. The casting was cured for 48 hours at 121° C. The $W_u$ was 23.4%, the $W_c$ was 32% and the $M_c$ was 2542 g/mol.

Example H33

A polyurethane was prepared from the following components:

| Component | Equivalent Weight | Equivalents | Weight (g) | Weight (%) |
|---|---|---|---|---|
| TONE 210 | 406.4 | 0.15 | 61.0 | 26.1 |
| 1,5-pentanediol | 52 | 0.55 | 28.6 | 12.2 |
| TMP | 44.7 | 0.3 | 13.4 | 5.7 |
| Des W | 131 | 1.0 | 131 | 56.0 |

The TONE 210, 1,5-pentanediol, TMP and DESMODUR W (preheated to 80° C.) were added to a glass kettle. Under nitrogen blanket and with constant stirring, the mixture was heated to ~110° C. The mixture was degassed, and cast into a 15"×15"×0.125" (38 cm×38 cm×0.3 cm) casting cell preheated to 121° C. The casting was cured for 48 hours at 121° C. The $W_u$ was 25.2%, the $W_c$ was 34.6% and the $M_c$ was 2342 g/mol.

Example I

Samples of Formulations 1-10 of Example A, Plexiglas from McMasterCarr, Poly 84 stretched acrylic and commercial grade LEXAN were tested for K-factor according to the following conditions:

Load cell: 2000 $lb_f$
Humidity (%): 50
Temperature: 73° F. (23° C.)
Test Speed: 320 $lb_f$/min
Thickness: 0.120"

| Test # | Sample ID | Width (in.) | Thickness (in.) | Crack (in.) | Load (lbs) | Time (sec) | K Factor |
|---|---|---|---|---|---|---|---|
| 34 | 1A | 2.138 | 0.123 | 0.575 | 345.800 | 345.800 | 1296.220 |
| 36 | 1B | 2.144 | 0.122 | 0.600 | 318.400 | 318.400 | 1241.140 |
| 35 | 1C | 2.135 | 0.128 | 0.700 | 294.200 | 294.200 | 1199.424 |
| 31 | 2A | 1.995 | 0.123 | 0.750 | 304.400 | 304.400 | 1477.415 |
| 33 | 2B | 1.990 | 0.131 | 0.650 | 322.100 | 322.100 | 1330.586 |
| 32 | 2C | 1.965 | 0.132 | 0.750 | 278.700 | 278.700 | 1279.169 |
| 29 | 3A | 1.986 | 0.125 | 0.475 | 216.400 | 216.400 | 777.079 |
| 30 | 3B | 1.972 | 0.130 | 0.425 | 228.200 | 228.200 | 746.028 |
| 1 | 3C | 1.988 | 0.127 | 0.750 | 175.600 | 117.067 | 822.370 |
| 26 | 4A | 2.017 | 0.125 | 0.600 | 327.600 | 327.600 | 1321.788 |
| 27 | 4B | 2.009 | 0.120 | 0.750 | 276.500 | 276.500 | 1359.195 |
| 28 | 4C | 2.023 | 0.123 | 0.675 | 283.500 | 283.500 | 1259.891 |
| 24 | 5A | 2.023 | 0.122 | 0.600 | 20.9.4 | 157.050 | 866.505 |
| 23 | 5B | 2.020 | 0.120 | 0.750 | 179.900 | 107.940 | 874.598 |
| 25 | 5C | 2.056 | 0.166 | 0.700 | 205.100 | 205.100 | 967.357 |
| 14 | 6A | 2.053 | 0.124 | 0.650 | 291.000 | 218.250 | 1225.187 |
| 16 | 6B | 2.039 | 0.122 | 0.670 | 245.900 | 245.900 | 1086.512 |
| 15 | 6C | 2.068 | 0.127 | 0.690 | 271.100 | 232.371 | 1144.531 |
| 12 | 7A | 2.024 | 0.127 | 0.620 | 277.600 | 185.067 | 1125.576 |
| 13 | 7B | 2.034 | 0.130 | 0.750 | 288.300 | 192.200 | 1288.378 |
| 11 | 7C | 2.019 | 0.128 | 0.750 | 278.700 | 101.345 | 1276.297 |
| 10 | 8A | 2.006 | 0.124 | 0.960 | 238.400 | 158.933 | 1388.038 |
| 9 | 8B | 2.021 | 0.124 | 0.800 | 284.600 | 87.569 | 1402.845 |
| 2 | 8C | 2.009 | 0.118 | 0.750 | 355.400 | 266.550 | 1776.120 |
| 6 | 9A | 2.003 | 0.118 | 0.520 | 1179.000 | 428.727 | 4681.823 |
| 8 | 9B | 2.020 | 0.123 | 0.670 | 345.800 | 106.400 | 1525.675 |
| 7 | 9C | 1.992 | 0.118 | 0.450 | 1220.000 | 395.676 | 4486.874 |
| 3 | 10A | 2.010 | 0.116 | 0.750 | 782.300 | 586.725 | 3956.318 |
| 4 | 10B | 2.021 | 0.119 | 0.450 | 742.600 | 270.036 | 2655.849 |
| 5 | 10C | 2.023 | 0.119 | 0.450 | 756.000 | 274.909 | 2700.237 |
| 21 | 11A | 2.011 | 0.132 | 0.650 | 272.200 | 98.982 | 1106.454 |
| 22 | 11B | 2.006 | 0.130 | 0.650 | 220.700 | 115.148 | 910.576 |
| 20 | 11C | 2.011 | 0.130 | 0.650 | 255.000 | 78.462 | 1048.797 |
| 19 | 12A | 2.019 | 0.134 | 0.650 | 873.600 | 268.800 | 3470.984 |
| 17 | 12B | 2.021 | 0.132 | 0.680 | 798.900 | 290.509 | 3313.758 |
| 18 | 12C | 2.023 | 0.133 | 0.710 | 863.400 | 313.964 | 3655.555 |
| 37 | 13A | 2.036 | 0.125 | 1.500 | 1435.000 | 521.818 | 15960.663 |
| 38 | 13B | 2.024 | 0.126 | 1.500 | 1401.000 | 262.688 | 15670.107 |
| 39 | 13C | 2.024 | 0.133 | 1.500 | 1456.000 | 273.000 | 15489.381 |

Example J

A polyurethane was prepared from the following components:

| | Solids | | | Polymer Wt. (g) | Desired Batch Size (g) |
|---|---|---|---|---|---|
| Monomer Name | 1,5-pentanediol | TMP | Des W | | 2100.00 |
| OH # | — | — | — | | |
| Acid # | — | — | — | | |
| Equivalent Wt. | 52.075 | 44.00 | 131.2 | | |
| Equivalents desired | 0.4000 | 0.600 | 1.000 | | |
| Mass Monomer | 20.83 | 26.40 | 131.20 | 178.43(sum) | |
| Weight % Monomer | 11.67% | 14.80% | 73.53% | | |
| Monomer masses for experiment | 245.15 | 310.71 | 1544.13 | | |
| Weight % Hard Segment | 41.09 | 0.4(131 + 52)/178.43 | | | |
| Weight % Urethane | 33.07 | 59 g/eq./178.43 g/eq. | | | |
| $M_c$ | 892.15 | 178.43/0.2 moles TMP | | | |

The 1,5-pentanediol, trimethylolpropane, and DESMODUR W (preheated to 80° C.) were added to a glass kettle. Under nitrogen blanket and with constant stirring, the mixture was heated to ~115° C. and allowed to compatibilize. Once clear, the mixture was degassed, and cast into a 14"×14"×0.375" casting cell preheated to 121° C. A first set of samples was cured for 48 hours at 121° C. A second set of samples was cured for 48 hours at 121° C. and for 12 hours at 145° C. Each set of samples was evaluated for stress craze resistance by immersion for 30 minutes in 75% aqueous solution of sulfuric acid. The second set of samples passed 30 minutes at 4000 psi.

Example K

Trimethylolpropane (0.05 equivalents), 1,10-decanediol (0.95 equivalents) and DESMODUR W (1.0 equivalents, preheated to 80° C.) were added to a glass kettle. Under nitrogen blanket and with constant stirring, the mixture was heated to 110° C. and allowed to compatibilize. Once clear, the mixture was degassed, and cast into a 12"×12"×0.125" casting cell preheated to 143° C. The filled cell was cured for 48 hours at 121° C. The Dynatup Multiaxial Impact Strength was 77 Joules, measured in accordance with ASTM-D 3763-02. The Dynatup Multiaxial Impact Strength of a sample of Lexan was 72 Joules.

Example L

Example L1

An isocyanate functional urethane prepolymer was prepared by reacting 0.3 equivalents of 1,5-pentanediol, 1.0 equivalent of DESMODUR W and 10 ppm dibutyltin diacetate as reactants in a glass kettle under vacuum. The reaction temperature was maintained at 143° C. for 10 hours and 0.4 equivalents of 1,5-pentanediol and 0.3 equivalents of trimethylolpropane were added. After about 30 minutes at 110° C., the mixture was cast between release coated glass molds and cured for 72 hours at 290° F. (143° C.). The mold was removed from the oven and the plastic released. The Gardner Impact strength was 256 in-lbs (29 J).

An isocyanate functional urethane prepolymer was prepared by reacting 0.5 equivalents of 1,5-pentanediol and 1.0 equivalent of DESMODUR W and 10 ppm dibutyltin diacetate as reactants in a glass kettle under vacuum. The reaction temperature was maintained at 143° C. for 10 hours and 0.2 equivalents of 1,5-pentanediol and 0.3 equivalents of trimethylolpropane were added. After about 30 minutes at 110° C., the mixture was cast between release coated glass molds and cured for 72 hours at 290° F. (143° C.). The mold was removed from the oven and the plastic released. The Gardner Impact strength was 256 in-lbs (29 J).

The sample prepared from an isocyanate functional urethane prepolymer having a higher amount (0.5 equivalents) of 1,5-pentanediol had a higher Gardner Impact strength. While not intending to be bound by any theory, it is believed that the miscibility between the components is improved by pre-reacting a portion of the short chain diol with the polyisocyanate.

Example L2

Samples Prepared Using Isocyanate Functional Prepolymer

Sample A

An isocyanate functional urethane prepolymer was prepared by reacting 0.3 equivalents of 1,5-pentanediol and 1.0 equivalent of DESMODUR W 4,4'-methylene-bis-(cyclohexyl isocyanate) in a glass reaction kettle under vacuum and nitrogen blanket. The prepolymer components were preheated to a temperature of 110° C., liquefied and degassed in a vacuum oven before mixing. The glass reaction kettle was preheated to a temperature of between 60° C.-80° C. before the addition of the prepolymer components. The reaction temperature was maintained at 120° C. for 15 minutes. Next, 0.4 equivalents of 1,5-pentanediol and 0.3 equivalents of trimethylolpropane were added. The 0.4 equivalents of 1,5-pentanediol and 0.3 equivalents of trimethylolpropane were preheated to a temperature of 80° C., liquefied and degassed in a vacuum oven before their addition to the mixture. The kettle was placed into a preheated heating mantle for about 15 minutes up to a temperature of approximately 120° C. while the formulation was stirred and outgassed under a vacuum pressure of −28 mmHg. Next, the mixture was cast between release coated 1"×15"×15" (2.5 cm×38.1 cm×38.1 cm) casting cell glass molds with a resin volume of 3600 grams which had been preheated to a temperature of approximately 120° C. The mixture was cured for two hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 256 in-lbs (29 J).

Sample B

An isocyanate functional urethane prepolymer was prepared by reacting 0.3 equivalents of 1,5-pentanediol and 1.0 equivalent of DESMODUR W in a glass reaction kettle under vacuum and nitrogen blanket. The prepolymer components were preheated to a temperature of 110° C., liquefied and degassed in a vacuum oven before mixing. The glass reaction kettle was preheated to a temperature of between 60° C.-80° C. before the addition of the prepolymer components. The reaction temperature was maintained at 120° C. for 15 minutes. Next, 0.1 equivalents of 1,5-pentanediol and 0.6 equivalents of trimethylolpropane were added. The 0.1 equivalents of 1,5-pentanediol and 0.6 equivalents of trimethylolpropane were preheated to a temperature of 80° C., liquefied and degassed in a vacuum oven before their addition to the mixture. The kettle was placed into a preheated heating mantle for about 15 minutes up to a temperature of approximately 120° C. while the formulation was stirred and outgassed under a vacuum pressure of −29 mmHg. Next, the mixture was cast between release coated 1"×15"×15" (2.5 cm×38.1 cm×38.1 cm) casting cell glass molds with a resin volume of 3600 grams which had been preheated to a temperature of approximately 120° C. The mixture was cured for two hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 100 in-lbs (11.3 J).

Sample C

An isocyanate functional urethane prepolymer was prepared by reacting 0.3 equivalents of 1,5-pentanediol and 1.0 equivalent of DESMODUR W in a glass reaction kettle under vacuum and nitrogen blanket. The prepolymer components were preheated to a temperature of 110° C., liquefied and degassed in a vacuum oven before mixing. The glass reaction kettle was preheated to a temperature of between 60° C.-80° C. before the addition of the prepolymer components. The reaction temperature was maintained at 120° C. for 15 minutes. Next, 0.2 equivalents of 1,5-pentanediol and 0.5 equivalents of trimethylolpropane were added. The 0.2 equivalents of 1,5-pentanediol and 0.5 equivalents of trimethylolpropane were preheated to a temperature of 80° C., liquefied and degassed in a vacuum oven before their addition to the mixture. The kettle was placed into a preheated heating mantle for about 15 minutes up to a temperature of approximately 120° C. while the formulation was stirred and outgassed under a vacuum pressure of −28 mmHg. Next, the mixture was cast between release coated 1"×15"×15" (2.5 cm×38.1 cm×38.1 cm) casting cell glass molds with a resin volume of 3600 grams which had been preheated to a temperature of approximately 120° C. The mixture was cured for two hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 56 in-lbs (6.3 J).

Samples A-C were evaluated for glass transition temperature (Tg), Gardner Impact Strength, Yellowness Index (YI), Light Transmittance (% T), Tensile Strength at Yield, Tensile Elongation at Break, and Young's Modulus. Glass transition temperature (Tg) was measured using DMA. Rectangular bars with nominal dimensions: ~60 mm length×13 mm width×~3 mm thickness were mounted onto a TAI DMA 2980 in the three-point bending mode (50 mm span) and scanned at 3° C./min. from −90 to 180° C. at a frequency of 1 Hz, 20 µm amplitude, 120% auto strain, 10 mN static force and a data point collected per 4 sec. Tensile strength at yield, Tensile elongation at break and Young's Modulus were measured at about 25° C. in accordance with ASTM-D-638-03 for five samples of each of Samples A-C. Prior to testing, the samples were conditioned for about 40 hours at about 23° C. and 50% RH. The average sample dimensions were 7"×0.506"×0.136" (17.78 cm×1.285 cm×0.345 cm). The crosshead speed was 6.0 inches/min (15.24 cm/min). The results are set forth below:

| Sample # | DMA Tg (° C.) | Gardner Impact Strength (In-lbs) | Optical YI | % T | Tensile Strength at Yield (PSI) | Tensile Elongation at Break (%) | Tensile Modulus (Youngs) (PSI) |
|---|---|---|---|---|---|---|---|
| A | 116 | 126 | 0.71 | 89.63 | 12700 | 20 | 301000 |
| A |  | 140 |  |  |  |  |  |
| A |  | 77 |  |  |  |  |  |
| B | 134 | 28 | 1.2 | 91.48 | 14200 | 15 | 328000 |
| C | 130 | 61 | 1.21 | 90.58 | 13900 | 14 | 321000 |

Sample D

An isocyanate functional urethane prepolymer was prepared by reacting 0.1 equivalents of 1,5-pentanediol and 1.0 equivalent of DESMODUR W in a glass reaction kettle under vacuum and nitrogen blanket. The glass reaction kettle was preheated to a temperature of between 60° C.-80° C. before the addition of the prepolymer components. The initial reaction temperature of the components was 67° C. and heated to 90° C. The prepolymer components were preheated to a temperature of 110° C., liquefied and degassed in a vacuum oven before mixing. The temperature was increased to 125° C. over approximately 135 minutes until the temperature of the prepolymer components was approximately 121° C. Next, 0.9 equivalents of trimethylolpropane were added to the mixture. The 0.9 equivalents of trimethylolpropane were preheated to a temperature of 130° C., liquefied and degassed in a vacuum oven before their addition to the mixture. Next, the mixture was cast between release coated 1"×15"×15" (2.5 cm×38.1 cm×38.1 cm) casting cell glass molds with a resin volume of 3600 grams which had been preheated to a temperature of approximately 120° C. The mixture was cured for two hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 27 in-lbs (3 J).

Sample E

An isocyanate functional urethane prepolymer was prepared by reacting 0.2 equivalents of 1,5-pentanediol and 1.0 equivalent of DESMODUR W in a glass kettle under vacuum and nitrogen blanket. The reaction temperature was maintained at 120° C. for two hours and 0.8 equivalents of trimethylolpropane were added. After about 30 minutes at 110° C., the mixture was cast between release coated 1"×15"×15" (2.5 cm×38.1 cm×38.1 cm) casting cell glass molds with a resin volume of 3600 grams which had been preheated to a temperature of approximately 120° C., and then cured for 72 hours at 290° F. (143° C.). The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 20 in-lbs (2.2 J). The K Factor crack propagation resistance was 800 lb/in$^{3/2}$. A sample was evaluated for stress craze resistance by immersion in 75% aqueous solution of sulfuric acid. No degradation of the sample was observed after two months at 4000 psi (27.6 MPa) stress.

Samples D and E were evaluated for tensile modulus, glass transition temperature and Gardner Impact Strength in the manner discussed above for Samples A-C, as well as density, K-factor, Percent Haze (Taber Abrasion), Solvent resistance using methylene chloride according to MIL-PRF-25690B (Jan. 29, 1993) and Amendment I (Jun. 25, 1995), stress craze resistance using 75% sulfuric acid, and coefficient of thermal expansion. Density (grams/cm$^3$) of solids was measured in accordance with ASTM-D 792-00. Taber Abrasion (% haze) was measured for 100 cycles using a Taber Abrader having a CS-10F abrasion wheel with 500 grams of weight, for a sample size 3" by 3" by ⅛" (7.62 cm by 7.62 cm by 0.32 cm) according to ASTM D 1044-99. K-Factor crack propagation resistance was measured according to U.S. Dept. of Defense MIL-PRF-25690B (Jan. 29, 1993). Stress craze resistance was measured by immersion in 75% aqueous solution of sulfuric acid at 3500 psi according to MIL-PRF-25690B (Jan. 29, 1993) and Amendment I (Jun. 25, 1995). Linear Coefficient of Thermal Expansion was measured using a duPont Thermomechanical analyzer (TMA) according to ASTM E 228-95. Results are set forth below:

|  | Sample D<br>0.1PDO/<br>0.9 TMP/DesW | Sample E<br>0.21PDO/<br>0.9 TMP/Des W |
| --- | --- | --- |
| Tensile Modulus (PSI) | 421,000 | 395,000 |
| density (g/cm$^3$) | 1.131 | 1.125 |
| Tg (° C.) | 174 | 163 |
| K-factor | 752 | 868 |
| % Haze<br>(Abrasion-100 cycles) | 15.8 | 15.8 |
| Impact (in-lb) | 22 | 22 |
| Solvent Resistance<br>methylene Chloride | 24 hours | 25 hours |
| Stress-Craze Resistance<br>(75% H$_2$SO$_4$ @ 3500 psi) |  | 11 days+ |
| Coefficient of Thermal Expansion<br>(PPM/° C.) | 68.06 | 63.14 |

Sample F

An isocyanate functional urethane prepolymer was prepared by reacting 0.2 equivalents of 1,5-pentanediol and 1.0 equivalent of DESMODUR W in a glass kettle under vacuum and nitrogen blanket. The reaction temperature was maintained at 120° C. for two hours, then the sample was cooled to room temperature (about 25° C.). The sample was reheated to 110° C. and 0.2 equivalents of 1,5-pentanediol was added. The reaction temperature was maintained at 120° C. for 12 hours and 0.6 equivalents of trimethylolpropane were added. After about 30 minutes at 110° C., the mixture was cast between release coated 1"×15"×15" (2.5 cm×38.1 cm×38.1 cm) casting cell glass molds with a resin volume of 3600 grams which had been preheated to a temperature of approximately 120° C., and then cured for 72 hours at 290° F. (143° C.). The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 100 in-lbs (11.3 J). A one inch thick sample was held in front of a white-surfaced board and no striations were observed when light was directed onto the sample ("Visual Striation Test").

Sample G

An isocyanate functional urethane prepolymer was prepared by reacting 0.2 equivalents of 1,5-pentanediol and 1.0 equivalent of DESMODUR W in a glass kettle under vacuum and nitrogen blanket. The reaction temperature was maintained at 120° C. for two hours, then the sample was cooled to room temperature (about 25° C.). The sample was reheated to 110° C. and 0.15 equivalents of 1,5-pentanediol was added. The reaction temperature was maintained at 120° C. for 12 hours and 0.6 equivalents of trimethylolpropane and 0.05 equivalents of 1,5-pentanediol were added. After about 30 minutes at 110° C., the mixture was cast between release coated 1"×15"×15" (2.5 cm×38.1 cm×38.1 cm) casting cell glass molds with a resin volume of 3600 grams which had been preheated to a temperature of approximately 120° C., and then cured for 72 hours at 290° F. (143° C.). The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 110 in-lbs (12.4 J). A one inch thick sample was held in front of a white-surfaced board and no striations were observed when light was directed onto the sample.

Ballistics Testing

A 6"×6"×1" (15.2 cm×15.2 cm×2.5 cm) thick sample of each of Formulations A-G from Example L2 above was cured by heating at 290° F. (143° C.) for 48 hours. A .40 caliber bullet shot from 30 feet (9.1 m) at a velocity of 987 ft/sec (300 m/sec) ricocheted off the surface of each sample and the plastic did not crack. A 9 mm bullet shot from 20 feet (6.1 m) at a velocity of 1350 ft/sec (411 m/sec) ricocheted off the surface of each sample and the plastic did not crack.

Samples Prepared without Prepolymer

Sample H A polyurethane was prepared from the following components:

| Component | Equivalent Weight | Equivalents | Weight (g) | Weight (%) |
| --- | --- | --- | --- | --- |
| TMP | 44.7 | 0.90 | 40.2 | 22.8 |
| 1,5-pentanediol | 52 | 0.10 | 5.20 | 2.95 |
| Des W | 131 | 1.0 | 131 | 74.2 |

The 1,5-pentanediol, TMP and DESMODUR W (each preheated to 80° C.) were added to a glass reaction kettle (under nitrogen blanket) that had been preheated to a temperature of between 60° C.-80° C. before the addition of the components. The kettle was placed into a preheated heating mantle for about 30 minutes and heated up to a temperature of approximately 118° C. while the formulation was stirred and outgassed under a vacuum pressure of −29 mmHg. Next, the mixture was cast between release coated 1"×15"×15" (2.5 cm×38.1 cm×38.1 cm) casting cell glass molds with a resin volume of 3600 grams which had been preheated to a temperature of about 120° C. The mixture was cured for two hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 27 in-lbs (3 J).

Sample I

A polyurethane was prepared from the following components:

| Component | Equivalent Weight | Equivalents | Weight (g) | Weight (%) |
| --- | --- | --- | --- | --- |
| TMP | 44.7 | 0.79 | 35.3 | 19.9 |
| 1,5-pentanediol | 52 | 0.21 | 10.9 | 6.2 |
| Des W | 131 | 1.0 | 131 | 73.9 |

The 1,5-pentanediol, TMP and DESMODUR W (preheated to 80° C.) were added to a glass reaction kettle (under nitrogen blanket) preheated to a temperature of between 60° C.-80° C. before the addition of the components. The kettle was placed into a preheated heating mantle for about 30 minutes and heated to a temperature of approximately 118° C. while the formulation was stirred and outgassed under a vacuum pressure of −29 mmHg. Next, the mixture was cast between release coated 1"×15"×15" (2.5 cm×38.1 cm×38.1 cm) casting cell glass molds with a resin volume of 3600 grams which had been preheated to a temperature of about 120° C. The mixture was cured for two hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 100 in-lbs (11 J). The Weight % Hard Segment was 21.69, the Weight % Urethane was 33.25, and the $M_c$ was 673.8 g/mol.

Sample J

A polyurethane was prepared from the following components:

| Component | Equivalent Weight | Equivalents | Weight (g) | Weight (%) |
|---|---|---|---|---|
| 1,4-butanediol | 45.1 | 0.63 | 28.4 | 14.1 |
| PC-1733 | 407.6 | 0.07 | 28.5 | 14.2 |
| TMP | 44.7 | 0.30 | 13.4 | 6.7 |
| Des W | 131.2 | 1.0 | 131.2 | 65.1 |

The 1,4-butanediol, PC-1733 polycarbonate diol, TMP and DESMODUR W (preheated to 80° C.) were added to a glass reaction kettle (under nitrogen blanket) preheated to a temperature of between 60° C.-80° C. before the addition of the components. The kettle was placed into a preheated heating mantle for about 20 minutes and heated to a temperature of approximately 121° C. while the formulation was stirred and outgassed under a vacuum pressure of –28 mmHg. Next, the mixture was cast between release coated 1"×15"×15" (2.5 cm×38.1 cm×38.1 cm) casting cell glass molds with a resin volume of 3600 grams which had been preheated to a temperature of about 120° C. The mixture was cured for 2 hours at approximately 120° C., followed by 22 hours at 160° C. The mold was removed from the oven and the plastic released. The plastic sheet was then removed from the glass mold and cut into 2"×2"×⅛" (5.1 cm×5.1 cm×0.3 cm) samples for Gardner Impact testing. The Gardner Impact strength was 520 in-lbs (29 J). The Weight % Hard Segment was 55%, the Weight % Urethane was 29.276, and the $M_c$ was 2015.3 g/mol.

Sample K

A polyurethane was prepared from the following components:

| Component | Equivalent Weight | Equivalents | Weight (g) | Weight (%) |
|---|---|---|---|---|
| CHDM | 72.1 | 0.80 | 57.7 | 24.6 |
| PC-1733 | 407.6 | 0.10 | 40.8 | 17.4 |
| TMP | 44.7 | 0.10 | 4.5 | 1.9 |
| Des W | 131.2 | 1.0 | 131.2 | 56.0 |

The CHDM, PC-1733, TMP and DESMODUR W (preheated to 80° C.) were added to a glass reaction kettle (under nitrogen blanket) preheated to a temperature of between 60° C.-80° C. before the addition of the components. The kettle was placed into a preheated heating mantle for about 20-25 minutes and heated to a temperature of approximately 121° C. while the formulation was stirred and outgassed under a vacuum pressure of –28 mmHg. Next, the mixture was cast between release coated 1"×15"×15" (2.5 cm×38.1 cm×38.1 cm) casting cell glass molds with a resin volume of 3600 grams which had been preheated to a temperature of about 120° C. The mixture was cured for two hours at approximately 120° C., followed by 22 hours at 160° C. The mold was removed from the oven and the plastic released. The $W_c$ was 27.5%, the Weight % Urethane was 25.33, and the $M_c$ was 7094.5.

Sample L

A polyurethane was prepared from the following components:

| Component | Equivalent Weight | Equivalents | Weight (g) | Weight (%) |
|---|---|---|---|---|
| CHDM | 72.1 | 0.70 | 50.5 | 20.2 |
| PC-1733 | 407.6 | 0.15 | 61.1 | 24.5 |
| TMP | 44.7 | 0.15 | 6.7 | 2.7 |
| Des W | 131.2 | 1.0 | 131.2 | 52.6 |

The CHDM, PC-1733, TMP and DESMODUR W (preheated to 80° C.) were added to a glass reaction kettle (under nitrogen blanket) preheated to a temperature of between 60° C.-80° C. before the addition of the components. The kettle was placed into a preheated heating mantle for about 20-25 minutes up to a temperature of approximately 122° C. while the formulation was stirred and outgassed under a vacuum pressure of –28 mmHg. Next, the mixture was cast between release coated 1"×15"×15" (2.5 cm×38.1 cm×38.1 cm) casting cell glass molds with a resin volume of 3600 grams which had been preheated to a temperature of about 120° C. The mixture was cured for two hours at approximately 120° C., followed by 22 hours at 160° C. The mold was removed from the oven and the plastic released. The Weight % Hard Segment was 23.85, the Weight % Urethane was 25.2, and the $M_c$ was 4680.

Sample M

A polyurethane was prepared from the following components:

| Component | Equivalent Weight | Equivalents | Weight (g) | Weight (%) |
|---|---|---|---|---|
| CHDM | 72.1 | 0.70 | 50.5 | 21.8 |
| PC-1733 | 407.6 | 0.10 | 40.8 | 17.6 |
| TMP | 44.7 | 0.20 | 8.9 | 3.9 |
| Des W | 131.2 | 1.0 | 131.2 | 56.7 |

The CHDM, PC-1733, TMP and DESMODUR W (preheated to 80° C.) were added to a glass reaction kettle (under nitrogen blanket) preheated to a temperature of between 60° C.-80° C. before the addition of the components. The kettle was placed into a preheated heating mantle for about 20-25 minutes up to a temperature of approximately 121° C. while the formulation was stirred and outgassed under a vacuum pressure of –28 mmHg. Next, the mixture was cast between release coated 1"×15"×15" (2.5 cm×38.1 cm×38.1 cm) casting cell glass molds with a resin volume of 3600 grams which had been preheated to a temperature of approximately 120° C. The mixture was cured for two hours at approximately 120° C., followed by 22 hours at 160° C. The mold was removed from the oven and the plastic released. The Weight % Hard Segment was 61.5%, the Weight % Urethane was 25.5, and the $M_c$ was 3505.7.

Example L3

An isocyanate functional urethane prepolymer was prepared by reacting 0.3 equivalents of 1,5-pentanediol, 1.0 equivalent of DESMODUR W 4,4'-methylene-bis-(cyclohexyl isocyanate) and 5 ppm dibutyltin diacetate as reactants. The DESMODUR W and 1,5-pentanediol were each pre-heated to a temperature of about 80° C. under a nitrogen atmosphere for at least about four hours prior to mixing. The components were mixed using a Max Urethane Processing System Model No. 601-000-282 available from Max Machinery, Inc. of Healdsburg, Calif. for Trials 1-3 and Max Urethane Processing System Model No. 601-000-333 for Trials 4-6.

The Max Urethane Processing System was used to heat the raw materials to the specified temperatures desired, maintain the temperature of the raw materials delivered to the mix head, degass each component, and deliver the specified quantities of each raw material to a dynamic pin mixer for blending and dispensing. See "Max Urethane Processing System", a publication of Max Machinery, Inc. (2005), incorporated by reference herein.

Subsequently, the isocyanate functional urethane prepolymer was reacted with 0.4 equivalents of 1,5-pentanediol and 0.3 equivalents of trimethylolpropane (Formulation 2), 0.1 equivalents of 1,5-pentanediol and 0.6 equivalents of trimethylolpropane (Formulation 3), or 0.2 equivalents of 1,5-pentanediol and 0.5 equivalents of trimethylolpropane (Formulation 81), as indicated below. Each of the reactants was heated to the temperature indicated below prior to mixing. The flow rate of each reactant and temperature at the mix head for each Trial is specified in Table 27 below. The mixing speed was 13,000 rpm.

Trial 1

TABLE 27

| Sample # | Formulation | Tank temperature (° C.) Prepolymer | PDO | TMP | Temp. mix head |
|---|---|---|---|---|---|
| 1 | 2 | 110 | 89 | 89 | 110 |
| 2 | 2 | 110 | 89 | 89 | 110 |
| 3 | 2 | 110 | 89 | 89 | 110 |
| 4 | 2 | 110 | 89 | 89 | 110 |
| 5 | 2 | 120 | 100 | 100 | 120 |
| 6 | 2 | 120 | 100 | 100 | 120 |
| 7 | 2 | 126 | 100 | 100 | 126 |
| 8 | 2 | 127 | 100 | 100 | 127 |
| 9 | 2 | 126 | 100 | 100 | 126 |
| 10 | 2 | 110 | 100 | 100 | 110 |
| 11 | 2 | 110 | 100 | 100 | 110 |
| 12 | 2 | 110 | 100 | 100 | 110 |
| 13 | 3 | 110 | 100 | 100 | 110 |
| 14 | 3 | 110 | 100 | 100 | 110 |
| 15 | 3 | 121 | 110 | 110 | 121 |
| 16 | 3 | 121 | 110 | 110 | 121 |
| 17 | 81 | 121 | 110 | 110 | 121 |
| 18 | 81 | 121 | 110 | 110 | 121 |
| 19 | 2 | 121 | 110 | 110 | 110 |
| 20 | 2 | 121 | 110 | 110 | 110 |
| 21 | 2 | 121 | 110 | 110 | 110 |
| 22 | 2 | 121 | 110 | 110 | 110 |
| 23 | 2 | 121 | 110 | 110 | 110 |
| 24 | 2 | 121 | 110 | 110 | 110 |
| 25 | 2 | 121 | 110 | 110 | 110 |
| 26 | 2 | 121 | 110 | 110 | 110 |
| 27 | 2 | 121 | 110 | 110 | 110 |
| 28 | 2 | 121 | 110 | 110 | 110 |
| 29 | 2 | 121 | 110 | 110 | 110 |
| 30 | 81 | 121 | 110 | 110 | 110 |
| 31 | 81 | 121 | 110 | 110 | 110 |
| 32 | 81 | 121 | 110 | 110 | 110 |
| 33 | 81 | 121 | 110 | 110 | 110 |
| 34 | 81 | 121 | 110 | 110 | 110 |
| 35 | 81 | 121 | 110 | 110 | 110 |
| 36 | 81 | 121 | 110 | 110 | 110 |
| 37 | 81 | 121 | 110 | 110 | 110 |
| 38 | 81 | 121 | 110 | 110 | 110 |
| 39 | 81 | 121 | 110 | 110 | 110 |
| 40 | 3 | 121 | 110 | 110 | 110 |
| 41 | 3 | 121 | 110 | 110 | 110 |
| 42 | 3 | 121 | 110 | 110 | 110 |
| 43 | 3 | 121 | 110 | 110 | 110 |
| 44 | 3 | 121 | 110 | 110 | 110 |
| 45 | 3 | 121 | 110 | 110 | 110 |
| 46 | 3 | 121 | 110 | 110 | 110 |
| 47 | 3 | 121 | 110 | 110 | 110 |
| 48 | 3 | 121 | 110 | 110 | 110 |
| 49 | 3 | 121 | 110 | 110 | 110 |
| 50 | 3 | 121 | 110 | 110 | 110 |
| 51 | 3 | 121 | 110 | 110 | 110 |
| 52 | 3 | 121 | 110 | 110 | 110 |
| 53 | 3 | 121 | 110 | 110 | 110 |
| 54 | 2 | 121 | 110 | 110 | 110 |
| 55 | 2 | 121 | 110 | 110 | 110 |
| 56 | 2 | 121 | 110 | 110 | 110 |
| 57 | 2 | 121 | 110 | 110 | 110 |
| 58 | 2 | 121 | 110 | 110 | 110 |
| 59 | 2 | 121 | 110 | 110 | 110 |
| 60 | 3 | 121 | 110 | 110 | 110 |
| 61 | 3 | 121 | 110 | 110 | 110 |
| 62 | 81 | 121 | 110 | 110 | 110 |
| 63 | 3 | 121 | 110 | 110 | 110 |
| 64 | 81 | 121 | 110 | 110 | 110 |
| 65 | 2 | 121 | 110 | 110 | 110 |
| 66 | 2 | 121 | 110 | 110 | 110 |
| 67 | 2 | 121 | 110 | 110 | 110 |
| 68 | 2 | 121 | 110 | 110 | 110 |
| 69 | 3 | 121 | 110 | 110 | 110 |
| 70 | 3 | 121 | 110 | 110 | 110 |
| 71 | 3 | 121 | 110 | 110 | 110 |
| 72 | 3 | 121 | 110 | 110 | 110 |
| 73 | 81 | 121 | 110 | 110 | 110 |
| 74 | 81 | 121 | 110 | 110 | 110 |
| 75 | 81 | 121 | 110 | 110 | 110 |
|  | 81 | 121 | 110 | 110 | 110 |

The flow rate in grams per minute of the prepolymer, trimethylolpropane and 1,5-pentanediol into the mix head is set forth in the table below. The mixtures were cast between release coated 1"×15"×15" (2.5 cm×38.1 cm×38.1 cm) casting cell glass molds with a resin volume of 3600 grams which had been preheated to a temperature of about 140° C. and cured for the respective times and temperatures set forth in Table 28 below. After curing, each mold was removed from the oven and allowed to cool to room temperature.

TABLE 28

| Sample # | Form. | Flow Rate (g/min) Prepolymer | TMP | PDO | Total | Cure Temp. (° C.) | Time (hours) |
|---|---|---|---|---|---|---|---|
| 1 | 2 | 2500 | 353.93 | 228.04 | 3081.97 | 132 | — |
| 2 | 2 | 3500 | 495.50 | 319.25 | 4314.75 | 132 | — |
| 3 | 2 | 3900 | 552.13 | 355.74 | 4807.87 | 132 | — |
| 4 | 2 | 3500 | 495.50 | 319.25 | 4314.75 | 99/127 | 5/14 |
| 5 | 2 | 3500 | 495.50 | 319.25 | 4314.75 | 132 | — |
| 6 | 2 | 3500 | 495.50 | 319.25 | 4314.75 | 25/99/160 | .5/2/14 |
| 7 | 2 | 3500 | 495.50 | 319.25 | 4314.75 | 99/127 | 1.25/14 |
| 8 | 2 | 3500 | 495.50 | 319.25 | 4314.75 | 99/127 | 0.5/14 |
| 9 | 2 | 3000 | 424.71 | 273.64 | 3698.36 | 121/160 | 2.75/15.5 |
| 10 | 2 | 3000 | 424.71 | 273.64 | 3698.36 | 110/160 | 2/15.5 |
| 11 | 2 | 3000 | 424.71 | 273.64 | 3698.36 | 100/160 | 4.5/15.5 |
| 12 | 2 | 3500 | 495.50 | 319.25 | 4314.75 | 100/160 | 4.5/15.5 |
| 13 | 3 | 3500 | 638.55 | 123.90 | 4262.45 | 100/160 | 1/15.5 |
| 14 | 3 | 3500 | 638.55 | 123.90 | 4262.45 | 100/160 | 1/15.5 |
| 15 | 3 | 3000 | 106.20 | 547.33 | 3653.53 | 100/160 | 1.5/15.5 |
| 16 | 3 | 3000 | 106.20 | 547.33 | 3653.53 | 100/160 | 1.5/15.5 |
| 17 | 81 | 3000 | 212.38 | 456.11 | 3668.49 | 100/160 | 1.25/15.5 |
| 18 | 81 | 3000 | 212.38 | 456.11 | 3668.49 | 100/160 | 1.25/15.5 |
| 19 | 2 | 500 | 70.79 | 45.61 | 616.39 | 121/160 | 3/15.5 |
| 20 | 2 | 500 | 70.79 | 45.61 | 616.39 | 121/160 | 3/15.5 |
| 21 | 2 | 500 | 70.79 | 45.61 | 616.39 | 121/160 | 3/15.5 |
| 22 | 2 | 500 | 70.79 | 45.61 | 616.39 | 121/160 | 3/15.5 |
| 23 | 2 | 500 | 70.79 | 45.61 | 616.39 | 121/160 | 3/15.5 |
| 24 | 2 | 500 | 70.79 | 45.61 | 616.39 | 121/160 | 3/15.5 |
| 25 | 2 | 800 | 113.26 | 72.97 | 986.23 | 121/160 | 3/15.5 |
| 26 | 2 | 800 | 113.26 | 72.97 | 986.23 | 121/160 | 3/15.5 |

TABLE 28-continued

| Sample # | Form. | Flow Rate (g/min) Prepolymer | TMP | PDO | Total | Cure Temp. (° C.) | Time (hours) |
|---|---|---|---|---|---|---|---|
| 27 | 2 | 800 | 113.26 | 72.97 | 986.23 | 121/160 | 3/15.5 |
| 28 | 2 | 800 | 113.26 | 72.97 | 986.23 | 121/160 | 3/15.5 |
| 29 | 2 | 800 | 113.26 | 72.97 | 986.23 | 121/160 | 3/15.5 |
| 30 | 81 | 500 | 35.40 | 76.02 | 611.41 | 121/160 | 2/15.5 |
| 31 | 81 | 500 | 35.40 | 76.02 | 611.41 | 121/160 | 2/15.5 |
| 32 | 81 | 500 | 35.40 | 76.02 | 611.41 | 121/160 | 2/15.5 |
| 33 | 81 | 500 | 35.40 | 76.02 | 611.41 | 121/160 | 2/15.5 |
| 34 | 81 | 500 | 35.40 | 76.02 | 611.41 | 121/160 | 2/15.5 |
| 35 | 81 | 800 | 56.63 | 121.63 | 978.26 | 121/160 | 2/15.5 |
| 36 | 81 | 800 | 56.63 | 121.63 | 978.26 | 121/160 | 2/15.5 |
| 37 | 81 | 800 | 56.63 | 121.63 | 978.26 | 121/160 | 2/15.5 |
| 38 | 81 | 800 | 56.63 | 121.63 | 978.26 | 121/160 | 2/15.5 |
| 39 | 81 | 800 | 56.63 | 121.63 | 978.26 | 121/160 | 2/15.5 |
| 40 | 3 | 800 | 28.32 | 145.95 | 974.27 | 121/160 | 2/15.5 |
| 41 | 3 | 800 | 28.32 | 145.95 | 974.27 | 121/160 | 2/15.5 |
| 42 | 3 | 800 | 28.32 | 145.95 | 974.27 | 121/160 | 2/15.5 |
| 43 | 3 | 800 | 28.32 | 145.95 | 974.27 | 121/160 | 2/15.5 |
| 44 | 3 | 800 | 28.32 | 145.95 | 974.27 | 121/160 | 2/15.5 |
| 45 | 3 | 1000 | 35.40 | 182.44 | 1217.84 | 121/160 | 2/15.5 |
| 46 | 3 | 1000 | 35.40 | 182.44 | 1217.84 | 121/160 | 2/15.5 |
| 47 | 3 | 1000 | 35.40 | 182.44 | 1217.84 | 121/160 | 2/15.5 |
| 48 | 3 | 1000 | 35.40 | 182.44 | 1217.84 | 121/160 | 2/15.5 |
| 49 | 3 | 1000 | 35.40 | 182.44 | 1217.84 | 121/160 | 0.5/15.5 |
| 50 | 3 | 1000 | 35.40 | 182.44 | 1217.84 | 121/160 | 0.5/15.5 |
| 51 | 3 | 1000 | 35.40 | 182.44 | 1217.84 | 121/160 | 0.5/15.5 |
| 52 | 3 | 1000 | 35.40 | 182.44 | 1217.84 | 121/160 | 0.5/15.5 |
| 53 | 3 | 1000 | 35.40 | 182.44 | 1217.84 | 121/160 | 0.5/15.5 |
| 54 | 2 | 3500 | 495.50 | 319.25 | 4314.75 | 121/160 | 0.5/15.5 |
| 55 | 2 | 2500 | 353.93 | 228.04 | 3081.97 | 121/160 | 0.5/15.5 |
| 56 | 2 | 2000 | 283.14 | 182.43 | 2465.57 | 121/160 | 0.5/15.5 |
| 57 | 2 | 1500 | 212.36 | 136.82 | 1849.18 | 121/160 | 0.5/15.5 |
| 58 | 2 | 3000 | 424.71 | 273.64 | 3698.36 | 121/160 | 2/15.5 |
| 59 | 2 | 2500 | 353.93 | 228.04 | 3081.97 | 121/160 | 2/15.5 |
| 60 | 3 | 3000 | 106.20 | 547.33 | 3653.53 | 121/160 | 2/15.5 |
| 61 | 3 | 2500 | 88.50 | 456.11 | 3044.61 | 121/160 | 2/15.5 |
| 62 | 81 | 2500 | 176.98 | 380.09 | 3057.07 | 121/160 | 2/15.5 |
| 63 | 3 | 2000 | 70.80 | 364.89 | 2435.69 | 121/160 | 2/15.5 |
| 64 | 81 | 2000 | 141.59 | 304.07 | 2445.66 | 121/160 | 2/15.5 |
| 65 | 2 | 800 | 72.97 | 113.26 | 986.23 | 121/160 | 2/15.5 |
| 66 | 2 | 800 | 72.97 | 113.26 | 986.23 | 121/160 | 2/15.5 |
| 67 | 2 | 800 | 72.97 | 113.26 | 986.23 | 121/160 | 2/15.5 |
| 68 | 2 | 800 | 72.97 | 113.26 | 986.23 | 121/160 | 2/15.5 |
| 69 | 3 | 800 | 145.95 | 28.32 | 974.27 | 121/160 | 2/15.5 |
| 70 | 3 | 800 | 145.95 | 28.32 | 974.27 | 121/160 | 2/15.5 |
| 71 | 3 | 800 | 145.95 | 28.32 | 974.27 | 121/160 | 2/15.5 |
| 72 | 3 | 800 | 145.95 | 28.32 | 974.27 | 121/160 | 2/15.5 |
| 73 | 81 | 800 | 121.63 | 56.63 | 978.26 | 121/160 | 2/15.5 |
| 74 | 81 | 800 | 121.63 | 56.63 | 978.26 | 121/160 | 2/15.5 |
| 75 | 81 | 800 | 121.63 | 56.63 | 978.26 | 121/160 | 2/15.5 |
|  | 81 | 800 | 121.63 | 56.63 | 978.26 | 121/160 | 2/15.5 |

Selected samples were evaluated for various physical properties. Yellowness Index (YI) and Light Transmittance (% T) after 333 hours (equivalent to about one year) exposure to QUV-B was determined according to ASTM G-53. The results are set forth in Table 29 below.

TABLE 29

| SAMPLE ID | Initial YI | % T | After 333 hrs QUV B YI | % T | Final-Initial YI | % T |
|---|---|---|---|---|---|---|
| 66 | 1.53 | 91.66 | | | | |
| 70 | 1.63 | 91.96 | | | | |
| 74 | 1.54 | 90.84 | | | | |
| 67 | | | 6.34 | 89.68 | | |
| 67 | | | 6.06 | 89.36 | | |
| Average | | | 6.2 | 89.52 | 4.67 | −2.14 |
| 71 | | | 9.62 | 89.89 | | |
| 71 | | | 8.43 | 88.76 | | |
| Average | | | 9.025 | 89.325 | 7.395 | −2.635 |
| 75 | | | 9.15 | 88.64 | | |
| 75 | | | 7.24 | 89.41 | | |
| Average | | | 8.195 | 89.025 | 6.655 | −1.815 |

Trial 2

For Trial 2, mixtures were prepared using the components as in Trial 1 above, except the respective mixing and casting conditions are set forth in Tables 30-31 below.

TABLE 30

| Sample # | Formulation. | Tank temperatures (° C.) Prepolymer | PDO | TMP | temp mix head (° C.) |
|---|---|---|---|---|---|
| 1 | 2 | 100 | 110 | 110 | 121 |
| 2 | 2 | 121 | 110 | 110 | 121 |
| 3 | 2 | 121 | 110 | 110 | 121 |
| 4 | 2 | 121 | 110 | 110 | 121 |
| 5 | 3 | 121 | 110 | 110 | 121 |
| 6 | 2 | 121 | 110 | 110 | 121 |
| 7 | 2 | 123 | 111 | 110 | 121 |
| 8 | 2 | 123 | 111 | 110 | 121 |
| 9 | 2 | 121 | 110 | 110 | 121 |
| 10 | 2 | 121 | 110 | 110 | 121 |
| 11 | 2 | 121 | 110 | 110 | 121 |
| 12 | 2 | 121 | 110 | 110 | 121 |
| 13 | 3 | 121 | 110 | 110 | 121 |
| 14 | 3 | 121 | 110 | 110 | 121 |
| 15 | 81 | 121 | 110 | 110 | 121 |
| 16 | 2 | 121 | 110 | 110 | 121 |
| 17 | 3 | 121 | 110 | 110 | 121 |
| 18 | 81 | 121 | 110 | 110 | 121 |
| 19 | 2 | 121 | 110 | 110 | 121 |
| 20 | 2 | 121 | 110 | 110 | 121 |
| 21 | 3 | 121 | 110 | 110 | 121 |
| 22 | 3 | 121 | 110 | 110 | 121 |
| 23 | 81 | 121 | 110 | 110 | 121 |
| 24 | 2 | 121 | 110 | 110 | 121 |
| 25 | 3 | 121 | 110 | 110 | 121 |
| 26 | 3 | 121 | 110 | 110 | 121 |
| 27 | 81 | 121 | 110 | 110 | 121 |
| 28 | 81 | 121 | 110 | 110 | 121 |
| 29 | 2 | 121 | 110 | 110 | 121 |
| 30 | 3 | 121 | 110 | 110 | 121 |
| 31 | 81 | 121 | 110 | 110 | 121 |
| 32 | 2 | 121 | 110 | 110 | 121 |
| 33 | 2 | 121 | 110 | 110 | 121 |
| 34 | 3 | 121 | 110 | 110 | 121 |
| 35 | 3 | 121 | 110 | 110 | 121 |
| 36 | 81 | 121 | 110 | 110 | 121 |
| 37 | 2 | 121 | 110 | 110 | 121 |
| 38 | 3 | 121 | 110 | 110 | 121 |
| 39 | 81 | 121 | 110 | 110 | 121 |
| 40 | 2 | 121 | 110 | 110 | 121 |
| 41 | 3 | 121 | 110 | 110 | 121 |
| 42 | 2 | 121 | 110 | 110 | 121 |
| 43 | 2 | 121 | 110 | 110 | 121 |
| 44 | 3 | 121 | 110 | 110 | 121 |
| 45 | 2 | 121 | 110 | 110 | 121 |
| 46 | 2 | 121 | 110 | 110 | 121 |
| 47 | 2 | 121 | 110 | 110 | 121 |
| 48 | 2 | 121 | 110 | 110 | 121 |
| 49 | 3 | 121 | 110 | 110 | 121 |
| 50 | 2 | 121 | 110 | 110 | 121 |
| 51 | 2 | 121 | 110 | 110 | 121 |
| 52 | 2 | 121 | 110 | 110 | 121 |
| 53 | 2 | 121 | 110 | 110 | 121 |
| 54 | 2 | 121 | 110 | 110 | 121 |
| 55 | 2 | 121 | 110 | 110 | 121 |

TABLE 30-continued

| Sample # | Formulation. | Tank temperatures (° C.) | | | temp mix head (° C.) |
|---|---|---|---|---|---|
| | | Prepolymer | PDO | TMP | |
| 56 | 2 | 121 | 110 | 110 | 121 |
| 57 | 2 | 121 | 110 | 110 | 121 |
| 58 | 3 | 121 | 110 | 110 | 121 |
| 59 | 81 | 121 | 110 | 110 | 121 |

Selected samples were evaluated for various physical properties. The results of Gardner Impact strength testing according to ASTM D-5420-04 of selected samples are set forth in Table 32 below and in FIG. 27. For the Samples below having stabilizers added to the formulation (Y), 0.5% by weight of IRGANOX 1076 antioxidant was added during preparation of the prepolymer, based upon total weight of the prepolymer, and 1% by weight of SANDUVOR VSU and 0.5% by weight of SANDUVOR 3058 were added during mixing of the prepolymer with the other monomers.

TABLE 31

| Sample # | Flow Rates (g/min) | | | | mix head volume (cc) | Residence Time (sec) | Cure | |
|---|---|---|---|---|---|---|---|---|
| | Prepolymer | TMP | PDO | Total | | | Temp (° C.) | time |
| 1 | 800 | 113.26 | 72.97 | 986.23 | 70 | 4.26 | 250/320 | 5.5/14.25 |
| 2 | 800 | 113.26 | 72.97 | 986.23 | 140 | 8.52 | 250/320 | 5.25/14.25 |
| 3 | 800 | 113.26 | 72.97 | 986.23 | 140 | 8.52 | 250/320 | /14.25 |
| 4 | 820 | 116.09 | 74.80 | 1010.88 | 22 | 1.31 | 250/320 | /14.25 |
| 5 | 820 | 29.03 | 149.60 | 998.63 | 22 | 1.32 | 250/320 | /14.25 |
| 6 | 1500 | 212.36 | 136.82 | 1849.18 | 140 | 4.54 | 250/320 | /14.25 |
| 7 | 2500 | 353.93 | 228.04 | 3081.97 | 140 | 2.73 | 250/320 | /14.25 |
| 8 | 3500 | 495.50 | 319.25 | 4314.75 | 140 | 1.95 | 250/320 | /14.25 |
| 9 | 800 | 113.26 | 72.97 | 986.23 | 140 | 8.52 | 320 | /14.25 |
| 10 | 800 | 113.26 | 72.97 | 986.23 | 140 | 8.52 | 320 | /14.25 |
| 11 | 3500 | 319.25 | 495.50 | 4314.75 | 140 | 1.95 | 230/320 | |
| 12 | 3500 | 319.25 | 495.50 | 4314.75 | 140 | 1.95 | 230/320 | |
| 13 | 2500 | 456.11 | 88.50 | 3044.61 | 140 | 2.76 | 230/320 | |
| 14 | 2500 | 456.11 | 88.50 | 3044.61 | 140 | 2.76 | 230/320 | |
| 15 | 3000 | 456.11 | 212.38 | 3668.49 | 140 | 2.29 | 230/320 | |
| 16 | 3500 | 319.25 | 495.50 | 4314.75 | 140 | 1.95 | 230/320 | |
| 17 | 2500 | 456.11 | 88.50 | 3044.61 | 140 | 2.76 | 230/320 | |
| 18 | 3000 | 456.11 | 212.38 | 3668.49 | 140 | 2.29 | 230/320 | |
| 19 | 800 | 72.97 | 113.26 | 986.23 | 140 | 8.52 | 230/320 | |
| 20 | 800 | 72.97 | 113.26 | 986.23 | 140 | 8.52 | 230/320 | |
| 21 | 800 | 145.95 | 28.32 | 974.27 | 140 | 8.62 | 230/320 | |
| 22 | 800 | 145.95 | 28.32 | 974.27 | 140 | 8.62 | 230/320 | |
| 23 | 800 | 121.63 | 56.63 | 978.26 | 140 | 8.59 | 230/320 | |
| 24 | 3500 | 319.25 | 495.50 | 4314.75 | 140 | 1.95 | 230/320 | |
| 25 | 2500 | 456.11 | 88.50 | 3044.61 | 140 | 2.76 | 230/320 | |
| 26 | 2500 | 456.11 | 88.50 | 3044.61 | 140 | 2.76 | 230/320 | |
| 27 | 3000 | 456.11 | 212.38 | 3668.49 | 140 | 2.29 | 230/320 | |
| 28 | 3000 | 456.11 | 212.38 | 3668.49 | 140 | 2.29 | 230/320 | |
| 29 | 800 | 72.97 | 113.26 | 986.23 | 140 | 8.52 | 230/320 | |
| 30 | 800 | 145.95 | 28.32 | 974.27 | 140 | 8.62 | 230/320 | |
| 31 | 800 | 121.63 | 56.63 | 978.26 | 140 | 8.59 | 230/320 | |
| 32 | 2500 | 228.04 | 353.93 | 3081.97 | 140 | 2.73 | 230/320 | |
| 33 | 2500 | 228.04 | 353.93 | 3081.97 | 140 | 2.73 | 230/320 | |
| 34 | 2000 | 364.89 | 70.80 | 2435.69 | 140 | 3.45 | 230/320 | |
| 35 | 2000 | 364.89 | 70.80 | 2435.69 | 140 | 3.45 | 230/320 | |
| 36 | 2500 | 380.09 | 176.98 | 3057.07 | 140 | 2.75 | 230/320 | |
| 37 | 1250 | 114.02 | 176.96 | 1540.98 | 70 | 2.73 | 230/320 | |
| 38 | 1000 | 182.44 | 35.40 | 1217.84 | 70 | 3.45 | 230/320 | |
| 39 | 1250 | 190.04 | 88.49 | 1528.54 | 70 | 2.75 | 230/320 | |
| 40 | 820 | 74.80 | 116.09 | 1010.88 | 140 | 8.31 | 230/320 | |
| 41 | 820 | 149.60 | 29.03 | 998.63 | 140 | 8.41 | 230/320 | |
| 42 | 1200 | 109.46 | 169.89 | 1479.34 | 140 | 5.68 | 230/320 | |
| 43 | 410 | 37.40 | 58.04 | 505.44 | 70 | 8.31 | 230/320 | |
| 44 | 410 | 74.80 | 14.51 | 499.32 | 70 | 8.41 | 230/320 | |
| 45 | 600 | 54.73 | 84.94 | 739.67 | 70 | 5.68 | 230/320 | |
| 46 | 600 | 54.73 | 84.94 | 739.67 | 70 | 5.68 | 230/320 | |
| 47 | 1750 | 159.63 | 247.75 | 2157.38 | 70 | 1.95 | 230/320 | |
| 48 | 1500 | 136.82 | 212.36 | 1849.18 | 70 | 2.27 | 230/320 | |
| 49 | 1250 | 228.05 | 44.25 | 1522.30 | 70 | 2.76 | 230/320 | |
| 50 | 1500 | 136.82 | 212.36 | 1849.18 | 70 | 2.27 | 230/320 | |
| 51 | 800 | 72.97 | 113.26 | 986.23 | 70 | 4.26 | 230/320 | |
| 52 | 800 | 72.97 | 113.26 | 986.23 | 70 | 4.26 | 230/320 | |
| 53 | 800 | 72.97 | 113.26 | 986.23 | 70 | 4.26 | 230/320 | |
| 54 | 800 | 72.97 | 113.26 | 986.23 | 70 | 4.26 | 230/320 | |
| 55 | 800 | 72.97 | 113.26 | 986.23 | 70 | 4.26 | 230/320 | |
| 56 | 800 | 72.97 | 113.26 | 986.23 | 70 | 4.26 | 230/320 | |
| 57 | 1250 | 114.02 | 176.96 | 1540.98 | 70 | 2.73 | 230/320 | |
| 58 | 1500 | 273.67 | 53.10 | 1826.76 | 70 | 2.30 | 230/320 | |
| 59 | 1250 | 190.04 | 88.49 | 1528.54 | 70 | 2.75 | 230/320 | |

Figure 27:
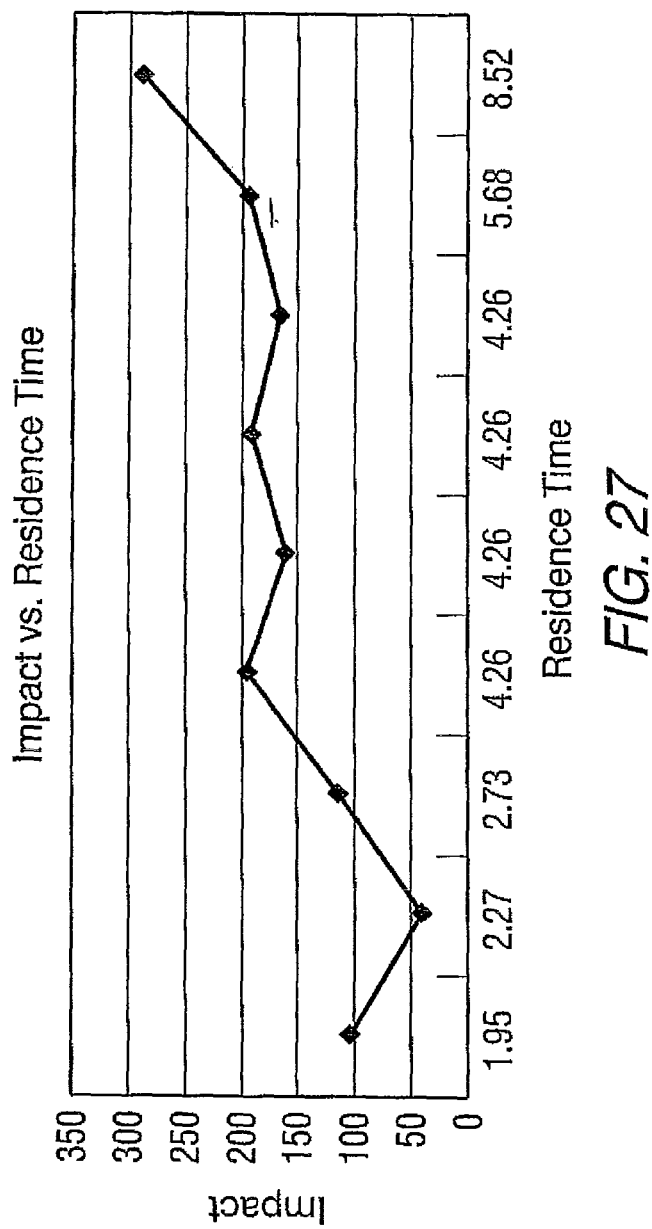
FIG. 27 is a graph of Gardner Impact strength as a function of residence time in the mix head for selected samples according to the present invention.

As shown in FIG. 27, increased residence time of the reactants in the mix head can provide improved Gardner Impact strength in molded articles prepared from samples according to the present invention.

TABLE 32

| Sample | Formulation | Trial | Residence Time (sec) | Stabilizers | Impact Strength (in-lbs/J) |
|---|---|---|---|---|---|
| 20 | 2 | 20 | 8.52 | N | 288/33 |
| 22 | 3 | 22 | 8.62 | N | 48/5 |
| 23 | 81 | 23 | 8.59 | N | 74/8 |
| 37 | 2 | 37 | 2.73 | Y | 115/13 |
| 38 | 3 | 38 | 3.45 | Y | 43/5 |
| 45 | 2 | 45 | 5.68 | Y | 195/22 |
| 47 | 2 | 47 | 1.95 | Y | 104/12 |
| 50 | 2 | 50 | 2.27 | Y | 40/5 |
| 53 | 2 | 53 | 4.26 | Y | 195/22 |
| 54 | 2 | 54 | 4.26 | Y | 161/18 |
| 55 | 2 | 55 | 4.26 | Y | 193/22 |
| 56 | 2 | 56 | 4.26 | Y | 164/19 |
| 44 | 3 | 44 | 8.41 | Y | 60/7 |

Yellowness Index (YI) and Light Transmittance (% T) for selected samples were determined according to ASTM G-53. Also, results for testing of selected samples tested initially and after exposure to QUV-B for 333 hours in a manner discussed above were determined. The results are set forth in Tables 33 and 34 below.

TABLE 33

| | INITIAL DATA | |
|---|---|---|
| SAMPLE | YI | % T |
| 20 | 1.38 | 92.04 |
| 22 | 0.97 | 91.36 |
| 23 | 0.95 | 91.13 |
| 37 | 1.88 | 91.38 |
| 38 | 2.04 | 91.26 |
| 45 | 2.64 | 90.43 |
| 47 | 2.52 | 91.9 |
| 50 | 2.46 | 90.6 |
| 53 | 2.5 | 92.15 |
| 54 | 2.37 | 92.02 |
| 55 | 2.1 | 91.01 |
| 56 | 2.41 | 92.1 |

TABLE 34

| | INITIAL DATA | | 333 h QUV DATA | |
|---|---|---|---|---|
| SAMPLE | YI | % T | YI | % T |
| 29 | 2.28 | 91.47 | 2.86 | 91.10 |
| 30 | 1.68 | 90.87 | 2.48 | 90.48 |
| 39 | 1.95 | 90.84 | 2.31 | 90.83 |
| 51 | 2.15 | 90.68 | 2.48 | 90.63 |

Glass transition temperature (Tg) of selected samples was measured using DMA. Rectangular bars with nominal dimensions: ~60 mm length×13 mm width×~3 mm thickness were mounted onto a TAI DMA 2980 in the three-point bending mode (50 mm span) and scanned at 3° C./min. from −90 to 180° C. at a frequency of 1 Hz, 20 μm amplitude, 120% auto strain, 10 mN static force and a data point collected per 4 sec. The results are set forth in Table 35 below and in FIGS. 28-34.

TABLE 35

| Sample | Tan gamma (low temperature), Tan delta max. temperature, Tan beta (° C.) |
|---|---|
| 19 | −66, 19, 114 |
| 21 | −67, 24, 131 |
| 31 | −74, 20, 127 |
| 46 | −70, 14, 109 |
| 48 | −68, 18, 109 |
| 49 | −67, 20, 129 |
| 52 | −67, 15, 108 |

Figure 28:
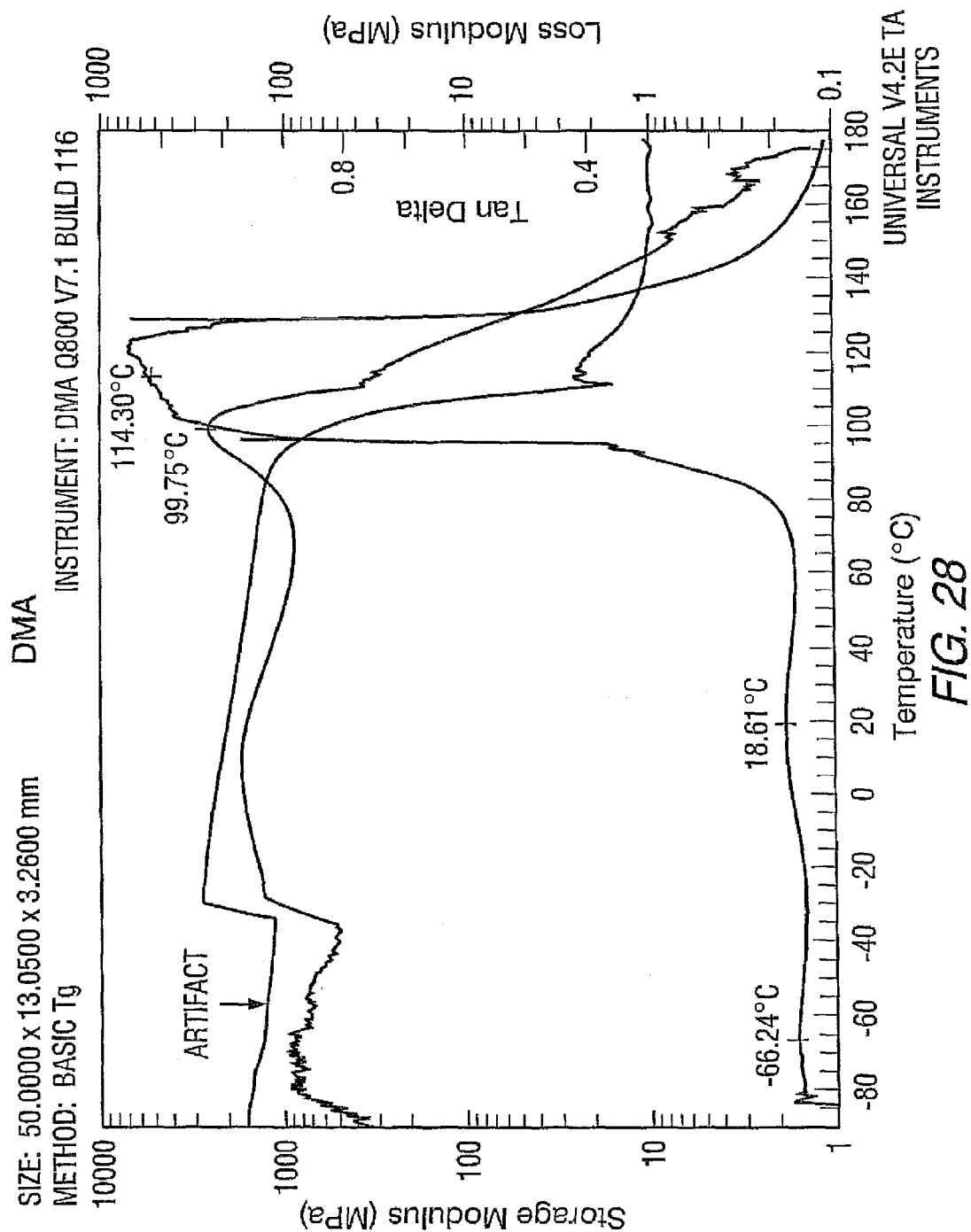
FIG. 28 is a graph of storage modulus, loss modulus and tan Delta as a function of temperature measured using DMA for a casting of a polyurethane prepared according to Example L3, Trial #2, Sample 19, according to the present invention.
Figure 29:
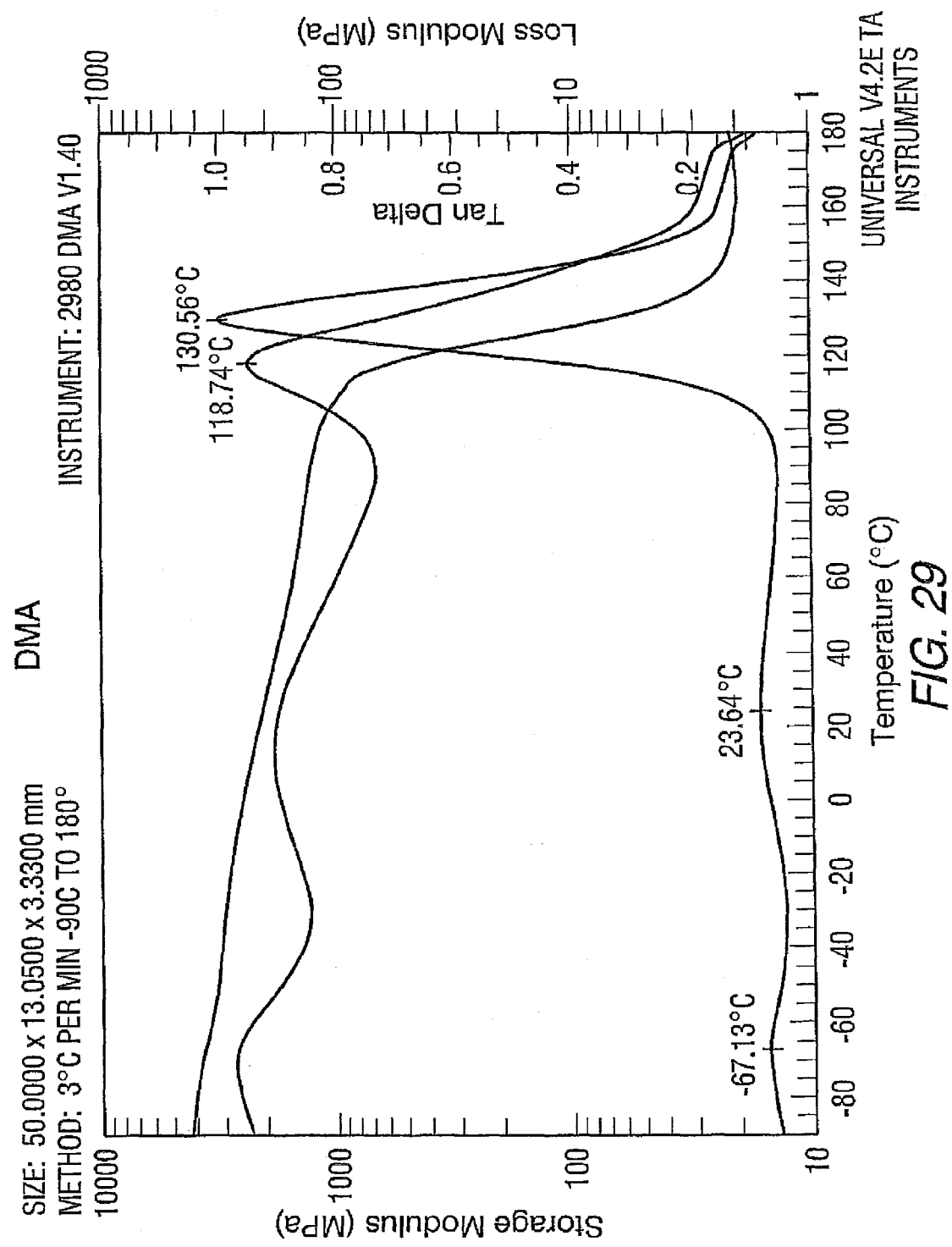
FIG. 29 is a graph of storage modulus, loss modulus and tan Delta as a function of temperature measured using DMA for a casting of a polyurethane prepared according to Example L3, Trial #2, Sample 21, according to the present invention.
Figure 30:
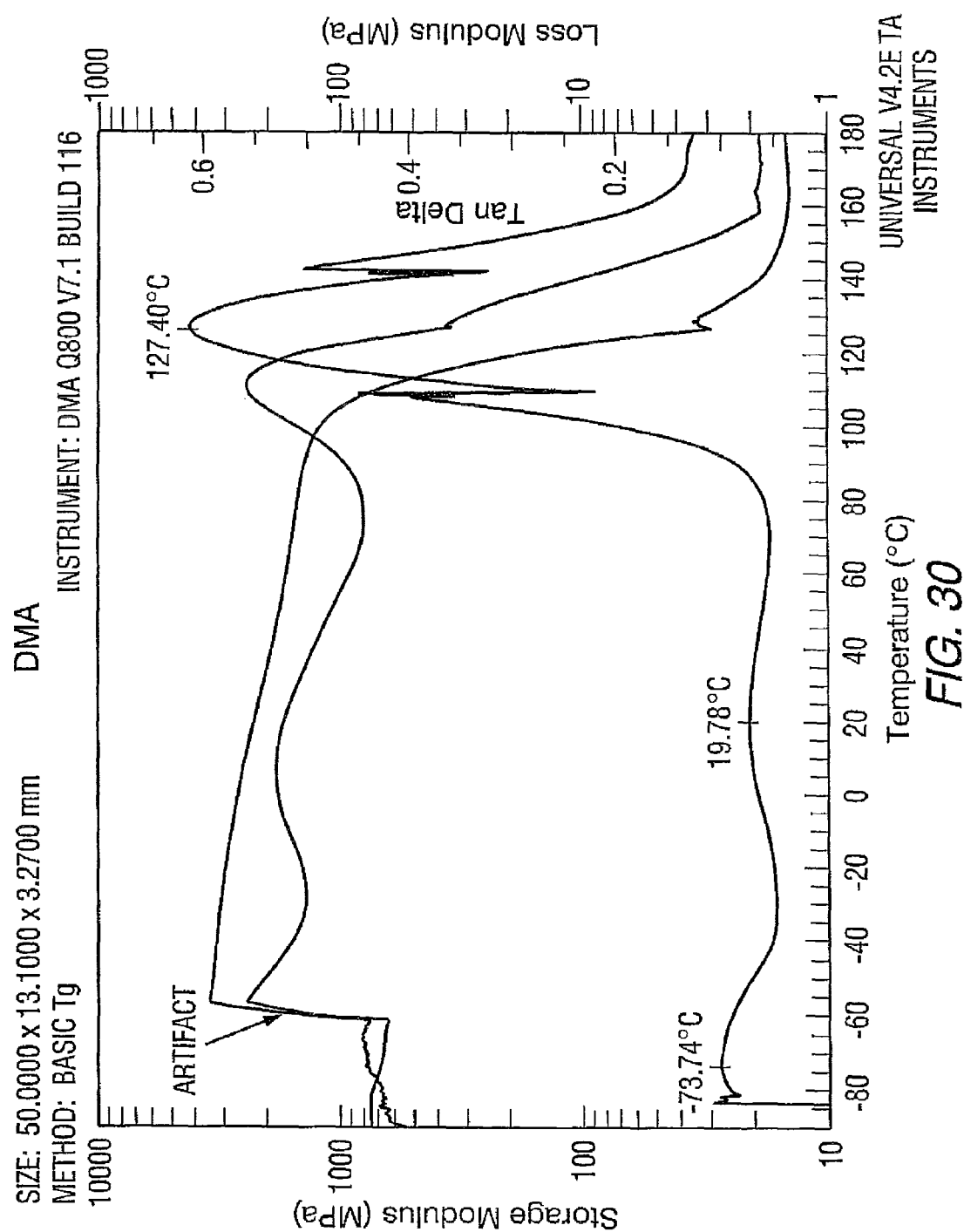
FIG. 30 is a graph of storage modulus, loss modulus and tan Delta as a function of temperature measured using DMA for a casting of a polyurethane prepared according to Example L3, Trial #2, Sample 31, according to the present invention.
Figure 31:
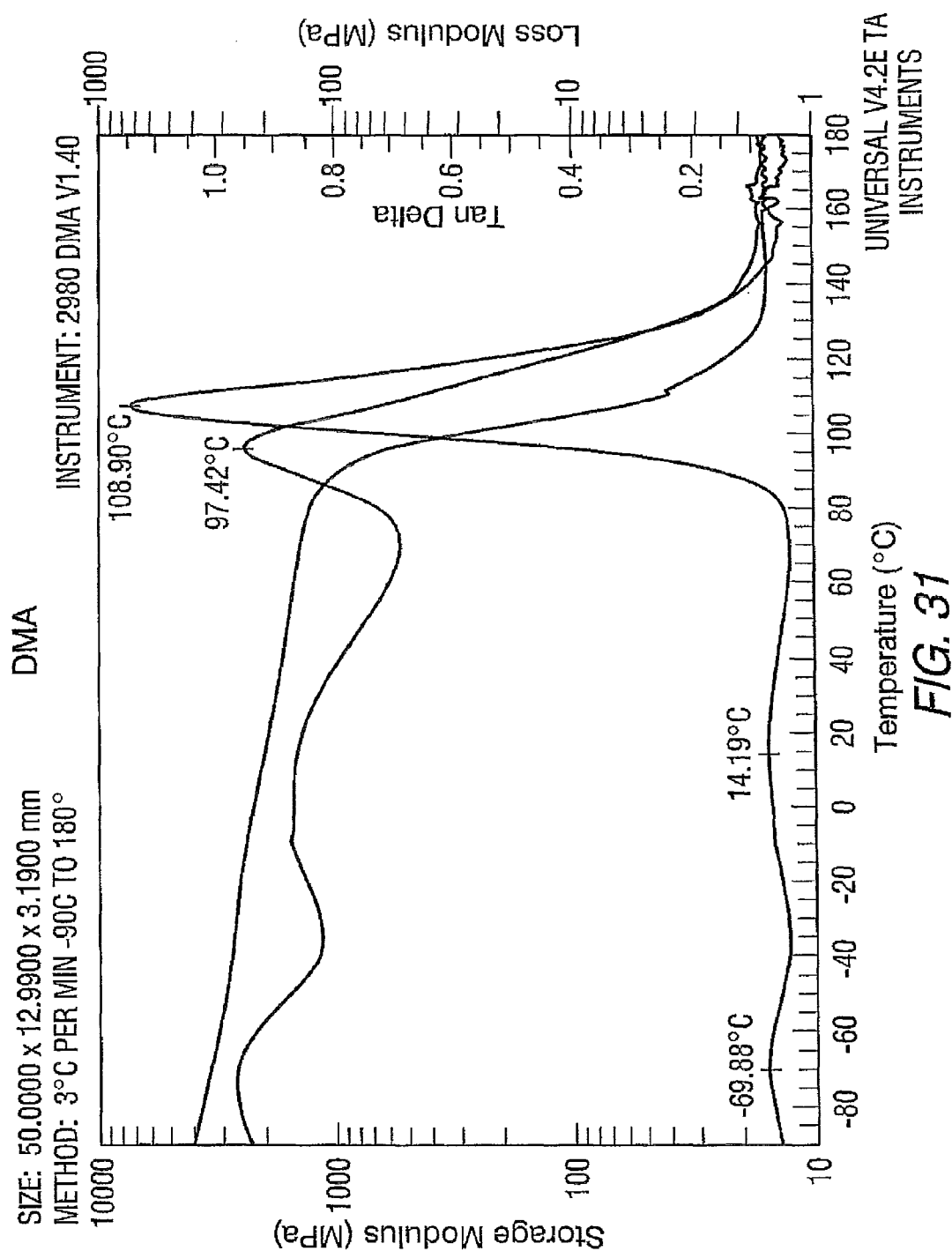
FIG. 31 is a graph of storage modulus, loss modulus and tan Delta as a function of temperature measured using DMA for a casting of a polyurethane prepared according to Example L3, Trial #2, Sample 46, according to the present invention.
Figure 32:
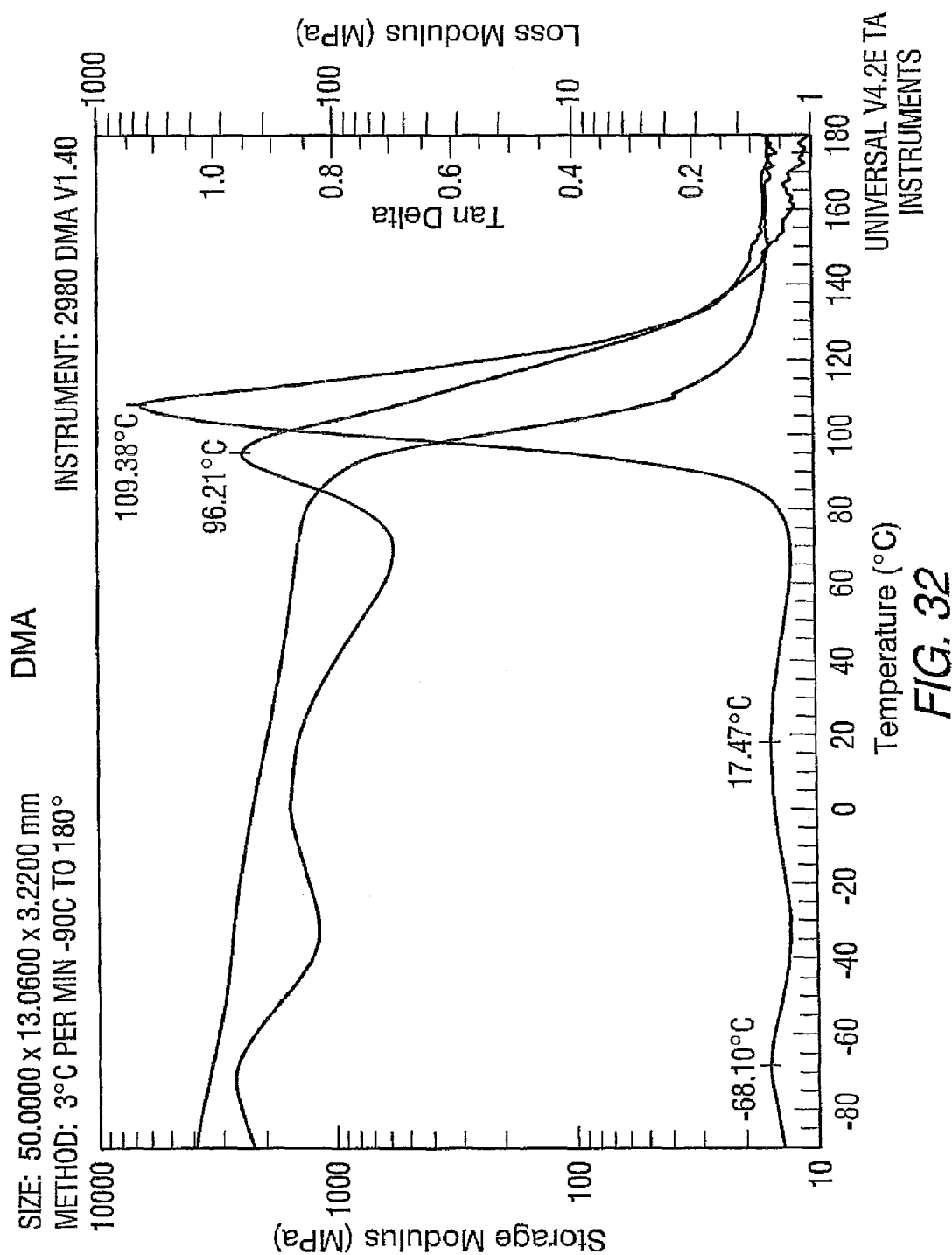
FIG. 32 is a graph of storage modulus, loss modulus and tan Delta as a function of temperature measured using DMA for a casting of a polyurethane prepared according to Example L3, Trial #2, Sample 48, according to the present invention.
Figure 33:
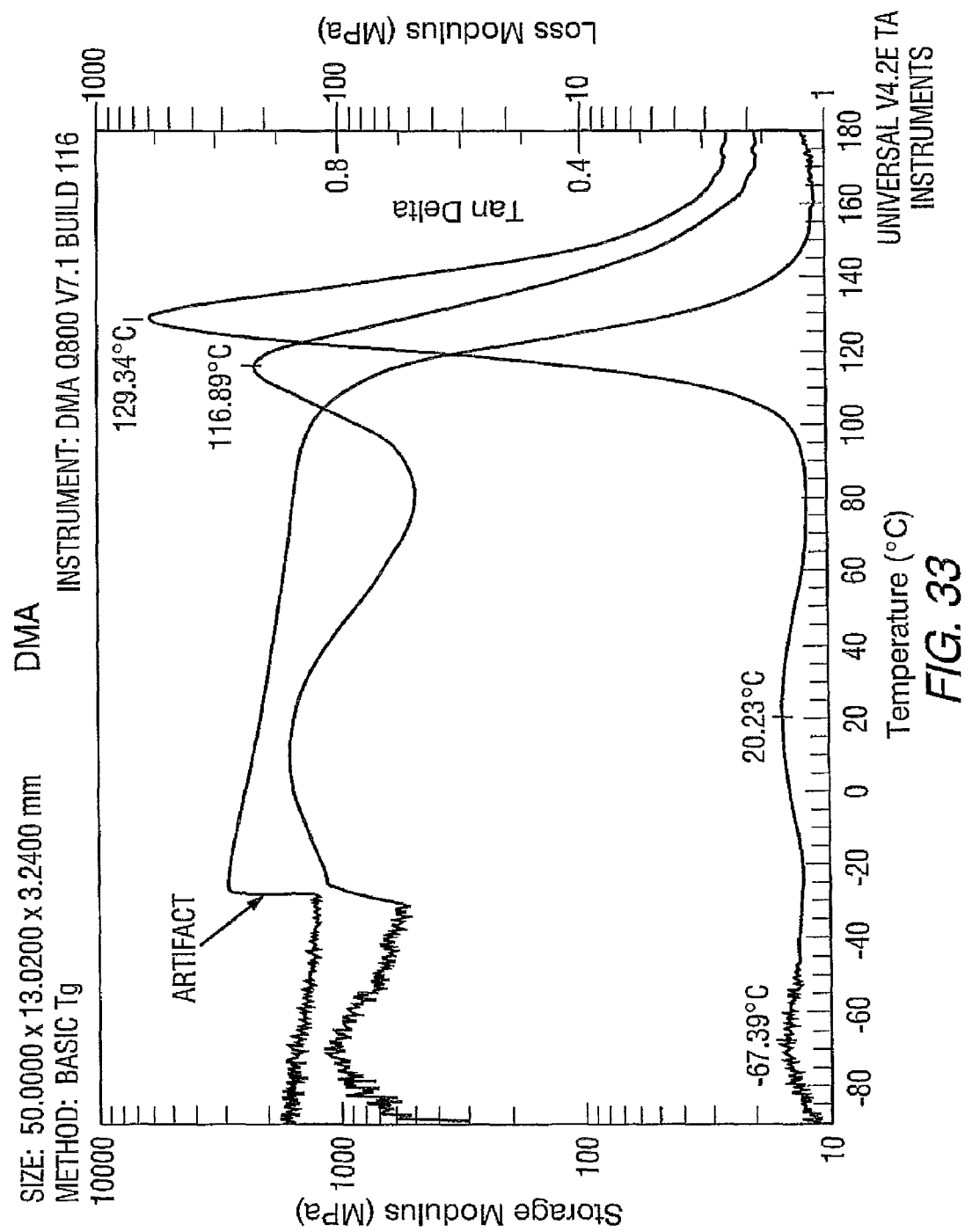
FIG. 33 is a graph of storage modulus, loss modulus and tan Delta as a function of temperature measured using DMA for a casting of a polyurethane prepared according to Example L3, Trial #2, Sample 49, according to the present invention.
Figure 34:
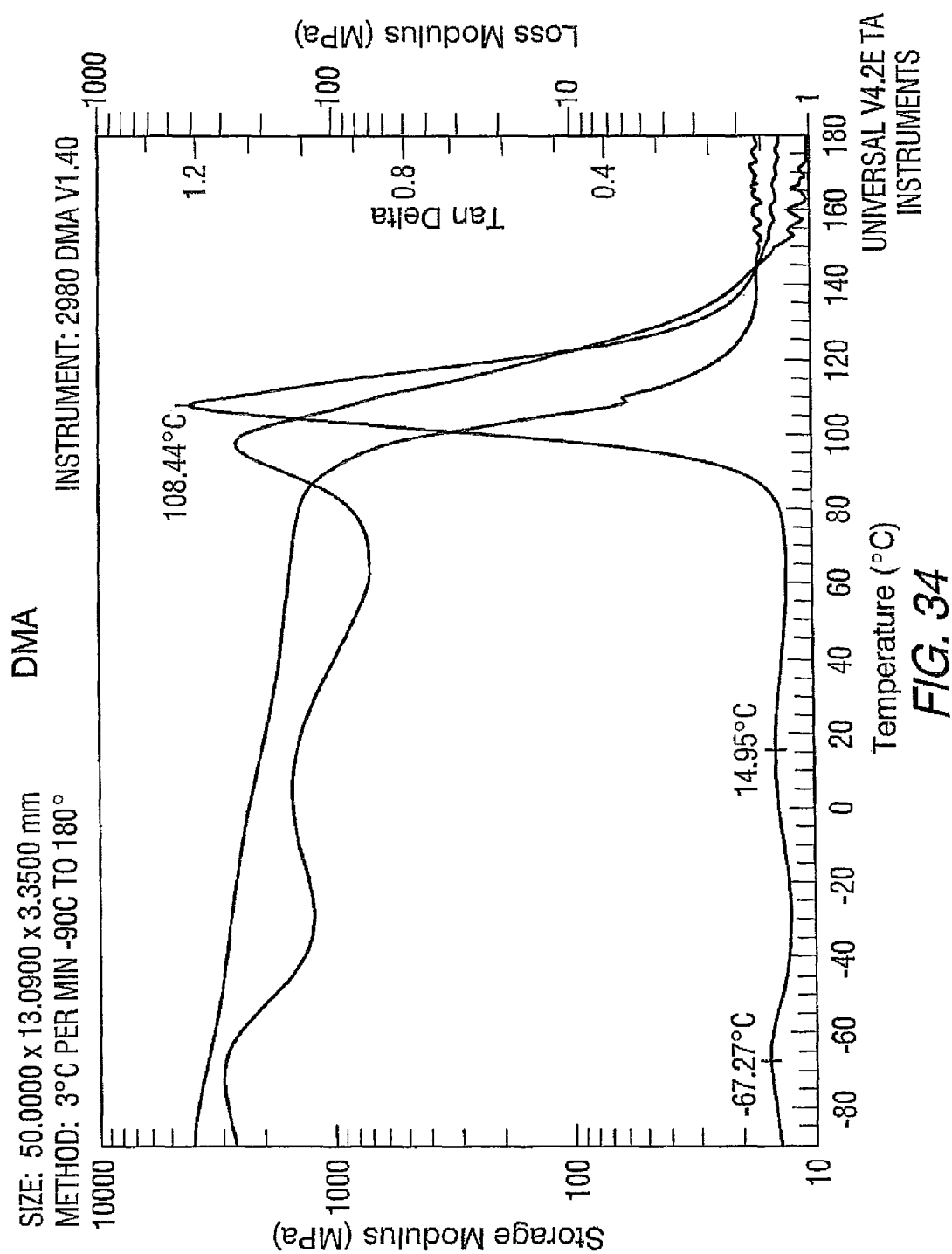
FIG. 34 is a graph of storage modulus, loss modulus and tan Delta as a function of temperature measured using DMA for a casting of a polyurethane prepared according to Example L3, Trial #2, Sample 52, according to the present invention.

FIG. 28 is a graph of storage modulus, loss modulus and tan Delta as a function of temperature measured using DMA for a casting of a polyurethane prepared according to Trial 2, Sample 19. FIG. 29 is a graph of storage modulus, loss modulus and tan Delta as a function of temperature measured using DMA for a casting of a polyurethane prepared according to Trial 2, Sample 21. FIG. 30 is a graph of storage modulus, loss modulus and tan delta as a function of temperature measured using DMA for a casting of a polyurethane prepared according to Trial 2, Sample 31. FIG. 31 is a graph of storage modulus, loss modulus and tan Delta as a function of temperature measured using DMA for a casting of a polyurethane prepared according to Trial 2, Sample 46. FIG. 32 is a graph of storage modulus, loss modulus and tan Delta as a function of temperature measured using DMA for a casting of a polyurethane prepared according to Trial 2, Sample 48. FIG. 33 is a graph of storage modulus, loss modulus and tan Delta as a function of temperature measured using DMA for a casting of a polyurethane prepared according to Trial 2, Sample 49. FIG. 34 is a graph of storage modulus, loss modulus and tan Delta as a function of temperature measured using DMA for a casting of a polyurethane prepared according to Trial 2, Sample 52.

Figure 35:
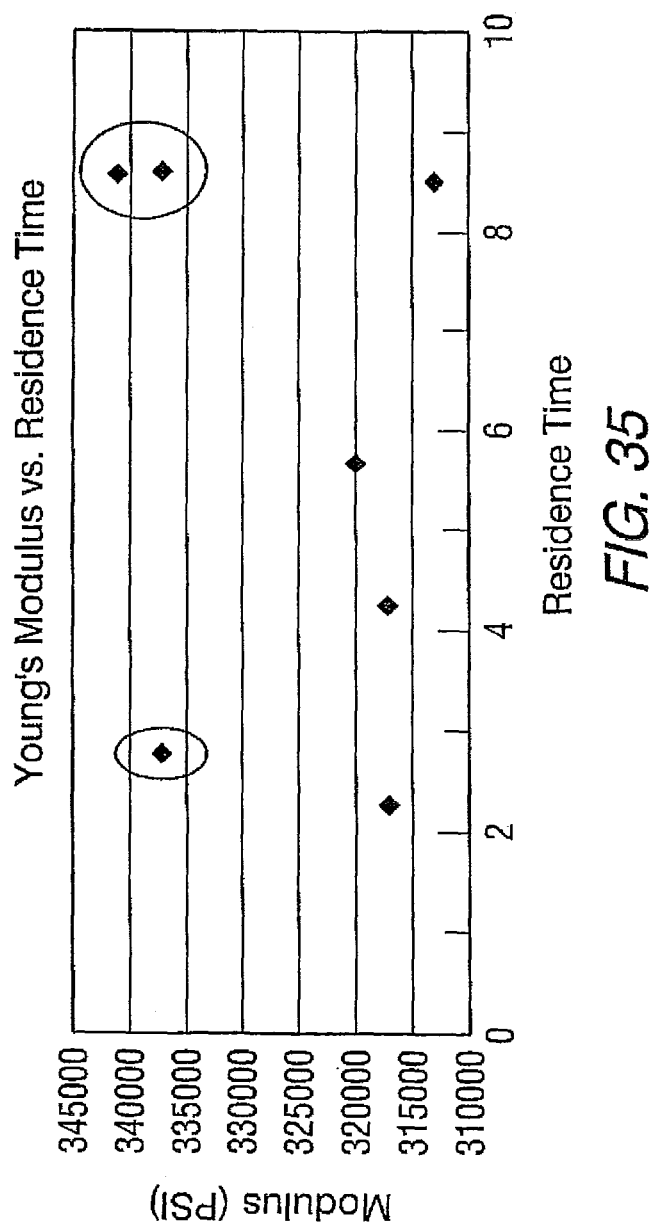
FIG. 35 is a graph of Young's Modulus (psi) as a function of residence time in the mix head (sec) for selected polyurethane samples prepared according to Example L3, Trial #2, according to the present invention.

Table 36 and FIG. 35 show the results of testing of selected samples for Young's Modulus (psi) as a function of residence time in the mix head (sec).

TABLE 36

| Formulation No. | Sample No. | Young's Modulus (psi) | Residence time in mix head (sec) |
|---|---|---|---|
| 2 | 19 | 313000 | 8.52 |
| 3 | 21 | 337000 | 8.62 |
| 81 | 31 | 341000 | 8.59 |
| 2 | 46 | 320000 | 5.68 |
| 2 | 48 | 317000 | 2.27 |
| 3 | 49 | 337000 | 2.76 |
| 2 | 52 | 317000 | 4.26 |

The results of Gardner Impact strength testing according to ASTM D-5420-04 of selected samples are set forth in Table 37 below. Stabilizers were included as discussed above.

TABLE 37

| Sample | Formulation | Trial | Residence Time (sec) | Stabilizers | Impact Strength (in-lbs/J) |
|---|---|---|---|---|---|
| 20 | 2 | 20 | 8.52 | N | 288/33 |
| 22 | 3 | 22 | 8.62 | N | 48/5 |
| 23 | 81 | 23 | 8.59 | N | 74/8 |
| 37 | 2 | 37 | 2.73 | Y | 115/13 |
| 38 | 3 | 38 | 3.45 | Y | 43/5 |
| 44 | 3 | 44 | 8.41 | Y | 60/7 |
| 45 | 2 | 45 | 5.68 | Y | 195/22 |
| 47 | 2 | 47 | 1.95 | Y | 104/12 |

TABLE 37-continued

| Sample | Formulation | Trial | Residence Time (sec) | Stabilizers | Impact Strength (in-lbs/J) |
|---|---|---|---|---|---|
| 50 | 2 | 50 | 2.27 | Y | 40/5 |
| 53 | 2 | 53 | 4.26 | Y | 195/22 |
| 54 | 2 | 54 | 4.26 | Y | 161/18 |
| 55 | 2 | 55 | 4.26 | Y | 193/22 |
| 56 | 2 | 56 | 4.26 | Y | 164/19 |

Gardner Impact strength was measured in accordance with ASTM D-5420-04 for sample runs as indicated in Table 38 below. Samples were tested after cure and after two or 78 hours of QUV-B exposure according to ASTM G-53.

TABLE 38

Summary Results for Gardner Impact Testing according to ASTM D5420-04

| FORMULATION # | 2 | 2 | 78 | 78 | 2 | 2 | 2 |
|---|---|---|---|---|---|---|---|
| Sample # | 1 control | 2 stab | 3 control | 4 stab | APT | APT w/stab | APT |
| Mean Failure Height | 360 | 243 | 19 | 24 | 50 | 10 | 18 |

Trial 3

For Trial 3, mixtures were prepared using the components as in Trial 1 above, except the respective mixing and casting conditions are set forth in Tables 39-40 below. The samples were cured for two hours at 250° F. (121° C.), then for 16 hours at 320° F. (160° C.). The mixtures were cast between release coated 1"×15"×15" (2.5 cm×38.1 cm×38.1 cm) casting cell glass molds with a resin volume of 3600 grams which had been preheated to a temperature of about 140° C. and cured for the respective times and temperatures set forth in the table below. After curing, each mold was removed from the oven and allowed to cool to room temperature.

TABLE 39

| Sample # | Tank temperatures ° C. | | | temp mix head (° C.) | Formulation |
|---|---|---|---|---|---|
| | Prepolymer | PDO | TMP | | |
| 1 | 125 | 110 | 110 | 120 | 3 |
| 2 | 125 | 110 | 110 | 120 | 3 |
| 3 | 125 | 110 | 110 | 120 | 2 |
| 4 | 125 | 110 | 110 | 120 | 2 |
| 5 | 125 | 110 | 110 | 120 | 2 |
| 6 | 125 | 110 | 110 | 120 | 2 |
| 7 | 125 | 110 | 110 | 120 | 2 |
| 8 | 125 | 110 | 110 | 120 | 2 |
| 9 | 125 | 110 | 110 | 120 | 2 |
| 10 | 125 | 110 | 110 | 120 | 2 |
| 11 | 125 | 110 | 110 | 120 | 2 |
| 12 | 125 | 110 | 110 | 120 | 2 |
| 13 | 125 | 110 | 110 | 120 | 2 |
| 14 | 125 | 110 | 110 | 120 | 2 |
| 15 | 125 | 110 | 110 | 120 | 2 |
| 16 | 125 | 110 | 110 | 120 | 2 |
| 17 | 125 | 110 | 110 | 120 | 2 |
| 18 | 125 | 110 | 110 | 120 | 2 |
| 19 | 125 | 110 | 110 | 120 | 2 |
| 20 | 125 | 110 | 110 | 120 | 2 |
| 21 | 125 | 110 | 110 | 120 | 2 |
| 22 | 125 | 110 | 110 | 120 | 2 |
| 23 | 125 | 110 | 110 | 120 | 2 |
| 24 | 125 | 110 | 110 | 120 | 2 |
| 25 | 125 | 110 | 110 | 120 | 2 |
| 26 | 125 | 110 | 110 | 120 | 2 |
| 27 | 125 | 110 | 110 | 120 | 2 |
| 28 | 125 | 110 | 110 | 120 | 2 |
| 29 | 125 | 110 | 110 | 120 | 2 |
| 30 | 125 | 110 | 110 | 120 | 2 |
| 31 | 125 | 110 | 110 | 120 | 2 |
| 32 | 125 | 110 | 110 | 120 | 2 |
| 33 | 125 | 110 | 110 | 120 | 2 |
| 34 | 125 | 110 | 110 | 120 | 2 |
| 35 | 125 | 110 | 110 | 120 | 2 |
| 36 | 125 | 110 | 110 | 120 | 2 |
| 37 | 125 | 115 | 120 | 125 | 2 |
| 38 | 125 | 110 | 110 | 120 | 3 |
| 39 | 125 | 110 | 110 | 120 | 3 |
| 40 | 125 | 110 | 110 | 120 | 3 |
| 41 | 125 | 110 | 110 | 120 | 81 |
| 42 | 125 | 110 | 110 | 120 | 81 |
| 43 | 125 | 110 | 110 | 120 | 81 |
| 44 | 125 | 110 | 110 | 120 | 81 |
| 45 | 125 | 110 | 110 | 120 | 81 |
| 46 | 125 | 110 | 110 | 120 | 81 |
| 47 | 125 | 110 | 110 | 120 | 81 |
| 48 | 125 | 110 | 110 | 120 | 81 |
| 49 | 125 | 110 | 110 | 120 | 81 |
| 50 | 125 | 110 | 110 | 120 | 81 |
| 51 | 125 | 110 | 110 | 120 | 3 |
| 52 | 125 | 110 | 110 | 120 | 3 |
| 53 | 125 | 110 | 110 | 120 | 3 |
| 54 | 125 | 110 | 110 | 120 | 3 |
| 55 | 125 | 110 | 110 | 120 | 3 |
| 56 | 125 | 110 | 110 | 120 | 3 |
| 57 | 125 | 110 | 110 | 120 | 3 |
| 58 | 125 | 110 | 110 | 120 | 3 |
| 59 | 125 | 110 | 110 | 120 | 3 |
| 60 | 125 | 110 | 110 | 120 | 3 |
| 61 | 125 | 110 | 110 | 120 | 3 |
| 62 | 125 | 110 | 110 | 120 | 81 |
| 63 | 125 | 110 | 110 | 120 | 2 |
| 64 | 125 | 110 | 110 | 120 | 2 |
| 65 | 125 | 110 | 110 | 120 | 2 |
| 66 | 125 | 110 | 110 | 120 | 2 |
| 67 | 125 | 110 | 110 | 120 | 262 |
| 68 | 125 | 110 | 110 | 120 | 262 |
| 69 | 125 | 110 | 110 | 120 | 263 |
| 70 | 125 | 110 | 110 | 120 | 263 |
| 71 | 125 | 110 | 110 | 120 | 264 |
| 72 | 125 | 110 | 110 | 120 | 264 |
| 73 | 125 | 110 | 110 | 120 | 265 |
| 74 | 125 | 110 | 110 | 120 | 265 |
| 75 | 125 | 110 | 110 | 120 | 2 |
| 76 | 125 | 110 | 110 | 120 | 2 |
| 77 | 125 | 110 | 110 | 120 | 2 |
| 78 | 125 | 110 | 110 | 120 | 2 |
| 79 | 125 | 110 | 110 | 120 | 2 |
| 80 | 125 | 110 | 110 | 120 | 2 |
| 81 | 125 | 110 | 110 | 120 | 2 |
| 82 | 125 | 110 | 110 | 120 | 2 |
| 83 | 125 | 110 | 110 | 120 | 2 |
| 84 | 125 | 110 | 110 | 120 | 2 |
| 85 | 125 | 110 | 110 | 120 | 2 |
| 86 | 125 | 110 | 110 | 120 | 2 |
| 87 | 125 | 110 | 110 | 120 | 2 |
| 88 | 125 | 110 | 110 | 120 | 2 |
| 89 | 125 | 110 | 110 | 120 | 2 |
| 90 | 125 | 110 | 110 | 120 | 2 |
| 91 | 125 | 110 | 110 | 120 | 2 |
| 92 | 125 | 110 | 110 | 120 | 3 |
| 93 | 125 | 110 | 110 | 120 | 2 |
| 94 | 125 | 110 | 110 | 120 | 2 |
| 95 | 125 | 110 | 110 | 120 | 2 |
| 96 | 125 | 110 | 110 | 120 | 2 |
| 97 | 125 | 110 | 110 | 120 | 2 |

TABLE 40

| Sample # | Formulation | Flow Rates (g/min) Prepolymer | Stabilizer | PDO | TMP | Total g/min | mix head volume (cc) | residence time (s) |
|---|---|---|---|---|---|---|---|---|
| 1 | 3 | 1000 | | 35.43 | 182.63 | 1218.06 | 205 | 10.10 |
| 2 | 3 | 1000 | | 35.43 | 182.63 | 1218.06 | 205 | 10.10 |
| 3 | 2 | 800 | 28 | 113.38 | 73.05 | 986.43 | 205 | 12.47 |
| 4 | 2 | 1000 | | 141.72 | 91.32 | 1233.04 | 205 | 9.98 |
| 5 | 2 | 1200 | | 170.06 | 109.58 | 1479.64 | 205 | 8.31 |
| 6 | 2 | 1500 | | 212.58 | 136.97 | 1849.55 | 205 | 6.65 |
| 7 | 2 | 2000 | | 283.44 | 182.63 | 2466.07 | 205 | 4.99 |
| 8 | 2 | 2500 | | 354.30 | 228.29 | 3082.59 | 205 | 3.99 |
| 9 | 2 | 2100 | | 297.61 | 191.76 | 2589.37 | 205 | 4.75 |
| 10 | 2 | 800 | | 113.38 | 73.05 | 986.43 | 205 | 12.47 |
| 11 | 2 | 1500 | | 212.58 | 136.97 | 1849.55 | 205 | 6.65 |
| 12 | 2 | 2100 | | 297.61 | 191.76 | 2589.37 | 205 | 4.75 |
| 13 | 2 | 900 | | 127.55 | 82.18 | 1109.73 | 205 | 11.08 |
| 14 | 2 | 1100 | | 155.89 | 100.45 | 1356.34 | 205 | 9.07 |
| 15 | 2 | 1300 | | 184.24 | 118.71 | 1602.95 | 205 | 7.67 |
| 16 | 2 | 1400 | | 198.41 | 127.84 | 1726.25 | 205 | 7.13 |

| Sample # | Formulation | Flow Rates (g/min) Prepolymer | PDO | TMP | Total g/min | mix head volume (cc) | residence time (s) |
|---|---|---|---|---|---|---|---|
| 17 | 2 | 1600 | 226.75 | 146.11 | 1972.86 | 205 | 6.23 |
| 18 | 2 | 1700 | 240.92 | 155.24 | 2096.16 | 205 | 5.87 |
| 19 | 2 | 1800 | 255.10 | 164.37 | 2219.46 | 205 | 5.54 |
| 20 | 2 | 1900 | 269.27 | 173.50 | 2342.77 | 205 | 5.25 |
| 21 | 2 | 800 | 113.38 | 73.05 | 986.43 | 250 | 15.21 |
| 22 | 2 | 900 | 127.55 | 82.18 | 1109.73 | 250 | 13.52 |
| 23 | 2 | 1000 | 141.72 | 91.32 | 1233.04 | 250 | 12.17 |
| 24 | 2 | 1100 | 155.89 | 100.45 | 1356.34 | 250 | 11.06 |
| 25 | 2 | 1200 | 170.06 | 109.58 | 1479.64 | 250 | 10.14 |
| 26 | 2 | 1300 | 184.24 | 118.71 | 1602.95 | 250 | 9.36 |
| 27 | 2 | 1400 | 198.41 | 127.84 | 1726.25 | 250 | 8.69 |
| 28 | 2 | 1500 | 212.58 | 136.97 | 1849.55 | 250 | 8.11 |
| 29 | 2 | 1600 | 226.75 | 146.11 | 1972.86 | 250 | 7.60 |
| 30 | 2 | 1700 | 240.92 | 155.24 | 2096.16 | 250 | 7.16 |
| 31 | 2 | 1800 | 255.10 | 164.37 | 2219.46 | 250 | 6.76 |
| 32 | 2 | 1900 | 269.27 | 173.50 | 2342.77 | 250 | 6.40 |

| Sample # | Formulation | Flow Rates (g/min) Prepolymer | Stabilizer and Prepolymer | PDO | TMP | Total g/min | mix head volume (cc) | residence time (s) |
|---|---|---|---|---|---|---|---|---|
| 33 | 2 | 2000 | 283.44 | 182.63 | 2466.07 | 250 | 6.08 | 33 |
| 34 | 2 | 2100 | | 297.61 | 191.76 | 2589.37 | 250 | 5.79 |
| 35 | 2 | 800 | | 113.38 | 73.05 | 986.43 | 250 | 15.21 |
| 36 | 2 | 1500 | | 212.58 | 136.97 | 1849.55 | 250 | 8.11 |
| 37 | 2 | 800 | 824.24 | 113.38 | 73.05 | 986.43 | 250 | 15.21 |
| 38 | 3 | 800 | 824.24 | 22.41 | 151.20 | 973.61 | 250 | 15.41 |
| 39 | 3 | 800 | 824.24 | 22.41 | 151.20 | 973.61 | 250 | 15.41 |
| 40 | 3 | 800 | 824.24 | 22.41 | 151.20 | 973.61 | 250 | 15.41 |
| 41 | 81 | 800 | 824.24 | 51.74 | 126.00 | 977.75 | 250 | 15.34 |
| 42 | 81 | 800 | 824.24 | 51.74 | 126.00 | 977.75 | 250 | 15.34 |
| 43 | 81 | 800 | 824.24 | 51.74 | 126.00 | 977.75 | 250 | 15.34 |
| 44 | 81 | 800 | 824.24 | 51.74 | 126.00 | 977.75 | 250 | 15.34 |
| 45 | 81 | 800 | 824.24 | 51.74 | 126.00 | 977.75 | 250 | 15.34 |
| 46 | 81 | 800 | 824.24 | 51.74 | 126.00 | 977.75 | 250 | 15.34 |
| 47 | 81 | 800 | 824.24 | 51.74 | 126.00 | 977.75 | 250 | 15.34 |
| 48 | 81 | 800 | 824.24 | 51.74 | 126.00 | 977.75 | 250 | 15.34 |
| 49 | 81 | 1500 | 1545.45 | 97.02 | 236.25 | 1833.27 | 250 | 8.18 |
| 50 | 81 | 2100 | 2163.63 | 135.83 | 330.76 | 2566.58 | 250 | 5.84 |
| 51 | 3 | 2100 | 2163.63 | 297.61 | 191.76 | 2589.37 | 250 | 5.79 |
| 52 | 3 | 1500 | 1545.45 | 212.58 | 136.97 | 1849.55 | 250 | 8.11 |
| 53 | 3 | 800 | 824.24 | 113.38 | 73.05 | 986.43 | 250 | 15.21 |
| 54 | 3 | 800 | 824.24 | 113.38 | 73.05 | 986.43 | 250 | 15.21 |
| 55 | 3 | 800 | 824.24 | 113.38 | 73.05 | 986.43 | 250 | 15.21 |
| 56 | 3 | 800 | 824.24 | 113.38 | 73.05 | 986.43 | 250 | 15.21 |
| 57 | 3 | 800 | 824.24 | 113.38 | 73.05 | 986.43 | 250 | 15.21 |
| 58 | 3 | 800 | 824.24 | 113.38 | 73.05 | 986.43 | 250 | 15.21 |
| 59 | 3 | 800 | 824.24 | 113.38 | 73.05 | 986.43 | 250 | 15.21 |
| 60 | 3 | 800 | 824.24 | 113.38 | 73.05 | 986.43 | 250 | 15.21 |
| 61 | 3 | 800 | 824.24 | 113.38 | 73.05 | 986.43 | 250 | 15.21 |
| 62 | 81 | 800 | 824.24 | 51.74 | 126.00 | 977.75 | 250 | 15.34 |
| 63 | 2 | 800 | 824.24 | 110.44 | 75.58 | 986.01 | 250 | 15.21 |
| 64 | 2 | 800 | 824.24 | 110.44 | 75.58 | 986.01 | 250 | 15.21 |

TABLE 40-continued

| | | | | | | | |
|---|---|---|---|---|---|---|---|
| 65 | 2 | 800 | 824.24 | 110.44 | 75.58 | 986.01 | 250 | 15.21 |
| 66 | 2 | 800 | 824.24 | 110.44 | 75.58 | 986.01 | 250 | 15.21 |
| 67 | 262 | 800 | 824.24 | 127.55 | 60.88 | 1012.66 | 250 | 14.81 |
| 68 | 262 | 800 | 824.24 | 127.55 | 60.88 | 1012.66 | 250 | 14.81 |
| 69 | 263 | 800 | 824.24 | 141.72 | 48.70 | 1014.66 | 250 | 14.78 |
| 70 | 263 | 800 | 824.24 | 141.72 | 48.70 | 1014.66 | 250 | 14.78 |
| 71 | 264 | 800 | 824.24 | 155.89 | 36.53 | 1016.66 | 250 | 14.75 |
| 72 | 264 | 800 | 824.24 | 155.89 | 36.53 | 1016.66 | 250 | 14.75 |
| 73 | 265 | 800 | 824.24 | 170.06 | 24.35 | 1018.65 | 250 | 14.73 |
| 74 | 265 | 800 | 824.24 | 170.06 | 24.35 | 1018.65 | 250 | 14.73 |
| 75 | 2 | 800 | 824.24 | 113.38 | 73.05 | 986.43 | 250 | 15.21 |
| 76 | 2 | 900 | 927.27 | 127.55 | 82.18 | 1109.73 | 250 | 13.52 |
| 77 | 2 | 1000 | 1030.3 | 141.72 | 91.32 | 1233.04 | 250 | 12.17 |
| 78 | 2 | 1100 | 1133.33 | 155.89 | 100.45 | 1356.34 | 250 | 11.06 |
| 79 | 2 | 1200 | 1236.36 | 170.06 | 109.58 | 1479.64 | 250 | 10.14 |
| 80 | 2 | 1500 | 1545.45 | 212.58 | 136.97 | 1849.55 | 250 | 8.11 |
| 81 | 2 | 1700 | 1751.51 | 240.92 | 155.24 | 2096.16 | 250 | 7.16 |
| 82 | 2 | 2000 | 2060.6 | 283.44 | 182.63 | 2466.07 | 250 | 6.08 |
| 83 | 2 | 2100 | 2163.63 | 297.61 | 191.76 | 2589.37 | 250 | 5.79 |
| 84 | 2 | 800 | 824.24 | 113.38 | 73.05 | 986.43 | 205 | 12.47 |
| 85 | 2 | 1000 | 1030.3 | 141.72 | 91.32 | 1233.04 | 205 | 9.98 |
| 86 | 2 | 1200 | 1236.36 | 170.06 | 109.58 | 1479.64 | 205 | 8.31 |
| 87 | 2 | 1500 | 1545.45 | 212.58 | 136.97 | 1849.55 | 205 | 6.65 |
| 88 | 2 | 1700 | 1751.51 | 240.92 | 155.24 | 2096.16 | 205 | 5.87 |
| 89 | 2 | 2000 | 2060.6 | 283.44 | 182.63 | 2466.07 | 205 | 4.99 |
| 90 | 2 | 2100 | 2163.63 | 297.61 | 191.76 | 2589.37 | 205 | 4.75 |
| 91 | 2 | 800 | 824.24 | 113.38 | 73.05 | 986.43 | 205 | 12.47 |
| 92 | 3 | 800 | 824.24 | 28.34 | 146.11 | 974.45 | 205 | 12.62 |
| 93 | 2 | 800 | 824.24 | 113.38 | 73.05 | 986.43 | 62 | 3.77 |
| 94 | 2 | 1000 | 1030.3 | 141.72 | 91.32 | 1233.04 | 62 | 3.02 |
| 95 | 2 | 1200 | 1236.36 | 170.06 | 109.58 | 1479.64 | 62 | 2.51 |
| 96 | 2 | 1500 | 1545.45 | 212.58 | 136.97 | 1849.55 | 62 | 2.01 |
| 97 | 2 | 2000 | 2060.6 | 283.44 | 182.63 | 2466.07 | 62 | 1.51 |

Fischer microhardness values for selected samples were determined according to ISO 14577-1:2002. The test results are set forth in Table 41 below.

TABLE 41

| Sample No. | Fischer Microhardness (N/mm$^2$) |
|---|---|
| 14 | 106 |
| 15 | 113 |
| 16 | 113 |
| 17 | 113 |
| 18 | 113 |
| 19 | 114 |
| 20 | 114 |
| 21 | 113 |
| 22 | 113 |
| 23 | 114 |
| 24 | 113 |
| 25 | 112 |
| 26 | 112 |
| 27 | 115 |
| 28 | 114 |
| 29 | 113 |
| 30 | 113 |
| 32 | 113 |
| 33 | 113 |
| 34 | 113 |
| 35 | 112 |
| 36 | 113 |

Gardner Impact strength (in-lbs) was measured in accordance with ASTM D-5420-04 for sample runs as indicated in Table 42 below.

TABLE 42

Summary Results for Gardner Impact Testing according to ASTM D5420-04

| FORMULATION # | 2 | 2 | 2 | 2 | 2 | 2 | 2 | 2 | 2 | 2 | 2 | 2 | 2 | 2 |
|---|---|---|---|---|---|---|---|---|---|---|---|---|---|---|
| Sample # | 75 | 76 | 77 | 78 | 79 | 80 | 81 | 82 | 83 | 84 | 85 | 86 | 87 | 88 |
| Mean Failure Height (in-lbs) | 50 | 111 | 145 | 171 | 107 | 72 | 50 | 66 | 208 | 219 | 168 | 294 | 165 | 175 |
| FORMULATION # | 2 | 2 | 2 | 2 | 2 | 2 | 2 | 2 | | | | | | |
| Sample # | 89 | 90 | 91 | 93 | 94 | 95 | 96 | 97 | | | | | | |
| Mean Failure Height | 161 | 109 | 184 | 225 | 61 | 134 | 116 | 243 | | | | | | |
| FORMULATION # | 2 | 2 | 2 | 2 | 2 | 2 | 2 | 2 | 2 | 2 | 2 | 81 | 81 | 81 |
| Sample # | 3 | 4 | 7 | 10 | 12 | 21 | 23 | 33 | 35 | 36 | 37 | 44 | 47 | 49 |
| Mean Failure Height | 62 | 45 | 101 | 180 | 98 | 131 | 115 | 60 | 78 | 37 | 148 | 28 | 26 | 38 |
| FORMULATION # | 81 | 3 | 3 | 3 | 3 | | | | | | | | | |
| Sample # | 50 | 51 | 52 | 54 | 57 | | | | | | | | | |
| Mean Failure Height | 64 | 69 | 104 | 98 | 54 | | | | | | | | | |

Light transmittance and Yellowness testing were conducted according to ASTM D1003 Test Method for Haze and Luminous Transmittance of Transparent Plastics and D1925 Test Method for Yellowness Index of Plastics. The test results are presented in Table 43 below.

MODUR W 4,4'-methylene-bis-(cyclohexyl isocyanate) and 5 ppm dibutyltin diacetate as reactants. The DESMODUR W, 1,5-pentanediol and trimethylolpropane were each preheated to a temperature of about 80° C. under a nitrogen atmosphere for at least about four hours prior to mixing. The

TABLE 43

Illuminant: C Observer: 2°

| | Sample ID | | | | | | | | | | |
|---|---|---|---|---|---|---|---|---|---|---|---|
| | 14 | 15 | 16 | 17 | 18 | 19 | 20 | 21 | 22 | 23 | 24 |
| CIE X (%) | 87.86 | 88.46 | 87.98 | 88.61 | 87.40 | 87.43 | 88.38 | 87.51 | 88.00 | 88.01 | 88.37 |
| CIEYX (%) | 89.59 | 90.16 | 89.67 | 90.31 | 89.10 | 89.14 | 90.10 | 89.22 | 89.71 | 89.73 | 90.07 |
| CIE Z (%) | 105.44 | 105.96 | 105.64 | 106.21 | 104.78 | 104.89 | 106.24 | 104.97 | 105.66 | 105.16 | 105.85 |
| CIE Y | 89.59 | 90.16 | 89.67 | 90.31 | 89.10 | 89.14 | 90.10 | 89.22 | 89.71 | 899.73 | 90.07 |
| CIE x | 0.3106 | 0.3108 | 0.3106 | 0.3108 | 0.3107 | 0.3106 | 0.3104 | 0.3107 | 0.3106 | 0.3111 | 0.3108 |
| CIE y | 0.3167 | 0.3168 | 0.3165 | 0.3167 | 0.3168 | 0.3167 | 0.3165 | 0.3167 | 0.3166 | 0.3172 | 0.3168 |
| CIE L* | 95.83 | 96.06 | 95.86 | 96.12 | 95.62 | 95.64 | 96.04 | 95.67 | 95.88 | 95.88 | 96.03 |
| CIE a* | 0.00 | 0.06 | 0.08 | 0.07 | 0.03 | 0.01 | 0.02 | 0.02 | 0.04 | 0.03 | 0.06 |
| CIE b* | 0.29 | 0.39 | 0.23 | 0.34 | 0.35 | 0.31 | 0.17 | 0.32 | 0.25 | 0.56 | 0.39 |
| DW (nm) | 580.63 | 582.40 | 588.54 | 583.79 | 581.47 | 581.28 | 587.36 | 581.63 | 584.68 | 579.81 | 582.32 |
| CIE Cab* | 0.29 | 0.39 | 0.24 | 0.35 | 0.35 | 0.31 | 0.18 | 0.32 | 0.25 | 0.56 | 0.39 |
| Purity (%) | 0.23 | 0.34 | 0.18 | 0.29 | 0.30 | 0.26 | 0.12 | 0.26 | 0.20 | 0.50 | 0.34 |
| CIE Huge | 90.68 | 81.29 | 70.71 | 78.19 | 85.69 | 87.82 | 81.83 | 86.44 | 80.50 | 87.01 | 81.61 |
| Yi | 0.78 | 1.01 | 0.71 | 0.92 | 0.91 | 0.82 | 0.57 | 0.84 | 0.72 | 1.32 | 1.01 |

| | Sample ID | | | | | | | | | | |
|---|---|---|---|---|---|---|---|---|---|---|---|
| | 25 | 26 | 27 | 28 | 29 | 30 | 32 | 33 | 34 | 35 | 36 |
| CIE X (%) | 88.52 | 87.87 | 88.61 | 88.03 | 88.07 | 87.82 | 88.04 | 88.63 | 88.39 | 88.17 | 88.41 |
| CIEYX (%) | 90.23 | 89.59 | 90.34 | 89.75 | 89.78 | 89.53 | 89.75 | 90.35 | 90.10 | 89.87 | 90.14 |
| CIE Z (%) | 106.11 | 105.54 | 106.23 | 105.66 | 105.78 | 105.37 | 105.72 | 106.1 | 105.78 | 105.63 | 106.31 |
| CIE Y | 90.23 | 89.59 | 90.34 | 89.75 | 89.78 | 89.53 | 89.75 | 90.35 | 90.10 | 89.87 | 90.14 |
| CIE x | 0.3107 | 0.3105 | 0.3107 | 0.3106 | 0.3016 | 0.3106 | 0.3105 | 0.3109 | 0.3109 | 0.3108 | 0.3104 |
| CIE y | 0.3168 | 0.3166 | 0.3168 | 0.3166 | 0.3166 | 0.3167 | 0.3166 | 0.3169 | 0.3170 | 0.3168 | 0.3164 |
| CIE L* | 96.09 | 95.83 | 96.14 | 95.89 | 95.91 | 95.80 | 95.89 | 96.14 | 96.04 | 95.94 | 96.05 |
| CIE a* | 0.04 | 0.00 | 0.03 | 0.02 | 0.03 | 0.04 | 0.04 | 0.04 | 0.05 | 0.05 | 0.02 |
| CIE b* | 0.35 | 0.24 | 0.35 | 0.28 | 0.27 | 0.29 | 0.24 | 0.44 | 0.45 | 0.38 | 0.16 |
| DW (nm) | 582.36 | 582.38 | 581.75 | 582.18 | 583.46 | 582.96 | 584.60 | 580.98 | 581.25 | 582.18 | 588.09 |
| CIE Cab* | 0.35 | 0.24 | 0.35 | 0.28 | 0.27 | 0.29 | 0.24 | 0.44 | 0.46 | 0.38 | 0.16 |
| Purity (%) | 0.30 | 0.18 | 0.30 | 0.22 | 0.22 | 0.24 | 0.19 | 0.38 | 0.40 | 0.33 | 0.11 |
| CIE Huge | 82.76 | 88.82 | 84.75 | 86.58 | 82.90 | 83.15 | 81.32 | 84.94 | 83.73 | 82.32 | 83.25 |
| Yi | 0.92 | 0.67 | 0.91 | 0.76 | 0.76 | 0.81 | 0.70 | 1.09 | 1.13 | 0.99 | 0.53 |

Trial 4

For Trial 4, mixtures were prepared using the components as in Trial 1 above, except the respective mixing conditions are set forth in Tables 44-45 below. The samples were cured for two hours at 250° F. (121° C.), then for 16 hours at 320° F. (160° C.). The mixtures were cast between release coated 1"×15"×15" (2.5 cm×38.1 cm×38.1 cm) casting cell glass molds with a resin volume of 3600 grams which had been preheated to a temperature of about 140° C. and cured for the respective times and temperatures set forth in the table below. After curing, each mold was removed from the oven and allowed to cool to room temperature.

Prepolymer (PP) was prepared as follows:

An isocyanate functional urethane prepolymer was prepared by reacting 0.21 equivalents of 1,5-pentanediol, 0.09 equivalents of trimethylolpropane, 1.0 equivalents of DES-components were mixed using a Max Urethane Processing System Model No. 601-000-333. The mix head volume was 205 cc.

Subsequently, the isocyanate functional urethane prepolymer was reacted with 0.21 equivalents of trimethylolpropane and 0.49 equivalents of 1,5-pentanediol. Each of the reactants was heated to the temperature indicated below prior to mixing. The flow rate of each reactant and temperature at the mix head is specified below. The mixing speed was 13,000 rpm.

TABLE 44

| Sample # | Line temperatures ° C. | | | temp mix head (° C.) | Formulation. |
|---|---|---|---|---|---|
| | Prepolymer | PDO | TMP | | |
| 1 | 120 | 120 | 120 | 120 | 2 |
| 2 | 120 | 120 | 120 | 120 | 2 |
| 3 | 120 | 120 | 120 | 120 | 2 |

TABLE 44-continued

| Sample # | Line temperatures ° C. Prepolymer | PDO | TMP | mix head (° C.) temp | Formulation. |
|---|---|---|---|---|---|
| 4 | 120 | 120 | 120 | 120 | X |
| 5 | 120 | 120 | 120 | 120 | 2 |
| 6 | 125 | 120 | 125 | 125 | 2 |
| 7 | 125 | 120 | 125 | 125 | 2 |
| 8 | 125 | 120 | 125 | 125 | X |
| 9 | 125 | 120 | 125 | 125 | 3 |
| 10 | 125 | 120 | 125 | 125 | 3 |
| 11 | 125 | 120 | 125 | 125 | 3 |
| 12 | 125 | 120 | 125 | 125 | 3 |
| 13 | 125 | 120 | 125 | 125 | 2 |
| 14 | 125 | 120 | 125 | 125 | 2 |
| 15 | 125 | 120 | 125 | 125 | 2 |
| 16 | 125 | 120 | 125 | 125 | 2 |
| 17 | 125 | 120 | 125 | 125 | 2 |
| 18 | 125 | 120 | 125 | 125 | 2 |
| 19 | 125 | 120 | 125 | 125 | 3 |
| 20 | 125 | 120 | 125 | 125 | 3 |
| 21 | 125 | 120 | 125 | 125 | 3 |
| 22 | 125 | 120 | 125 | 125 | 2 |
| 23 | 125 | 120 | 125 | 125 | 2 |
| 24 | 125 | 120 | 125 | 125 | 2 |
| 25 | 125 | 120 | 125 | 125 | 2 |
| 26 | 125 | 120 | 125 | 125 | 2 |
| 27 | 125 | 120 | 125 | 125 | 2 |
| 28 | 125 | 120 | 125 | 125 | 2 |
| 29 | 125 | 120 | 125 | 125 | 3 |
| 30 | 125 | 120 | 125 | 125 | 2 |
| 31 | 125 | 120 | 125 | 125 | 2 |
| 32 | 125 | 120 | 125 | 125 | 2 |
| 33 | 125 | 120 | 125 | 125 | 3 |
| 34 | 125 | 120 | 125 | 125 | 3 |
| 35 | 125 | 120 | 125 | 125 | 3 |
| 36 | 125 | 120 | 125 | 125 | 2 |
| 37 | 125 | 120 | 125 | 125 | 2 |
| 38 | 125 | 120 | 125 | 125 | 2 |
| 39 | 125 | 120 | 125 | 125 | 3 |
| 40 | 125 | 120 | 125 | 125 | 3 |
| 41 | 125 | 120 | 125 | 125 | 3 |
| 42 | 125 | 120 | 125 | 125 | 352 |
| 43 | 125 | 120 | 125 | 125 | 352 |
| 44 | 125 | 120 | 125 | 125 | 352 |
| 45 | 125 | 120 | 125 | 125 | 352 |
| 46 | 125 | 120 | 125 | 125 | 2 |
| 47 | 125 | 120 | 125 | 125 | 2 |
| 48 | 125 | 120 | 125 | 125 | 2 |
| 49 | 125 | 120 | 125 | 125 | 3 |
| 50 | 125 | 120 | 125 | 125 | 3 |
| 51 | 125 | 120 | 125 | 125 | 3 |
| 52 | 125 | 120 | 125 | 125 | 2 |
| 53 | 125 | 120 | 125 | 125 | 2 |
| 54 | 125 | 120 | 125 | 125 | 2 |
| 55 | 125 | 120 | 125 | 125 | 3 |
| 56 | 125 | 120 | 125 | 125 | 3 |
| 57 | 125 | 120 | 125 | 125 | 3 |

TABLE 45

| | Flow Rates | | | | |
|---|---|---|---|---|---|
| Sample # | DesW/NCO Prepolymer | PDO | TMP | Total | Residence Time (s) |
| 1 | 665.43 | 112.66 | 41.48 | 819.57 | 15.01 |
| 2 | 807.32 | 140.83 | 51.85 | 1000.00 | 12.30 |
| 3 | 831.78 | 140.83 | 51.85 | 1024.46 | 12.01 |
| 4 | 670.10 | 44.22 | 101.98 | 816.30 | 15.07 |
| 5 | 837.62 | 140.83 | 51.85 | 1030.30 | 11.94 |
| 6 | 670.10 | 112.66 | 41.48 | 824.24 | 14.92 |
| 7 | 837.62 | 140.83 | 51.85 | 1030.30 | 11.94 |
| 8 | 670.10 | 44.22 | 101.98 | 816.30 | 15.07 |
| 9 | 847.54 | 55.28 | 127.48 | 1030.30 | 11.94 |
| 10 | 847.54 | 55.28 | 127.48 | 1030.30 | 11.94 |
| 11 | 847.54 | 55.28 | 127.48 | 1030.30 | 11.94 |
| 12 | 847.54 | 55.28 | 127.48 | 1030.30 | 11.94 |
| 13 | 837.62 | 140.83 | 51.85 | 1030.30 | 11.94 |
| 14 | 837.62 | 140.83 | 51.85 | 1030.30 | 11.94 |
| 15 | 837.62 | 140.83 | 51.85 | 1030.30 | 11.94 |
| 16 | 670.10 | 112.66 | 41.48 | 824.24 | 14.92 |
| 17 | 1005.14 | 169.00 | 62.22 | 1236.36 | 9.95 |
| 18 | 1005.14 | 169.00 | 62.22 | 1236.36 | 9.95 |
| 19 | 678.03 | 44.22 | 101.98 | 824.24 | 14.92 |
| 20 | 678.03 | 44.22 | 101.98 | 824.24 | 14.92 |
| 21 | 678.03 | 44.22 | 101.98 | 824.24 | 14.92 |
| 22 | 586.33 | 98.58 | 36.30 | 721.21 | 17.05 |
| 23 | 670.10 | 112.66 | 41.48 | 824.24 | 14.92 |
| 24 | 753.86 | 126.75 | 46.67 | 927.27 | 13.26 |
| 25 | 837.62 | 140.83 | 51.85 | 1030.30 | 11.94 |
| 26 | 1005.14 | 169.00 | 62.22 | 1236.36 | 9.95 |
| 27 | 1256.43 | 211.25 | 77.78 | 1545.45 | 7.96 |
| 28 | 670.10 | 113.23 | 41.69 | 825.01 | 14.91 |
| 29 | 678.03 | 44.45 | 102.49 | 824.97 | 14.91 |
| 30 | 670.10 | 113.23 | 41.69 | 825.01 | 14.91 |
| 31 | 670.10 | 113.23 | 41.69 | 825.01 | 14.91 |
| 32 | 670.10 | 113.23 | 41.69 | 825.01 | 14.91 |
| 33 | 678.03 | 44.45 | 102.49 | 824.97 | 14.91 |
| 34 | 678.03 | 44.45 | 102.49 | 824.97 | 14.91 |
| 35 | 678.03 | 44.45 | 102.49 | 824.97 | 14.91 |
| 36 | 837.62 | 141.53 | 52.11 | 1031.26 | 11.93 |
| 37 | 837.62 | 141.53 | 52.11 | 1031.26 | 11.93 |
| 38 | 837.62 | 141.53 | 52.11 | 1031.26 | 11.93 |
| 39 | 847.54 | 55.56 | 128.12 | 1031.21 | 11.93 |
| 40 | 847.54 | 55.56 | 128.12 | 1031.21 | 11.93 |
| 41 | 847.54 | 55.56 | 128.12 | 1031.21 | 11.93 |
| 42 | 658.88 | | 141.12 | 800.00 | 15.38 |
| 43 | 658.88 | | 141.12 | 800.00 | 15.38 |
| 44 | 658.88 | | 141.12 | 800.00 | 15.38 |
| 45 | 658.88 | | 141.12 | 800.00 | 15.38 |
| 46 | 645.86 | 113.23 | 41.69 | 800.77 | 15.36 |
| 47 | 645.86 | 113.23 | 41.69 | 800.77 | 15.36 |
| 48 | 645.86 | 113.23 | 41.69 | 800.77 | 15.36 |
| 49 | 653.79 | 44.45 | 102.49 | 800.73 | 15.36 |
| 50 | 653.79 | 44.45 | 102.49 | 800.73 | 15.36 |
| 51 | 653.79 | 44.45 | 102.49 | 800.73 | 15.36 |
| 52 | 807.32 | 141.53 | 52.11 | 1000.96 | 12.29 |
| 53 | 807.32 | 141.53 | 52.11 | 1000.96 | 12.29 |
| 54 | 807.32 | 141.53 | 52.11 | 1000.96 | 12.29 |
| 55 | 817.24 | 55.56 | 128.12 | 1000.91 | 12.29 |
| 56 | 817.24 | 55.56 | 128.12 | 1000.91 | 12.29 |
| 57 | 817.24 | 55.56 | 128.12 | 1000.91 | 12.29 |

Yellowness Index (YI) and Light Transmittance (% T) for selected samples were determined according to ASTM G-53. Also, results for testing of selected samples tested initially and after exposure to QUV-B for 333 hours in a manner discussed above were determined. The results are set forth in Table 46 below.

Fischer microhardness values for selected samples were determined according to ISO 14577-1:2002. Young's Modulus values were derived from the Fischer microhardness values by conversion formulae well-known to those skilled in the art. The test results are set forth in Table 47 below.

Figure 36:
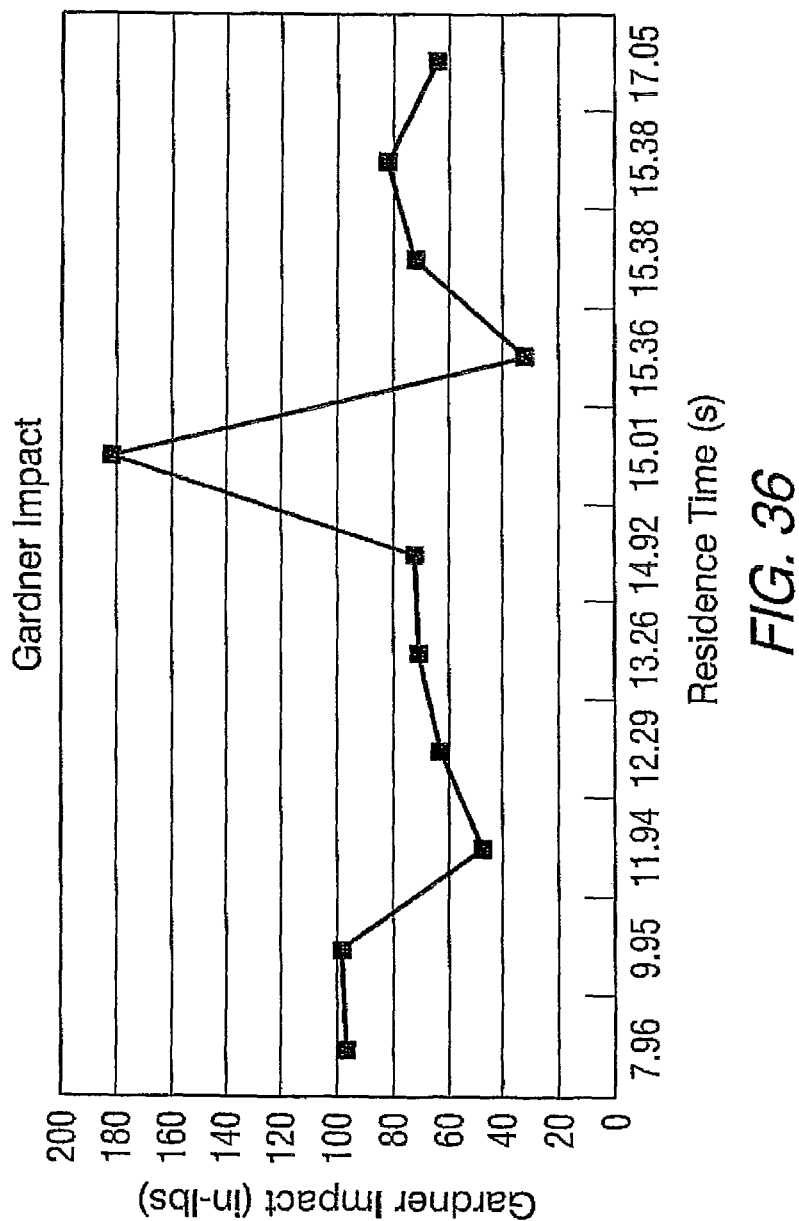
FIG. 36 is a graph of Gardner Impact strength as a function of residence time in the mix head for selected samples according to the present invention.
Figure 37:
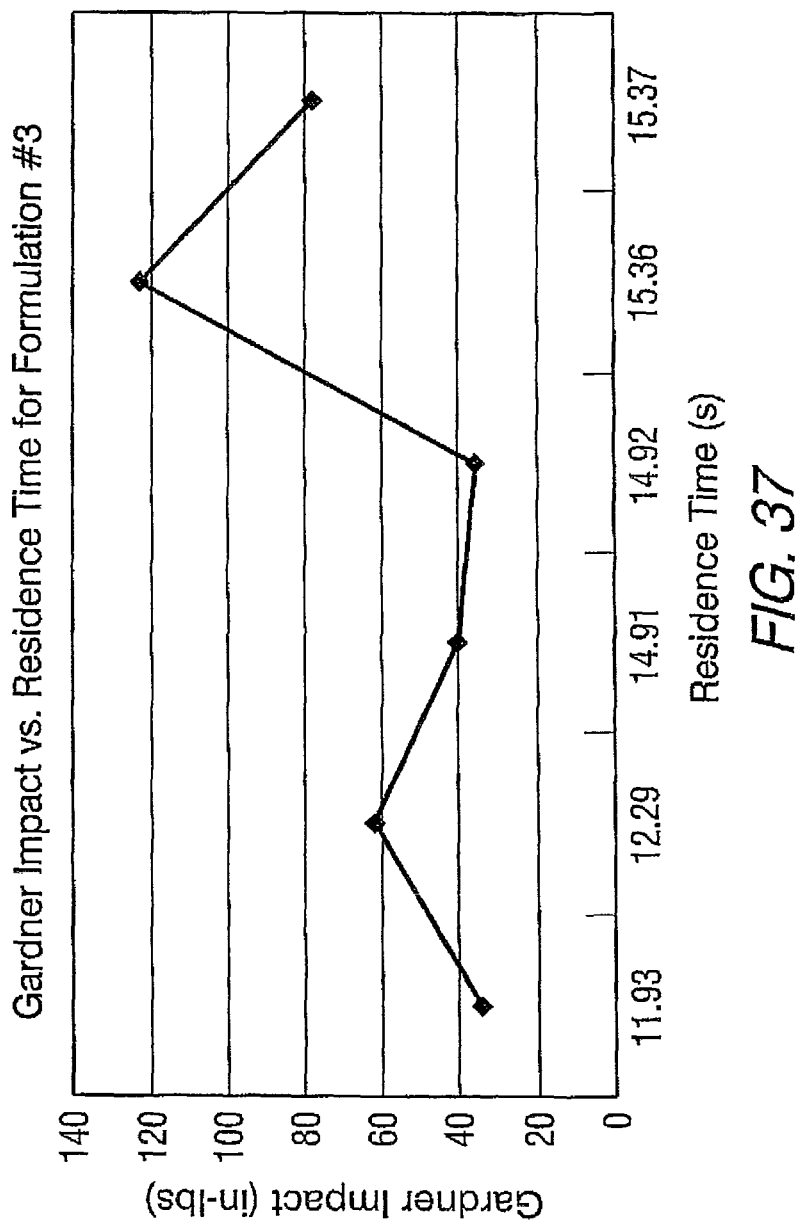
FIG. 37 is a graph of Gardner Impact strength as a function of residence time in the mix head for selected samples according to the present invention.

Gardner Impact strength was measured in accordance with ASTM D-5420-04 for sample runs as indicated in Table 48 below and FIGS. 36 and 37 below.

Cabin Window Forming Example

Figure 38:
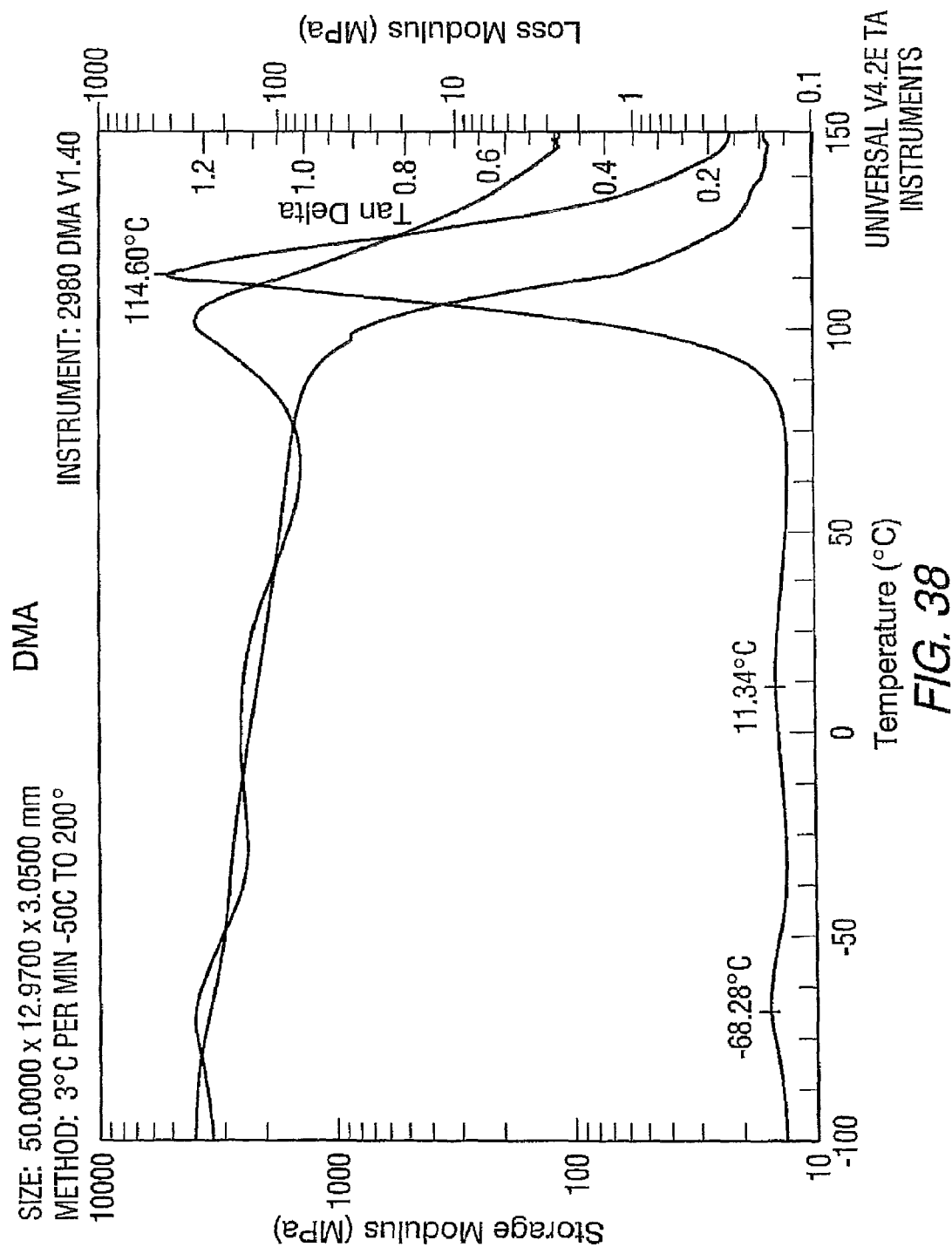
FIG. 38 is a graph of storage modulus, loss modulus and tan Delta as a function of temperature measured using DMA for a casting of a polyurethane prepared according to Example L3, Trial #4, Sample 11, according to the present invention.

A (27"×34"×0.42") billet of Sample 11 of Trial #4, (Formulation 3) was prepared for forming to a simple curvature by bonding a urethane foam material around the periphery of the billet. The billet and peripheral urethane foam were then clamped to a female vacuum mold and heated to a temperature of about 135° C. (275° F.) until the plastic softened and sagged. Vacuum was applied until the billet part conformed to the shape of the mold. The vacuum was maintained and the part was cooled to a temperature of about 65° C. (150° F.), at which time the vacuum was discontinued and the molded billet was removed from the mold. The forming temperature range for each composition was determined by a plot of storage modulus vs. temperature derived from Dynamic Mechanical Analysis (DMA) testing. For example, see FIG. 38 for the DMA analysis of a sample of Sample 11 of Trial #4. Appropriate forming temperatures are generally near the onset of the glass transition temperature, but not at the glass transition temperature, to prevent mold markoff on the plastic molded part. The molded part can be polished, if desired.

TABLE 46

| SAMPLE | initial YI | QUV YI | Δ YI | INITIAL % T | QUV % T | Δ % T | STAB |
|---|---|---|---|---|---|---|---|
| 1 | 1.37 | 1.30 | −0.07 | 90.23 | 90.33 | 0.10 | Y |
| 18 | 1.24 | 1.47 | 0.23 | 90.06 | 90.50 | 0.44 | Y |
| 21 | 1.19 | 1.67 | 0.48 | 90.33 | 90.54 | 0.21 | Y |
| 22 | 1.35 | 1.31 | −0.04 | 90.87 | 89.64 | −1.23 | Y |
| 23 | 1.69 | 1.63 | −0.06 | 90.81 | 90.09 | −0.72 | Y |
| 24 | 1.27 | 1.50 | 0.23 | 90.23 | 90.39 | 0.16 | Y |
| 25 | 1.29 | 1.38 | 0.09 | 90.22 | 90.92 | 0.70 | Y |
| 27 | 0.91 | 1.37 | 0.46 | 90.24 | 90.61 | 0.37 | Y |
| 35 | 1.12 | 1.48 | 0.36 | 91.45 | 91.13 | −0.32 | Y |
| 37 | 1.05 | 1.51 | 0.46 | 91.40 | 91.76 | 0.36 | Y |
| 41 | 0.86 | 1.72 | 0.86 | 91.46 | 91.54 | 0.08 | Y |
| 45 | 1.02 | 1.72 | 0.70 | 91.16 | 91.55 | 0.39 | Y |
| 48 | 0.87 | 1.67 | 0.80 | 91.58 | 91.68 | 0.10 | Y |
| 51 | 1.06 | 1.50 | 0.44 | 91.45 | 90.81 | −0.64 | Y |
| 52 | 0.93 | 1.48 | 0.55 | 91.60 | 91.47 | −0.13 | Y |
| 53 | 1.09 | 1.40 | 0.31 | 91.44 | 91.38 | −0.06 | Y |
| 57 | 0.99 | 1.46 | 0.47 | 91.30 | 91.44 | 0.14 | Y |

TABLE 47

| Sample | Fischer Microhardness (N/mm2) | Young's Modulus (Kpsi) |
|---|---|---|
| 1 | 113 | 348 |
| 18 | 114 | 350 |
| 21 | 124 | 373 |
| 22 | 116 | 355 |
| 23 | 115 | 352 |
| 24 | 113 | 348 |
| 25 | 112 | 345 |
| 27 | 113 | 348 |
| 41 | 123 | 372 |
| 45 | 130 | 387 |
| 48 | 124 | 374 |
| 51 | 113 | 348 |
| 52 | 115 | 352 |
| 57 | 113 | 348 |

TABLE 48

| Formulation # | Sample # | Residence Time | Gardner Impact Strength Mean Failure Height |
|---|---|---|---|
| 2 | 27 | 7.96 | 97 |
| 2 | 18 | 9.95 | 99 |
| 2 | 25 | 11.94 | 47 |
| 2 | 52 | 12.29 | 63 |
| 2 | 24 | 13.26 | 70 |
| 2 | 23 | 14.92 | 72 |
| 2 | 1 | 15.01 | 182 |
| 2 | 48 | 15.36 | 33 |
| 2 | 22 | 17.05 | 63 |

TABLE 48-continued

| 3 | 41 | 11.93 | 34 |
|---|---|---|---|
| 3 | 57 | 12.29 | 62 |
| 3 | 35 | 14.91 | 40 |
| 3 | 21 | 14.92 | 36 |
| 3 | 51 | 15.36 | 122 |
| 352 | 45 | 15.38 | 19 |

Summary Results for Gardner Impact Testing according to ASTM D5420-04

| FORMULATION # | 2 | 2 | 3 | 2 | 2 | 2 | 2 | 2 | 3 |
|---|---|---|---|---|---|---|---|---|---|
| Sample # | 1 | 18 | 21 | 22 | 23 | 24 | 25 | 27 | 35 |
| Mean Failure Height | 182 | 99 | 36 | 63 | 72 | 70 | 47 | 97 | 40 |

TABLE 48-continued

| FORMULATION # | 3 | NEW | 2 | 3 | 2 | 3 |
|---|---|---|---|---|---|---|
| Sample # | 41 | 45 | 48 | 51 | 52 | 57 |
| Mean Failure Height | 34 | 19 | 33 | 122 | 63 | 62 |

Trial 5

For Trial 5, mixtures were prepared using the components as in Trial 1 above, except the respective mixing and casting conditions are set forth in Tables 49 and 50 below.

A 12"×12"×0.42" billet of each sample was held vertically and exposed to the flame of a propane torch for 15 seconds. Each of the samples self-extinguished after the flame was removed. The Gardner Impact strength was 100 in-lbs for a 0.125 inch thick sample and 610 in-lbs for a 0.42 inch thick sample.

Cabin Window Forming

A 27"×34"×0.42" billet of each of Samples 1-6 from Trial 5 were prepared for forming to a simple curvature by bonding a urethane foam material around the periphery of the billet. The billet and peripheral urethane foam were then clamped to a female vacuum mold and heated to a temperature of about 135° C. (275° F.) until the plastic softened and sagged. Vacuum was applied until the billet part conformed to the shape of the mold. The vacuum was maintained and the part was cooled to a temperature of about 65° C. (150° F.), at which time the vacuum was discontinued and the molded billet was removed from the mold. The forming temperature range for each composition was determined by a plot of storage modulus vs. temperature derived from Dynamic Mechanical Analysis (DMA) testing of corresponding samples. The molded part can be polished, if desired.

TABLE 49

| Sample # | Tank temperatures ° C. | | | temp mix head (° C.) | Formulation |
|---|---|---|---|---|---|
| | Prepolymer | PDO | TMP | | |
| 1 | 121 | 110 | 110 | 121 | 2 |
| 2 | 180 | 110 | 111 | 118 | 2 |
| 3 | 121 | 110 | 110 | 121 | 3 |
| 4 | 121 | 110 | 110 | 121 | 3 |
| 5 | 121 | 110 | 110 | 121 | 81 |
| 6 | 124 | 108 | 114 | 116 | 81 |

TABLE 50

| Sample # | Formulation | Flow Rates (g/min) | | | | | mix head volume (cc) | residence time (s) | Cure Temp. (° C.) | Cure Time (hrs) |
|---|---|---|---|---|---|---|---|---|---|---|
| | | Prepolymer | Prepolymer + Stabilizer | PDO | TMP | Total g/min | | | | |
| 1 | 2 | 1000 | 1030.3 | 141.72 | 91.32 | 1233.04 | 140 | 6.81 | 110/160 | 4.38/15.17 |
| 2 | 2 | 1000 | 1030.3 | 141.72 | 91.32 | 1233.04 | 140 | 6.81 | 110/160 | 3.80/17.0 |
| 3 | 3 | 1000 | 1030.3 | 26.87 | 181.26 | 1208.13 | 140 | 6.95 | 110/160 | 1.90/18.37 |
| 4 | 3 | 1000 | 1030.3 | 35.43 | 182.63 | 1218.06 | 140 | 6.90 | 110/160 | 2.53/17.0 |
| 5 | 81 | 1000 | 1030.3 | 62.03 | 151.05 | 1213.06 | 140 | 6.92 | 110/160 | 1.65/18.37 |
| 6 | 81 | 1000 | 1030.3 | 70.86 | 152.19 | 1223.05 | 140 | 6.87 | 110/160 | 2.02/16.17 |

Trial 6

An isocyanate functional urethane prepolymer was prepared by reacting 0.35 equivalents of 1,5-pentanediol, 1.0 equivalent of DESMODUR W 4,4'-methylene-bis-(cyclohexyl isocyanate) and 5 ppm dibutyltin diacetate as reactants as per Trial 1 above.

Subsequently, the isocyanate functional urethane prepolymer was reacted with 0.05 equivalents of 1,5-pentanediol and 0.6 equivalents of trimethylolpropane (Formulation 3), and the indicated weight percentage of IRGANOX® 1076 octadecyl-3-(3,5-di-tert.butyl-4-hydroxyphenyl)-propionate available from Ciba, HOSTAVIN® VSU N-(2-ethoxyphenyl)-N'-(4-ethylphenyl)-ethylene diamide UV absorber available from Clariant Corp., and LOWILITE® 92 mixture of bis(1,2,2,6,6-pentamethyl-4-piperidinyl) sebacate and methyl(1,2,2,6,6-pentamethyl-4-piperidinyl) sebacate available from Chemtura was added, as shown in Tables 51 and 52 below. Each of the reactants was heated to the temperature of about 125-130° C. prior to mixing. The flow rate of each reactant and temperature at the mix head is specified below. The mixing speed was 13,000 rpm.

A cabin window can be prepared from this polymer composition according to the method set forth in detail below.

TABLE 51

| Formulation # | Run # | Thickness of sample | dye | Weight percent of additive | | |
|---|---|---|---|---|---|---|
| | | | | HOSTAVIN VSU | LOWILITE L 92 | IRGANOX 1076 |
| 3 | 1 | 0.125 | 3 ppm | 2.44 | 0.75 | 0.50 |
| 3 | 2 | 0.125 | 3 ppm | 2.44 | 0.75 | 0.50 |
| 3 | 3 | 0.125 | 3 ppm | 2.44 | 0.75 | 0.50 |
| 3 | 4 | 0.42 | 3 ppm | 2.44 | 0.75 | 0.50 |
| 3 | 5 | 0.42 | 3 ppm | 2.44 | 0.75 | 0.50 |
| 3 | 6 | 0.42 | 3 ppm | 2.44 | 0.75 | 0.50 |
| 3 | 7 | 0.42 | 3 ppm | 2.44 | 0.75 | 0.50 |
| 3 | 8 | 0.42 | 3 ppm | 2.44 | 0.75 | 0.50 |
| 3 | 9 | 0.42 | 3 ppm | 2.44 | 0.75 | 0.50 |
| 3 | 10 | 0.42 | 3 ppm | 2.44 | 0.75 | 0.50 |
| 3 | 11 | 0.42 | 3 ppm | 2.44 | 0.75 | 0.50 |
| 3 | 12 | 1 | 3 ppm | 2.44 | 0.75 | 0.50 |
| 3 | 13 | 1 | 3 ppm | 2.44 | 0.75 | 0.50 |

TABLE 52

| Flow Rates (grams) | | | Mix Head Volume | Residence | 1st Cure | Time | Second Cure Temp | Time | |
|---|---|---|---|---|---|---|---|---|---|
| Prepolymer | TMP | Total | (cc) | Time (s) | Temp (° C.) | (hrs) | (° C.) | (hrs) | Point Source light/white background-Straie |
| 1252.91 | 233.80 | 1486.71 | 250 | 0.099 | 250 | 2 | 320 | 22 | |
| 1252.91 | 233.80 | 1486.71 | 250 | 0.099 | 250 | 2 | 320 | 22 | |
| 1252.91 | 233.80 | 1486.71 | 250 | 0.099 | 250 | 2 | 320 | 22 | |
| 1252.91 | 233.80 | 1486.71 | 250 | 0.099 | 250 | 2 | 320 | 22 | straie top fill side and bottom |
| 1252.91 | 233.80 | 1486.71 | 250 | 0.099 | 250 | 2 | 320 | 22 | pre-release lines, straie an fill side ⅓ and bottom |
| 1252.91 | 233.80 | 1486.71 | 250 | 0.099 | 250 | 2 | 320 | 22 | straie around edges, large swirls |
| 1252.91 | 233.80 | 1486.71 | 250 | 0.099 | 250 | 2 | 320 | 22 | very little straie on fill an bottom |
| 1252.91 | 233.80 | 1486.71 | 250 | 0.099 | 250 | 2 | 320 | 22 | very little straie around edges |
| 1252.91 | 233.80 | 1486.71 | 250 | 0.099 | 250 | 2 | 320 | 22 | light straie around edges and top middle |
| 1252.91 | 233.80 | 1486.71 | 250 | 0.099 | 250 | 2 | 320 | 22 | little bit of straie around sides and bottom, scratch in view area |
| 1252.91 | 233.80 | 1486.71 | 250 | 0.099 | 250 | 2 | 320 | 22 | light straie fill side and bottom |
| 1252.91 | 233.80 | 1486.71 | 250 | 0.099 | 250 | 2 | 320 | 22 | straie heavy all through |
| 1252.91 | 233.80 | 1486.71 | 250 | 0.099 | 250 | 2 | 320 | 22 | straie heavy all through |

Deflection and K-Factor Testing

Selected samples were evaluated for K-Factor crack propagation resistance and creep or deflection. K-Factor crack propagation resistance was measured according to U.S. Dept. of Defense MIL-PRF-25690B (Jan. 29, 1993). The K-Factor crack propagation resistance for stretched acrylic cabin windows is generally about 2400 lbs/in$^{3/2}$. In some non-limiting embodiments, the K-Factor crack propagation resistance of cabin windows prepared according to the present invention is at least 2000 lbs/in$^{3/2}$.

A flexural test was developed to simulate the creep phenomenon under 3,294 psig (300 times the service pressure at 3,500 feet altitude) for 3 hrs. Each test specimen was 6" by ½" by ⅛" (15.2 cm×1.3 cm×0.3 cm). The deflection tests were done using a Zwick ProLine testing machine. A flexural pressure of 3,294 psig (22.7 MPa) was applied on the specimen for three hours. The maximum deflection of each specimen was measured. The results are shown in FIG. 39.

Figure 39:
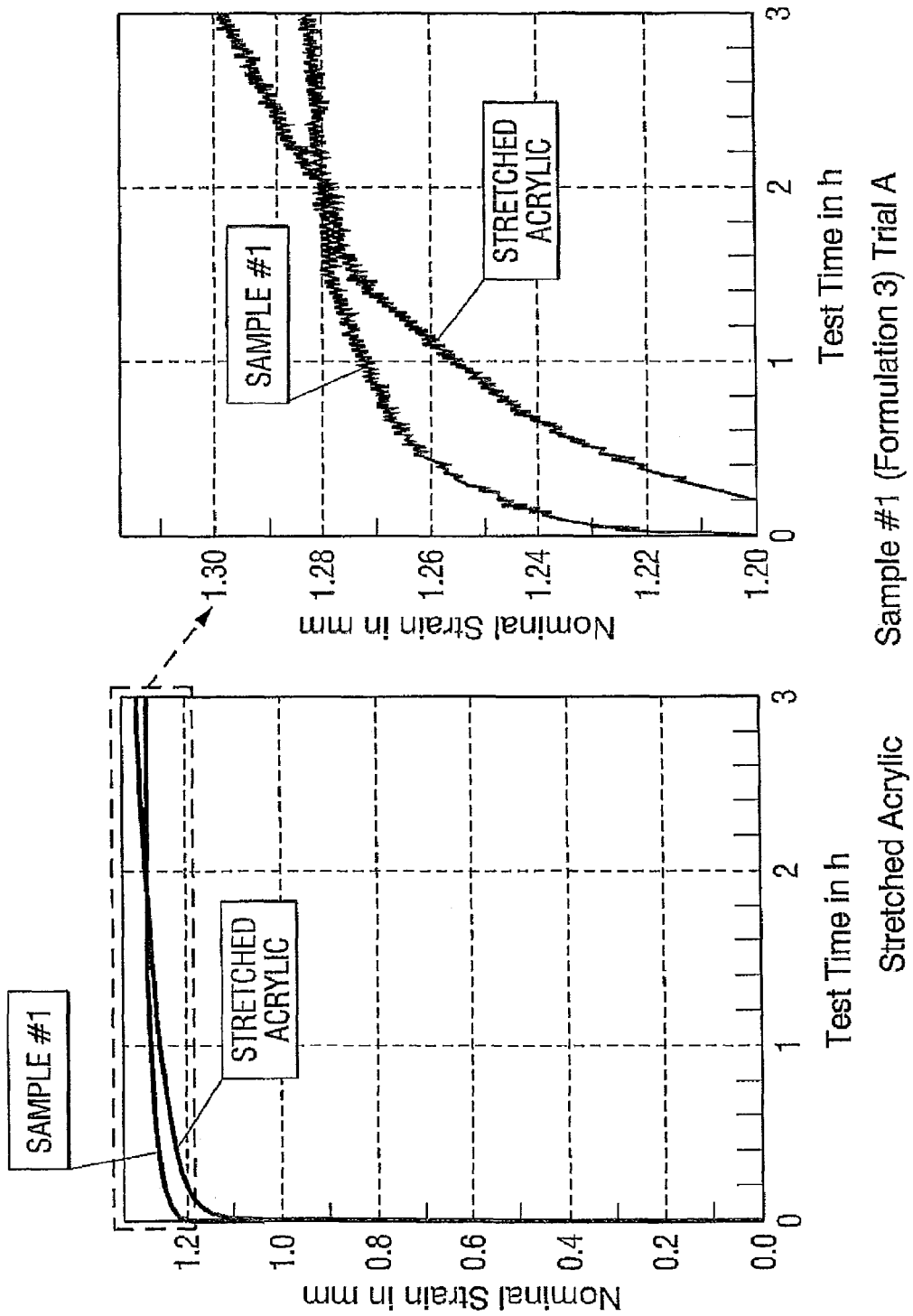
FIG. 39 is a graph of nominal strain in mm as a function of test time for samples of conventional stretched acrylic and a sample #1 (Formulation 3) Trial A according to the present invention.

FIG. 39 is a graph of nominal strain in mm as a function of test time for samples of conventional stretched acrylic and a sample according to the present invention. FIG. 39 shows the deflection of Sample #1 (Formulation 3), Trial A (preparation described below) compared to stretched acrylic. This had a tensile modulus around 60% of that of a control sample of stretched acrylic. As shown in FIG. 39, even though the sample of Formulation 3 deflected more at the beginning, its deflection rate with time was much slower so it deflected less than stretched acrylic after around 2 hrs.

Sample #1, Trial A (Formulation 3) was prepared from the same components in the same manner as in Trial #1 of Example L3 discussed above, as follows:

| Formulation | 3 |
|---|---|
| Tank temperature (° C.) - prepolymer | 180 |
| Tank temperature (° C.) - PDO | 110 |
| Tank temperature (° C.) - TMP | 111 |
| Temp. mix head | 118 |
| Flow rate (g/min) - Prepolymer | 1000 |
| Flow rate (g/min) - Prepolymer + Stabilizer | 1030.3 |
| Flow rate (g/min) - TMP | 182.63 |
| Flow rate (g/min) - PDO | 35.43 |
| Flow rate (g/min) - Total | 1218.06 |
| Residence Time (sec) | 6.90 |
| Cure - Temp. (° C.) | 110/160 |
| Cure - Time (hrs) | 3/17 |

Sample #2, Trial A of (Formulation 81) (discussed below) was prepared from the same components in the same manner as in Trial #1 of Example L3 discussed above, as follows:

| Formulation | 81 |
|---|---|
| Tank temperature (° C.) - prepolymer | 180 |
| Tank temperature (° C.) - PDO | 110 |
| Tank temperature (° C.) - TMP | 111 |
| Temp. mix head | 118 |
| Flow rate (g/min) - Prepolymer | 1000 |
| Flow rate (g/min) - Prepolymer + Stabilizer | 1030.3 |
| Flow rate (g/min) - TMP | 152.19 |
| Flow rate (g/min) - PDO | 70.86 |
| Flow rate (g/min) - Total | 1223.05 |
| Residence Time (sec) | 6.87 |
| Cure - Temp. (° C.) | 110/160 |
| Cure - Time (hrs) | 3/17 |

Sample #1, Trial B of (Formulation 2) (discussed below) was prepared as follows:

An isocyanate functional urethane prepolymer was prepared by reacting 0.3 equivalents of 1,5-pentanediol and 1.0 equivalent of DESMODUR W 4,4'-methylene-bis-(cyclohexyl isocyanate) in a glass reaction kettle under vacuum and nitrogen blanket. The prepolymer components were preheated to a temperature of 110° C., liquefied and degassed in a vacuum oven before mixing. The glass reaction kettle was preheated to a temperature of between 60° C.-80° C. before the addition of the prepolymer components. The reaction temperature was maintained at 120° C. for 15 minutes. Next, 0.4 equivalents of 1,5-pentanediol and 0.3 equivalents of trimethylolpropane were added. The 0.4 equivalents of 1,5-pentanediol and 0.3 equivalents of trimethylolpropane were preheated to a temperature of 80° C., liquefied and degassed in a vacuum oven before their addition to the mixture. The kettle was placed into a preheated heating mantle for about 15 minutes up to a temperature of approximately 120° C. while the formulation was stirred and outgassed under a vacuum pressure of −28 mmHg. Next, the mixture was cast between release coated 1"×15"×15" (2.5 cm×38.1 cm×38.1 cm) casting cell glass molds with a resin volume of 3600 grams which had been preheated to a temperature of approximately 120° C. The mixture was cured for 2 hours at approximately 120° C., followed by 22 hours at 160° C. The mold was removed from the oven and the plastic released.

Figure 40:
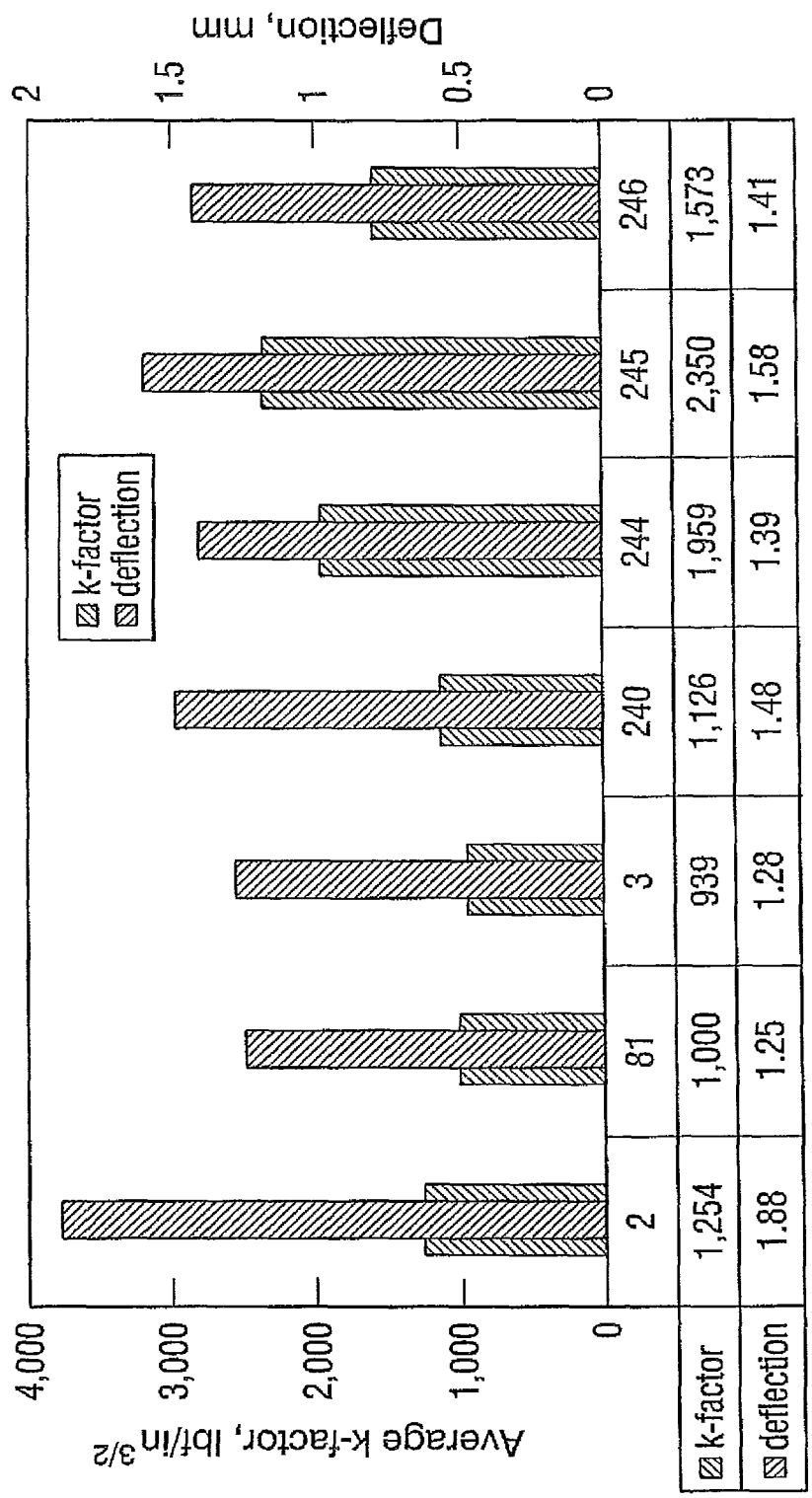
FIG. 40 is a bar chart of average K-factor in $lb/in^{3/2}$ and deflection in mm for selected samples according to the present invention.

Four formulations (240, 244, 245 and 246 from Example L2 above) were designed for cabin windows to meet deflection under pressure and K-factor crack propagation resistance, as well as good solvent/abrasion resistance, good flame retardation and low creep. K-Factor and deflection properties for these formulations together with Sample #1 of Trial A (Formulation 3), Sample #2 of Trial A (Formulation 81) and Sample #1 of Trial B (Formulation 2) (discussed below) were evaluated. The deflection tests were conducted as discussed above, and then the final deflection values were compared. The final deflection values of all four new formulations were less than that of Sample #1 of Trial B (Formulation 2), which had met the specification of deflection under pressure. Particularly, Sample L of Example L2 reached an average k-factor of 2,350 $lb/in^{3/2}$. FIG. 40 is a bar chart of average K-factor in $lb/in^{3/2}$ and deflection in mm for selected samples of Samples A, B, C, J, K L and M, respectively, of Example L2 above.

Examples M

Example M1

An isocyanate functional prepolymer (NCO/OH ratio of 3.8) having an equivalent weight of 327 grams/mole was prepared by reacting the following components:

| Component | Weight % | Equivalent. Wt. | Number of equivalents |
|---|---|---|---|
| DESMODUR W 4,4'-methylene-bis-(cyclohexyl isocyanate) | 54.42 | 131.2 | 0.42 |
| DBT FASTCAT 4202 (dibutyl tin dilaurate) | 0.005 | | |
| PLURACOL E400NF (polyethylene glycol) | 5.095 | 200 | 0.03 |
| PLURONIC L62D (ethylene oxide/propylene oxide block copolymer) | 33.97 | 1180 | 0.03 |
| TRIMETHYLOLPROPANE | 2.32 | 45 | 0.05 |
| CAPA 2077A polycaprolactone polyol | 1.23 | 375 | 0.003 |
| IRGANOX 1010 | 0.49 | | |
| CYASORB UV 5411 | 0.97 | | |
| TINUVIN 328 | 1.46 | | |
| IRGANOX MD 1024 | 0.05 | | |
| Total | 100.000000 | | | at a temperature of about 104° C. for about 5 hours. All of the components were mixed together, except the stabilizers which were dissolved after the prepolymer was reacted.

About 9 grams of acrylamide was dissolved in about 45 grams of 1,4-butanediol at a temperature of about 25° C. and mixed with about 365 grams of the above prepolymer and about 0.1 weight percent of azobisisobutyronitrile (AIBN) based on total solids. The mixture was cast into a glass mold and heated in an oven at a temperature of about 80° C. for about 48 hours with constant stirring. A clear polymerizate was formed. A sample of the cured polymer was evaluated for light transmittance and Gardner Impact Strength. The light transmittance of the sample was 91% and the Gardner Impact Strength was 150 in-lbs (17 J).

Example M2

A polyurethane polymer according to the present invention was prepared from the above isocyanate functional prepolymer, cyclohexanedimethanol (CHDM) and 1,4-butanediol as listed below:

| Monomer Name | Solids | | | Polymer Wt. (g) | Desired Batch Size (g) |
|---|---|---|---|---|---|
| | Prepolymer | CHDM | 1,4-butanediol | 417.53 | 200.00 |
| OH # | — | — | — | | |
| Acid # | — | — | — | | |
| Equivalent Wt. | 365.71 | 72.11 | 45.06 | | |
| Equivalents desired | 1.00 | 0.25 | 0.75 | | |
| Mass Monomer | 365.71 | 18.03 | 33.80 | | |
| Weight % Monomer | 87.59% | 4.32% | 8.09% | | |
| Monomer masses for experiment | 175.18 | 8.64 | 16.19 | | |

The prepolymer, CHDM (preheated to 80° C.) and 1,4-butanediol were added to a glass kettle. Under nitrogen blanket and with constant stirring, the mixture was heated to ~40° C. and allowed to compatibilize. Once clear, the mixture was degassed, and cast into a 6"×6"×0.25" (15 cm×15 cm×0.6 cm) casting cell and aluminum cups preheated to 80° C. The filled cell was cured for 24 hours at 121° C.

An article of 6"×6"×1" thickness (15 cm×15 cm×2.5 cm) prepared from this polymer stopped a 9 mm, 125 grain, bullet shot at an initial velocity 1350 ft/sec (411 m/sec) from 20 feet (6.1 m) distance with little surface damage. The same sample also withstood a .40 caliber shot with little surface damage. The bullets did not ricochet or embed in the polymer. The bullets were laying partly deformed at the bottom of the sample.

Example M3

A polyurethane polymer according to the present invention was prepared from the above isocyanate functional prepolymer, cyclohexanedimethanol (CHDM) and 1,4-butanediol as listed below:

| Monomer Name | Solids | | | Polymer Wt. (g) | Desired Batch Size (g) |
|---|---|---|---|---|---|
| | Prepolymer | CHDM | 1,4-butanediol | 424.30 | 200.00 |
| OH # | — | — | — | | |
| Acid # | — | — | — | | |
| Equivalent Wt. | 365.71 | 72.11 | 45.06 | | |
| Equivalents desired | 1.00 | 0.50 | 0.50 | | |
| Mass Monomer | 365.71 | 36.06 | 22.53 | | |
| Weight % Monomer | 86.19% | 8.50% | 5.31% | | |
| Monomer masses for experiment | 172.38 | 17.00 | 10.62 | | |

The prepolymer, CHDM (preheated to 80° C.) and 1,4-butanediol were added to a glass kettle. Under nitrogen blanket and with constant stirring, the mixture was heated to ~40° C. and allowed to compatibilize. Once clear, the mixture was degassed, and cast into a 6"×6"×0.25" (15 cm×15 cm×0.6 cm) casting cell and aluminum cups preheated to 80° C. The filled cell was cured for 24 hours at 121° C.

Example M4

A polyurethane polymer according to the present invention was prepared from the above isocyanate functional prepolymer and hydroquinone bis(hydroxyethyl)ether as listed below:

| Monomer Name | Prepolymer | Solids | Hydroquinone bis(hydroxyethyl) ether | Polymer Wt. (g) | Desired Batch Size (g) |
|---|---|---|---|---|---|
| OH # | — | | — | | |
| Acid # | — | | — | | |
| Equivalent Wt. | 384.29 | | 99.11 | | |
| Equivalents desired | 1.00 | | 1.00 | | |
| Mass Monomer | 384.29 | | 99.11 | | |
| Weight % Monomer | 79.50% | | 20.50% | | |
| Monomer masses for experiment | 198.74 | | 51.26 | 483.40 | 250.00 |

The prepolymer and hydroquinone bis(hydroxyethyl)ether were added to a glass kettle and placed in a heating mantle. Under nitrogen blanket and with constant stirring, the mixture was heated to ~85° C. and allowed to compatibilize. Once clear, the mixture was placed under vacuum and degassed, and cast into a 6"×6"×0.25" (15 cm×15 cm×0.6 cm) casting cell preheated to 80° C. The filled cell was cured for 24 hours at 121° C. The cast sample was clear, but showed some haze. The Gardner Impact Strength was 320 in-lbs (37 J).

Example N

An isocyanate functional prepolymer was prepared by reacting the following components:

| Component | Weight % | Equivalent. Wt. | Number of equivalents |
|---|---|---|---|
| DESMODUR W 4,4'-methylene-bis-(cyclohexyl isocyanate) | 54.42 | 131.2 | 0.42 |
| DBT FASTCAT 4202 (dibutyl tin dilaurate) | 0.005 | | |
| PLURACOL E400NF (polyethylene glycol) | 5.095 | 200 | 0.03 |
| PLURONIC L62D (ethylene oxide/propylene oxide block copolymer) | 33.97 | 1180 | 0.03 |
| TRIMETHYLOLPROPANE | 2.32 | 45 | 0.05 |
| CAPA 2077A polycaprolactone polyol | 1.23 | 375 | 0.003 |
| Total | 100.000000 | | | at a temperature of about 104° C. for about 5 hours. All of the components were mixed together, except the stabilizers which were dissolved after the prepolymer was reacted.

A polyurethane polymer according to the present invention was prepared from the above prepolymer and 1,4-butanediol as listed below:

| Monomer Name | Prepolymer | Solids | 1,4-butanediol | Polymer Wt. (g) | Desired Batch Size (g) |
|---|---|---|---|---|---|
| OH # | — | | — | | |
| Acid # | — | | — | | |
| Equivalent Wt. | 330.32 | | 45.06 | | |
| Equivalents desired | 1.00 | | 1.00 | | |
| Mass Monomer | 330.32 | | 45.06 | | |
| Weight % Monomer | 88.00% | | 12.00% | | |
| Monomer masses for experiment | 88.00 | | 12.00 | 375.38 | 100.00 |

The prepolymer and 1,4-butanediol were added to a glass kettle. Under nitrogen blanket and with constant stirring, the mixture was heated to ~45° C. and allowed to compatibilize. Once clear, the mixture was degassed, and cast into a 4"×4"×60 mil casting cell preheated to 80° C. The filled cell was cured for 24 hours at 121° C.

An article of 6"×6"×1" (15 cm×15 cm×2.5 cm) prepared from this polymer stopped a 9 mm, 125 grain, bullet shot at an initial velocity of 1350 ft/sec (411 m/sec) from 20 feet (6.1 m) distance with little surface damage. The same sample also withstood a .40 caliber shot with little surface damage.

Examples O

Example O1

An isocyanate functional prepolymer was prepared by reacting the following components:

| | Prepolymer Formulation | | | | | | |
|---|---|---|---|---|---|---|---|
| Component | Equivalent weight | Equivalents | Wt. (g) | Weight % | Normalized Equivalents to Des W | | Normalized Wt. (g) |
| CAPA 2047 | 200.0 | 0.14 | 27.8 | 27.8% | 0.28 | | 56.68 |
| CAPA 2077 | 375.0 | 0.018 | 6.65 | 6.7% | 0.036 | | 13.56 |
| TMP | 44.6 | 0.027 | 1.2 | 1.2% | 0.055 | | 2.45 |
| OH Totals = | — | 0.18 | 35.65 | — | 0.37 | | 72.69 |
| Des W | 131.2 | 0.49 | 64.35 | 64.4% | 1.0000 | | 131.20 |
| | | | Total = | 78.5% | Prepolymer $M_w$ = | | 203.89 |
| | | | | | Prepolymer $W_{urethane}$ = | | 28.94% |
| | | | | | Prepolymer $M_c$ = | | 11150 |
| | | | | | Prepolymer $W_b$ = | | 7433 | at a temperature of about 104° C. for about 5 hours. All of the components were mixed together, except the stabilizers which were dissolved after the prepolymer was reacted.

A polyurethane polymer according to the present invention was prepared from the above prepolymer and CHDM as listed below:

|  | Solids | | Polymer Wt. (g) | Desired Batch Size (g) |
|---|---|---|---|---|
| Monomer Name | Prepolymer | CHDM | 402.98 | 800.00 |
| OH # | — | — | | |
| Acid # | — | — | | |
| Equivalent Wt. | 330.87 | 72.11 | | |
| Equivalents desired | 1.00 | 1.0000 | | |
| Mass Monomer | 330.87 | 72.11 | | |
| Weight % Monomer | 82.11% | 9.01% | | |
| Monomer masses for experiment | 656.85 | 143.15 | | |

The prepolymer and CHDM were added to a glass kettle. Under nitrogen blanket and with constant stirring, the mixture was heated to ~55° C. and allowed to compatibilize. Once clear, the mixture was degassed, and cast into a 13"×13"×0.25" casting cell preheated to 80° C. The filled cell was cured for 24 hours at 121° C.

Example O2

A polyurethane polymer according to the present invention was prepared from the above prepolymer and CHDM as listed below:

|  | Solids | | Polymer Wt. (g) | Desired Batch Size (g) |
|---|---|---|---|---|
| Monomer Name | Prepolymer | 2,2-thiodiethanol | 391.97 | 700.00 |
| OH # | — | — | | |
| Acid # | — | — | | |
| Equivalent Wt. | 330.87 | 61.10 | | |
| Equivalents desired | 1.00 | 1.0000 | | |
| Mass Monomer | 330.87 | 61.10 | | |
| Weight % Monomer | 84.41% | 15.59% | | |
| Monomer masses for experiment | 590.89 | 109.11 | | |

The prepolymer and 2,2-thiodiethanol were added to a glass kettle. Under nitrogen blanket and with constant stirring, the mixture was heated to ~55° C. and allowed to compatibilize. Once clear, the mixture was degassed, and cast into a 13"×13"×0.25" casting cell preheated to 80° C. The filled cell was cured for 24 hours at 121° C.

Example P

As a comparative example, a thermoplastic polymer was prepared using 1.0 equivalent of 1,10-decanediol and 1.0 equivalent of DESMODUR W as reactants and 10 ppm dibutyltindiacetate as catalyst. The polymer was mixed at 110° C. in a glass kettle under vacuum. After about 30 minutes at 110° C., the mixture was cast between release coated glass molds and cured for 72 hours at 290° F. (143° C.). The mold was removed from the oven and the plastic released. The Gardner Impact strength was less than 40 in-lbs (5 J) and averaged about 16 in-lbs (2 J).

A polymer according to the present invention was prepared in a similar manner using a small amount of a branched polyol, namely 0.05 equivalents of trimethylolpropane, as well as 0.95 equivalents of 1,10-decanediol, and 1.0 equivalents of DESMODUR W. The Gardner Impact strength averaged 640-in-lbs for this branched thermoplastic with a molecular weight per crosslink of about 12,900 grams/mole.

Example O

Comparative Example

For comparison, a prepolymer was prepared by reacting about 0.1 equivalents of trimethylol propane with about 1.0 equivalent of 4,4'-methylene-bis-(cyclohexyl isocyanate) (DESMODUR W) to form a polyurethane polyisocyanate dissolved in an excess (0.9 eqs.) of DESMODUR W. About 10 ppm of dibutyltindiacetate was used as a catalyst. While mixing rapidly at room temperature, about 0.1 equivalents of 4,4'-methylene-bis-cyclohexylamine, a diamine analog of DESMODUR W, was added. Immediately, a white, flaky precipitate formed. The precipitate increased in concentration sitting overnight and would not dissolve upon heating up to about 290° F. (143° C.). The above example was repeated in the same order as above, but the polyisocyanate was heated to about 40° C. While mixing rapidly, the diamine was added and a similar white precipitate formed which could not be dissolved upon heating up to about 290° F. (143° C.).

According to the present invention, the same polyisocyanate above was heated to about 40° C. About 0.1 equivalents of water was added while mixing rapidly. Vacuum was applied (4 mm Hg) to remove the carbon dioxide and a polyurea formed within the polyurethane to form a polyurethane polyurea polyisocyanate that was slightly hazy. The diamine analog of DESMODUR W was formed in situ when the water was reacted. This mixture was then reacted with 0.8 equivalents of trimethylolpropane to form a high modulus plastic with high optical clarity. The light transmittance of a ⅛" thick (0.3 cm) sample was 91.8% with less than 0.1% haze. The glass transition temperature was 175° C.

According to the present invention, the same polyisocyanate was reacted with 0.2 equivalents of water at about 40° C. and the carbon dioxide removed via vacuum. The diamine analog of DESMODUR W was formed in situ when the water was reacted. About 0.5 equivalents of pentanediol and about 0.2 equivalents of trimethylolpropane were reacted with the polyurethane polyurea polyisocyanate to form a high clarity optical plastic with a light transmittance of 91.74% for a ⅛" thick (0.3 cm) sample and a glass transition temperature of about 137° C.

Examples R

Example R1

In a glass kettle under nitrogen blanket with stirring, were charged 8.26 weight % 3,6-dithia-1,2-octanediol (91.6 equivalent wt.); 29.47 weight % bis(4-(-hydroxyethoxy)-3,5-dibromophenyl) sulfone (326.985 equivalent wt.); 6.50 weight % 1,4-cyclohexanedimethanol (CHDM) (72.1 equivalent wt.); 5.10 weight % trimethylolpropane (TMP) (44 equivalent wt.); and 50.68 weight % 4,4'-methylenebis (cyclohexyl isocyanate) (DESMODUR W) (131.2 equivalent wt.) preheated to a temperature of 80° C. The mixture was then heated to a temperature of 115° C.

The mixture was then degassed and cast into a 12"×13"× 0.125" (30 cm×33 cm×0.3 cm) casting cell which had been preheated to a temperature of 121° C. The filled cell was then cured in an oven for a period of 48 hours at 121° C.

The refractive index of the resulting lens was measured as $n_D=1.5519$.

Example R2

In a glass kettle under nitrogen blanket with stirring, were charged 30.75 weight % 3,6-dithia-1,2-octanediol (91.6 equivalent wt.); 6.23 weight % TMP (44.0 equivalent wt.) and 62.92 weight % DESMODUR W (131.2 equivalent wt.) which was preheated to a temperature of 80° C. The mixture was heated to a temperature of 105° C.

The mixture was then degassed and cast into a 12"×13"×0.125" (30 cm×33 cm×0.3 cm) casting cell which had been preheated to a temperature of 121° C. The filled cell was then cured in an oven for a period of 48 hours at 121° C.

The refractive index of the resulting lens was measured as $n_D=1.5448$ and the impact as 82.0 in-lbs (9 J).

Example R3

In a glass kettle under nitrogen blanket with stirring, were charged 9.70 weight % 1,5-pentanediol (52.1 equivalent wt.); 7.03 weight % TMP (44.0 equivalent wt.); 13.43 weight % CHDM (72.1 equivalent wt.) and 69.84% DESMODUR W (131.2 equivalent wt.) which was preheated to a temperature of 80° C. The mixture was heated to a temperature of 105° C.

The mixture was then degassed and cast into a 12"×13"×0.125" (30 cm×33 cm×0.3 cm) casting cell which had been preheated to a temperature of 121° C. The filled cell was then cured in an oven for a period of 48 hours at 121° C.

The impact was measured as 160.0 in-lbs (18 J).

Example R4

This example was conducted in accordance with the procedure in Example 3 with the exception that 1,4-butanediol (45.1 equivalent wt.) was used instead of 1,5 pentanediol and CHDM was not present in the mixture. 17.28% 1,4 butanediol, 7.23% trimethylolpropane, and 75.48% DESMODUR W.

The impact was measured as 120.0 in-lbs (14 J).

Example R5

This example was conducted in accordance with the procedure in Example 4 with the exception that 1,4-benzenedimethanol (69.1 equivalent wt.) was used instead of 1,4-butanediol. 25.09 weight % 1,4 benzenedimethanol, 6.85 weight % trimethylolpropane, and 74.57 weight % DESMODUR W.

The impact was measured as 72.0 in-lbs (8 J). It was observed that after fifteen minutes into the cure cycle, the material turned hazy. Thus, the oven temperature had been increased to 143° C. for the remainder of the cure cycle, but the material remained hazy.

Example R6

This example was conducted in accordance with the procedure in Example 5 with the exceptions that 1,4-butanediol (45.1 equivalent weight) was also added to the mixture and the mixture was heated to a temperature of 115° C. instead of 105° C. 13.12 weight % 1,4 benzenedimethanol, 8.55 weight % 1,4 butanediol, and 71.17 weight % DESMODUR W.

The impact was measured as 72.0 in-lbs (8 J).

Example R7

This example was conducted in accordance with the procedure in Example 6 with the exception that 1,6-hexanediol (59.1 equivalent wt.) was used instead of 1,4-butanediol. 12.76 weight % 1,4 benzenedimethanol, 10.93 weight % 1,6 hexanediol, and 69.32 weight % DESMODUR W.

The impact was measured as 64.0 in-lbs (7 J).

Example R8

This example was conducted in accordance with the procedure in Example 7 with the exceptions that thiodiethanol (61.1 equivalent wt.) was used instead of 1,4-benzenedimethanol and the mixture was heated to a temperature of 105° C. instead of 115° C. 11.78 weight % 2,2-thiodiethanol, 8.69 weight % 1,4 butanediol, 7.27 weight % trimethylolpropane, and 70.10 weight % DESMODUR W.

The impact was measured as 72.0 in-lbs (8 J).

Example R9

This example was conducted in accordance with the procedure in Example 3 with the exceptions that CHDM was not present in the mixture and the mixture was heated to a temperature of 115° C. instead of 105° C. 20.16 weight % 1,5 pentanediol, 7.3 weight % trimethylolpropane, and 72.55 weight % DESMODUR W.

The impact was measured as 200.0 in-lbs (23 J).

Example R10

This example was conducted in accordance with the procedure in Example 9 with the exception that 1,8-octanediol (73.1 equivalent wt.) was used instead of 1,5-pentanediol. 26.14 weight % 1,8 octanediol, 6.75 weight % trimethylol propane, and 67.11 weight % DESMODUR W.

The impact was measured as 624.0 in-lbs (72 J).

Example R11

This example was conducted in accordance with the procedure in Example 10 with the exception that 1,10-decanediol (87.1 equivalent wt.) was used instead of 1,8-octanediol. 29.66 weight % 1,10 decanediol, 6.43 weight % trimethylolpropane, and 63.9 weight % DESMODUR W.

The impact was measured as 624.0 in-lbs (72 J).

Example R12

This example was conducted in accordance with the procedure in Example 11 with the exceptions that ethyleneglycol (31.0 equivalent wt.) was used instead of 1,10-decanediol and the mixture was heated to a temperature of 105° C. instead of 115° C. 13.06 weight % ethylene glycol, 7.95 weight % trimethylolpropane, and 78.99 weight % DESMODUR W The impact was measured as 8.0 in-lbs (1 J).

Example R13

This example was conducted in accordance with the procedure in Example 11 with the exception that 1,12- dodecanediol was used instead of 1,10-decanediol. 32.87 weight % 1,12 dodecanediol, 6.14 weight % trimethylolpropane, and 60.99 weight % DESMODUR W.

The impact was measured as 624.0 in-lbs (72 J).

Example R14

This example was conducted in accordance with the procedure in Example 13 with the exceptions that 1,6-hexanediol (59.1 equivalent wt.) was used instead of 1,12-dodecanediol and the mixture was heated to a temperature of 105° C. instead of 115° C. 22.24 weight % 1,6 hexanediol, 7.11 weight % trimethylolpropane, and 70.65 weight % DESMODUR W.

The impact was measured as 144 in-lbs (17 J).

Example R15

This example was conducted in accordance with the procedure in Example 9. The impact was measured as 80.0 in-lbs (9 J).

Example R16

This example was conducted in accordance with the procedure in Example 11 with the exceptions that 101.2 equivalent wt of 1,10-decanediol was used; and KM-1733 (a 1000 MW carbonate diol made from hexanediol and diethylcarbonate, and commercially available from ICI) (428 equivalent wt.) was added to the mixture. 28.29% 1,10 decanediol, 9.48 weight % PC-1733, 5.69 weight % trimethylolpropane, and 56.54 weight % DESMODUR W.

The impact was measured as 640.0 in-lbs (74 J).

Example R17

Formulations 1 through 11 were prepared in accordance with the procedure of Example 3 with the exception that the components listed in Table 21 were used to prepare the reaction mixture. The resultant properties (including tensile strength at yield, % elongation at yield, tensile strength at break, % elongation at break, and Young's Modulus were measured in accordance with ASTM-D 638-03; Gardner Impact was measured in accordance with ASTM-D 5420-04; Tg was measured using Dynamic Mechanical Analysis; and Density was measured in accordance with ASTM-D 792) of formulations 1 through 11 as are shown in Tables 27-29.

TABLE 27

| Formulation # | Component | Equivalent Wt. (g/Eq.) | Equivalents | Weight | Weight % | Wu (%) | Wc (%) | Mc (g/mole) |
|---|---|---|---|---|---|---|---|---|
| 1 | TMP | 44.7 | 0.3 | 13.40 | 6.5 | 28.7 | 39.4 | 2055 |
|   | 1,10 dodecanediol | 87.1 | 0.7 | 60.97 | 29.7 |  |  |  |
|   | DESMODUR W | 131.0 | 1.0 | 131.0 | 63.8 |  |  |  |
| 2 | TMP | 44.7 | 0.3 | 13.40 | 6.7 | 29.4 | 40.4 | 2006 |
|   | 1,10 dodecanediol | 87.1 | 0.35 | 30.48 | 15.2 |  |  |  |
|   | 1,8 octanediol | 73.1 | 0.35 | 25.58 | 12.7 |  |  |  |
|   | DESMODUR W | 131.0 | 1.0 | 131.0 | 65.4 |  |  |  |
| 3 | TMP | 44.7 | 0.3 | 13.40 | 7.61 | 33.5 | 46.04 | 1759 |
|   | 1,4 butanediol | 45.0 | 0.7 | 31.5 | 17.9 |  |  |  |
|   | DESMODUR W | 131.0 | 1.0 | 131.0 | 74.49 |  |  |  |
| 4 | TMP | 44.7 | 0.3 | 13.40 | 7.40 | 32.6 | 44.8 | 1808 |
|   | 1,5 pentanediol | 52.0 | 0.7 | 36.4 | 20.13 |  |  |  |
|   | DESMODUR W | 131.0 | 1.0 | 131.0 | 72.47 |  |  |  |
| 5 | TMP | 44.7 | 0.6 | 26.82 | 11.64 | 33.0 | 45.81 | 1786 |
|   | 1,5 pentanediol | 52.0 | 0.4 | 20.8 | 15.06 |  |  |  |
|   | DESMODUR W | 131.0 | 1.0 | 131.0 | 73.3 |  |  |  |
| 6 | TMP | 44.7 | 0.3 | 13.40 | 7.20 | 31.77 | 43.62 | 1857 |
|   | 1,6 hexanediol | 59.0 | 0.7 | 41.3 | 22.26 |  |  |  |
|   | DESMODUR W | 131.0 | 1.0 | 131.0 | 70.54 |  |  |  |
| 7 | TMP | 44.7 | 0.3 | 13.40 | 6.81 | 30.44 |  | 1938 |
|   | 1,4 CHDM | 72.11 | 0.35 | 25.24 | 13.02 |  |  |  |
|   | 1,6 BDM | 69.08 | 0.35 | 24.18 | 12.48 |  |  |  |
|   | DESMODUR W | 131.0 | 1.0 | 131.0 | 131.0 |  |  |  |

TABLE 28

| Formulation # | Component | Equivalent Wt. (g/Eq.) | Equivalents | Weight | Weight % | Wu (%) | Wc (%) | Mc (g/mole) |
|---|---|---|---|---|---|---|---|---|
| 8 | TMP | 44.7 | 0.3 | 13.40 | 7.03 | 31.41 | 43.1 | 1879 |
|   | 1,4 CHDM | 72.11 | 0.35 | 25.24 | 13.43 |  |  |  |
|   | 1,5 pentanediol | 52.0 | 0.35 | 18.23 | 9.70 |  |  |  |
| 9 | TMP | 44.7 | 0.3 | 13.40 | 6.94 | 31.0 | 42.55 | 1903 |
|   | 1,4 CHDM | 72.11 | 0.35 | 25.24 | 13.26 |  |  |  |
|   | 1,6 hexanediol | 59.09 | 0.35 | 20.68 | 10.87 |  |  |  |
|   | DESMODUR W | 131.0 | 1.0 | 131.0 | 68.94 |  |  |  |
| 10 | TMP | 44.7 | 0.3 | 13.20 | 6.7 | 30.2 | 41.4 | 1956 |
|   | 1,8 octanediol | 73.1 | 0.7 | 51.17 | 26.2 |  |  |  |
|   | DESMODUR W | 131.0 | 1.0 | 1.0 | 67.1 |  |  |  |

TABLE 28-continued

| Formulation # | Component | Equivalent Wt. (g/Eq.) | Equivalents | Weight | Weight % | Wu (%) | Wc (%) | Mc (g/mole) |
|---|---|---|---|---|---|---|---|---|
| 11 | TMP | 44.7 | 0.3 | 13.40 | 6.33 | 28.29 | 38.84 | 2085 |
|  | 3,6-dithia-1,2 octanediol | 91.6 | 0.7 | 64.12 | 30.75 |  |  |  |
|  | DESMODUR W | 131.0 | 1.0 | 131.0 | 62.92 |  |  |  |

Note:
Formula 11 has a refractive index of 1.55 and a Gardner Impact strength of 65 in-lbs.

TABLE 29

| Formula | Tensile Strength At Yield (psi) | % Elongation At Yield (psi) | Tensile Strength At Break (psi) | % Elongation At Break (psi) | YounG's Modulus (psi) | Gardner Impact In-lbs | Tg | Density g/cc |
|---|---|---|---|---|---|---|---|---|
| 1 | 9190 | 7.4 | 6710 | 57 | 268,000 | 600 | 99.1 | 1.091 |
| 2 | 9530 | 7.5 | 7030 | 65 | 282,000 | 592 | 102 | 1.093 |
| 3 | 12,100 | 9.2 | 9040 | 41 | 336,000 | 120 | 126 | 1.14 |
| 4 | 11,200 | 8.7 | 8230 | 38 | 321,000 | 190 | 119 | 1.13 |
| 5 | 13,100 | 9.6 | 11,000 | 19 | 351,000 | 71 | 140 | 1.13 |
| 6 | 11,000 | 8.7 | 8300 | 56 | 311,000 | 130 | 117 | 1.12 |
| 7 | 13,600 | 10 | 12,100 | 18 | 360,000 | 75 | 156 | 1.13 |
| 8 | 12,100 | 9.8 | 9380 | 32 | 339,000 | 143 | 132 | 1.12 |
| 9 | 11,900 | 9.4 | 8880 | 34 | 327,000 | 124 | 130 | 1.14 |
| 10 | 9880 | 7.9 | 7480 | 55 | 287,000 | 600 | 106 | 1.10 |
| 11 | — | — | — | — | — | 65 | — | — |

Example R18

This example was conducted in accordance with the procedure in Example 12 with the exceptions that 53.0 equivalent wt. of diethylene glycol was used instead of ethylene glycol and the mixture was heated to a temperature of 115° C. instead of 105° C.

The impact was measured as 6.0 in-lbs.

Example R19

This example was conducted in accordance with the procedure in Example 18 with the exception that 67.0 equivalent wt. dipropylene glycol was used instead of diethylene glycol.

The impact was measured as 8.0 in-lbs.

After curing, a set of the sheets coated with each of the polymers A-D were abrasion tested using a standard Taber abrasion test with CS10F wheels (one pair for all samples), 500 grams each wheel. The wheels were re-surfaced before each cycle (25 cycles). Test conditions were conducted at a temperature of ranging from about 70° F. to about 75° F. and about 50% to about 60% relative humidity. Average scattered light haze for a given number of Taber cycles was determined, with the results shown below.

Standard QUV-B exposure test procedure over a period of 1000 hours, representing the equivalent of about three years of outdoor exposure. The results are shown below.

Exposed Samples—1000 hours QUV-B Exposure—3 yr. Equivalent Outdoor

| Coated with | % Haze at number of Cycles | | | | |
|---|---|---|---|---|---|
| Sample | 0 | 100 | 300 | 500 | 1000 |
| Polymer A |  |  |  |  |  |
| Polymer B |  |  |  |  |  |
| Polymer C |  |  |  |  |  |
| Polymer D |  |  |  |  |  |

Example S: Fire Retardance Testing

Example S1

A polyurethane polymer according to the present invention was prepared from the components listed below:

| | Solids | | | Polymer Wt. (g) | Desired Batch Size (g) |
|---|---|---|---|---|---|
| Monomer Name | Tetrabromobisphenol A bis(2-hydroxyethyl) ether | 1,6-hexanediol | TMP | Des W | 291.54 | 100.00 |

|  | Solids |  |  | Polymer Wt. (g) | Desired Batch Size (g) |
|---|---|---|---|---|---|
| OH # | — | — | — | — | |
| Acid # | — | — | — | — | |
| Equivalent Wt. | 315.99 | 59.09 | 44.00 | 131.2 | |
| Equivalents desired | 0.4000 | 0.5000 | 0.100 | 1.000 | |
| Mass Monomer | 126.40 | 29.55 | 4.40 | 131.20 | |
| Weight % Monomer | 43.35% | 10.13% | 1.51% | 45.00% | |
| Monomer masses for experiment | 43.35 | 10.13 | 1.51 | 45.00 | |
| Weight % Urethane | 20.24 | | | | |
| Molecular Weight per Crosslink (g/mole) ($M_c$) | 8746.23 | | | | |

The 1,6-hexanediol, trimethylolpropane and DESMO-DUR W preheated to 80° C. were added to a glass beaker along with solid tetrabromobisphenol A bis(2-hydroxyethyl) ether. While stirring on a hotplate, the mixture was heated until the mixture had cleared and all solid tetrabromobisphenol A bis(2-hydroxyethyl)ether had dissolved/melted. Initial Gardner impact data showed better impact strength than stretched acrylic (>16 in/lbs), and much higher than PLEXIGLAS (2 in-lb). Burn testing with a Bunsen burner showed that the flame was immediately self-extinguishing.

Example S2

A polyurethane polymer according to the present invention was prepared from the components listed below:

The polymer weight was 304.39 grams. The 1,6-hexanediol, trimethylolpropane and DESMODUR W preheated to 80° C. were added to a glass kettle along with solid tetrabromobisphenol A bis(2-hydroxyethyl)ether. Under nitrogen blanket and with constant stirring, the mixture was heated to ~105° C., until the mixture had cleared and all solid tetrabromobisphenol A bis(2-hydroxyethyl)ether had dissolved/melted. Once clear, the mixture was degassed, and cast into a 12"×12"×0.125" casting cell preheated to 121° C. The filled cell was cured for 48 hours at 121° C. Initial impact data showed very poor performance (<16 in/lbs). Burn testing with a Bunsen burner showed that the flame was immediately self-extinguishing.

|  | Solids |  |  |  | Desired Batch Size (g) |
|---|---|---|---|---|---|
| Monomer Name | Tetrabromobisphenol A bis(2-hydroxyethyl) ether | 1,6-hexanediol | TMP | Des W | 475.00 |
| OH # | — | — | — | — | |
| Acid # | — | — | — | — | |
| Equivalent Wt. | 315.99 | 59.09 | 44.00 | 131.2 | |
| Equivalents desired | 0.4500 | 0.4500 | 0.100 | 1.000 | |
| Mass Monomer | 142.20 | 26.59 | 4.40 | 131.20 | |
| Weight % Monomer | 46.72% | 8.74% | 1.45% | 43.10% | |
| Monomer masses for experiment | 221.90 | 41.49 | 6.87 | 204.74 | |
| Weight % Urethane | 19.38 | | | | |
| Molecular Weight per Crosslink (g/mole) ($M_c$) | 9131.58 | | | | |

Example S3

A polyurethane polymer according to the present invention was prepared from the components listed below:

| | | Solids | | | Desired Batch Size (g) |
|---|---|---|---|---|---|
| Monomer Name | Tetrabromobisphenol A bis(2-hydroxyethyl) ether | 1,6-hexanediol | TMP | Des W | 300.00 |
| OH # | — | — | — | — | |
| Acid # | — | — | — | — | |
| Equivalent Wt. | 315.99 | 59.09 | 44.00 | 131.2 | |
| Equivalents desired | 0.1000 | 0.8000 | 0.100 | 1.000 | |
| Mass Monomer | 31.60 | 47.27 | 4.40 | 131.20 | |
| Weight % Monomer | 14.73% | 22.04% | 2.05% | 61.17% | |
| Monomer masses for experiment | 44.20 | 66.12 | 6.15 | 183.52 | |
| Weight % Urethane | 27.51 | | | | |
| Molecular Weight per Crosslink (g/mole) ($M_c$) | 6434.13 | | | | |

The polymer weight was 214.47 grams. The 1,6-hexanediol, trimethylolpropane and DESMODUR W preheated to 80° C. were added to a glass kettle along with solid tetrabromobisphenol A bis(2-hydroxyethyl)ether. Under nitrogen blanket and with constant stirring, the mixture was heated to ~105° C., until the mixture had cleared and all solid tetrabromobisphenol A bis(2-hydroxyethyl)ether had dissolved/melted. Once clear, the mixture was degassed, and cast into a 12"×12"×0.125" casting cell preheated to 121° C. The filled cell was cured for 48 hours at 121° C. Burn testing with a Bunsen burner showed that the polymer charred and burned for about 7 seconds after the flame was removed.

Example T

Fiberglass Reinforced Polyurethane

The following reactants: 208 grams of 1,10-decanediol (2.39 equivalents) and 45.7 grams of trimethylolpropane (1.02 equivalents) were charged into a flask and heated to 125° C. under a nitrogen blanket with stirring. When a clear, homogenous melt was formed the mixture was cooled to 105° C. and 446 grams (3.41 equivalents) of DESMODUR W were added. After mixing for 15 minutes and reheating to about 90° C. the mixture clarified. After controlling the temperature at 90° C. for about 10 minutes, approximately 50% of the liquid was vacuum transferred into a 20" by 20" by ⅛" (50.8 cm×50.8 cm×0.3 cm) thick mold containing 4 layers of bidirectional E-glass fiber mat covered by release fabric and flow mesh inside a vacuum bag. The mold and glass were preheated to 105° C. before beginning the transfer.

After approximately 15 minutes, sufficient material was transferred to completely fill the bag and wet the fiberglass. The bag and mold were then heated to 143° C. for 48 hours. The temperature of the resulting fiberglass-urethane composite was then reduced to 120° C. and held for 1 hour, followed by a further reduction in temperature to 38° C. After a one hour hold at 38° C., the system was cooled to room temperature and disassembled. The resulting part was rigid, colorless and void-free.

Example U

Multilayer Composite of Cast Film According to the Present Invention on Stretched Acrylic A casting cell was constructed using 0.5" Polycast 84® stretched acrylic and 0.25" of glass that was release coated with dimethyldichlorosilane. A primer was applied to the stretched acrylic for good urethane adhesion. The cell was 6"×6" with a 0.060" gap between the glass and the stretched acrylic held constant with a silicone rubber gasket. The edges were clamped. A composition using 0.3 equivalents of trimethylolpropane, 0.7 equivalents of 1,5 pentanediol, and 1.0 equivalents of DESMODUR W were mixed and degassed at 210° F. and poured into the described casting cell. The composition was cured at 180° F. for 3 days, allowed to cool to room temperature, and then the film-cast plastic was separated from the glass release plate. A high optical quality composite was produced that had excellent substrate adhesion and high resistance to solvent stress-craze resistance. The composite was stressed to 4,000 psi with the polyurethane plastic in tensile stress and ethyl acetate was applied, covered with a glass cover slip and allowed to sit for 30 minutes. No crazing was observed even under microscopic examination. The same test was done on bare stretched acrylic in which crazes are immediately visible without microscopic examination. The same test was run on bare stretched acrylic stressed to 1000 psi. Crazing was again immediately visible without microscopic examination.

Examples V

Reinforced Composites

With reference to Table 30 below, a thermoset polyurethane was prepared as follows:

A reaction vessel was equipped with a stirrer, thermocouple, nitrogen inlet, distillation container and vacuum pump. Charge A was then added and stirred with heating to 80° C.-100° C. under vacuum and held for 1 hour. The reaction mixture was then cooled to 80° C., vacuum turned off and Charge B was added to the vessel. The reaction mixture was then heated to 80° C. under vacuum and allowed to exotherm from 110° C.-120° C. The reaction mixture was then cast in place between two 5" by 5"×3/16" float glass plates which were fitted with gaskets on three sides and held together using clamps. Both glass plates had a silane release coating on their faces that contacted the polyurethane. The spacing between the plates was approximately three sixteenths of an inch. The casting cell was preheated to a temperature of about 120° C. before casting. After casting, the assembly was given a 24 hour cure at 120° C. and then a 16 hour cure at 143° C. After curing was complete, the cell was given a two hour gradual cool down cycle from the 143° C. temperature to 45° C. while remaining in the oven. The cell was removed from the oven and the glass plates were separated from the polyurethane.

TABLE 30

|  | Parts by Weight |
|---|---|
| Charge A |  |
| 1,10-Decanediol | 61.00 |
| Trimethylolpropane | 13.41 |
| Charge B |  |
| DESMODUR W[1] | 131.00 |

[1]Bis(4-isocyanatocyclohexyl)methane from Bayer Material Science.

Example V

The following Examples show the infusion of various inorganic particulate phases into a thermoset polymeric phase. The thermoset polymers were contacted with various swelling solvents and various precursors that formed the inorganic particulate phase in situ.

Example V1

Infusion of Tetramethyl Orthosilicate in Methanol

The thermoset polyurethane of Example A was immersed into a solution comprising 20.3% by weight (25% by volume) of anhydrous methanol and 79.7% by weight (75% by volume) of tetramethyl orthosilicate (TMOS) for 24 hours. The poly(urethane) was removed from the methanol/TMOS solution and placed into deionized water for three days. The poly(urethane) was subsequently placed in a vacuum oven at 100° C. for 2 hours. Transmission electron microscopy (TEM) indicated that silica particles had infused into the polyurethane phase. The silica particles had generated 250 μm into the poly(urethane) substrate. Silica nanoparticle morphology was generally spherical and the particle size ranged from 10 to 20 nm. Discrete particles and clusters of particles were seen in this specimen.

Example V2

Infusion of Tetraethyl Orthosilicate in Ethanol

The thermoset polyurethane of Example A was immersed into a solution comprising 21.9% by weight (25% by volume) of anhydrous ethanol and 78.1% by weight (75% by volume) of tetraethyl orthosilicate (TEOS) for 24 hours. The poly(urethane) was removed from the ethanol/TEOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase. The nanoparticles ranged in size from 10 to 70 nm, with most being in the 10 nm range.

Example V3

Infusion of Tetramethyl Orthosilicate in Xylene

The thermoset polyurethane of Example A was immersed into a solution comprising 21.7% by weight (25% by volume) of anhydrous xylene and 78.3% by weight (75% by volume) of tetramethyl orthosilicate (TMOS) for 24 hours. The poly(urethane) was removed from the xylene/TMOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase. The nanoparticles ranged in size from 7 to 40 nanometers.

Example V4

Infusion of Tetramethyl Orthosilicate in Ethyl Acetate

The thermoset polyurethane of Example A was immersed into a solution comprising 22.4% by weight (25% by volume) of anhydrous ethyl acetate and 77.6% by weight (75% by volume) of tetramethyl orthosilicate (TMOS) for 24 hours. The poly(urethane) was removed from the ethyl acetate/TMOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase.

Example V5

Infusion of Tetramethyl Orthosilicate in Dimethyl Sulfoxide

The polyurethane of Example A was immersed into a solution comprising 25% by weight (25% by volume) of anhydrous dimethyl sulfoxide (DMSO) and 75% by weight (75% by volume) of tetramethyl orthosilicate (TMOS) for 24 hours. The poly(urethane) was removed from the DMSO/TMOS solution and placed into a 14% aqueous solution of ammonium hydroxide for four hours. The poly(urethane) was rinsed with water and placed into an oven at 143° C. for four hours. TEM indicated silica nanoparticles had infused into the polyurethane phase. The nanoparticles ranged in size from 7 to 30 nanometers.

Example V6

Infusion of Tetramethyl Orthosilicate into a Crosslinked Polyester Film

A piece of crosslinked polyester film was immersed into a solution comprising 20.3% by weight (25% by volume) of anhydrous methanol and 79.7% by weight (75% by volume) of tetramethyl orthosilicate (TMOS) for two hours. The film was removed from the methanol/TMOS solution and placed into a 14% aqueous solution of ammonium hydroxide for two hours. The film was rinsed with water for 15 minutes and allowed to dry at room temperature for 17 hours. A silica particulate phase infused into the polymeric phase. TEM indicated the nanoparticles ranged in size from 7 to 300 nm.

Example V7

Infusion of Titanium bis(ethyl acetoacetato) Diisopropoxide in Ethyl Acetate

The thermoset polyurethane of Example A was immersed into a solution comprising 80.1% by weight of anhydrous ethyl acetate and 19.9% by weight of titanium bis(ethyl acetoacetato) diisopropoxide for 24 hours. The poly(urethane) was removed from the ethyl acetate/titanium bis(ethyl acetoacetato) diisopropoxide solution and placed into a 14% aqueous solution of ammonium hydroxide for four hours. The poly(urethane) was rinsed with water and placed into an oven at 143° C. for four hours. A titania particulate phase infused into the polyurethane phase. Tem indicated the nanoparticles ranged in size from 5 to 200 nm.

Example V8

Infusion of Zirconium(IV) Acetylacetonate in Ethyl Acetate

The thermoset polyurethane of Example A was immersed into a solution comprising 91.2% by weight of anhydrous ethyl acetate and 8.8% by weight of zirconium(IV) acetylacetonate for 24 hours. The poly(urethane) was removed from the ethyl acetate/zirconium(IV) acetylacetonate solution and placed into a 14% aqueous solution of ammonium hydroxide for four hours. The poly(urethane) was rinsed with water and placed into an oven at 143° C. for four hours. A zirconia particulate phase infused into the polyurethane phase.

Examples W

Synthesis of Acrylic Silane Polymers

For each of Examples A to C in Table 23, a reaction flask was equipped with a stirrer, thermocouple, nitrogen inlet and a condenser. Charge A was then added and stirred with heat to reflux temperature (75° C.-80° C.) under nitrogen atmosphere. To the refluxing ethanol, charge B and charge C were simultaneously added over three hours. The reaction mixture was held at reflux condition for two hours. Charge D was then added over a period of 30 minutes. The reaction mixture was held at reflux condition for two hours and subsequently cooled to 30° C.

TABLE 31

|  | Example A | Example B | Example C |
|---|---|---|---|
| Charge A (weight in grams) | | | |
| Ethanol SDA 40B[1] | 360.1 | 752.8 | 1440.2 |
| Charge B (weight in grams) | | | |
| Methyl Methacrylate | 12.8 | 41.8 | 137.9 |
| Acrylic acid | 8.7 | 18.1 | 34.6 |
| Silquest A-174[2] | 101.4 | 211.9 | 405.4 |
| 2-hydroxyethylmethacrylate | 14.5 | 0.3 | 0.64 |
| n-Butyl acrylate | 0.2 | 0.3 | 0.64 |
| Acrylamide | 7.2 | — | — |
| Sartomer SR 355[3] | — | 30.3 | — |
| Ethanol SDA 40B | 155.7 | 325.5 | 622.6 |
| Charge C (weight in grams) | | | |
| Vazo 67[4] | 6.1 | 12.8 | 24.5 |
| Ethanol SDA 40B | 76.7 | 160.4 | 306.8 |
| Charge D (weight in grams) | | | |
| Vazo 67 | 1.5 | 2.1 | 6.1 |
| Ethanol SDA 40B | 9.1 | 18.9 | 36.2 |
| % Solids | 17.9 | 19.5 | 19.1 |
| Acid value (100% resin solids) | 51.96 | 45.64 | 45.03 |
| Mn | — | 3021[5] | 5810 |

[1]Denatured ethyl alcohol, 200 proof, available from Archer Daniel Midland Co.
[2]gamma-methacryloxypropyltrimethoxysilane, available from GE silicones.
[3]Di-trimethylolpropane tetraacrylate, available from Sartomer Company Inc.
[4]2,2'-azo bis(2-methyl butyronitrile), available from E.I. duPont de Nemours & Co., Inc.
[5]Mn of soluble portion; the polymer is not completely soluble in tetrahydrofuran.

Example W1

The acrylic-silane resin from Example A (8.5 grams) was blended with polyvinylpyrrolidone (0.1 grams) and water (1.5 grams). The formulation was stored at room temperature for 225 minutes. A portion of the resulting solution was loaded into a 10 ml syringe and delivered via a syringe pump at a rate of 1.6 milliliters per hour to the spinneret as described in Example 1. The conditions for electrospinning were as described in Example 1. Ribbon shaped nanofibers having a thickness of 100-200 nanometers and a width of 1200-5000 nanometers were collected on grounded aluminum foil and were characterized by optical microscopy and scanning electron microscopy. A sample of the nanofiber was dried in an oven at 110° C. for two hours. No measurable weight loss was observed. This indicates the nanofibers were completely crosslinked.

Examples W2 and W3

Transparent composite articles comprising a polyurethane matrix and electrospun fibers of Example 1 were prepared as follows:

For each of Examples 2 and 3, see Table 32 below, a reaction vessel was equipped with a stirrer, thermocouple, nitrogen inlet, distillation container and vacuum pump. Charge A was then added and stirred with heating to 80° C.-100° C. under vacuum and held for 1 hour. The reaction mixture was then cooled to 80° C., vacuum turned off and Charge B was added to the vessel. The reaction mixture was then heated to 80° C. under vacuum and allowed to exotherm from 110° C.-120° C. The reaction mixture was then cast in place between two 5"×5"×3/16" float glass plates which were fitted with gaskets on three sides and held together using clamps. Both glass plates had a silane release coating on their faces that contacted the electrospun fibers and the polyurethane. The fibers were spun over the treated plates before assembling them into a casting cell. The casting cell was assembled with the electrospun nanofiber covered plate on the inside of the casting cell. The spacing between the plates was approximately three sixteenths of an inch. The casting cell was preheated to a temperature of about 120° C. before casting. After casting, the assemblies were given a 24 hour cure at 120° C. and then a 16 hour cure at 143° C. After curing was complete, the cells were given a two hour gradual cool down cycle from the 143° C. temperature to 45° C. while remaining in the oven. The cells were removed from the oven and the glass plates were separated from the composite article.

Polyurethane Examples 2 and 3

TABLE 32

|  | Example 2 | Example 3 |
|---|---|---|
| Charge A (weight in grams) | | |
| 1,4 Butanediol | 31.54 | — |
| 1,10 Decanediol | — | 61.00 |
| Trimethylolpropane | 13.41 | 13.41 |
| Charge B (weight in grams) | | |
| DESMODUR W[1] | 131.00 | 131.00 |

[1]Bis(4-isocyanatocyclohexyl)methane from Bayer Material Science.

Each composite article was tested for scratch resistance by subjecting the composite to scratch testing by linearly scratching the surface with a weighted abrasive paper for ten double rubs using an Atlas ATCC Scratch Tester, Model CM-5, available from Atlas Electrical Devices Company of Chicago, Ill. The abrasive paper used was 3M 281Q WETORDRY™ PRODUCTION™ 9 micron polishing paper sheets, which are commercially available from 3M Company of St. Paul, Minn.

After completing the scratch-test with a Crockmeter using a 9-μm abrasive, the increase in the average roughness in the surface of the scratched area was measured using an optical profilometer. The surface of the scratched area was scanned perpendicular to the direction on the Crockmeter scratching; that is, across the scratches. An identical scan was taken in an unscratched area to measure average roughness of the surface of the original article. Change in average surface roughness for each article was calculated by subtracting the average roughness of the unscratched surface from the average roughness of the scratched surface. Transparent articles with no nanofibers were compared with transparent composite articles containing electrospun fibers from Example 3.

Also, for the purpose of comparison, composite articles were prepared as generally described above for Example 3, but in which polyvinylidene fluoride (KYNAR) and nylon-6 fibers were electrospun and used in place of the fibers of Example 3. The composite articles were evaluated for scratch resistance as described above. The results of the testing are reported in Table 33 below.

TABLE 33

| Example | Electrospun Fibers | Change in average surface roughness (nm) |
|---|---|---|
| Control | None | 74.54 |
| Example 4 | Example 3 | 6.93 |
| Example 4 (repeat) | Example 3 | −7.28 |
| Control (repeat) | None | 81.48 |
| Example 5 | Example 3 | −4.91 |
| Comparative | KYNAR | 90.2 |
| Comparative | Nylon-6 | 66.96 |

The results reported in Table 33 show the improvement in scratch resistance provided by the acrylic-silane electrospun fibers.

Example X

Powder Example 1,4-Butanediol (5.47 grams, 0.122 equivalents) and 4,4'-methylene bis-cyclohexylisocyanate (DESMODUR W from Bayer Corporation; NCO equivalent weight 131; 14.52 grams, 0.111 equivalents) were stirred together in a dry glass container. One drop of dibutyltin dilaurate was added. The cloudy mixture warmed spontaneously and became transparent. The mixture was then placed in an oven at 120° C. for 6 hours.

A 1.88 gram portion of the resulting glassy, solid polyurethane was dissolved in 5.23 grams of M-Pyrol by boiling on a hot plate. Similarly, isophorone diisocyanate trimer (0.23 grams) was dissolved in 3.68 grams of M-Pyrol. The two solutions were combined in an aluminum dish and baked at 145° C. for 35 minutes. The resulting film was transparent, tough and hard. Rubbing with methyl ethyl ketone did not soften the film or cause it to become tacky, indicating it was thoroughly crosslinked.

Example Y

Liquid Infusion of Inorganic Precursors into Urethane Resulting in In-Situ Generated Nanoparticles A piece of urethane plastic was prepared by the following method. Dimethyl dichlorosilane was vapor deposited onto the surface of two pieces of tempered glass and the excess was wiped off with isopropanol. A rubber gasket (3/16" in diameter) was placed between the two pieces of glass and the pieces of glass were fastened together so that one end of the mold was open. The prepolymer was prepared by heating 504 g 1,10-decanediol (3.55 mol, 0.7 equivalents) and 111 g trimethylolpropane (0.83 mol, 0.3 equivalents) in a three-neck round bottom flask to 120° C. under vacuum, where it was held for 30 minutes. The contents of the flask were cooled to 80° C. and 1084 g dicyclohexylmethane diisocyanate (4.14 mol, 1 equivalent) was added. The reaction exothermed to 105° C. and the solution was poured into the open end of the glass mold. The mold was placed into an oven at 120° C. for 24 hours and 143° C. for 16 hours. The temperature was decreased to 43° C. for one hour and the mold was removed from the oven. The mold was disassembled to remove the cast urethane plastic part.

A solution comprising 75% by volume of tetramethyl-orthosilicate (TMOS) and 25% by volume of methanol was prepared in a sealed container. A piece of urethane plastic was placed into the sealed container and the container was flushed with dry nitrogen gas. The urethane plastic soaked in the TMOS/methanol solution for 4 or 24 hours. The urethane plastic was removed and immersed in: 1) water for 72 hours, 2) 2 M HCl for one hour and water for one hour or 3) 15% v/v solution of $NH_4OH$ in water for one hour. The specimens were subsequently annealed at 143° C. for 4 hours. The immersion soaks hydrolyzed and condensed the liquid inorganic precursor (TMOS) that was infused in the plastic. Each soak resulted in different sized nanoparticles which were located at different depths in the plastic.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

What is claimed is:

1. A polyurethane comprising a reaction product of components comprising:
   (a) an isocyanate functional urethane prepolymer comprising a reaction product of components comprising:
      (i) about 1 equivalent of at least one polyisocyanate; and (ii) about 0.1 to about 0.5 equivalents of at least one polyol having 2 to 18 carbon atoms selected from the group consisting of dodecanediol, octadecanediol, 1,4-benzenedimethanol, xylene glycol, hydroxybenzyl alcohol, 1,4-bis(hydroxyethyl)piperazine, N,N',bis(2-hydroxyethyl)oxamide, 2-methyl-butanediol, 2,2,4-trimethyl-1,3-pentanediol, 2-methyl-1,3-pentanediol, 2-ethyl-1,3-hexanediol, polyethylene glycol, cycloalkane diol, cyclopentanediol, 1,4-cyclohexanediol, cyclohexanedimethanol, cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane and mixtures thereof; and (b) about 0.05 to about 1.0 equivalents of at least one branched polyol having 4 to 18 carbon atoms and at least 3 hydroxyl groups, based upon the about 1 equivalent of at least one polyisocyanate (i), the polyol (b) being selected from the group consisting of tetramethylolmethane, trimethylolethane, trimethylolpropane, pentaerythritol, dipentaerythritol, tripentaerythritol, and mixtures thereof; and (c) up to about 0.9 equivalents of at least one polyol different from branched polyol (b) and having 2 to 18 carbon atoms, based upon the about 1 equivalent of at least one polyisocyanate (i), wherein the reaction product components comprise less than about 5 weight percent of polyester polyol, less than about 5 weight percent of polycarbonate polyol and less than about 5 weight percent polyether polyol, wherein the prepolymer (a), polyol (b), and polyol (c) (if present) are each preheated to and maintained at a temperature of at least about 120° C. to about 140° C. for at least about 10 minutes immediately prior to mixing together within a mixing chamber of a dynamic pin mixer, wherein the mixing chamber has a volume of about 62 cc to about 250 cc, the total flow rate of components into the mixing chamber is about 499 to about 4807 grams per minute, and wherein the residence time of the components in the mixing chamber is from about 0.1 seconds to about 5 minutes.

2. The polyurethane according to claim 1, wherein the polyisocyanate is selected from the group consisting of diisocyanates, triisocyanates, dimers, trimers and mixtures thereof.

3. The polyurethane according to claim 2, wherein the polyisocyanate is a diisocyanate selected from the group consisting of ethylene diisocyanate, trimethylene diisocyanate, 1,6-hexamethylene diisocyanate, tetramethylene diisocyanate, hexamethylene diisocyanate, octamethylene diisocyanate, nonamethylene diisocyanate, decamethylene diisocyanate, 1,6,11-undecane-triisocyanate, 1,3,6-hexamethylene triisocyanate, bis(isocyanatoethyl)-carbonate, bis (isocyanatoethyl)ether, trimethylhexane diisocyanate, trimethylhexamethylene diisocyanate, 2,2'-dimethylpentane diisocyanate, 2,2,4-trimethylhexane diisocyanate, 2,4,4-trimethylhexamethylene diisocyanate, 1,8-diisocyanato-4-(isocyanatomethyl) octane, 2,5,7-trimethyl-1,8-diisocyanato-5-(isocyanatomethyl)octane, 2-isocyanatopropyl-2,6-diisocyanatohexanoate, lysinediisocyanate methyl ester, 4,4'-methylene-bis-(cyclohexyl isocyanate), 4,4'-isopropylidene-bis-(cyclohexyl isocyanate), 1,4-cyclohexyl diisocyanate, 4,4'-dicyclohexylmethane diisocyanate, 3-isocyanato methyl-3,5,5-trimethylcyclohexyl isocyanate, meta-tetramethylxylylene diisocyanate, diphenyl methane diisocyanates, diphenyl isopropylidene diisocyanate, diphenylene diisocyanate, butene diisocyanate, 1,3-butadiene-1,4-diisocyanate, cyclohexane diisocyanate, methylcyclohexane diisocyanate, bis(isocyanatomethyl) cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanato-methyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo-[2.2.1]-heptane, 2-isocyanatomethyl-2-(3-isocyanatopropyl)-6-(2-isocyanatoethyl)-bicyclo[2.2.1]-heptane, α,α'-xylene diisocyanate, bis(isocyanatoethyl)benzene, α,α,α',α'-tetramethylxylene diisocyanate, 1,3-bis(1-isocyanato-1-methylethyl) benzene, bis(isocyanatobutyl)benzene, bis(isocyanatomethyl)naphthalene, bis(isocyanatomethyl)diphenyl ether, bis(isocyanatoethyl) phthalate, mesitylene triisocyanate, 2,5-di(isocyanatomethyl)furan, α,α'-xylene diisocyanate, bis(isocyanatoethyl)benzene, α,α,α',α'-tetramethylxylene diisocyanate, 1,3-bis(1-isocyanato-1-methylethyl) benzene, bis(isocyanatobutyl) benzene, bis(isocyanatomethyl)naphthalene, bis(isocyanatomethyl) diphenyl ether, bis(isocyanatoethyl) phthalate, 2,5-di(isocyanatomethyl)furan, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, and dimers, trimers and mixtures thereof.

4. The polyurethane according to claim 3, wherein the diisocyanate is 4,4'-methylene-bis-(cyclohexyl isocyanate) or the trans, trans isomer of 4,4'-methylene-bis-(cyclohexyl isocyanate).

5. The polyurethane according to claim 1, wherein the polyisocyanate is selected from the group consisting of aliphatic, cycloaliphatic, aromatic and heterocyclic isocyanates, dimers and trimers thereof and mixtures thereof.

6. The polyurethane according to claim 1, wherein the equivalent ratio of polyisocyanate to polyol having 2 to 18 carbon atoms for preparing the isocyanate functional urethane prepolymer ranges from about 1:0.3 to about 1:0.4.

7. The polyurethane according to claim 1, wherein the equivalent ratio of polyisocyanate to polyol having 2 to 18 carbon atoms for preparing the isocyanate functional urethane prepolymer is about 1:0.35.

8. The polyurethane according to claim 1, wherein the branched polyol has three hydroxyl groups.

9. The polyurethane according to claim 1, wherein the branched polyol is trimethylolpropane.

10. The polyurethane according to claim 1, wherein the polyol (c) is selected from the group consisting of ethylene glycol, diethylene glycol, triethylene glycol, tetraethylene glycol, 1,2-ethanediol, propanediol, butanediol, pentanediol, hexanediol, heptanediol, octanediol, nonanediol, decanediol, dodecane diol, octadecanediol, sorbitol, mannitol, cyclopentanediol, 1,4-cyclohexanediol, cyclohexanedimethanol, 1,4-benzenedimethanol, xylene glycol, hydroxybenzyl alcohol, dihydroxytoluene bis(2-hydroxyethyl) terephthalate, 1,4-bis(hydroxyethyl)piperazine, N,N',bis(2-hydroxyethyl)oxamide and mixtures thereof.

11. The polyurethane according to claim 10, wherein the diol (c) is butanediol.

12. The polyurethane according to claim 10, wherein the diol (c) is pentanediol.

13. The polyurethane according to claim 1, wherein the reaction product components comprise less than about 0.1 equivalents of polyester polyol or polyether polyol or polycarbonate polyol.

14. The polyurethane according to claim 1, wherein the reaction product components further comprise one or more polyurethane polyols, acrylamides, polyvinyl alcohols, hydroxy functional acrylates, hydroxy functional methacrylates, allyl alcohols, dihydroxy oxamides, dihydroxyamides, dihydroxy piperidines, dihydroxyethyl hydroquinones and mixtures thereof.

15. The polyurethane according to claim 1, wherein the reaction product components are essentially free of amine curing agent.

16. The polyurethane according to claim 1, wherein the polyurethane has a urethane content of about 20 to about 40 weight percent.

17. The polyurethane according to claim 1, wherein the polyurethane has a cyclic content of about 10 to about 80 weight percent.

18. The polyurethane according to claim 1, wherein the polyurethane has a molecular weight per crosslink of at least about 500 grams per mole.

19. The polyurethane according to claim 1, wherein the reaction components are maintained at a temperature of at least about 100° C. for at least about 10 minutes.

20. A polyurethane comprising a reaction product of components comprising:
 (a) an isocyanate functional urethane prepolymer comprising a reaction product of components comprising:
  (i) about 1 equivalent of at least one polyisocyanate; and
  (ii) about 0.1 to about 0.5 equivalents of at least one diol having 2 to 18 carbon atoms selected from the group consisting of dodecanediol, octadecanediol, 1,4-benzenedimethanol, xylene glycol, hydroxybenzyl alcohol, 1,4-bis(hydroxyethyl)piperazine, N,N', bis(2-hydroxyethyl)oxamide, 2-methyl-butanediol, 2,2,4-trimethyl-1,3-pentanediol, 2-methyl-1,3-pentanediol, 2-ethyl-1,3-hexanediol, polyethylene glycol, cycloalkane diol, cyclopentanediol, 1,4-cyclohexanediol, cyclohexanedimethanol, cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidenebiscyclohexanol, bis(4-hydroxycyclohexanol)methane and mixtures thereof; and
 (b) about 0.05 to about 0.9 equivalents of at least one branched polyol having 4 to 18 carbon atoms and at least 3 hydroxyl groups, based upon the about 1 equivalent of at least one polyisocyanate (i), the polyol (b) being selected from the group consisting of tetramethylolmethane, trimethylolethane, trimethylolpropane, pentaerythritol, dipentaerythritol, tripentaerythritol, and mixtures thereof; and
 (c) up to about 0.45 equivalents of at least one diol having 2 to 18 carbon atoms,
  wherein the reaction product components comprise less than about 5 weight percent of polyester polyol, less than about 5 weight percent of polycarbonate polyol and less than about 5 weight percent polyether polyol, wherein the prepolymer (a), polyol (b), and polyol (c) (if present) are each preheated to and maintained at a temperature of at least about 120° C. to about 140° C. for at least about 10 minutes immediately prior to mixing together using within a mixing chamber of a dynamic pin mixer, wherein the mixing chamber has a volume of about 62 cc to about 250 cc, the total flow rate of components into the mixing chamber is about 499 to about 4807 grams per minute, and wherein the residence time of the components in the mixing chamber is from about 0.1 seconds to about 5 minutes.

21. An article comprising the polyurethane of claim 1.

22. The article according to claim 21, wherein the article is a molded article.

23. The article according to claim 21, wherein the article is selected from the group consisting of transparencies, optical articles, photochromic articles, ballistic resistant articles, and glazings.

24. The article according to claim 21, wherein the article has a Gardner Impact strength of at least about 400 in-lb (45 Joules) according to ASTM-D 5420-04.

25. An article comprising the polyurethane of claim 21, wherein the article is an airplane transparency.

26. The article according to claim 25, wherein the article comprises at least one layer of the polyurethane of claim 19 and at least one layer of polycarbonate.

27. A laminate comprising:
 (a) at least one layer of the polyurethane of claim 1; and
 (b) at least one layer of a substrate selected from the group consisting of paper, glass, ceramic, wood, masonry, textile, metal or organic polymeric material and combinations thereof.

28. A coating composition comprising the polyurethane of claim 1.

* * * * *